United States Patent [19]

Casper et al.

[11] 4,451,916

[45] May 29, 1984

[54] REPEATERED, MULTI-CHANNEL FIBER OPTIC COMMUNICATION NETWORK HAVING FAULT ISOLATION SYSTEM

[75] Inventors: Paul W. Casper, Melbourne; Norman C. Seiler, West Melbourne, both of Fla.; Thomas J. Nixon, Gaithersburg, Md.; George A. Waschka, Jr., Melbourne, Fla.; Charles R. Patisaul, Melbourne, Fla.; James W. Toy, Melbourne, Fla.; Willie T. Burton, Jr., Palm Bay, Fla.; W. B. Ashley, Manhattan Beach, Calif.; Fred J. Orlando, Jr., West Melbourne, Fla.; Ronald R. Giri, Melbourne, Fla.; Peter H. Halpern, Longwood, Fla.; J. Richard Jones, Melbourne, Fla.; Harold Iley, Huntsville, Ala.

[73] Assignee: Harris Corporation, Melbourne, Fla.

[21] Appl. No.: 149,291

[22] Filed: May 12, 1980

[51] Int. Cl.³ .............................................. H04J 3/12
[52] U.S. Cl. ........................................ 370/16; 371/22; 455/8; 455/9; 455/16; 455/601; 375/4; 370/10
[58] Field of Search ................. 455/8, 9, 15, 17, 16, 455/601, 613, 608, 609, 618; 375/3, 4, 38; 333/2, 3; 179/175.3 F, 175.3 S; 340/147 SC; 370/16, 10; 371/22

[56] References Cited

U.S. PATENT DOCUMENTS

| 4,069,402 | 1/1978 | Mantovani et al. | 371/22 |
| 4,184,056 | 1/1980 | Basch et al. | 179/175.31 R |
| 4,187,415 | 2/1980 | Boutmy et al. | 179/175.3 F |
| 4,211,920 | 7/1980 | Wakabayashi | 179/175.3 F |
| 4,234,956 | 11/1980 | Adderley et al. | 375/38 |
| 4,278,850 | 7/1981 | Sato et al. | 179/175.31 R |
| 4,334,303 | 6/1982 | Bertin et al. | 179/175.31 R |

OTHER PUBLICATIONS

A. H. Erlund, "An Automatic Protection System for Digital Lines", I.E.E.E. Transactions on Comm., vol. Com. 23, No. 4, pp. 478-482, 4/75.

Primary Examiner—John C. Martin
Assistant Examiner—Edward L. Coles
Attorney, Agent, or Firm—Antonelli, Terry & Wands

[57] ABSTRACT

A repeatered, multichannel fiber optic communication network includes a plurality of full duplex fiber optic channels and one or more auxiliary channels. In order to supervise and control the operation of the network, for both data transmission and fault/maintenance actions, each terminal station contains a processor-based subsystem capable of network monitoring, first level maintenance action, fault isolation, and remote network control and status reporting. This processor-based subsystem interfaces with each fiber optic channel, with an orderwire communication link, and with external input/output devices and surveillance equipment. Three substantially autonomous processor-based sections which are dedicated to performing specific functions within the overall network operation are employed for carrying out these separate interfacing tasks. Each section of the processor-based subsystem in a terminal station contains its own CPU and associated memory and is programmed to carry out specific functions identified with that section. Each section is interconnected with the other two so that, internally, the subsystem is fully integrated.

104 Claims, 50 Drawing Figures

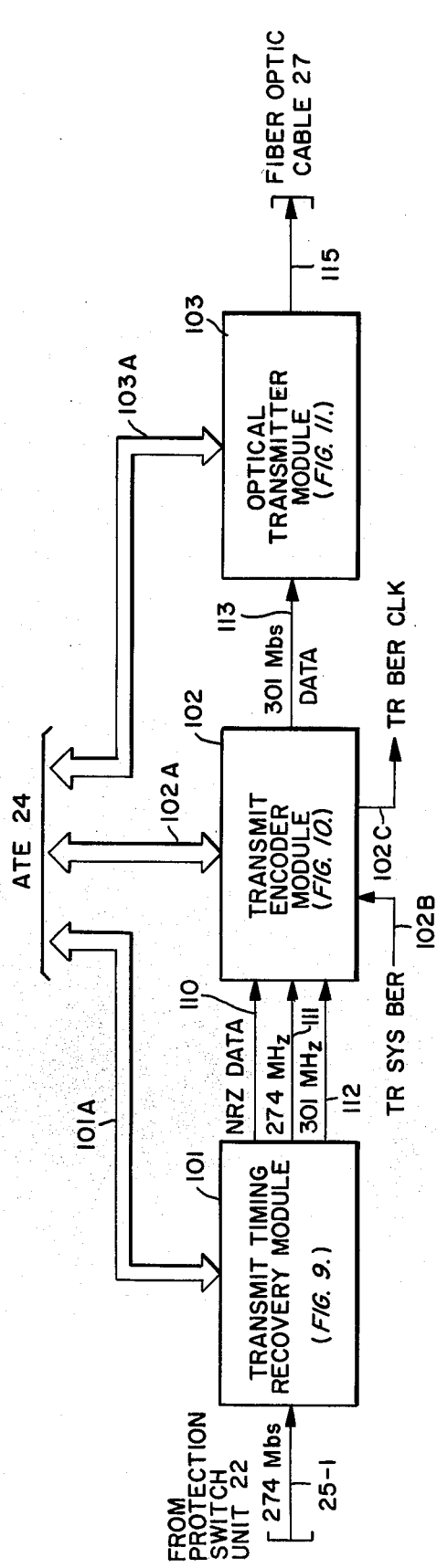
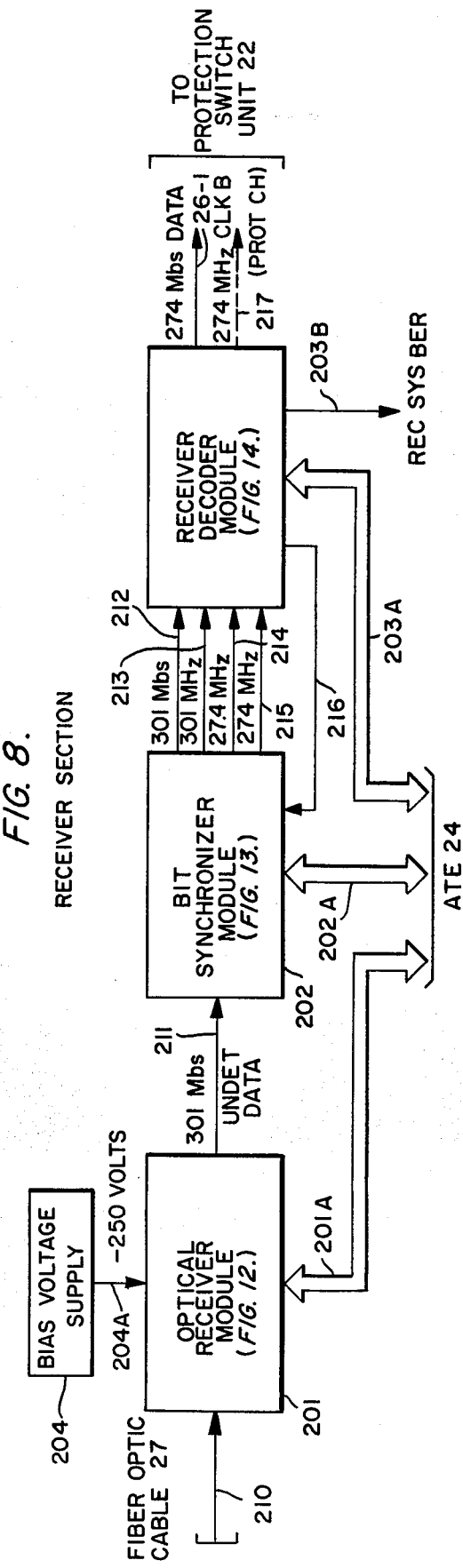

SUBFRAME

FRAME

MAJOR FRAME $S_n \equiv$ FRAME SYNC BIT N
B $\equiv$ BER BIT
O $\equiv$ OW BIT
C $\equiv$ ATU COMMAND AND CONTROL BIT
N $\equiv$ NOT USED

DATA FORMAT

LOW ENCODE/DECODE CONTROL UNIT

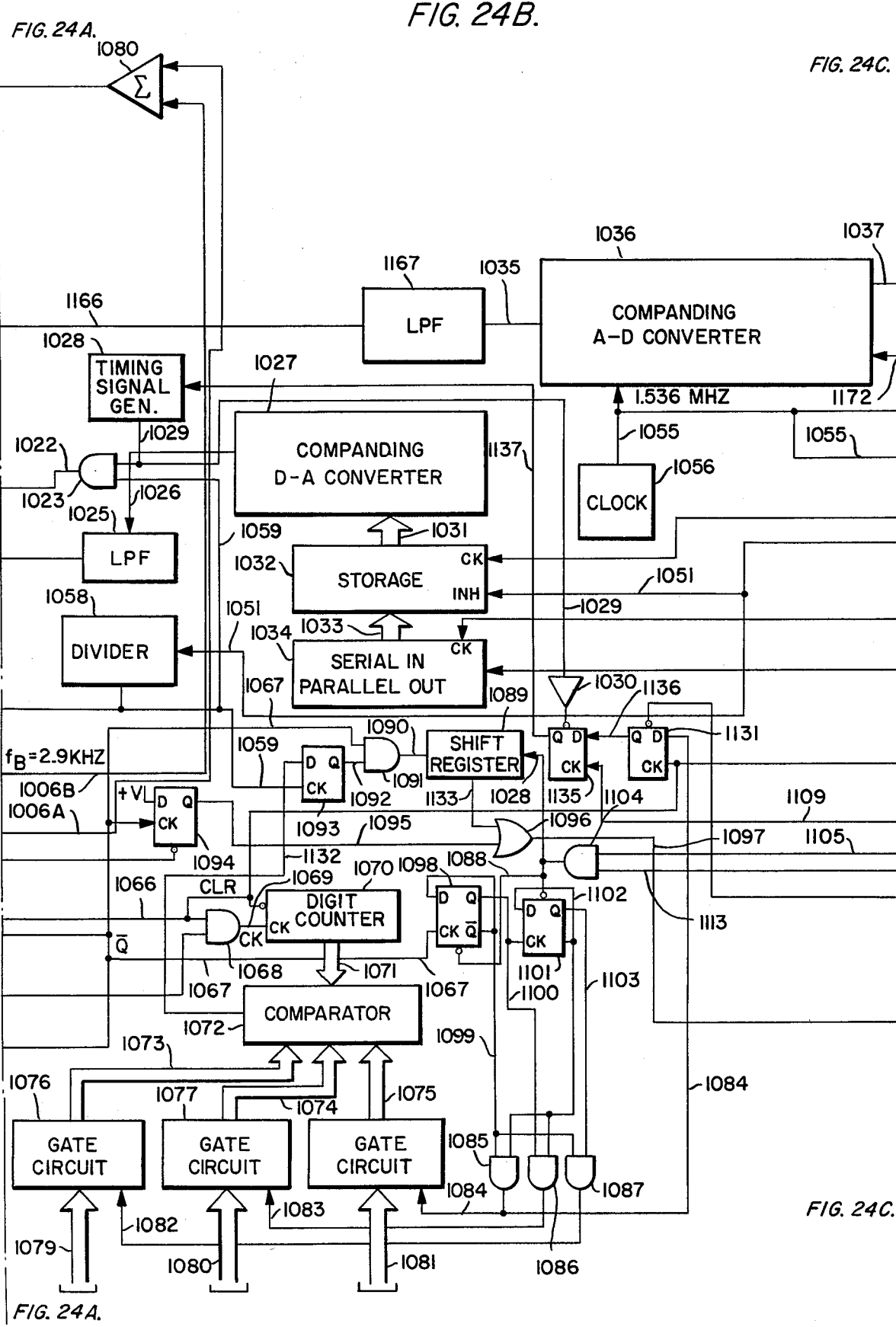

REPEATERED, MULTI-CHANNEL FIBER OPTIC COMMUNICATION NETWORK HAVING FAULT ISOLATION SYSTEM

FIELD OF THE INVENTION

The present invention is directed to communication systems and relates particularly to a repeatered multichannel fiber optic communication network for transmitting high data rate digitally encoded signals between relatively geographically remote stations.

BACKGROUND OF THE INVENTION

With the recent development of and practical realization of electro-optic communication systems using fiber optic cables or high bandwidth signalling highways, applications of such systems to areas previously involving radio or copper wire cables have emerged. Auspiciously, fiber optic communication systems offer high density signalling traffic communication facilities, such as long distance telephone trunk lines, the ability to handle extremely high data rate digital data, permitting the telephone systems to service the increasing needs of a larger number of customers over a greater geographical area. Examples of fiber optic transmission networks that relate in general to repeatered communication systems are described in the Kach U.S. Pat. No. 4,027,153 and Maione et al, No. 4,019,048.

Within such systems, signalling integrity maintenance measures, such as repeaters and protection channel equipment, assist in permitting expansion of the system as the need arises. Of course, repeatered multi channel communication systems have been conventionally adopted for long range radio and copper cable environments and such systems typically include auxiliary or protection channels as an adjunct to the normally used communication highways in the event of a failure. Examples of such systems are described in the Farkas U.S. Pat. No. 3,111,624, Ferrar et al, No. 3,045,113, Miedama, No. 4,039,947 and Higo, No. 4,077,004. These systems typically employ signal monitoring and evaluation equipment separate from the signal transmission links themselves and take appropriate channel substitution action on the basis of the monitored inputs.

Unfortunately heretofore proposed multichannel communication networks, whether they be of the radio, copper wire, or fiber optic variety, as exemplified by the above-mentioned prior art schemes, do not offer a rapid and accurate approach to detecting the occurrence of a failure or a potential failure on a link together with a measure for isolating the cause of a failure on a link. Moreover, such systems do not offer the network subscriber a broad-based system capable of overall network monitoring, maintenance action, fault isolation, and remote system control and status reporting.

SUMMARY OF THE INVENTION

In accordance with the present invention, there is provided a new and improved repeatered, multichannel fiber optic communication system particularly suited for handling high data rate, high density digital data signals, e.g. T-4 data signals such as multiplexed voice and digital communications to be transmitted over long geographical distances. The fiber optic communication network of the present invention offers highly reliable telephone and data transmission capabilities and is suitable for inter-office trunk, digital microwave entrance, and special utility entrance links in both urban and rural installations.

For this purpose, and considering a communication scheme between a pair of relatively geographically remote stations with respect to which the digitized telephone traffic may be interfaced, the network of the present invention includes a plurality of full duplex fiber optic channels and one or more auxiliary channels to supplement a working channel in the event of a failure. While the number of channels, including both normally working and auxiliary or protection channels, is not limited to any particular number, for purposes of describing an exemplary embodiment of the invention, the configuration under consideration may contain five normally working channels and one protection or auxiliary channel. Each channel is comprised of a pair of fiber optic strands, one transmitting signals from a first station to a second station, the other transmitting signals from the second station to the first station, thereby providing full duplex capability over each channel.

Between the stations, between which the digitized voice and data traffic is to be transmitted over the fiber optic channels are one or more repeater stations. Each repeater station contains an individual repeater unit including a receiver and a transmitter, for each fiber optic strand, thereby providing six upstream and six downstream repeater units at each repeater station, for the six available channels. Every other repeater unit also contains a bit synchronizer, coupled between the receiver and the transmitter, for maintaining synchronization of data communications along the link. Transceiver components, similar to those employed in the repeater stations are contained at each terminal station so that the terminal stations may source or terminate data signals on the various channels. A transmitter portion of the transceiver accepts customer data to be transmitted as well as additional control and synchronization data, multiplexes the groups of data signals together and scrambles them for transmission to a distant terminal station. The scrambling of the data is effected using a maximal length PN sequence which serves to synchronize the descrambling and demultiplexing of data at the receiving terminal station.

A separate twisted pair copper wire link is coupled among the terminal stations and each repeater station along the network for the purpose of parameter monitoring and fault isolation in the event of a failure. Through the separate communication link termed an orderwire (OW) link, which carries no customer data but is dedicated exclusively to network operation, condition and bit error rate data from each station can be monitored. In addition, interface components associated with this additional orderwire cable permit supervisory and maintenance personnel to carry on audio communications with each other. Signalling over the orderwire cable for parameter monitoring and fault isolation is effected using digitally encoded tone pulses. These tone pulses are summed with any voice signals and both are transmitted simultaneously among the stations.

In order to supervise and control the operation, for both data transmission and fault/maintenance actions, of the network, each terminal station contains a processor-based subsystem capable of network monitoring, first level maintenance action, fault isolation, and remote network control and status reporting. This processor-based subsystem interfaces with each fiber optic channel, with the orderwire communication link, and with external input/output devices and surveillance equipment. To carry out these separate interfacing tasks, three substantially autonomous processor-based sections dedicated to performing specific functions within the overall network operation are employed.

A first section, termed a terminal surveillance section, interfaces with the opto-electronic receiver and transmitter equipment at its end of the network for each of the available fiber optic channels and measures the channel quality (BER). The terminal surveillance section also monitors parameter conditions of the transceiver equipment in the terminal station itself. If either a fault in the terminal is sensed or channel quality falls below a prescribed threshold level, action is taken by the subsystem to cause the defective channel to be replaced by the protection channel.

A second section, termed a site surveillance section, forms that portion of the processor-based subsystem which communicates with the repeater stations over the orderwire cable. It is through this section that a fault isolation process to locate the cause of unacceptable channel quality as measured by the terminal surveillance section is implemented. Advantageously, through a separate channel quality monitoring unit associated with each repeater station, the site surveillance section measures the throughput of each repeater station for a specified channel in sequence, from the source of the channel data to the receiving terminal station and identifies the faulty repeater in response to an unacceptable change in measured BER. In carrying out the fault isolation process a prescribed psuedo random number digital data sequence corresponding to that used in scrambling and synchronizing data on the fiber optic links is injected into the faulty channel's fiber optic link at the transceiver equipment associated with the terminal station at the upstream end of the link. Via the local orderwire, each repeater station is individually addressed by a command message from the site surveillance section and a response meassage containing information as to the channel quality as monitored by the BER monitoring unit in the repeater is transmitted from the addressed repeater, thereby enabling the subsystem to identify the location of the data degradation on the channel of interest.

A third section, termed a control and status section, communicates with peripheral and I/O control devices, such as printer, CRT, operator display and control switches, etc., and also interfaces with the multiplexed data on each of the fiber optic channels through a prescribed overhead bit that is periodically inserted into the data stream transmitted over the fiber optic channels. Through this overhead bit, the processor based subsystems of the terminal stations at the opposite ends of the network communicate with each other exchanging control and status information.

Each of the three sections of the processor based subsystem in a terminal station contains its own CPU and associated memory and is programmed to carry out specific tasks identified with that section. Each of the sections is interconnected with the other two so that, internally, the subsystem is fully integrated.

As a further feature of the network, attendants or operators in the terminal stations may communicate directly with each other over any of the active fiber optic channels through an audio interface unit, termed an "express orderwire" subsystem which, like the control and status section of the microprocessor based subsystem, interfaces with the multiplexed data on each of the fiber optic channels through a preselected overhead bit that is periodically inserted in the data stream transmitted over the fiber optic channels. With respect to the inserted overhead bits in the active channels, it is to be observed that an overhead bit is coupled to each active channel in parallel so that even in the event of a complete failure of a channel (interruption of customer service) control and status information necessary for network operation will still get through over each of the remaining active channels. Facility is provided at each terminal station to either selectively monitor any desired channel or that channel having a preferred quality for the purpose of exchanging data via the "overhead bit highway" on the fiber optic channels.

In order to assist maintenance personnel in rapidly locating and identifying individual network components for which the processor based subsystem has determined a fault exists, individual fault indicators are provided in each module and associated housing components. In addition, operation mode and condition indicators and control switches are provided on the attendant's consoles in the terminal stations to facilitate supervisory action as necessary. In this respect programmed procedures stored in the various sections described above can be circumvented by direct operator control, thereby maximizing access to and control over all facets of the network's operation.

BRIEF DESCRIPTION OF THE DRAWINGS

FIG. 7 is a block diagram of the components of the transmitter portion of a transceiver unit;

FIG. 8 is a block diagram of the components of the receiver portion of a transceiver unit;

DETAILED DESCRIPTION

Figure 1:
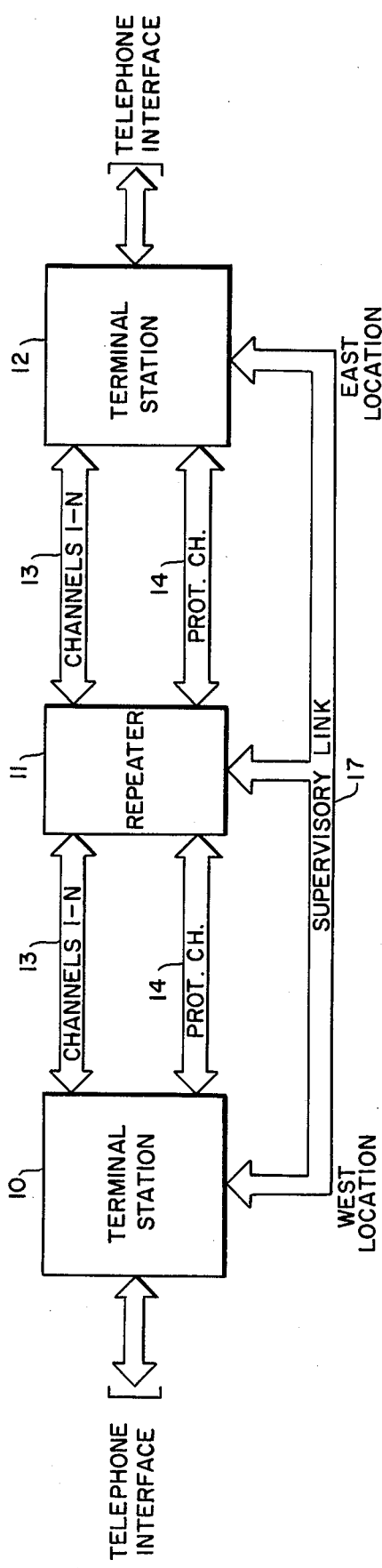
FIG. 1 is a general block diagram of a repeatered multichannel fiber optic communication network.

Referring to FIG. 1, there is shown a general block diagram of a fiber optic communication network in accordance with the present invention wherein information is to be conveyed between geographically separated locations identified in FIG. 1 as a West location and an East location. For purposes of facilitating the description and illustration of the invention, the network will be reduced to a simplified communication configuration containing only two spaced apart locations between which information is to be conveyed. It should be understood, however, that more than two separate locations may be interconnected with each other over respective network sections established between each pair of locations. FIG. 1 illustrates the configuration of an individual section of the network wherein a pair of terminal stations 10 and 12 geographically remote from each other at respective West and East locations are coupled together over the fiber optic transmission arrangement to be described in detail below. Where the overall network is comprised of more than only the two separate locations shown in FIG. 1, separate sections are associated with each pair of locations between which communications are to be conveyed, with the sections being linked together in a back-to-back chain configuration to complete the overall network. Since the network configuration will be assumed to be reduced to only a single section coupling a pair of locations geographically separated from each other, the terms network and section may be considered to be synonymous, except in a few isolated instances where reference to separate sections of a larger (more than two) network will be made. For purposes of the present description it will be assumed that the information to be conveyed over the network is in the form of digitized telephone traffic, although it should be understood that the particular type of information transmitted via the system is not critical. The digitized telephone signals may represent voice, data, etc., namely, whatever signals may be digitized into a suitable format for high speed, high density data communication.

Situated at one end of the network at a West location and coupled to a telephone signalling interface (not shown) is a first terminal station 10. Terminal station 10 provides full duplex transmission capability between a telephone interface, such as an interoffice trunk, or digital microwave interface and a multichannel fiber optic communication highway comprised of an N-channel fiber optic link 13 and a protection channel link 14. Each fiber optic channel is configured of a pair of optical fibers, one for transmitting signals in one direction (e.g. West-to-East) and the other for transmitting signals in the reverse direction (e.g. East-to-West). In the present description it will be assumed that six channels make up the system, including five normally active or used channels and one normally quiescent or protection channel. It should be understood, however, that the number of channels that may be employed is not limited to the particular number chosen in the example described, but may be any suitable number as the need demands. The protection channel 14 is normally not used but is provided in the event of a failure of one of the five active channels of link 13.

From terminal station 10 at the West end of the network, fiber optic links 13 and 14 are coupled to a repeater 11 which is further coupled to additonal fiber optic links 13 and 14 to terminal station 12 at the opposite (East) end of the network. Repeater 11 provides the necessary signal regeneration to ensure proper signal transmission, via the optical fiber channel links, reception and data recovery at the receiving terminal station 12. While only a single repeater 11 has been shown in FIG. 1 so as to simplify the drawing, it should be understood that more repeaters may be serially situated along the fiber optic link between terminal stations 10 and 12 as the distance between terminal statins at opposite ends of the network increases. With presently available optical fibers a cable length separation between units of up to approximately 3.8 km has been found to be acceptable at the data rates used in this system. In the T-4 embodiment described herein, the basic system frequencies are 274.176±0.003 MHz and 301.594±0.003 MHz.

For purposes of the description to follow, these frequencies will be simplified as 274 MHz and 301 MHz, respectively.

Like terminal station 10, terminal station 12 provides full duplex transmission capability between an associated local telephone interface (not shown) and the multichannel fiber optic communication highway. Also coupled to each terminal and repeater is a supervisory link 17. Supervisory link 17 is used to convey status and control information between the separate portions of the network for monitoring the operation of the network. The supervisory signals that are conveyed over link 17 are produced by monitoring and control subsystems within the terminal stations and the repeater equipment, as will be described in detail below. Since the bandwidth of the status and control signals conveyed over link 17 is much lower than that of the high density signalling over the optical channel links, link 17 may be formed of a twisted copper wire pair. The details of the configuration and operation of the components of the communication network diagram shown in FIG. 1 will be explained more fully below.

TERMINAL STATION (FIG. 2)

Figure 2:
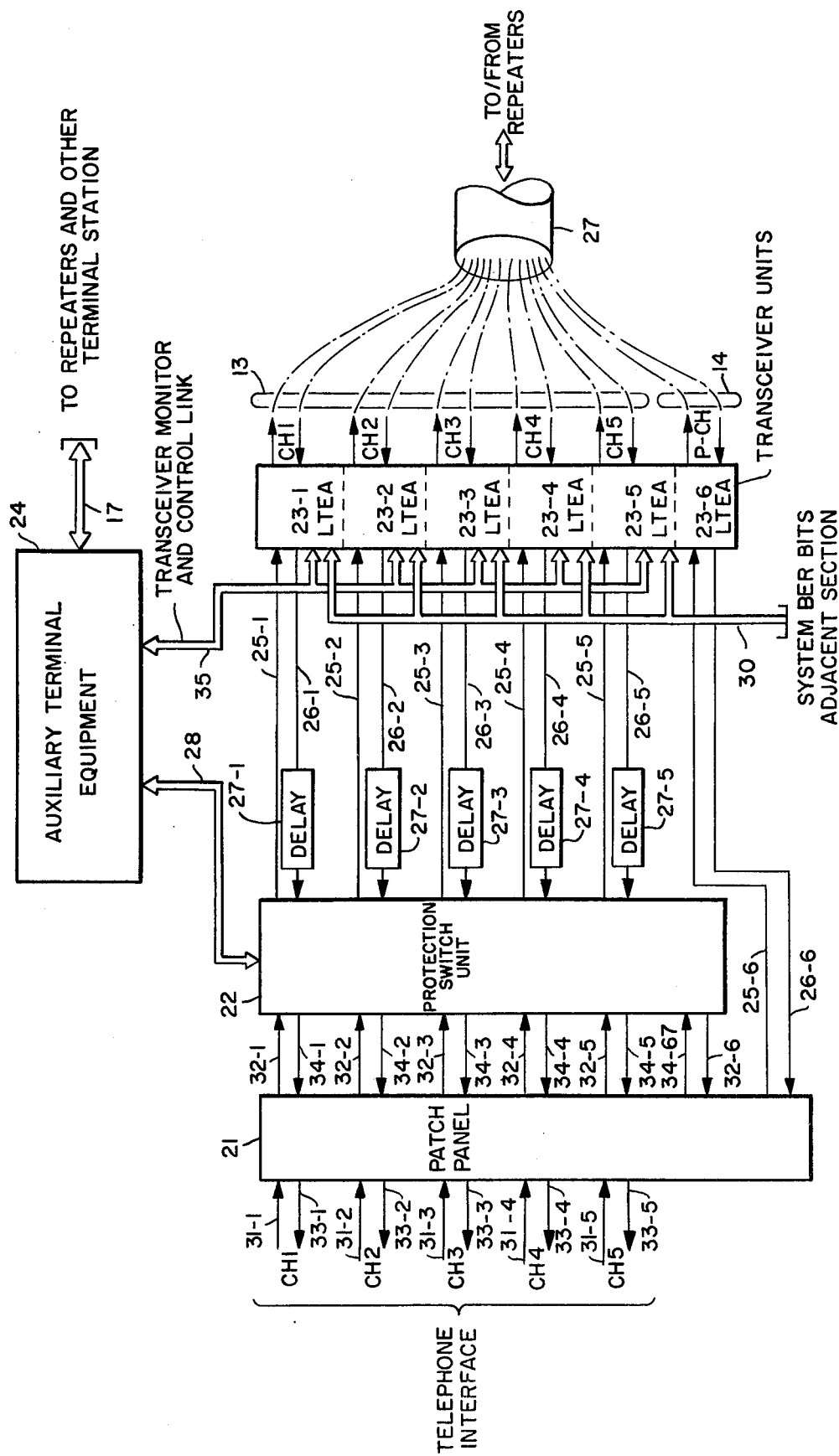
FIG. 2 is a schematic block diagram of a terminal station of the network of FIG. 1.

A block diagram illustration of an individual terminal station, such as terminal station 10 of FIG. 1, is shown in FIG. 2. In the present example, for the assumed normally active five channel full duplex system, five sets of transmit/receive lines 31-1/33-1 to 31-5/33-5 are coupled between the telephone interface and a patch panel 21. Patch panel 21 consists of a set of ten pairs of jacks and associated jumpers or straps for coupling lines 31-1 to 33-5 to corresponding patch panel output lines 32-1 to 34-5 and an additional pair of jacks for coupling protection channel receive line 34-6 to line 26-6 and protection channel transmit line 32-6 to line 25-6. Lines 32-1 to 32-6 and 34-1 to 34-6 are coupled to a protection switch unit 22 which is controlled by a processor-based supervisory subsystem, hereafter referred to as auxiliary terminal equipment (ATE) 24, via link 28. As will be described in more detail below, ATE 24 is a processor-based network control unit that is coupled to the supervisory link 17 and which conducts necessary network monitoring and control functions which ensure proper network operation. In the event of a fault in one of the five channels, ATE 24 takes the requisite action to substitute the protection channel for the faulty channel. The intraterminal station connection substitution is effected through the use of protection switch unit 22 which normally couples transmit/receive lines 32-1/34-1 through 32-5/34-5 for respective channels one to five to lines 25-1/26-1 through 25-5/26-5 that are coupled to a set of transceiver units 23-1 to 23-5, respectively. The incoming data receive lines 26-1 to 26-5 are coupled through respective delay circuits 27-1 to 27-6.

Transceiver units 23-1 to 23-5 are coupled to respective pairs of optical fibers of which optical fiber channel link 13 is comprised. Similarly, a protection channel transceiver unit 23-6 is coupled to the optical fiber pair of protection channel link 14 and, via lines 25-6, patch panel 21 and lines 32-6, 34-6, to a protection switch unit 22. Each transceiver unit is coupled to ATE 24 via link 35. A further link 30 couples bit error rate (BER) data between the transceiver units 23-1 to 23-6 and an adjacent terminal-to-terminal network section, where the network contains more than the pair of stations shown in FIG. 1, as will be explained in detail below. Each transceiver unit 23-1 to 23-6 contains a transmitter section and a receiver section. The transmitter section receives incoming digital data to be transmitted from a telephone interface channel, derives appropriate clock signals, adds additional data (termed overhead bits) and then outputs optical data into an optical fiber. As will be described fully below in conjunction with the description of an individual transceiver unit, the overhead bits are used for synchronization and control purposes. The receiver section receives incoming optical data from an optical fiber, carries out timing recovery, separates the detected data into overhead and data bits, and then outputs the data to its associated telephone interface channel and the overhead bits to its associated auxiliary terminal equipment 24.

Under normal circumstances protection switch 22 couples incoming and outgoing serial data between lines 32-1 . . . 32-5 and lines 34-1 . . . 34-5 and transceiver units 23-1 to 23-5. In the event of a fault, ATE 24 causes the protection switch unit 22 to steer the communication through the protection channel, so that one of the lines of line pairs 32-1/34-1 will be coupled to a corresponding line of line pair 32-6/34-6, patch panel 21, one of lines 25-6/26-6 and transceiver 23-6. ATE 24 also places transceiver 23-6 into service for the protected channel and carries out diagnostic tests on the faulty link to locate the source of the failure. Communication over the optical fiber via the overhead bits sets up the distant terminal station to begin using the protection channel in place of the designated faulty channel.

PROTECTION SWITCH UNIT (FIG. 3)

Figure 3:
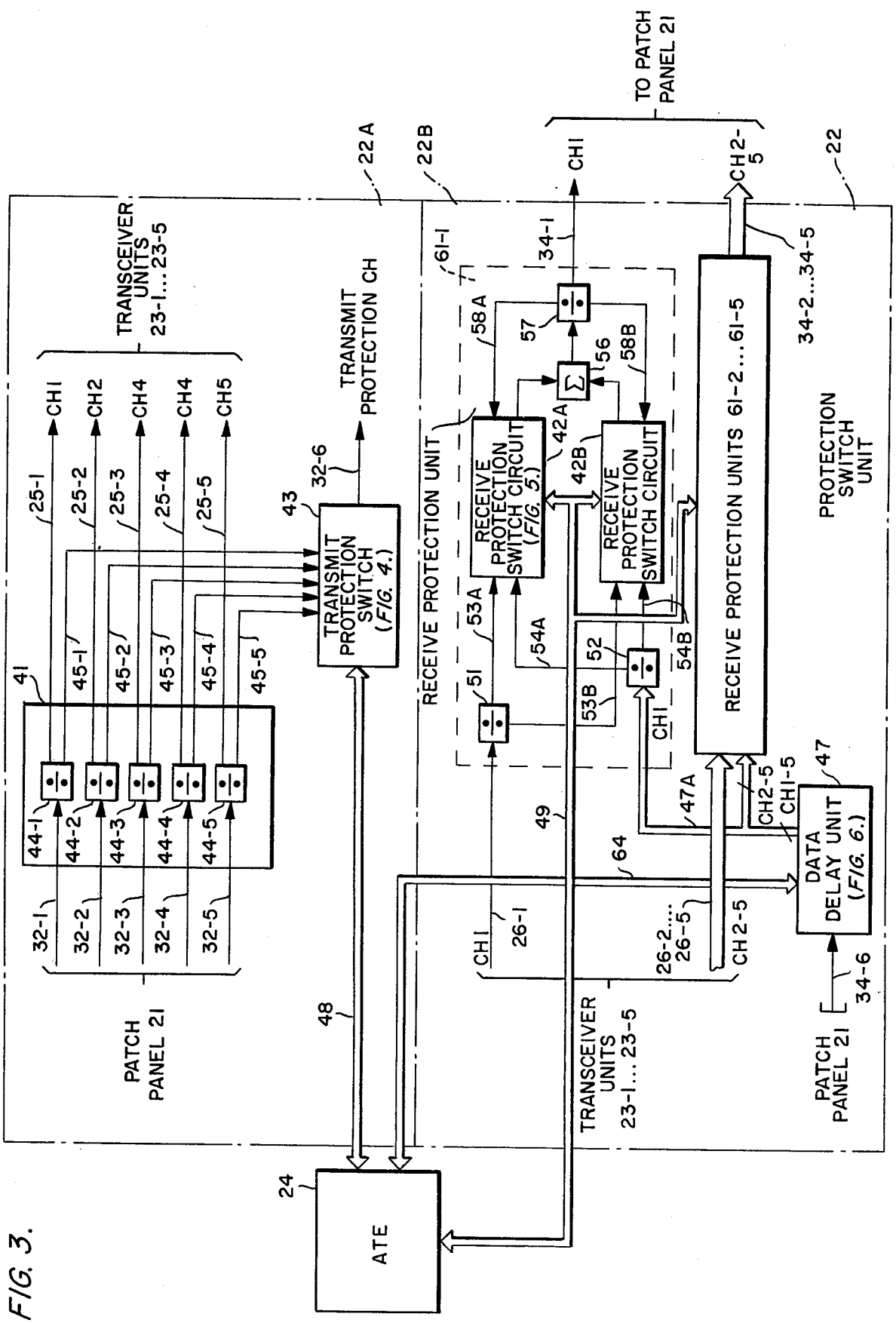
FIG. 3 is a schematic block diagram of the protection switch configuration of a terminal station of FIG. 2.

A schematic block diagram of the protection switch unit 22 of the terminal station is shown in FIG. 3. Protection switch unit 22 includes a transmit protection switch section 22A and a receive protection switch section 22B, each operated under the supervisory control of auxiliary terminal equipment 24. The transmit protection switch section in one terminal station is used in corporation with a receive protection switch section in the other terminal station at the opposite end of the network to controllably carry out the substitution between the protection channel and a selected normally active channel. Advantageously, as is described in copending application Ser. No. 146,340, filed May 2, 1980, now abandoned but refiled as continuation application Ser. No. 319,999 on Nov. 10, 1981 by J. Toy, P. Casper, F. Orlando and R. Giri entitled "Synchronized Protection Switching Arrangement", assigned to the assignee of the present application, such a switching unit is capable of synchronizing a pair of signal paths between which the substitution is to be made, so that there is no loss or addition of data bits. Now although this synchronized or "hitless" switching arrangement is explained fully in the above reference copending application to which reference may be had for a description of the arrangement, it will be described here also in order to facilitate an understanding of its impact upon the overall network.

TRANSMIT PROTECTION SWITCH SECTION 22A

Within the transmit protection switch section 22A, respective lines 32-1 to 32-5 for incoming telephone data signals from patch panel 21 are coupled to respective signal splitters 44-1 to 44-5 of a signal divider 41. Each splitter has a first output line, corresponding to respective lines 25-1 to 25-5, coupled to one of transceiver units 23-1 to 23-5, and a second output line, corresponding to respective lines 45-1 to 45-5, coupled to a transmit protection switch unit 43. Transmit protection switch unit 43 (to be described in detail below in conjunction with the description of FIG. 4) has a data output coupled to transmit protection channel 32-6 and a control link 48 coupled to ATE 24 for controlling the action of unit 43. In the protection switching mode transmit protection switch unit 43 operates in response to a command on link 48 from ATE 24 to selectively couple one of lines 45-1 to 45-5 to output line 32-6 and thereby through patch panel 21 to the transmitter portion of transceiver 23-6. In this mode the data for the selected channel is applied simultaneously to two transceiver units—to the one of units 23-1 to 23-5 associated with the replaced normally active channel and also to transceiver unit 23-6 associated with the protection channel. However, as will be described in detail below, the data path through the replaced transceiver unit is interruptable by ATE 24 so that a fault isolation signal sequence may instead by transmitted out over the replaced fiber optic channel. Service to the users of the replaced channel is maintained via the action of transmit protection switch 43 and its associated protection channel transceiver unit 23-6 and fiber optic protection link 14.

The purpose of transmit switch control section 22A is to initially place the data that is being transmitted via the channel being substituted onto the protection channel at the upstream end of the communication link. Thus, taking as an example, the need to substitute the protection channel link that conveys data from terminal station 10 to terminal station 12 over channel-one with the corresponding link of the protection channel, the transmit switch control unit at terminal station 10 serves to connect the incoming data interface link for channel-one to two terminal-to-terminal channel links, that for channel-one and that for the protection channel. Downstream, at the receiving end of the link, namely, at terminal station 12, the switching between the protection channel and channel-one is controlled in a "hitless" or synchronized manner, in order to achieve the required data transfer between channels that connect to the outgoing data interface of interest.

In the channel substitution switching mode, transmit protection switch 43 (to be described in detail below with reference to FIG. 4) operates in response to a command on link 48 from ATE 24 to selectively couple one of lines 45-1 to 45-5 to output line 32-6 and thereby to the transmitter portion of a terminal-transceiver unit for the protection channel. In this mode, the data for the selected channel is applied from signal divider 41 to two transceiver units—over line 25-1 to the one associated with the replaced normally active channel (e.g. channel-one) and also over line 32-6 to the transceiver unit associated with the protection channel, so that both channels are initially active prior to the synchronized substitution at the receiving end of the link, i.e., at terminal station 12. Once the substitution has been completed, ATE 24 may supply a signal to the transceiver associated with channel-one to inhibit further transmission over the station 10-to station 12 link of channel-one or insert a predetermined signal onto channel-one for test/diagnostic purposes.

RECEIVE PROTECTION SWITCH SECTION 22B

Within the receive protection switch section 22B respective receive lines 26-1 to 26-5 for received signals from transceiver units 23-1 to 23-5 are coupled to respective receive protection switch units 61-1 to 61-5, only unit 61-1 being illustrated in detail, so as to simplify the drawing. Receive protection switch unit 61-1 includes a first signal divider 51 coupled to receive line 26-1. Divider 51 couples the data on line 26-1 over lines 53-A and 53-B to respective receive protection switch circuits 42-A and 42-B. These circuits are controlled via link 49 that is coupled to ATE 24. The circuits are identical and normally only one is operated at a time, the other providing a redundant back up capability. The outputs of receive protection switch circuits 42-A and 42-B are combined in adder 56 (although only one output is active at any given instant) and then coupled via signal splitter 57 to output line 34-1. Signal splitter 57 provides a pair of branched signals over lines 58A and 58B to a respective phase comparator contained within each of circuits 42A and 42B. The phase comparator is used to synchronize the switch-over operation between the protection channel and a normally active channel during a "hitless" switching mode of operation to be described below, thereby avoiding a loss of or addition of data, as will be explained more fully below in conjunction with the detailed description of the receive protection switch circuit illustrated in FIG. 5.

The protection switch unit 22 also includes a data delay unit 47, shown in FIG. 6 to be described in detail below, which adjusts the phase delay to $\pm \frac{1}{4}$ bit between the protection channel and one of the normally active channels one to five. Briefly, this unit enables a "hitless" switchover between the protection channel and one of channels one to five to be effected without causing a bit insertion into or bit deletion from the traffic data stream. Control of the operation of data delay unit 47 is effected via link 64 which is coupled to ATE 24. The data output from data delay unit 47 is coupled over link 47A to each of receive protection units 61-1 to 61-5. In the detailed illustration of receive protection unit 61-1, the channel-one output of data delay unit 47 is separated by signal splitter 52 into respective signal branches 54A and 54B coupled to receive protection switch circuits 42A and 42B. That one of redundant receive protection switch circuits 42A and 42B which has been placed into operation will couple one of lines 53A (53B) or 54A (54B) to output channel line 34-1 under control of ATE 24. Assuming normal operation for channel-one and operation of circuit 42A, the output 53A from splitter 51 would be coupled through receive protection switch circuit 42A to channel-one output line 34-1. In the event of a failure of channel-one, ATE 24 will couple control signals over links 49 and 64 to cause the received signal on line 34-6 to be coupled through data delay circuit 47, link 47A to splitter 52, line 54B and circuit 42B to output line 34-1, while the output of receive switch circuit 42A is interrupted.

TRANSMIT PROTECTION SWITCH UNIT (FIG. 4)

Figure 4:
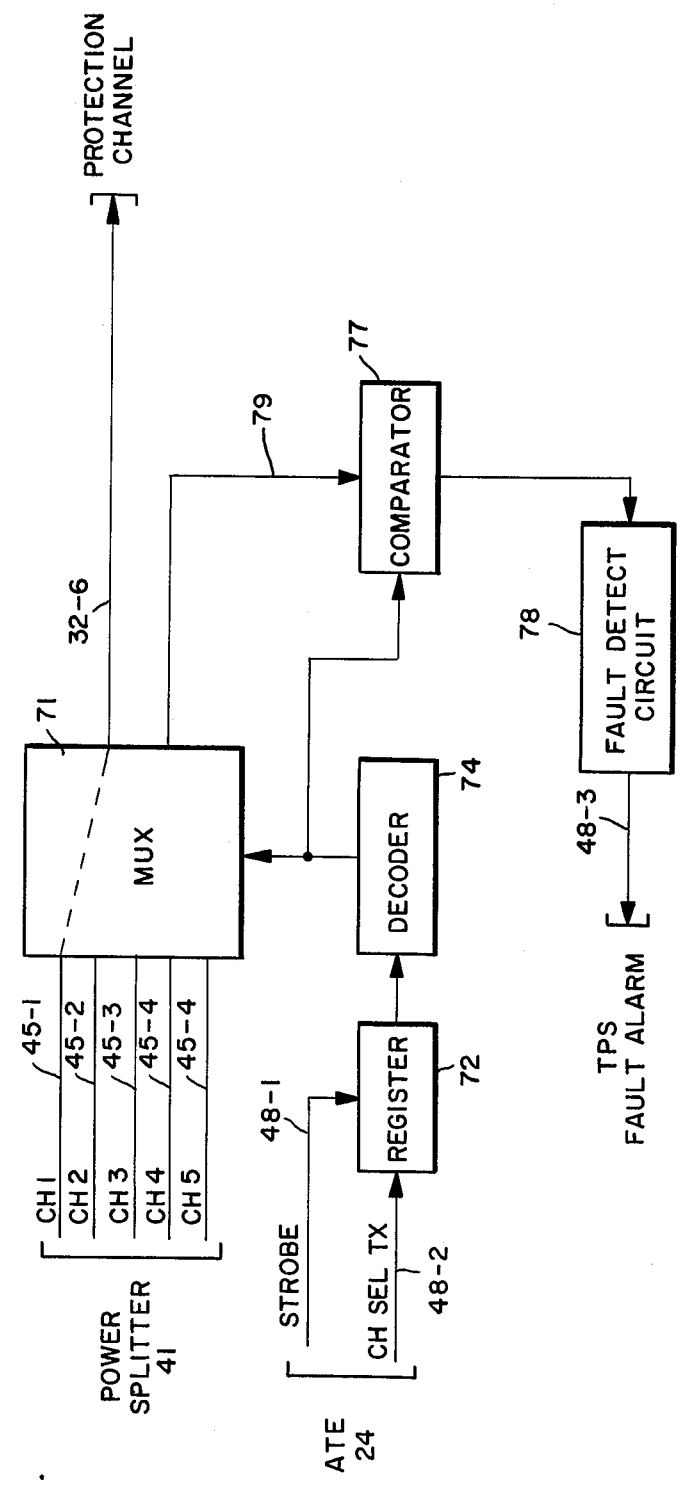
FIG. 4 is a block diagram of the transmit protection switch of FIG. 3.

As illustrated in FIG. 4, the five normally active communication channel lines for coupling data to be transmitted, branched from splitters 44-1 to 44-5 (FIG. 3), are supplied over lines 45-1 to 45-5 to a multiplexer 71. In the following description it will be assumed that channel-one is to be replaced by the protection channel, so that line 45-1 is to be coupled through multiplexer 71 to output line 32-6. From ATE 24 a binary code (001) indicative of channel-one is coupled over link 48-2 and is strobed into a register 72 in response to a strobe or store enable pulse on line 48-1 from ATE 24. This binary code is decoded into a multiplexer switch selection signal by decoder 74. The output of decoder 74 instructs multiplexer 71 to couple line 45-1 (channel-one) to output lead 32-6. With this coupling action having been taken, the data on the incoming link for channel-one is now coupled over a pair of fiber optic channels from terminal station 10 to terminal station 12, i.e. over the West-to-East fiber of channel-one and over the West-to-East fiber of the protection channel. As a result, as will be described in detail below, the receiver protection switch 22B of terminal station 12 can proceed to substitute the protection channel for channel-one.

Figure 37:
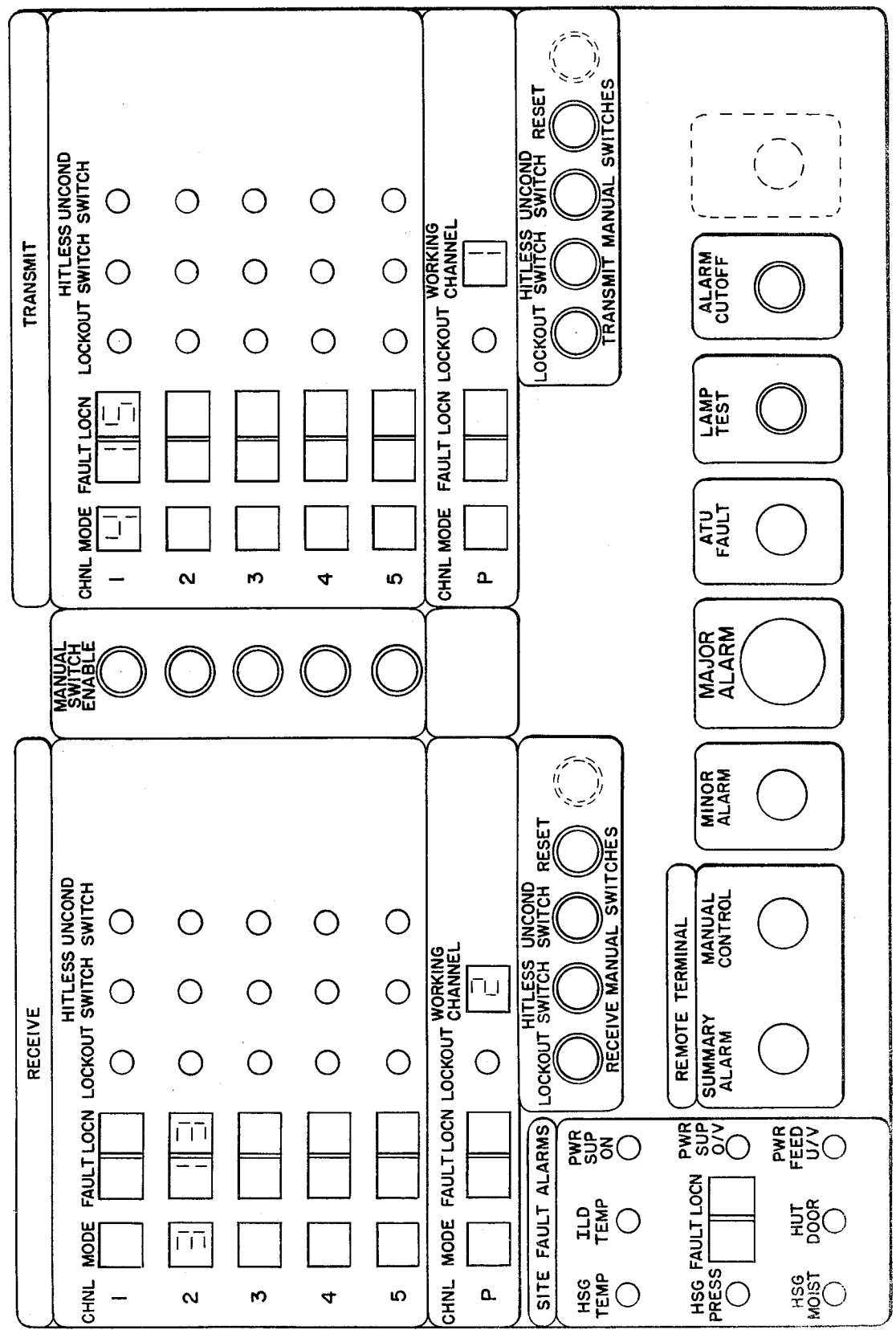
FIG. 37 shows an exemplary layout for an attendant's alarm panel.

Comparator 77 is coupled to the output 79 of multiplexer 71 which verifies that the channel coupled to output line 32-6 (here, channel-one), is the same channel selected by decoder 74. The output of comparator 77 is coupled to a fault detection circuit 78. Like the other fault detector circuits employed in the various modules of the network, fault detection circuit 78 may be comprised of a threshold detector which monitors the output state of comparator 77. For a change in state of the output of comparator 77 indicating an error in the operation of multiplexer 71, the fault detection threshold circuitry is triggered causing a fault signal to be applied to line 48-3. Namely, as long as the switched channel identifier output signal on line 79 corresponds to a signal indicative of the intended channel to be switched supplied by decoder 74, comparator 77 does not generate a fault identification signal. Should there be a fault or failure in the intended switching operation of multiplexer 71 as instructed by decoder 74, there will be a code mismatch signal supplied to fault detection circuit 78 and a fault alarm signal will be applied via line 48-3 to ATE 24 indicating that the defective channel was not replaced as intended. A fault indication signal is generated by ATE 24 and supplied to an attendant's control panel (FIG. 37) to advise operation personnel of the switching failure so that corrective action can be taken.

RECEIVE PROTECTION UNIT (FIG. 5)

As was described above in conjunction with the description of the protection switch unit shown generally in FIG. 3, the receive protection switch section 22B of protection switch unit 22 is comprised of a set of receive protection units 61-1 . . . 61-5, one for each normally active data channel, and a data delay unit 47. Each of the receive protection units serves two functions. In a first mode of operation, termed the static mode, it couples incoming data on either its associated channel (e.g. channel-one for receive protection unit 61-1) or the protection channel to its output coupling to patch panel 21. In a second mode of operation, termed the dynamic mode, the receive protection unit performs a switchover between the protection channel and its associated channel. Moreover in this second mode of operation the receive protection unit may be controlled in cooperation with data delay unit 47 (to be described below in conjunction with the description of FIG. 6) to effect a "hitless" mode of switching between the protection channel and the receive protection unit's associated channel, whereby no data bits are lost or added in the changeover process. This "hitless" switching capability can be omitted, if desired, by directly replacing the protection channel with the normally active channel subject, of course, to a possible loss of data bits.

Figure 5:
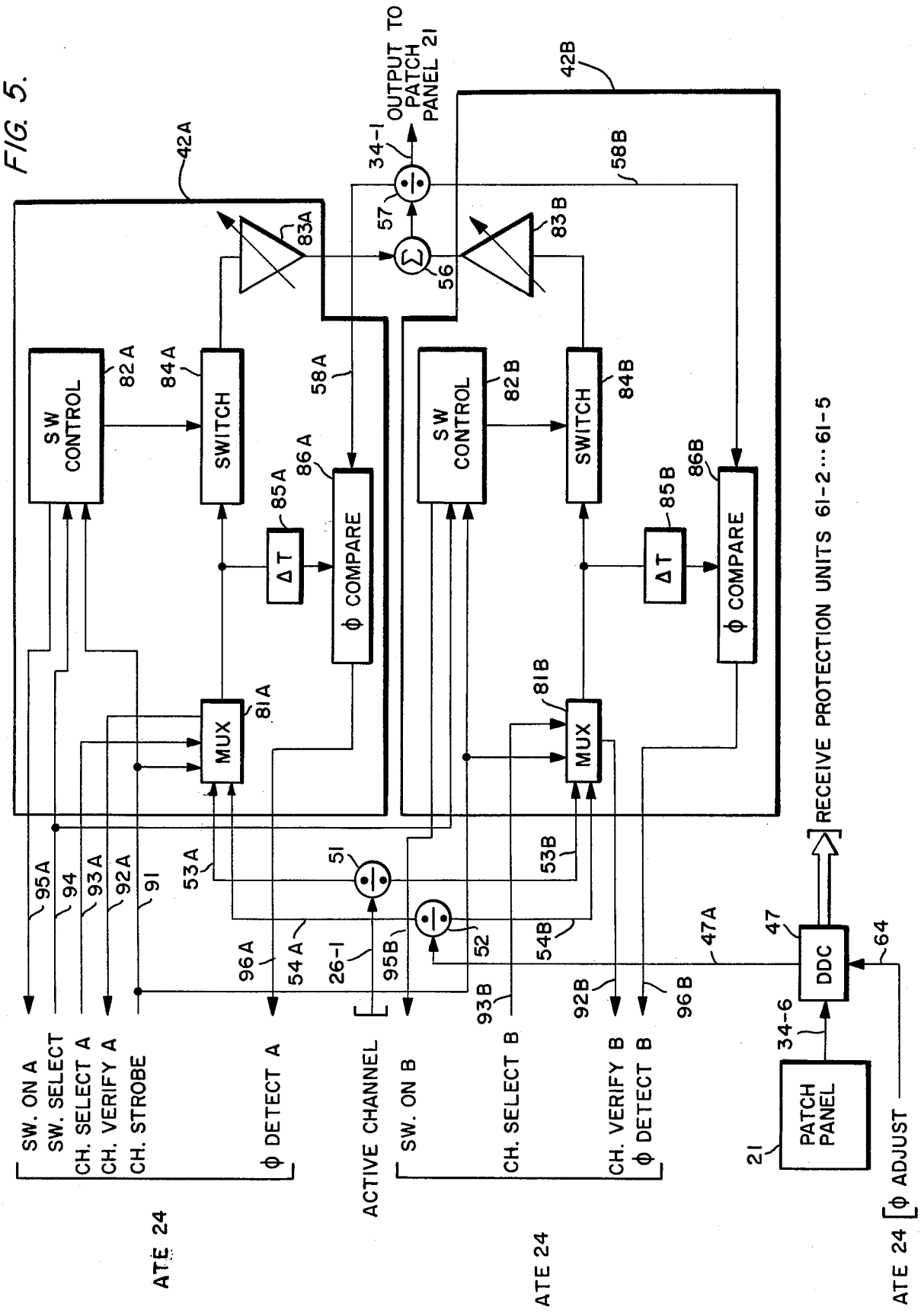
FIG. 5 is a schematic block diagram of the receive protection switch portion of FIG. 3.

Referring now to FIG. 5, there is illustrated a schematic block diagram of a portion of the protection switch unit 22 shown in FIG. 3, specifically the details of an individual receive protection unit (such as unit 61-1 taken as an example) and its associated data delay unit. Each receive protection unit is comprised of a pair of protection switch circuits 42A and 42B, one of which provides redundancy back-up capability during the static mode of operation of the unit, and both of which are used during the "hitless" dynamic mode of operation of the receive protection unit, with one protection switch circuit providing a data path for the normally active channel while the other switch circuit operates in conjunction with data delay circuit 47 to adjust the timing of the data to be coupled through the normally active channel, so that a changeover between the protection and normally active channels can be accomplished with no bit slips.

Again considering the circuitry associated with channel-one for purposes of providing an example, the configuration and operation of receive protection unit 61-1 will be described. Within the receive protection unit there are a pair of identically configured protection switch circuits 42A and 42B. As shown in FIG. 5, protection switch circuit 42A includes a multiplexer 81A the output of which is coupled to a switch 84A and a delay circuit 85A. The output of switch 84A is coupled through controlled gain amplifier 83A to adder 56. Switch 84A is controlled by a switch control circuit 82A. Switch control circuit 82A is coupled to ATE 24 via control lines 91, 94 and 95A. Line 91 coupled a channel strobe signal to the switch control circuit in each protection switch circuit to control the opening and closing of switches 84A and 84B. Line 94 couples a signal designating whether the switch control circuit is to open or close its associated switch circuit. Line 95A is used to advise ATE 24 of the state of switch control circuit 82A. Similarly line 95B coupled a signal to ATE from switch control circuit 82B indicating the state of the circuit.

Further control lines from ATE 24 are coupled to multiplexer 81A. In addition to channel strobe line 91 which controls the switching operation of multiplexer 81A, line 93A couples a signal to multiplexer 81A indicating which of input lines 53A and 54A is to be coupled to the output of the multiplexer. Line 92A couples a signal to ATE 24 from multiplexer 81A indicating the actual coupling state of the multiplexer. An additonal control signal line 96A is coupled to ATE 24 from the output of phase comparator 86A, to indicate the phase difference between the output of delay circuit 85A and divider 57 on line 58A. The output of phase comparator 86A is monitored by ATE 24 during "hitless" switching between the protection channel and the normally active channel, as will be explained in detail below in conjunction with the description of the data delay circuit shown in FIG. 6.

Since protection switch circuit 42B is configured identically as protection switch circuit 42A, a detailed description of the circuit will be omitted. Instead, reference will be made to the components of each circuit in the description of the operation below.

OPERATION

As was explained previously, each receive protection unit operates in either a static mode or a dynamic mode. In the static mode, one of the protection switch circuits 42A, 42B is quiescent or serves as a redundant backup for the other circuit in the event of a failure. Multiplexer 81A (81B) will have been strobed by line 91 and control line 93A (93B) to couple the output of splitter 52 to switch 84A (84B). Switch control circuit 82A will have received instructions from the ATE 24 to couple the output of the multiplexer 81A through switch 84A and amplifier 83A to summing circuit 56. The output of summing circuit or adder 56 is coupled through divider 57 and over output line 34-1 to the patch panel 21. With protection switch circuit 42B in the quiescent mode, switch 84B is open and there is no output supplied to adder 56 from swtch 84B, so that adder 56 and divider 57 couple the output of protection switch circuit 42A over line 34-1 and to the patch panel. In the normal operating mode, phase comparator 86A (86B) compares its active channel input to a sample of the output signal from divider 57. Thus, line 96A (96B) sends a signal to ATE 24 indicating the condition of the respective switching unit. In the event of a failure, auxiliary terminal equipment 24 takes the appropriate action to disengage protection switch circuit 42A and insert protection switch circuit 42B between the incoming channel and the output line 34-1. For this purpose, switch controls 82A and 82B are controlled to open switch 84A and close switch 84B, respectively, in order that service over the link will be maintained.

In the dynamic mode of operation, the receive protection unit operates to switch between the protection channel and a normally active channel. The dynamic mode of operation can be effected in either a "hitless" fashion, or a direct switching fashion (which may result in the loss of data bits). In the latter instance, ATE 24 simply switches the multiplexer (81A or 81B depending upon which protection switch circuit is being used) from the protection channel to the active channel, the data on which is then coupled through the protection switch circuit to adder 56, splitter 57 and out to the patch panel. Advantageously, however, switching between the protection channel and the normally active channel can be accomplished in a "hitless" fashion, so that the data stream on the protection channel and that on the active channel are brought into synchronization with one another within one-quarter of a bit at the time the multiplexer is switched, in order to prevent loss of or insertion of even one bit of data over the link.

In order to implement "hitless" switching in the dynamic mode of operation, data delay circuit 47 operates to delay the data stream on line 34-6 from the protection channel in a step-wise fashion until the output of the phase comparator (either phase comparator 86A or phase comparator 86B of the protection switch being utilized) indicates proper synchronization of the normally active channel data and the protection channel data.

More specifically, let it be assumed that protection switch circuit 42A is presently coupling the received data on normally active channel-one through multiplexer 81A, switch 84A and amplifier 83A to adder 56 and out to signal splitter 57 and output line 34-1. When it is desired to switch between the protection channel and normally active channel-one, again using channel-one for purposes of the example previously chosen, the data stream on channel-one must first be placed on the protection channel fiber optic link. As explained above in conjunction with the description of the transmit protection switch, this action is carried out at the upstream terminal station (i.e., terminal station 10 in the present example). It will be assumed here that this procedure has already taken place in the manner described above so that the data stream of interest on channel-one is also on the protection channel fiber optic link (although terminal station 12 is presently receiving only channel-one data since the protection channel substitution has not yet been carried out). Now, multiplexer 81B within protection switch circuit 42B will be instructed by the auxiliary terminal equipment 24 to switch its output to input line 54B over which the protection channel data is supplied. Switch control 82B will be controlled by the ATE to maintain switch circuit 84B in the open position so that only the normally active channel-one data continues to be applied to adder 56 and from there to the patch panel. The normally active channel-one data itself is split off from splitter 57 over line 58B to a phase comparator 86B which also receives the protection channel data by way of delay circuit 85B. Phase comparator 86B compares the phase of the protection channel data with that coupled from splitter 57 representative of the normally active channel-one data. A signal indicating an in-phase or out-of-phase condition is coupled over line 96B to the automatic terminal equipment 24. As long as the two signals are not within one-quarter bit of phase difference of each other, ATE 24 supplies a phase adjustment signal over line 64 in successive increments of one-quarter bit to the data delay circuit 47. As will be explained below, in conjunction with the description of FIG. 6, data delay circuit 47 operates to incrementally delay the data on the protection channel by one-quarter per bit until the protection channel and the normally active channel come within one-quarter bit of being synchronized with one another. Once the phase adjustment signals on line 64 have accomplished this proper synchronization, the output of phase comparator 86B will advise ATE 24 that switching between the normally active channel and the protection channel can take place. With the proper delay having been imparted to the protection channel to insure synchronization and switchover, the automatic terminal equipment 24 instructs each of switch controls 82A and 82B to change the operation of their respective switch circuits 84A and 84B. At this time, again using the example chosen, switch circuit 84A is opened so as to sever the link between the normally active channel-one and adder 56, while switch circuit 84B is closed so as to couple the protection channel through switch 84B to adder 56. As a result, there is no loss of even a single bit of data output over line 34-1 to the patch panel 21. Namely, the changeover between the protection and normally active channels is accomplished in a "hitless" fashion. The manner in which the data delay circuit accomplishes the incremental delay imparted to the protection channel data will be explained below in conjunction with the description of FIG. 6.

DATA DELAY UNIT (FIG. 6)

Figure 6:
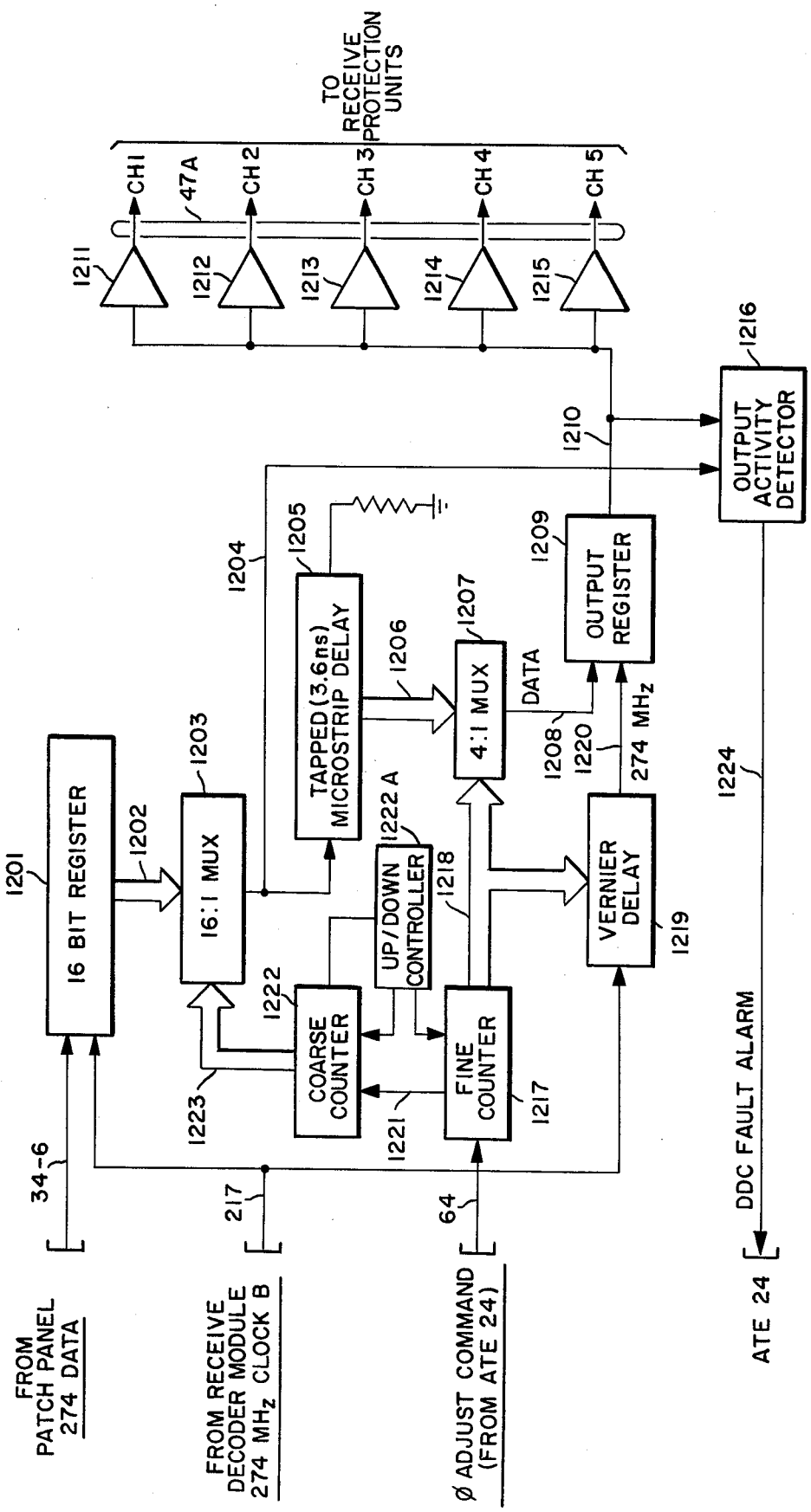
FIG. 6 is a schematic block diagram of a data delay circuit shown in FIG. 5.

As was described above in conjunction with the operation of the receive protection unit (FIG. 5), in order to effect hitless switching between the protection channel and the normally active channel, a data delay unit 47, shown in detail in FIG. 6, is disposed in the data link between line 34-6 over which the protection channel data is supplied and each of the inputs to the receive protection units. The delay unit 47 operates to delay the data on the protection channel in quarter bit increments until synchronization between the normally active channel and the protection channel is achieved, namely, until there is no greater than one quarter bit offset between the two.

For this purpose, as shown in FIG. 6, the input protection channel data on line 34-6 is applied to the data input of a sixteen bit register 1201. Register 1201 is clocked by the 274 MHz clock B produced on line 217 from the receiver decoder module to be described below. Clock B is inverted in phase relative to the normal 274 MHz clock synchronously derived by the transmit timing recovery unit 101 to be described below. Suffice it to say for purposes of the description of the data delay unit that the clock on line 217 is synchronized with the incoming protection channel data. As input data is applied on line 34-6 to the sixteen bit register 1201, it is clocked in, one bit at a time, by the clock on line 217. Register 1201 is a serial in, serial out shift register with the spilled over bits from the last register being deleted. Each of the successive stages of register 1201 is coupled over parallel links 1202 to a multiplexer 1203. Multiplexer 1203 is controlled by a link 1223 from a "coarse" counter 1222 to selectively coupled one of the stages of sixteen bit register 1201 to output line 1204. Output line 1204 is coupled to a delay line 1205 which produces taps at quarter bit increments to provide, on output link 1206, successive delayed versions of the data bit output of multiplexer 1203. One of these delayed bits is coupled through multiplexer 1207 under the control of a switch signal on line 1218 from a "fine" counter 1217 to an output line 1208.

Counters 1222 and 1217 are controlled by an up-/down controller 1222A which steers the direction in which the contents of counters 1222 and 1217 are operated. Up/down counters 1222 and 1217 are incremented for each count signal applied to line 64 until they reach positive capacity at which point they begin counting down to minimum value as controlled by up/down controller 1222A. Upon reaching its lower limit, controller 1222A causes counters 1222 and 1217 to begin sweeping back in the positive direction. This action on the part of up/down controller 1222A causes the control signal on link 1223 to switch multiplexer 1203 in such a fashion that it sweeps across the stages of register 1201 back-and-forth, rather than in onely on direction and then immediately back to the beginning. In this manner, counters 1222 and 1217 are prevented from rolling over, so that at the outputs of multiplexers 1203 and 1207 there is never a loss of the data bits that are applied to and shifted through register 1201. Output 1208 is coupled to the data input terminal of an output register 1209. Output register 1209 is clocked by a 274 MHz clock on line 1220 which is provided by a vernier delay 1219 that is clocked by the clock on line 217 but incrementally delayed in accordance with a control signal on link 1218 from counter 1217. The output of register 1209 is coupled over line 1210 through successive amplifiers 1211 through 1215 to link 47A which is coupled to the dividers 52 of each of the protection units 61-1-61-5, described above in conjunction with FIGS. 3 and 5.

An output activity (fault) detector 1216 which is comprised of threshold detection circuitry is coupled to each of lines 1204 and 1210 to monitor the operation of the data delay unit and to provide an alarm signal on line 1224 to the auxiliary terminal equipment in the event of a failure (i.e., loss of activity). A phase adjust command signal on line 64 from the auxiliary terminal equipment 24 is coupled to the fine counter 1217 to control the incremental delay operation of the data delay unit.

OPERATION

In order to provide the desired synchronization between a normally active channel and the protection channel, the auxiliary terminal equipment monitors the output of one of the phase comparators 86A, 86B in the receive protection unit under consideration. As was explained above in conjunction with the description of FIG. 5, the output of the phase comparator indicates whether the data on the normally active channel is in-phase with the data on the protection channel. As long as there is a phase difference between the data on the two channels, the phase comparator delivers an output signal to the auxiliary terminal equipment which, in turn, delivers a phase adjust command signal to counter 1217. Counter 1217 is a count-to-four counter which produces an output on line 1221 at overflow for each four signals counted on line 64 from the ATE 24. Counter 1222 counts up to sixteen and then recycles in accordance with the count pulses produced on line 1221 from counter 1217. The state of counter 1222 governs which of the outputs of register 1201 will be coupled through multiplexer 1203 to delay line 1205.

Assuming that the protection channel and the normally active channel data bits are out of sync with one another, a phase comparison by one of the phase comparators in the receive protection unit will produce an output causing the auxiliary terminal equipment 24 to supply an increment signal to counter 1217. Beginning with the first stage of register 1201, assuming that counters 1222 and 1217 are cleared, multiplexer 1203 coupled the first bit stage to delay line 1205 which successively delays the data bit and applies it to multiplexer 1207, with four data bits identical to each other but each successively offset from the previous bit by one-quarter bit being applied to the inputs of the multiplexer. Counter 1217 initially addresses the first delay tap and causes the data bit to be coupled over line 1208 to the output register 1209. Delay 1219 effects a delay corresponding to that of the delay bit as addressed by counter 1217 so that the bit delivered through multiplexer 1207 is synchronously clocked into register 1209 and delivered over line 47 to divider 52 within each of the receive protection units 61-1 . . . 61-5. If the phase comparison circuit detects that the protection channel and the normally active channel are still out of sync, it delivers an output signal to the auxiliary terminal equipment 24. In turn, this equipment delivers a further pulse signal over line 64 to counter 1217 to increment its contents by one and to cause multiplexer 1207 to address the next successive input on link 1206 from microstrip delay 1205. Similarly, delay line 1219 responds to the new contents of counter 1217 provided on link 1218 to delay the clock on line 1217 by an amount to synchronously load the next successively delayed bit on line 1208 into register 1209.

The above process is repeated for each of the quarter bit delays of the presently addressed bit in register 1201 and then successively for each additional bit in the same manner, as necessary, for the successive stages of register 1201 until the output of the phase comparator within the receive protection unit indicates that the normally active channel and the protection channel are properly timed with one another. At that time, further phase adjust command signals from the ATE 24 are inhibited and the contents of counter 1217 and counter 1222 are no longer incremented. The delay provided by way of register 1201 and delay 1205 through the data delay unit is now fixed at the proper incremental offset between the normally active channel and the protection channel to insure a "hitless" switchover between the two channels. At this point, the operation described above in conjunction with the description of FIG. 5 for "hitless" switching between the channels may take place.

In the foregoing explanation of the operation of the hitless switching control arrangement of FIGS. 4–6, the description related to the substitution of the protection channel for one of the normally active channels (e.g., channel-one). With the data delay circuit being deposed in the communication path of the protection channel proper, rapid incremental delay adjustments to the phase of the protection channel data are carried out to bring the protection channel into synchronization with the normally active channel being replaced. When it is desired to switch back to the normally active channel, the adjustment of its incremental delay proceeds fairly slowly since the data output undergoes phase steps.

More specifically, it is common practice in commercial high data rate data communication networks of the type considered herein to couple communicaton channel outputs to timing recovery circuitry (usually including a phase-locked loop) to precisely regenerate the data being conveyed. Accordingly, assuming that there is a phase offset between the protection channel and that previously replaced normally active channel (although this is quite unlikely since the down time of the normally active channel should be reasonably brief while the channel should remain synchronized for a number of hours), ATE 24 causes a gradual incremental change in the protection channel delay. This gradual change (in increments of a quarter of a bit) is quite tolerable because of the action of the timing recovery circuitry which sees this quarter bit delay as jitter on the bit and properly reconstitutes the bit. Eventually, synchronization between the two channels is realized and return to the normally active channel can be effected.

TRANSCEIVER UNIT (FIG. 7 and 8)

Each of the transceiver units 23-1 to 23-6 depicted generally in FIG. 2, described above, contains a transmitter section comprised of a set of three intercoupled modules 101-103, shown in FIG. 7, and a receiver section comprised of another set of intercoupled modules 201-204, shown in FIG. 8. In keeping with the reference to channel-one for the purposes of the present description, the modules shown in FIGS. 7 and 8 are those which make up transcriver unit 23-1. Transceiver unit 23-2 to 23-6 are configured identically to unit 23-1.

TRANSMITTER SECTION (FIG. 7)

Within the transmitter section there is a transmit timing recovery module 101 (FIG. 9) which is coupled to receive an input data stream supplied from the protection switch unit 22 over line 25-1. This module couples the data to a transmit encoder module 102 over line 110 and also operates to derive a synchronous transmission clock at the frequency of the data and a further clock to be used for encoding and data transmission. Assuming a T-4 data rate of 274 Mb/s, transmit timing recovery module 101 generates a synchronous system clock signal at this 274 MHz frequency and an additional 301.6 MHz clock at 11/10 of the 274 MHz rate on line 112. Also, a 1/10 rate clock of 27.4 MHz is generated and output over line 111. Transmit timing and recovery module 101 is also coupled to ATE over line 101A for coupling fault alarm and indication signals therebetween.

Transmit encoder module 102 (FIG. 10) adds overhead bits to the 274 Mb/s data stream supplied over line 110 from transmit timing and recovery module 101, scrambles the resultant data and supplies a modified data output stream at the 301 MHz output frequency over line 113 to an optical transmitter module 103. Transmit encoder module 102 is also coupled to ATE 24 via link 102A for coupling control, fault alarm and indication signals between the two units. Lines 102B and 102C are coupled to respectively receive a system BER word from and transmit a BER clock to an adjacent terminal-to-terminal section if the network is of multi-section (more than two terminal stations) configuration.

The optical transmitter module 13 (FIG. 11) receives the modified serial data stream on line 113 and converts the incoming electrical signal into optical pulses for transmission over optical fiber 115. Optical transmitter module 103 is also connected to ATE 24 via link 103A for coupling parameter monitor and fault indication signals therebetween.

RECEIVER SECTION (FIG. 8)

The receiver section of the transceiver unit is shown in FIG. 8 as including an optical fiber receiver module 201 (FIG. 12) which includes an opto-electronic conversion unit, such as an avalanche photo diode circuit, for converting optical pulses making up the serial data stream supplied over fiber 210 into an electrical current signal. This signal is suitably filtered and gain-adjusted to produce a new raw received 301 MHz data signal that is coupled over line 211 to a bit synchronizer module 202. Optical receive module 201 is also coupled over link 201A to ATE 24 for coupling fault alarm and indication signals therebetween. A bias voltage supply module 204 provides −250 VDC via line 204A to the APD.

The bit synchronizer module 202 (FIG. 13) extracts a synchronous bit rate clock from the raw serial data and, with this clock, completely regenerates the data for subsequent logic processing. The detected data at the 301 Mb/s data rate is coupled over line 212 to a receiver decoder module 203. Also produced by bit synchronizer module 202 and coupled to receiver decoder module 203 over lines 213–215 are respective 301 MHz, 27.4 MHz and 274 MHz clocks. A feedback line 216 is coupled from receiver decoder module 203 for frame synchronization control. Fault alarm and indication signals are coupled between ATE 24 and bit synchronizer module 202 via link 202A.

Receiver decoder module 203 (FIG. 14) descrambles the 301 Mb/s data coupled from bit synchronizer module 202 over line 212, removes the overhead bits that were inserted during encoding by the transmit encoder module described previously, and delivers a replica of the original data stream over line 26-1 to protection switch unit 22 Receive decoder module 203 in the protection channel also produces a separate 274 clock signal on line 217 which is supplied to data delay unit 47 (FIG. 6). Fault indication and alarm signals and control signals are coupled over link 203A between ATE 24 and the receiver decoder module. Link 203B couples received system BER word produced by module 203 to the next section.

Each of the individual units of which a transceiver is configured will now be described in more detail below with reference to FIGS. 9–14.

TRANSMIT TIMING AND RECOVERY MODULE 101 (FIG. 9)

Figure 9:
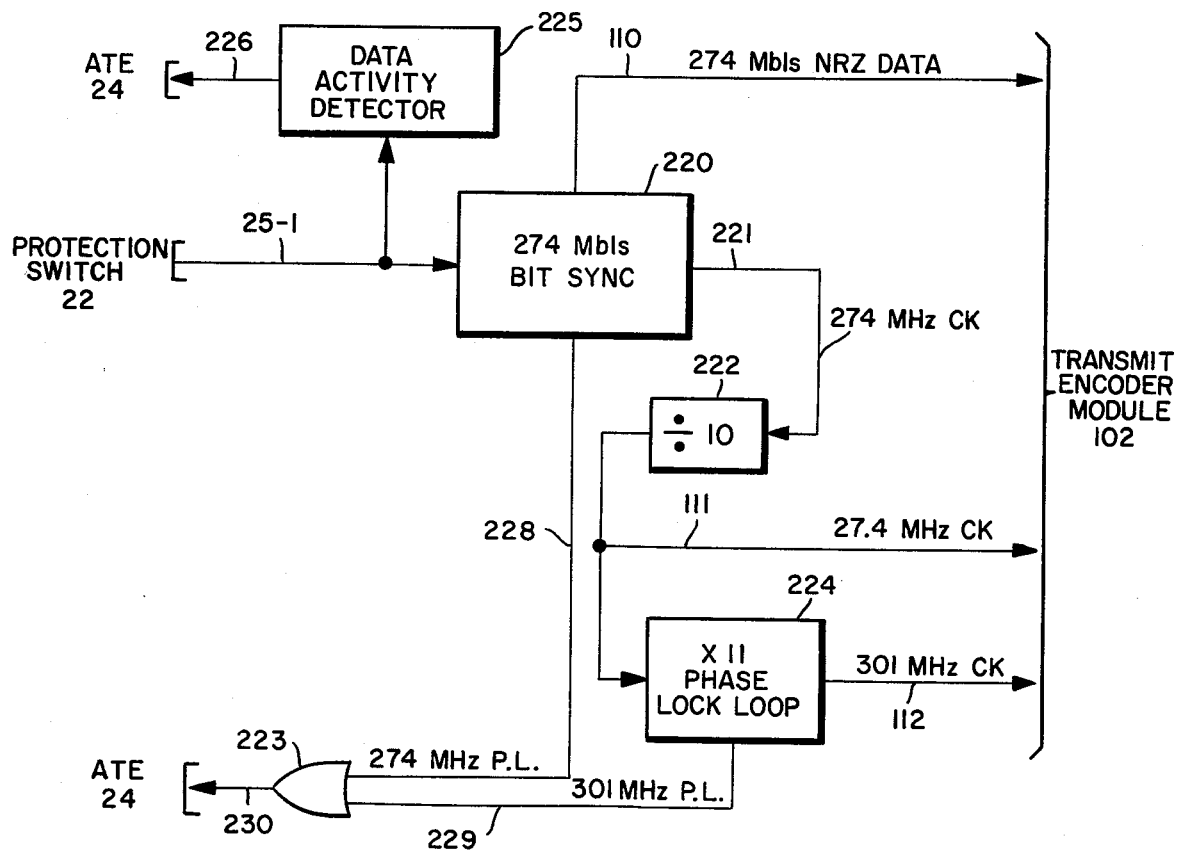
FIG. 9 is a schematic block diagram of a transmit timing recovery module of FIG. 7.

Transmit timing and recovery module 101 is shown in FIG. 9 as comprising a bit synchronizer 220 coupled to input data 25-1. Bit synchronizer 220 is configured essentially as the bit synchronization circuit of the bit synchronizer module 202, to be described below with reference to FIG. 13A. Bit synchronizer 220 derives a synchronous 274 MHz clock from the incoming 274 Mb/s data stream on line 25-1 and outputs this clock on line 221 to a divide-by-ten divider circuit 222. The 274 Mb/s NRZ data stream is coupled from bit synchronizer 220 to line 110. When phase lock is acquired, a signal is coupled over line 228 to OR gate 223. This signal is derived from a phase locked loop within the synchronizer 220 and indicates that the 274 MHz clock produced on line 221 is in sync with the data stream on line 25-1. The output of divide-by-ten divider 222 is a 27.4 MHz clock that is coupled over line 111 to transmit encoder module 102 and to a times-eleven phase lock loop 224. Loop 224 effectively multiples the frequency of the 27.4 clock by a factor of eleven and produces a synchronous higher frequency ($\simeq$301 MHz) clock over line 112 to be coupled to transmit encoder module 102. A phase lock indication signal for the higher clock rate (301 MHz) is coupled from loop 224 over line 229 to a second input of OR gate 223. The output of OR gate 223 is coupled to ATE 24 via line 230 and is used to advise ATE 24 of a fault in the timing circuitry of module 101. As long as the 274 and 301 phase lock loops are synchronously generating the 274 and 301 MHz signals, the output of OR gate 223 is low. An out-of-sync condition in either loop causes OR gate 223 to go high and thereby advise the ATE 24 of a fault condition.

Also contained within the transmit timing and recovery module is an input data activity detector 225, comprised essentially of a threshold detector, which is coupled to line 25-1 for monitoring data activity on the line. As long as there is data coming in on line 25-1, there is no change in state of the output of detector 225. Absence of data, however, causes a signal to be produced over line 226 to ATE 24 advising the supervisory subsystem of a loss of data. For either a loss of data signal on line 226 or a loss of sync signal on line 230, ATE 24 takes appropriate action and causes a fault light (not shown) on the module to be energized so that correction of the error condition can be rapidly carried out by service personnel.

TRANSMIT ENCODER MODULE (TEN 102) FIG. 10

As was described briefly above in conjunction with the general description of a transceiver unit, transmit timing and recovery module 101 supplies timing (clock) and data signals to transmit encoder module (TEN) 102. TEN 102 adds overhead bits to the 274 Mb/s data stream, scrambles the modified data and produces a scrambled data stream at a higher frequency of 301 MHz at its output, the 301 MHZ scrambled data stream being applied to the optical transmitter module 103 (described in detail below in conjunction with the description of FIG. 11) for transmission out over the optical communication link. (In the receiving terminal station, a receiver decoder module (to be described below with reference to FIG. 14) descrambles and recovers the original data. Advantageously, the transmit encode module and the receiver decoder module employ a maximal length PN sequence for data scrambling and frame synchronization. The scheme for accomplishing these functions, per se, as applied to communication systems in general, is described in copending patent application Ser. No. 146,338, filed May 2, 1980, by Charles R. Patisaul, James W. Toy and Peter H. Halpern, entitled "Combined Use of PN Sequence for Data Scrambling and Frame Synchronization in Digital Communication Systems" and assigned to the assignee of the present application. Now although reference may be had to the above copending application for a detailed explanation of such a scheme, those components of such a system and their relationship with the remainder of a transceiver section of the network of the present invention will be described here in order to facilitate a full appreciation of the same. Overhead bits to be inserted into the data stream include synchronization bits made up of a maximal length PN thirty-one bit sequence, control and status bits, bit error rate bits and orderwire bits. The synchronization bits are used to enable the receiver section of a transceiver to which the scrambled data is sent to decode and recover the original data stream and to properly demultiplex all overhead bits. These bits are generated within the encoder module itself and one sync bit is multiplexed into each frame of data. If the network contains more than one terminal-to-terminal section, section BER bits are supplied from an adjacent section with one BER bit being inserted into each frame of data. The control and status bits and the orderwire bits are generated by ATE 24 and are inserted alternately into every other frame of data. The control and status bits convey command signals from the ATE while the orderwire bits carry digitized audio signals from one terminal station to another. The manner of generation, encoding, transmission and recovery of these various bits will be described subsequently in detail.

Figure 10A:
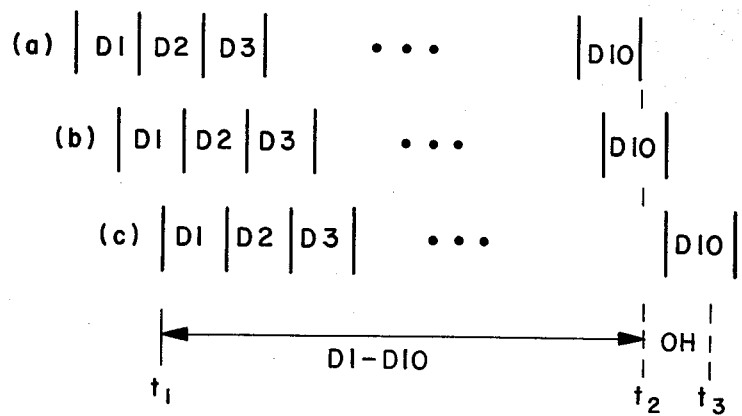
FIG. 10A is a data timing diagram relating to the operation of the transmit encoder module of FIG. 10.
Figure 10:
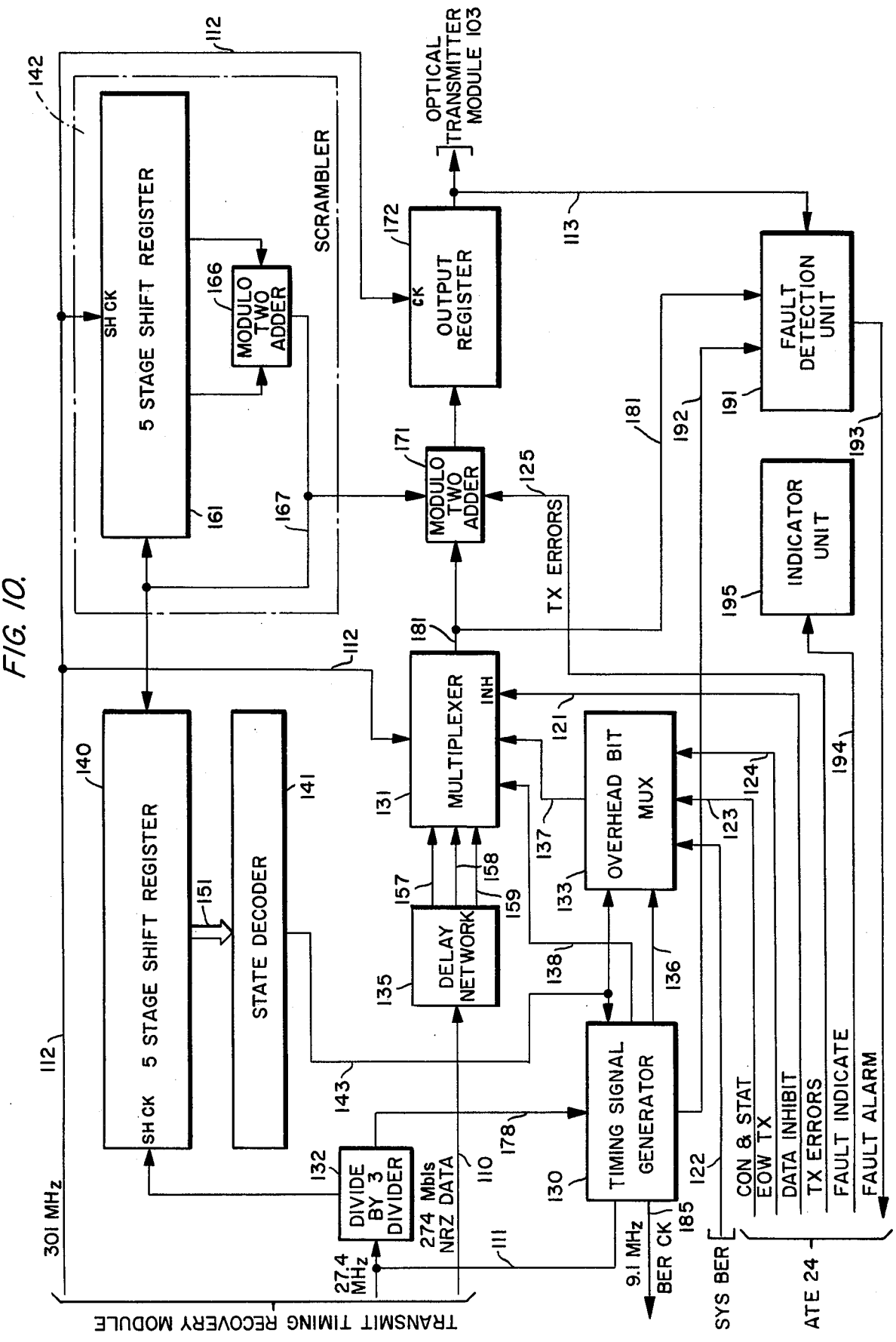
FIG. 10 is a schematic block diagram of a transmit encoder module of FIG. 7.
Figure 10B:
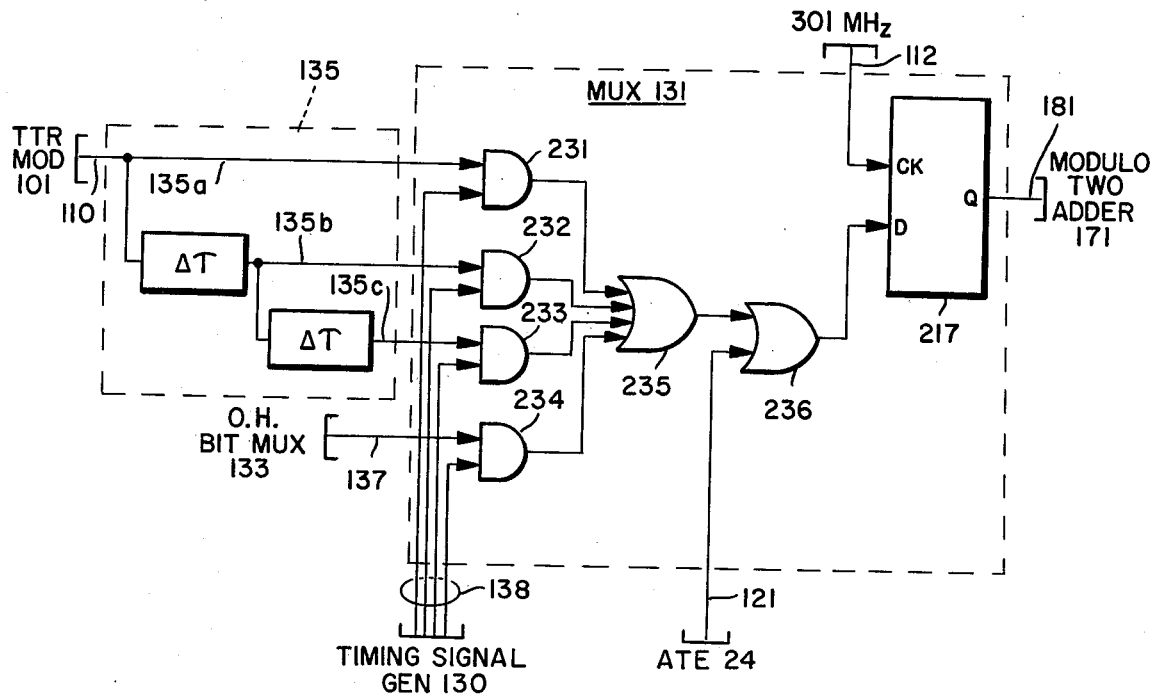
FIG. 10B is a detailed logic circuit diagram of the delay network 135 and multiplexer 131 of the transmit encoder module of FIG. 10.

Referring now to FIG. 10, wherein a schematic block diagram of TEN 102 is illustrated, line 110 from transmitting and recovery module 101 couples the 274 Mb/s NRZ data to a delay network 135 which operates in conjunction with a multiplexer 131 and a timing signal generator 130 to increase the data rate of the incoming data stream and to insert overhead bits supplied by overhead bit multiplexer 133 at every eleventh bit position of the output of multiplexer 131. As shown in FIG. 10B delay network 135 may comprise a plurality of parallel delay channels 135a, 135b, 135c of different time delays to produce sequences of the 274 Mb/s data stream successively displaced in time with respect to one another over lines 157, 158 and 159, respectively. Thus, with reference to the data timing sequences illustrated in FIG. 10A and considering a sequence of ten successive data bits D1-D10, the action of delay network 135 serves to produce successively offset (in time) data sequences (a), (b) and (c). The period of time covering bits D1-D10 for a 274 mb/s rate is approximately 36.5 nanoseconds. With successive delays using parallel channels, the period of time from the beginning of one delayed sequence such as sequence (c) to the end of another sequence of a lesser or no delay such as sequence (a) (i.e. between instants of time $t_1$ and $t_2$ shown in FIG. 10A) is compressed to a length of time considerably shorter than the 36.5 nanosecond time span (for ten bits at 274 Mb/s) of each sequence. As was pointed out above, pursuant to the present invention the output data rate is 301 Mb/s. Since ten successive bits at 301 MHz rate cover a time span of only approximately 33 ns, then for the additional approximately 3.5 nanoseconds otherwise occupied by a data bit in the incoming data stream in line 110, it is possible to insert an overhead bit or auxiliary bit for synchronization and control purposes without loss of data by compressing the data using delay network 135 and multiplexer 131. For this purpose timing signal generator 130, which is comprised of suitable combinational logic and delay circuitry to generate timing signals in a straightforward manner, controls the multiplexing or switching action of multiplexer 131.

As is shown further in FIG. 10B, multiplexer 131 may comprise a set of gates 231–234 respectively coupled to each of data stream delay lines 157–159 and to line 137 which is coupled to the output of overhead bit multiplexer 133. The outputs of the gates 231 to 234 are coupled through OR gate 235 to one input of OR gate 236 the output of which is coupled to the D input of clocked flip-flop 217. A second input of OR gate 236 is coupled to data inhibit line 121. The clock input of flip-flop 217 is coupled to line 112 over which the 301 MHZ clock for reading out the compressed data and overhead bits is supplied from transmit timing recovery module 101. The selective enabling of the respective gates 231–234 of multiplexer 131 that are coupled to lines 157–159 and 137 is controlled by a set of timing signals supplied by timing signal generator 130 over link 138; these timing signals may be derived by appropriately delaying and logically operating on delayed ones of the 27.4 MHZ clock coupled to timing signal generator 130 over line 111. Thus, for example, and referring again to FIG. 10A, the selective control or timing signals supplied over link 138 to multiplexer 131 may be such as to couple data bits D1–D3 from sequence (c), data bits D4–D7 from sequence (b) and data bits D8–D10 from sequences (a) through multiplexer 131 with the 301 MHz signal applied over line 112 clocking out the values of these gates data bits from the Q output of flip-flop 217 at the 301 Mb/s readout rate over line 181. Between time instants $t_2$ and $t_3$ the timing or control signal on line 138 enables gates 234 (FIG. 10B), so that the overhead bit on line 137 can be clocked out at the 301 Mb/s data rate. Thus, the combined action of delay network 135, overhead bit multiplexer 133 and multiplexer 131 is to compress the incoming 274 Mb/s data rate to a 301 Mb/s data rate and then insert a selected overhead bit between each group of ten data bits. As a result, from multiplexer 131 there is produced a modified data sequence of the ten original data bits followed by one additional or overhead bit. Namely, by compressing the 274 Mb/s data to a rate of 301 Mb/s, then, for every ten input data bits there are produced eleven output bits.

Referring further to FIG. 10, the output of multiplexer 131 is coupled to one input of a modulo-two adder 171. A second input of modulo-two adder 171 is coupled to line 125 over which a prescribed transmit error control signal (TX ERRORS), the function of which will be explained below, from ATE 24 is supplied. A further input of modulo-two adder 171 is coupled to output line 167 from a scrambler 142. Scrambler 172 is comprised of five stage shift register 161 the output of selected ones of which are coupled to a modulo-two adder 166. The output of modulo-two adder 166 is coupled to the input of the first stage of shift register 161 and to the input of the first stage of a five stage shift register 140. Shift register 161 of scrambler 142 is clocked at the 301 MHZ clock rate via line 112. With five shift register stages, scrambler 142 is equipped to supply a 31-bit maximal length pseudorandom sequence that is modulo-two combined with the data and overhead bit sequence read out of multiplexer 131.

The PN scrambling sequence from scrambler 142 is clocked into shift register 140 at 1/33 times the scrambler clock rate. This is achieved by the provision of a divide-by-three divider 132 coupled to line 111 over which the 27.4 MHZ clock is supplied from transmit timing recovery module 101. The result is that every thirty-third bit from free-running scrambler 142 is loaded into shift register 140. It can be shown that taking every Kth bit from a cyclic 31-bit maximal length sequence generates another cyclic 31-bit maximal length PN sequence. For the scrambler 142 shown in FIG. 10, the sequence generated by taking every 33rd bit of the scrambling sequence on line 167 is a replica of the scrambling sequence and serves as a framing sequence.

Figure 10C:
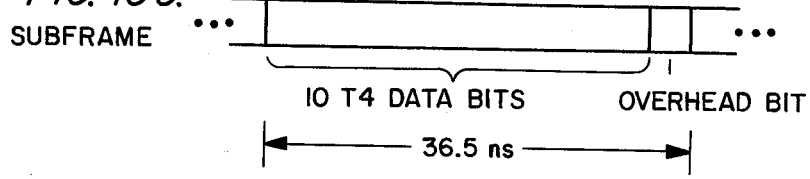
FIGS. 10C–10E are data format diagrams showing the makeup of a subframe, frame and major frame, respectively of FIG. 10.
Figure 10D:
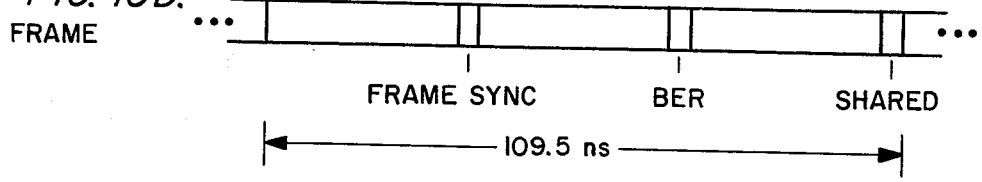
Figure 10E:
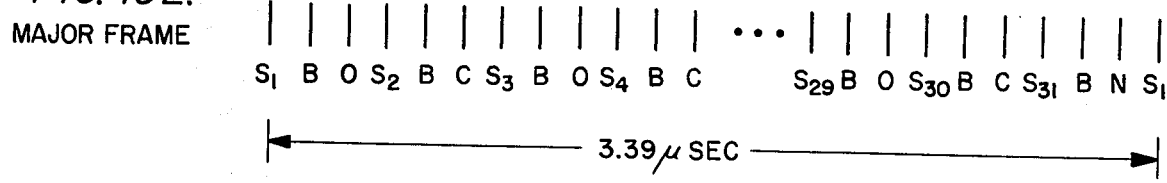

FIGS. 10C–10E illustrate the data format as assembled by the transmit encoder module shown in FIG. 10. Each subframe illustrated in FIG. 10C is comprised of ten successive NRZ data bits followed by one overhead bit and is produced by the operation of multiplexer 131 as described previously. A frame, shown in FIG. 10D, consists of three successive subframes, differing from one another. A major frame is shown in FIG. 10E as containing thirty-one consecutive frames. Within a major frame, the frame sync bit sequence for the first five frames is termed a frame marker that is used to mark the beginning of a frame, namely, frame synchronization bits $S_1$, $S_2$, $S_3$, $S_4$ and $S_5$. The marking of a beginning of a frame is effected by monitoring the state of the stages of shift register 140.

More particularly, the stages of shift register 140 are connected to a state decoder 141 which consists of combinational logic configured to decode one of the thirty-one possible states (all zeroes being forbidden for a maximal length sequence) of shift register 140 to mark the beginning of a frame. When the frame marker sequence is detected by state decoder 141 an output signal is supplied over line 143 to timing signal generator 130. Logic in timing signal generator 130 responds to the clock signal on line 178 from divider 132 and signal on line 143 to couple a signal over line 136 to multiplexer 133 causing multiplexer 133 to supply a zero over line 137 to multiplexer 131 to be inserted as an overhead bit at the intended frame synchronization bit position in synchronization with a timing signal on line 138. Thereafter, for each clock signal from divider 132 timing signal generator 130 couples a signal on line 136 causing a zero to be supplied over line 137 to multiplexer 131, thereby causing a zero to be inserted at every third overhead bit position. For the other two overhead bit positions of each frame, timing signal generator 130 responds to the 27.4 MHz clock on line 111 and supplies a signal over line 136 causing overhead bit multiplexer 133 to selectively couple one of the bits on links 122–124 to line 137 as the overhead bit.

Now, as the 301 Mb/s data and overhead bit stream is clocked out of multiplexer 131 and summed in modulo-two adder 171 with the scrambling sequence supplied over line 167, the zero bits occupying the framing bit positions $S_1$ shown in FIG. 10E are replaced by every thirty-third bit of the scrambling sequence on line 167, thereby inserting the 31-bit PN framing sequence precisely where required in the major frame. Because each unique state of the framing sequence $S_1 \ldots S_{31}$ contained within the major frame corresponds to only one state of the scrambling sequence produced by scrambler 142, synchronization of the descrambler contained within the receiver decoder module 203, to be described in detail below in conjunction with FIG. 14, can be achieved by observing the state of the recovered framing sequence.

As the scrambled sequence is generated by modulo-two adder 171 it is coupled to an output register 172 and, via a suitable delay (not shown), is clocked out of register 172 over line 113 at the 301 MHz clock rate supplied over line 112. Line 113 couples the scrambled 301 Mb/s data sequence to the optical transmitter module 103 to be described in detail below in conjunction with the description of FIG. 11.

Fault monitoring of transmit encoder module 102 is carried out by fault detection unit 191 which may be comprised of respective threshold detectors coupled to each of lines 113, 181 and 192, the outputs of the threshold detectors being logically ANDed and coupled to output line 293. Should there occur a lack of activity on scrambled data line 113, unscrambled data line 181 or the major frame timing derived by timing signal generator 130, the output of the corresponding threshold detector in fault detection unit 191 will change state so that a fault alarm signal will be delivered on line 193 to ATE 24. ATE 24 then activates the appropriate indicator 195 in TEN 102 via line 194 so that the location of the detective module can be readily identified.

The transmit encoder module shown in FIG. 10 also contains lines that are employed in conjunction with a repeater fault isolation process carried out under the direction of ATE 24. The purpose of the repeater fault isolation process is to locate and identify which unit in a communication link between stations is defective. Although the process will be described in detail below in conjunction with the description of the operation ATE 24, the control lines and their functions associated with the transmit encoder module shown in FIG. 10 will be explained briefly here.

The data inhibit line 121 is used to couple a signal from ATE 24 that prevents the coupling of data from multiplexer 131 over line 181 to modulo-two adder 171. As was described above in conjunction with the description of protection switch unit 22 (FIG. 3), the insertion of the protective channel via the operation of the transmit protection switch 43 (FIGS. 3 and 4) does not prevent incoming data from being applied over the corresponding one of lines 25-1 to 25-5 to its associated transceiver unit. Thus, data is still permitted to be coupled over line 110 through delay network 135 and to multiplexer 131. However, by applying a DATA INHIBIT logic signal on line 121, ATE 24 effectively disables the output gate circuitry of multiplexer 131 and thereby interrupts the flow of data over line 181.

Then, during the fault isolation process, only the PN scrambling sequence is coupled over line 167 through modulo-two adder 171 to output register 172 for delivery to optical transmitter module 103. Through the use of a bit error rate (BER) module in each station, the operation of downstream components of the system is monitored by observing errors in the scrambling sequence as it passes through these components. The configuration and operation of the BER module and the fault isolation process itself will be explained in more detail below. Through this process the identification of defective equipment can be rapidly located.

A further output line 185 is coupled from timing signal generator 130 to provide an additional clock (9.1 MZ) for the bit error rate PER source. To generate this clock signal, timing signal generator 130 contains gating circuitry that couples the output of divide-by-three divider 132 on line 178 to output line 185.

OPTICAL TRANSMITTER MODULE (FIG. 11)

Figure 11:
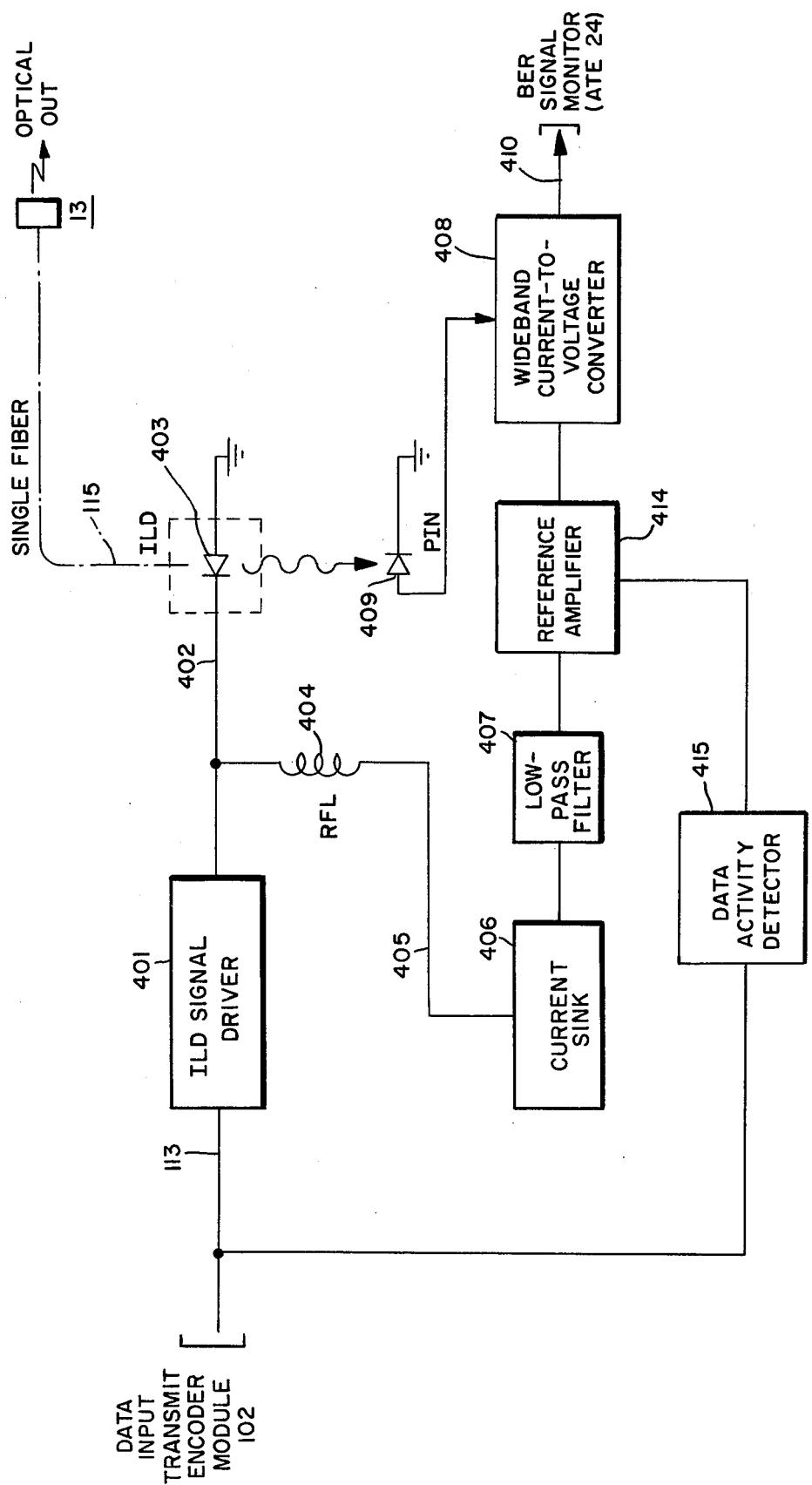
FIG. 11 is a schematic block diagram of an optical transmitter module of FIG. 7.

Optical transmitter module 103 is shown in detail in FIG. 11. This module, per se, like others described in the present application, has utility in optical communications in general and is the subject of a separate U.S. patent application entitled "Injection Laser Diode Optical Transmitter" by Paul Casper and William Ashley, Ser. No. 141,590 filed Apr. 18, 1980, now U.S. Pat. No. 4,307,469, issued Dec. 22, 1981, and assigned to the assignee of the present application. Now although reference may be had to that application for a detailed explanation of the components of the transmitter, per se, as warranted, a brief explanation of the block diagram of the components of the optical transmitter module will be presented here in order to facilitate an appreciation of its advantageous use in the environment of the present invention.

The serial stream of scrambled digital data from transmit encoder module 102 is coupled over input line 113 to an injection laser diode driver 401, which consists of a voltage-to-current converter amplifier for producing an injection laser diode drive current signal corresponding to the scrambled 301 MHz data. This current signal is coupled via line 402 to injection laser diode (ILD) 403. ILD 403 is configured so that its front facet is optically coupled through a suitable fiber optic connector (not shown) to a single optical fiber pigtail 115 that forms part of optical communications link 13 for a single channel. The rear facet of ILD 403 is optically coupled to a fast feedback photodetector 409 which produces an output current replica of the modulation of ILD 403 by the scrambled data and supplies this output current to a wideband current-to-voltage converter (such as a resistor or transimpedance amplifier) 408. The output of converter 408 is coupled to one input of a reference amplifier 414, the output of which is coupled through a low pass filter 407 to a current sink 406. A second input of reference amplifier (or comparator) 414 is coupled to the output of a data activity detector 415, the input of which is connected to data input line 113. Data activity detector 415 monitors line 113 for the presence of a data signal and supplies a pseudo photo current to reference amplifier 414 in the event of a loss of data signal. In the presence of a data signal on line 113 the output of data activity detector 415 is at a low level, so that reference amplifier effectively compares the output of converter 408 to a reference level and provides an output to be coupled through low pass filter 407 and current sink 406 for biasing the operational level of ILD 403 on the basis of the average photo output detected by APD 409. During loss of signal, the output of data activity detector 415 changes in the direction required to provide a pseudo photo current representative signal to reference amplifier 414. This pseudo photo current representative signal effectively deceives reference amplifier 414, so that the bias to ILD 403 is not increased to a level to compensate for loss of optical signal. Namely, for a loss of data signal on line 113 there is a drop in the optical output of ILD 403, to a level which improves the laser lifetime and which also prevents over driving of the device when signal reappears. When the data signal on line 113 reappears, data activity detector 415 removes the pseudo photo current input to reference amplifier 414, as reference amplifier 414 receives an optical data representative signal from converter 408.

The output of reference amplifier 414 is coupled to low pass filter 407 which removes any signal component from the voltage output of reference amplifier 414 and supplies a DC voltage level directly proportional to the average output to a current sink 406. From current sink 406 the integrated difference output of reference amplifier 414 is applied through RF choke 404 to ILD 403 as a bias control current. Reference amplifier 414, low pass filter 407 and current sink 406 operate to adjust the bias current on line 405 through RF choke 404 and line 402 to reduce the differential between the reference and the output of photo diode 409 to zero. Any fluctuation of the ILD optical output caused by changes in the current produced by APD 409, thereby shifting the bias current to again reduce the differential to zero. This compensation technique is particularly useful for the high speed data rates described herein where ILD 403 must be biased above its lasing threshold to achieve the requisite switching speed.

An environmental cooler (not shown) is also provided to maintain the operation of ILD 403 within a prescribed temperature range. A suitable temperature sensor may be thermally coupled to diode 403 and provide an output to ATE 24 for indicating whether ILD 403 is being properly temperature controlled. Should the temperature exceed a prescribed threshold, a fault signal would then be coupled to ATE 24 so that corrective action could be taken.

The output of converter 408 which, as pointed out above, is a replica of the modulation and therefore the data, is further coupled to ATE 24 via line 410. This output is used by ATE 24 to monitor the bit error rate (BER) in the optical signal being coupled over optical communications link 13 and provides a direct source for indicating the accuracy of the optical data transmission.

OPTICAL RECEIVER MODULE (FIG. 12)

Figure 12:
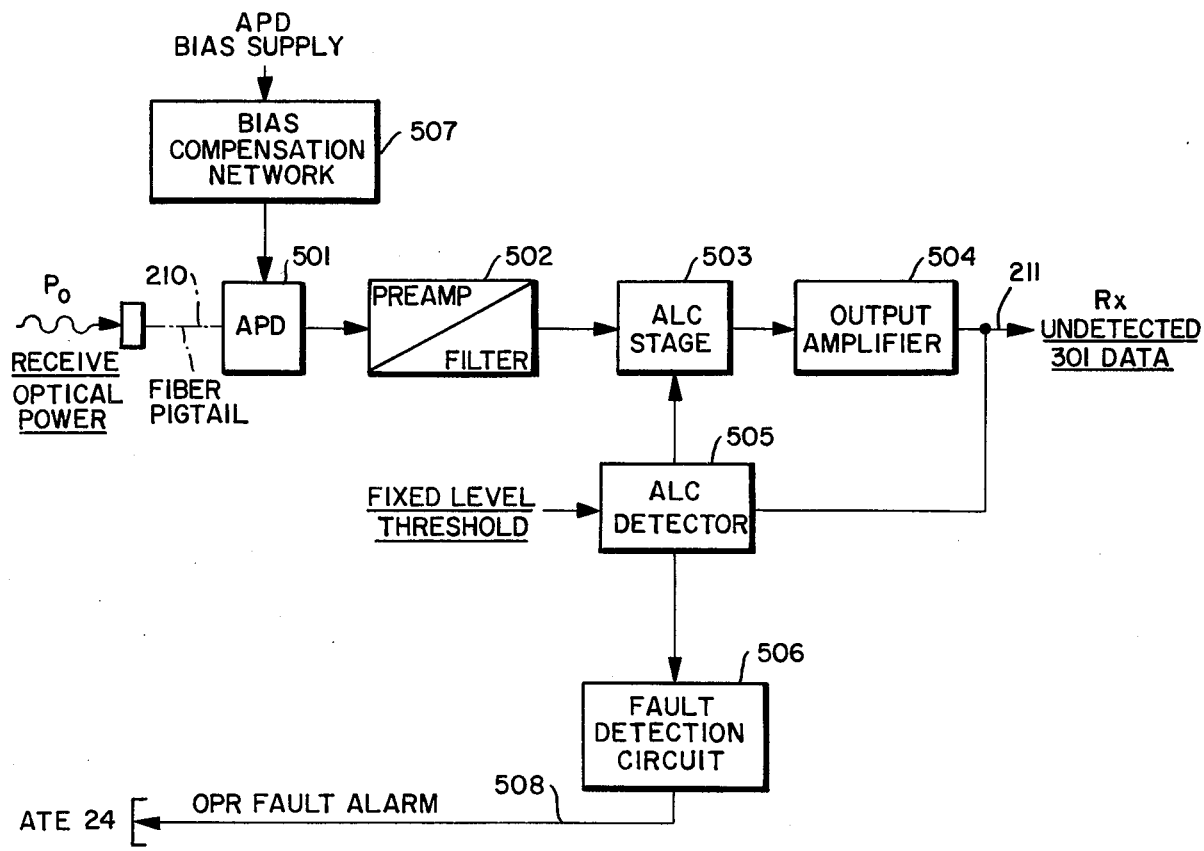
FIG. 12 is a schematic block diagram of an optical receiver module of FIG. 8.

A schematic block diagram of the optical receiver module (OPR) is illustrated in FIG. 12. The optical receiver module constitutes the front end of the receiver section of transceiver unit whether it be part of a terminal station or a repeater station disposed in the optical communication highway between terminals stations. An incoming modulated optical beam transmitted over a fiber optical communication link is optically coupled to an opto-electronic converter unit such as an avalanche photo diode 501. For this purpose the optical fiber pigtail 210 of the fiber cable may be coupled through a suitable optical fiber connector associated with the photodiode. Avalanche photodiode 501 converts the optical pulses applied to its detection face from optical fiber strand 210 into electrical current pulses which are amplified and filtered by a transimpedance amplifier 502. Advantageously, amplifier 502 may be configured as the optical preamplifier described in detail in copending application, Ser. No. 128,146 entitled Transimpedance Preamplifier, filed Mar. 7, 1980, by W. Eddins and assigned to the assignee of the present application. In accordance with this improved amplifier configuration the sensitivity and bandwidth is significantly improved over conventional circuits. Moreover, its frequency response may be tailored to perform active filtering with a three pole response characteristic, eliminating the need for external; discrete filters to establish receiver noise bandwidth. As a result, the sensitivity of the optical receiver module is enhanced affording a wide range of use of available optical receiver components such as avalanche photodiode, PIN diode, etc., in which there are simultaneously obtained low noise, high transimpedance and a flat frequency response.

The output of transimpedance amplifier 502 is coupled to an automatic level control unit 503 which adjusts the gain of the optical receiver module such that a constant output level is maintained irrespective of the level of the input optical signal detected by photodiode 501. For this purpose a gain control feedback loop coupled to the output of automatic level control unit 505 is provided. This loop consists of an output amplifier 504 which is coupled between the output of automatic level control unit 503 and line 211 that is connected to bit synchronizer module 202 (to be described below with reference to FIG. 13). The output of amplifier 504 is fed back to an automatic level control detector 505 which compares the level of the output signal to be supplied to bit synchronizer module 202 and a reference threshold voltage. Any difference between the two levels is used to control the gain of level control unit 503 so as to maintain the voltage level of the output undetected 301 Mb/s scrambled data at the proper value. The output of detector 505 is further coupled to a fault detection current 506 at the output of which is coupled over line 508 to ATE 24. Fault detection circuit 506 comprises a threshold detector that triggers when the gain control signal produced by level control detector 505 is at a level corresponding to a maximum gain for automatic level control unit 503. The maximum gain condition occurs in the absence of an optical input (no data being received) and represents a fault along the link to which the OPR is coupled. The OPR alarm triggers a repeater fault isolation process. The OPR is declared faulty if and only if none of the repeaters are found faulty.

Also included as part of the optical receiver module is a bias compensation unit 507 that is coupled to avalanche photodiode 501. Bias compensation unit 507 includes a temperature responsive impedance coupled between a bias voltage source and the photodiode 501. This component serves to compensate the maximum bias voltage applied to the photodiode and prevents avalanche photodiode breakdown for the entire operating temperature range. Unit 507 further presents a sufficient source impedance so as to cause a voltage drop due to the average photo current at high input optical power levels thereby decreasing the bias voltage to photodiode 501 and consequently reducing its gain. This gain compression action of bias compensation unit 507 adds to the overall receiver input optical dynamic range for a stabilized output.

BIT SYNCHRONIZER MODULE (FIG. 13)

Figure 13:
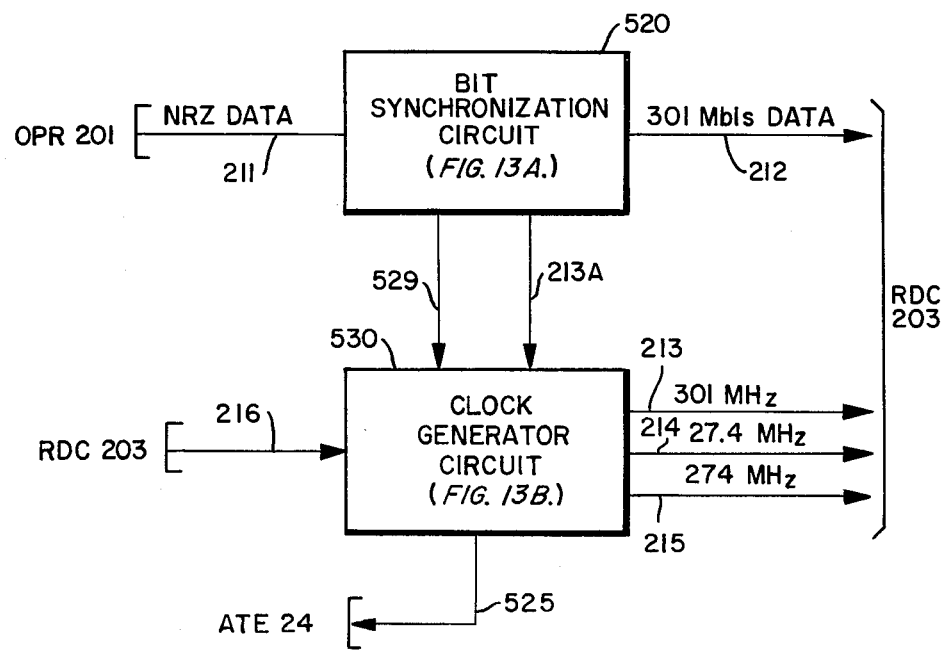
FIG. 13 is a block diagram of a bit synchronizer module of FIG. 8.

The bit synchronizer module 202, a schematic block diagram of which is shown in FIG. 13, performs the function of synchronously detecting the 301 Mb/s data and generating respective clock signals employed by the receiver decoder module in descrambling and recreating the original data. For this purpose, the bit synchronizer module is comprised of a bit synchronization circuit 520 having its input coupled over line 211 to receive the 301 Mb/s NRZ data stream supplied from the optical receiver module 201 and which outputs a fully synchronized detected data stream on line 212 to be descrambled by the receiver decoder module 203. Advantageously, bit synchronization circuit 520 is configured in the manner described in copending U.S. patent application Ser. No. 128,147, filed Mar. 7, 1980, now U.S. Pat. No. 4,320,515, issued Mar. 16, 1982 by Willie Burton entitled "Bit Synchronization Circuit", assigned to the assignee of the present application. Now although reference may be had to the above referenced application for a detailed explanation of the constituents components and operation of such a bit synchronization circuit which is especially useful for the T-4 fiber optic data rates referenced previously, the circuit will also be described here in order to facilitate an understanding of its application to the environment of the present invention. The bit synchronizer module further includes a clock generator 530 which is coupled to the bit synchronization circuit 520 and which produces three respective clock signals to be employed by the receiver decoder module at frequencies of 301 MHz, 274 MHz and 27.4 MHz. Advantageously, the bit synchronization circuit may also be employed in the repeater modules, to be described below, for the regeneration of data along the fiber optic link.

In the configuration shown in FIG. 13, bit synchronization circuit 520 operates to synchronously derive the 301 Mb/s data on line 212 and to produce a synchronously derived clock at the 301 MHz rate on line 213. As will be described in detail below, in conjunction with the description of FIG. 13A, bit synchronization circuit 520 includes a phase lock loop which produces the 301 MHz clock over line 213A and a phase lock signal over line 529 to clock generator circuit 530, the details of which will be described below in conjunction with the description of FIG. 13B. In addition to receiving the 301 MHz clock signal on line 529 from the bit synchronization circuit 520, clock generator circuit 530 receives a frame sync control signal on line 216 from the receiver decoder module 203 to be described below with reference to FIG. 14. Line 216 is employed to incrementally delay the 301 MHz signal produced from the clock generator circuit 530 on line 213 during frame sync acquisition. Output lines 214 and 215 respectively supply a 27.4 MHz and a 274 MHz clock signal to be used by the receiver decoder module. Line 525 supplies a fault alarm signal to the ATE 24 in the event of a fault in the bit synchronizer module. The module further includes an indicator lamp, not shown, which is controllably energized by ATE 24 in response to a fault alarm signal on line 525.

BIT SYNCHRONIZATION CIRCUIT

Figure 13A:
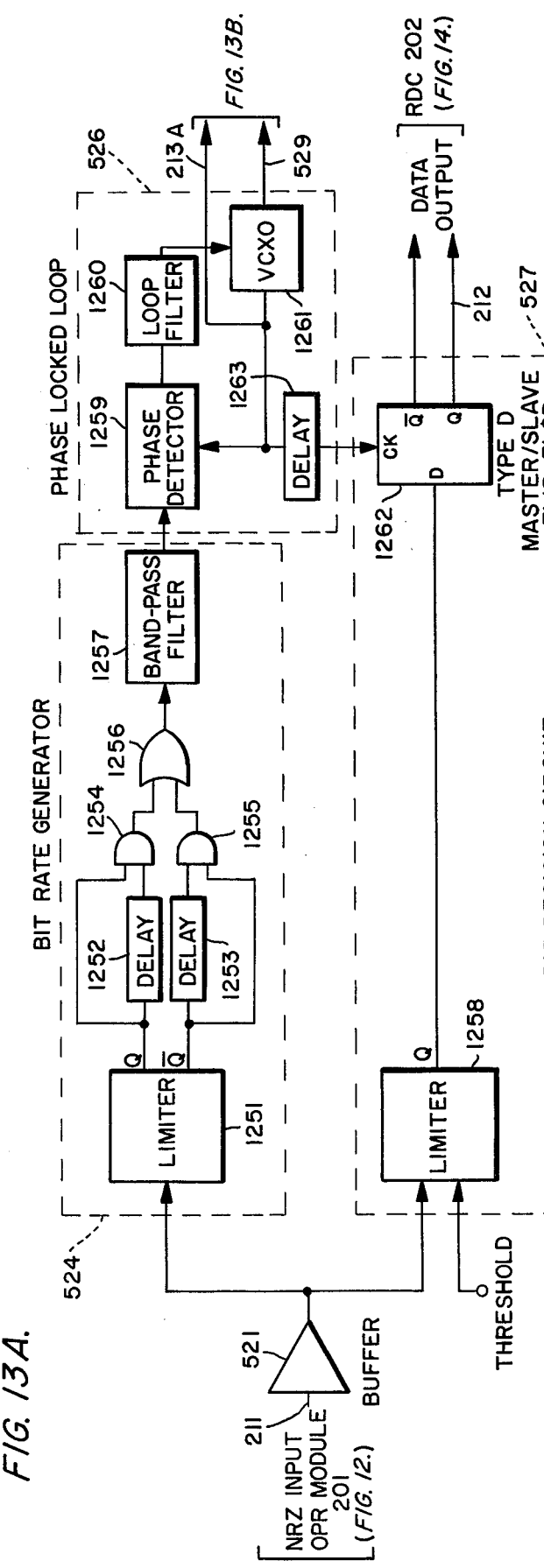
FIG. 13A is a schematic diagram of the bit synchronization circuit portion of FIG. 13.
Figure 14:
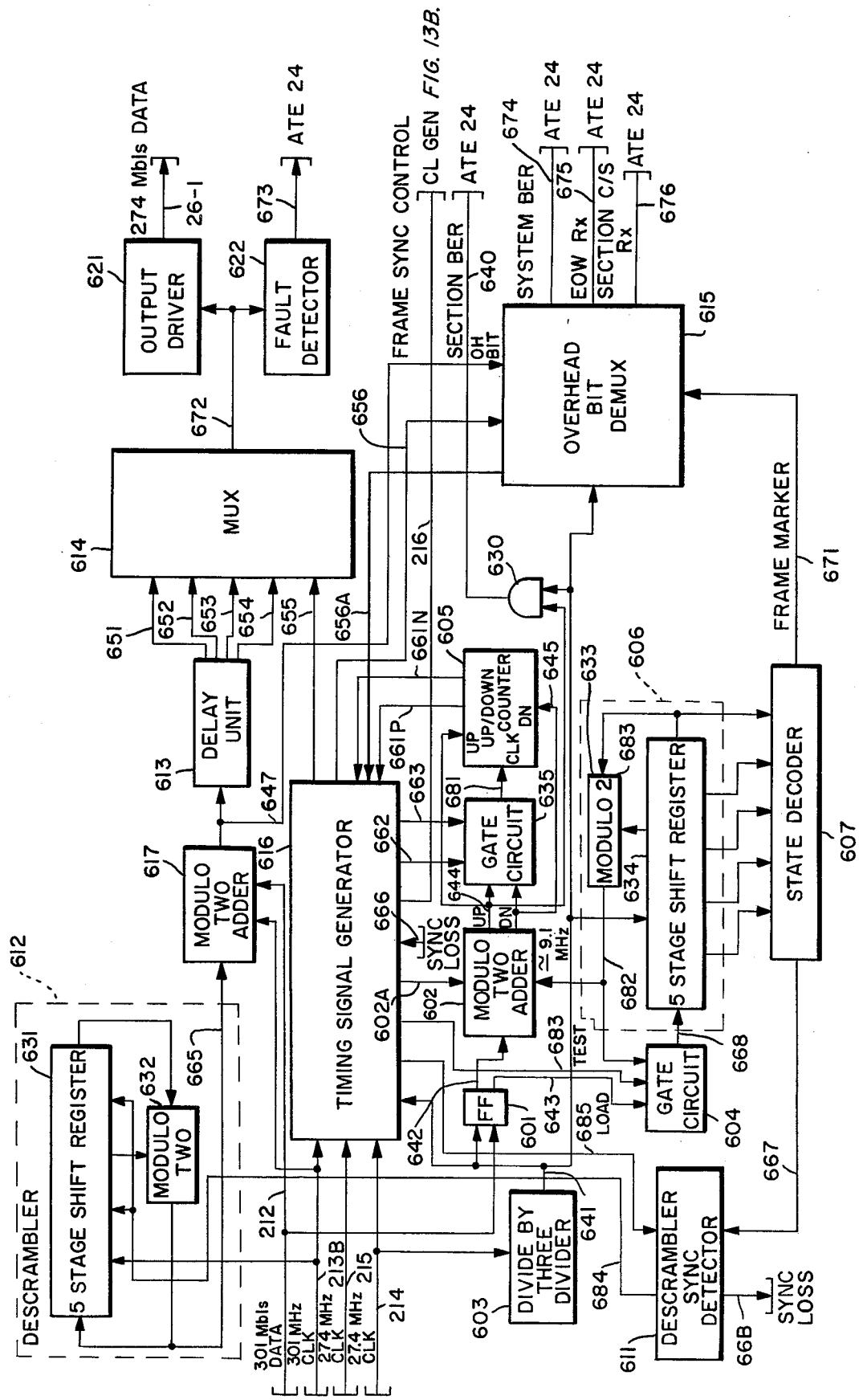
FIG. 14 is a schematic block diagram of a receiver decoder module of FIG. 8.

Referring now to FIG. 13A, which shows a schematic block diagram of the bit synchronization circuit, input line 211 from the optical receiver module 201 (FIG. 12) couples the NRZ data to an input data buffer amplifier 521, the output of which is coupled to a bit rate generator 524 and a bit decision circuit 527. The output of bit rate generator 524 is coupled to a phase locked loop 526, output line 213A of which supplies the 301 MHz clock signal which clocks the bit decision circuit 527. The bit synchronization circuit performs the function of synchronously regenerating the NRZ data at its output with low probability of error and low timing jitter. It also supplies a synchronous clock signal to be employed by the clock generator circuit 530 in producing the clocks to be employed by the receiver decoder module 203 (FIG. 14).

Between the input line 211 and each of bit rate generator 524 and bit decision circuit 527, buffer amplifier 521, which may be configured as a simple emitter follower circuit, provides isolation between the optical receiver output and the bit synchronizer input circuits. As was pointed out above, the bit synchronization circuit 520 may advantageously be employed in the repeater modules, as well as transceiver circuits. Since the continuous spectrum of random NRZ data has a null at the bit rate, timing information is derived from the input data transitions in order that the phase locked loop 526 will have signal excursions on which to lock.

From buffer amplifier 521, the NRZ data is initially hard limited by a wide band limiter 1251 configured as a differential comparator employing discrete, high frequency, bipolar transistors and optimized for minimum power at the desired switching speed. Both the Q and the $\overline{Q}$ outputs of the limiter are used. Each of the Q and $\overline{Q}$ outputs is combined with a one-half bit delayed version of itself, created by delay circuits 1252 and 1253, respectively, in a differential exclusive OR circuit. This differential exclusive OR circuit may be configured as shown of a pair of AND gates 1254 and 1255, the outputs of which are OR'd with each other, as through an OR gate 1256 produces an output containing a strong bit rate component which is phase coherent with the input NRZ data transitions. Undesired baseband components are removed by a band pass filter 1257 which is coupled to the output of OR gate 1256. The center frequency of band-pass filter 1257 is centered at the bit rate of the NRZ data. The bandwidth of the filter itself is selected so that negligible phase shifts result over the frequency uncertainty range of the data.

The output of the band-pass filter 1257 is then coupled to a phase detector 1259 within phase lock loop 526. The output of the phase detector 1259 is coupled through a loop filter 1260 which contains a clamping circuit for limiting the input control voltage of a voltage controlled crystal oscillator 1261 and thereby limiting the output frequency of the oscillator to limits well within the loop pull-in range. The output of the voltage controlled crystal oscillator 1261 is coupled to phase detector 1259 and through a delay 1263 to the clock input of a flip-flop 1262 within bit decision circuit 527. Delay 1263 provides the proper mid-bit decision time for clocking flip-flop 1262. The data input to the flip-flop is a hard-limited version of the NRZ input produced by limiter 1258 which provides the necessary ECL logic levels to the decision flip-flop. Limiter 1258 is configured similarly to that of limiter 1251 with a threshold input applying an appropriate detection voltage for the photodetector diode state dependent noise. The Q output of flip-flop 1262 is applied to line 212 as the synchronously detected NRZ data. The output of the voltage controlled oscillator 1261 is further coupled to line 213A to provide a 301 mHz clock to be employed by the receiver decoder module. When phase lock has been achieved, voltage controller oscillator 1261 produces a further output on line 529 that is coupled to the clock generator circuit 530, to be described below.

CLOCK GENERATOR CIRCUIT

Figure 13B:
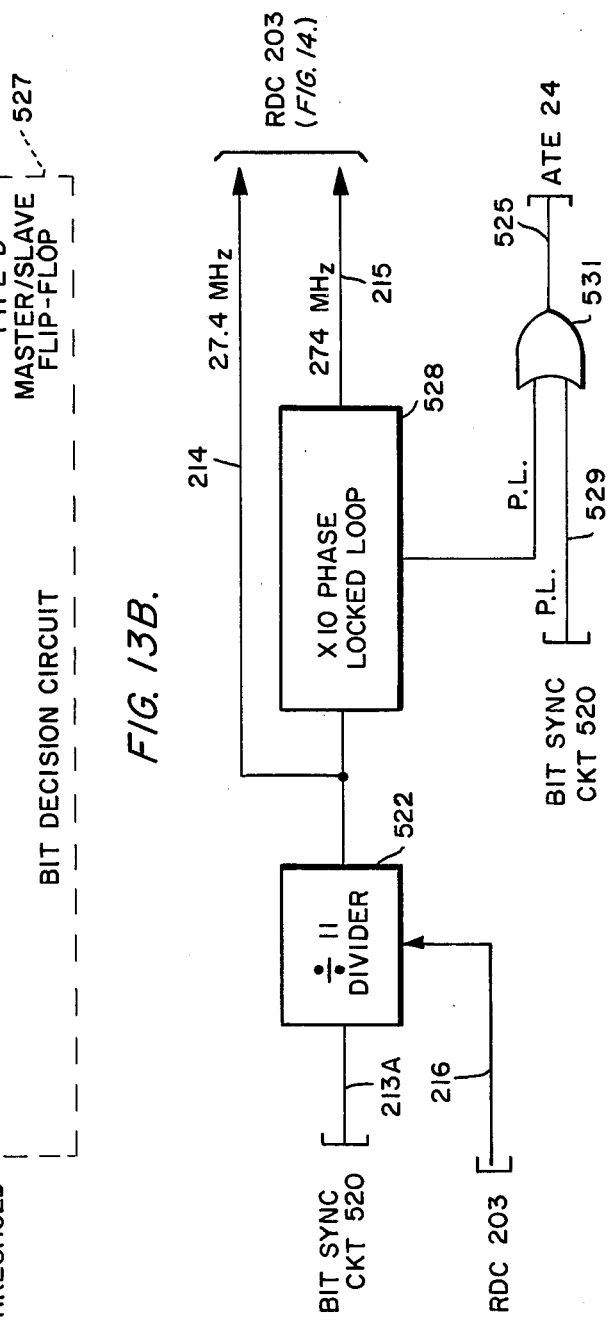
FIG. 13B is a schematic diagram of the clock generator circuit portion of FIG. 13.

As is shown in FIG. 13B, the clock generator circuit includes a divider 522 which is coupled to line 213A to receive the 301 MHz clock produced from voltage controlled oscillator 1261 within the phase lock loop 526 of FIG. 13A. Divider 522 also contains a logic circuit which may be controlled to selectively delete one of the 301 MHz clock pulses applied on line 213A. More particularly, as will be explained below in conjunction with the description of the receiver decoder module (FIG. 14), during frame sync acquisition, a search process is conducted to identify the location of the frame synchronization sequence among the scrambled incoming data. In response to a signal on line 216, the logic circuit of divider 522 inhibits one of the 301 MHz clock pulses and thereby effectively shifts the phase of the 27.4 MHz clock on line 214 by one bit. This action is used to step through the scrambled data stream, as will be explained fully below.

Divider 522 further divides the 301 MHz clock signal down to 27.4 MHz and outputs the signal over line 214 to the receiver decoder module. It further applies the 27.4 MHz clock to a times-ten phase lock loop 528 which derives a synchronous 274 MHz clock to be employed by the receiver decoder module in regenerating the data. When lock is achieved, phase lock loop 528 produces a phase lock signal to one input of OR gate 531, the other input of which is coupled to line 529 from voltage controlled oscillator 1261 within phase locked loop 526. Loop 528, like loop 526, includes an appropriate combination of phase detector, loop filter and voltage control oscillator to derive the clock signal (here 274 MHz). The output of OR gate 531 is coupled over line 525 to supply a fault alarm signal to ATE 24. In the event of loss of sync by either loop, an alarm signal is delivered to the ATE 24 which responds by generating the appropriate fault indication signal for energizing an indicator lamp (not shown), in the module.

RECEIVER DECODER MODULE (FIG. 14)

The receiver decoder shown in schematic block diagram form in FIG. 14 is coupled to the scrambled data and clock lines 212–215 from the bit synchronizer module described above with reference to FIG. 13 and operates to descramble and remove the overhead bits from the 301 Mb/s data stream coupled over line 212. The descrambled data stream that is produced at the output of the receiver decoder module is clocked out of the receiver decoder module at 274 MHz so that it corresponds to the original data sequence supplied to the transmitter and has a bit rate corresponding to that of the original data sequence.

Since the data stream that is applied to the receiver decoder module is augmented by overhead bits scrambled by a maximal length PN sequence, it is necessary to descramble the incoming data sequence and remove the overhead bits in order for accurate data recovery to be effected. As was explained previously in conjunction with the description of the transmitter encoder module, every third overhead bit of each major frame corresponds to a respective bit of the original PN scrambling sequence. In order to implement the data recovery process, the receiver decoder module must initially locate this framing bit sequence. Once the location of the framing bit sequence is identified, the PN generator of a local descrambler is then placed in the proper state to begin descrambling the data so that the overhead bits can be removed and the data bits forwarded to output line 26-1.

For implementing the above events, the receiver decoder module includes a flip-flop 601, the D input of which is coupled to the scrambled data stream sequence that is coupled to the receiver decoder module from bit synchronizer module 202 over line 212. Flip-flop 601 is clocked at a frequency of one/thirty-third of the incoming data rate or approximately 9.1 MHz. For this purpose the 27.4 MHz clock supplied over line 214 is applied to a divide-by-three divider 603, the output of which is applied over line 641 to the clock input of flip-flop 601. This 9.1 MHz clock on line 641 together with the other clock signals on lines 213B, 214 and 215 are applied to a timing signal generator 616. Timing signal generator 616 is configured of appropriate combinational logic for generating enabling and timing signals at selected times in accordance with the sequence of events to be described fully below. The particular design of the combinational logic circuitry employed may take various forms readily implemented by the skilled artisan, given the subsequently described sequence of events which take place during the reception and descrambling of the data stream. The various signal control lines from timing signal generator 616 are depicted and will be described in conjunction with the interconnection and operation of the receiver decoder module.

The Q output of flip-flop 601 is coupled over line 642 to one input of modulo-two adder 602 a second input of which is coupled over line 682 from frame sync PN generator 606. Modulo-two adder 602 is comprised of an exclusive OR gate coupled to a flip-flop, the Q and $\overline{Q}$ outputs of which are applied over lines 644 and 645, respectively, to gate circuit 635 and to the count UP and count DOWN control inputs of UP/DOWN counter 605. Line 602A from timing signal generator 616 clocks the output of the exclusive OR gate through the flip-flop to be applied to lines 644 and 645. The Q output of flip-flop 601 is coupled to a first input (labelled LOAD) of a gate circuit 604. A second output (labelled TEST) of gate circuit 604 is coupled to the output line 682 of frame sync PN generator 606. Frame sync PN generator 606, like descrambler 612 and scrambler 142 (FIG. 10) is configured of a multistage (5 stages) shift register 634 and a modulo-two adder 633 coupled to the outputs of prescribed stages of the shift register and connected in a feedback path to the first stage via gate circuit 604 and gate output line 668. Gate circuit 604 is controlled via line 683 from timing signal generator 616 and selectively couples either the scrambled data on line 212 that is clocked out of flip-flop 601 or the output of modulo-two adder 633 to line 668 and into the first stage of five stage shift register 634. Frame sync PN generator 606 is clocked at the 9.1 MHz clock rate supplied over line 641 to the clock input of shift register 634. Line 641 is further coupled to one input of an AND gate 630, the output of which is coupled over line 640 to ATE 24. A second input of gate 630 is coupled over line 644 to modulo two adder 602. During reception and decoding of data by the decoder module AND GATE 630 is enabled every thirty-third bit of the incoming data sequence. As will be explained in detail below, for no bit errors, modulo-two adder 602, which compares the PN sequence on line 682 with that in line 642, should always produce a zero output so that AND gate 630 supplies a zero output on line 640. Bit errors, however, cause the two inputs of modulo-two adder to differ thereby enabling AND gate 630 upon these occurrences. These bit errors are counted by ATE 24 via line 640 to obtain a measure of the bit error rate performance of the transceiver.

The outputs of the respective stages of shift register 634 are coupled to a state decoder 607 which is comprised of a pair of combinational logic circuits connected in parallel to the outputs of the stages of shift register 634. The first of these logic circuits causes the logic level on line 667 to change state when the contents of shift register 634 correspond to a prescribed sequence of framing bits that represent the frame marker; the second of these logic circuits causes the logic level on line 671 to change state when the contents of shift register 634 correspond to a prescribed logical code sequence that identifies the last five sync bits of a major frame of data. Line 671 is used to inhibit the coupling of the unused overhead bit for the last frame of a major frame of data (which corresponds to the shared overhead bit—either the express orderwire bit or the C/S bit) to line 675 or 676 by demultiplexer 615. Descrambler sync detector 611 operates in conjunction with frame sync PN generator 606 and state decoder 607 to enable the descrambling of the incoming data stream upon the frame synchronization bit sequence having been located and the frame marker identified. Namely, decrambler sync detector 611 presets the stages of descrambler sequence generator 612 in the correct logic state so that descrambler sequence generator 612 will produce an output line 665, a descrambling sequence exactly in phase with and identical to the scrambling sequence that has been combined with the data bits in the transmitter. As a result, when the descrambling sequence from descrambler sequence generator is modulo-two added to the incoming scrambled data stream, the scrambling sequence will be removed leaving only the original data and overhead bits.

Descrambler sync detector 611 comprises a latch switching circuit which monitors the level change on line 667 and thereafter applies a signal over line 684 to respective stages of shift register 631 upon the application of a timing signal on line 685 from timing signal generator 616. During a loss of sync condition indicating that the framing sequence and frame marker have not been located, descrambler sync detector 611 couples a loss of sync signal over line 666 to timing signal generator 616.

The output of descrambler sequence generator 612 (generator 612 being configured exactly the same as scrambler 142 within transmit encoder module 102) is coupled over line 665 to modulo-two adder 617. Like modulo-two adder 602, adder 617 contains an exclusive-OR circuit coupled in series with one input of a clocked flip-flop. The two inputs of the exclusive-OR circuit are coupled to lines 665 and 212, with the flip-flop being clocked by the 301 MHz signal on line 213. Modulo-two adder 617 combines the incoming scrambled data stream on line 212 with the descrambling sequence provided at the output of modulo-two 632 and produces a descrambled 301 Mb/s data stream on line 647. Line 647 is coupled to a delay unit 613 and to an overhead bit demultiplexer 615. Delay unit 613 is comprised of a series of three delay units and produces an undelayed signal on line 651 and three delayed signals of successively longer delay times on lines 652-654. Each of the lines 651-654 is applied as a respective input to multiplexer 614. To control the selective switching of inputs 651-654 to output line 672 of multiplexer 614, a switching control link 655 is coupled from timing signal generator 616 to multiplexer 614. Multiplexer 614 may be configured in a manner similar to multiplexer 131 of the transmit encoder module with link 655 supplying respective timing enabling signals to the gates to which lines 651-654 are coupled, the combined outputs of the gates being clocked through a flip-flop. For this latter purpose link 655 further includes a line coupled to input line 215 for clocking the flip-flop at the 274 MHz rate. As will be appreciated from the previous description of the action of delay network 135 and multiplexer 131 of the transmit encoder module (shown in detail in FIG. 10B), by successively delaying the input serial data stream among a plurality of parallel paths, selective control of the spacing of the data bits and thereby the bit rate of the resultant data stream can be effected. This permits both the insertion and deletion of selected data bits through the selective enabling of the gate circuits of the multiplexer at desired time intervals. In the receiver decoder module each overhead or eleventh bit in the serial data stream is deleted by selectively disabling the gate that is coupled to receive the output of the longest effective delay path, here line 654, during the interval occupied by the overhead bit. With the data being clocked out of multiplexer at the 274 MHz clock rate the resultant sequence is a serial data stream containing only data bits at a 274 Mb/s bit rate.

Output line 672 is coupled to an output driver 621 and a fault detector circuit 622. Output driver 621 buffers the output 274 Mb/s for subsequent delivery to downstream processing circuitry while fault detector monitors the activity on line 672. Like the fault detectors employed in the other transceiver modules described previously, fault detector 622 compares the level on line 672 with a prescribed threshold and supplies an output on line 673 to ATE 24 in the event of a drop in activity. The receiver decoder module also includes a fault indicator (not shown) that is controllably energized by ATE 24.

For distributing the overhead bits contained in the descrambler serial data stream produced at the output of modulo-two adder 617 to their respective destinations, line 647 at the output of modulo-two adder 617 is coupled to an overhead bit demultiplexer 615. Demultiplexer 615 has a plurality of output lines 674, 675 and 676 coupled to supervisory/control equipment to be described in detail below. Timing signal generator 616 delivers selective enabling signals over link 656 to demultiplexer 615 in synchronism with the occurrence of the non-frame sync overhead bits, i.e., bits B, O and C shown in FIG. 10E, so that those bits will be selectively coupled to the appropriate system supervisory circuits, once the frame sync marker has been detected by sync detector 611 as explained above.

Frame synchronization is accomplished by the operation of up/down counter 605 in conjunction with the control of divider 522 in the bit synchronizer module 202 (FIG. 13). Up/down counter 605 is clocked by pulses applied from gate circuit 635 over line 681. Gate circuit 635 is coupled to receive a pair of clock pulse signals on lines 662 and 663 from timing signal generator 616. Line 662 supplies a single clock pulse to one input of gate circuit 635 while line 663 supplies a prescribed plurality of clock pulses to the gate circuit. Gate circuit 635 couples one of the single pulses on line 662 and the plural pulses on line 663 and the clock input of up/down counter 605 in response to control signals on lines 644 and 645. As was described above, lines 644 and 645 are coupled to respective Q and $\overline{Q}$ outputs of a flip-flop in modulo-two adder circuit 602. These outputs govern the switching action of gate circuit 635 during frame synchronization acquisition. As long as the inputs on lines 642 and 682 to modulo-two adder circuit match, as is the case for an in-sync condition, there is an output on line 644 causing gate circuit 635 to couple a single pulse on line 662 and to counter 605. The signal on line 644 causes counter 605 to be incremented by a count of one and this process continues until the counter has reached capacity, after which consecutive agreements at the inputs to modulo-two adder 602 simply cause the contents of counter 605 to remain at its highest count. When counter 605 is incremented to its maximum count, line 661 couples a signal to timing signal generator 616 indicating an apparent synchronous condition between the synchronization PN sequence produced by frame synchronization PN generator 606 and every thirty-third bit in the incoming scrambled data sequence supplied to modulo-two adder circuit 602 from flip-flop 601.

During the process of searching for and locking onto the frame synchronization code produced by frame sync PN generator 606, for an out-of-sync condition, the output of generator 606 on line 682 and the output of flip-flop 642 will frequently fail to match, so that an output is produced on line 645 causing the contents of up/down counter to be decremented by a prescribed number of pulses, e.g., eleven pulses. After several "misses", the counter reaches its minimum count, whereby the signal level on line 661 at the output of counter 605 is at a different state than for an in-sync condition described above. In response to this signal, timing signal generator 616 produces a signal on line 216 which is coupled to divider 522 in the bit synchronization module (FIG. 13). Divider 522 contains a gate circuit that responds to the signal on line 216 and inhibits or deletes one of the 301 MHz clock pulses applied on input line 213B so that an additional 301 MHz clock pulse cycle is required before the next 27.4 MHz clock pulse is coupled over line 214 to divider 603. Since the output of divide-by-three divider 603 on line 641 controls the clocking of flip-flop 601 and frame sync PN generator 606, the effect of the pulse deletion is to delay the clocking of flip-flop 601 and frame sync PN generator 606. As will be explained below, this action is taken to effectively enable the shifting of a new sequence of five data bits, offset in phase by one 301 MHz data bit, from the previous sequence loaded in shift register 634, so that a new attempt to locate the frame synchronization pattern in new bit positions of the incoming data stream, shifted in phase from those previously examined, can be carried out.

In addition to applying a frame sync control signal on line 216, timing signal generator 616 supplies a switching control signal over line 683 to gate circuit 604 causing the output of flip-flop 601 on line 643, applied to the LOAD input, to be coupled to line 668. This action causes five new data bits to be loaded into shift register 634 of frame sync PN generator 606. As explained above, because of the deletion of the 301 MHz clock pulse in the production of the 27.4 MHz clock input to divider 522 of the bit synchronizer module, these five new bits correspond to those that are shifted by one 301 MHz clock pulse period relative to the positions that would have been occupied by the next five bits occupying consecutive every thirty-third position of the scrambled data sequence. Once the time required to load these bits into shift register 634 has elapsed, the state of line 683 switches the output of gate circuit 604 to the TEST input that is connected to line 682, and modulo-two adder circuit 602 compares the PN sequence from generator 606 with every thirty-third bit of the incoming scrambled data sequence. The above-described procedure is thereafter repeated until the framing bit sequence is located, at which time the output on line 661 from up/down counter 605 causes timing signal generator 616 to supply a signal to line 685 indicating that the frame synchronization PN sequence has been located.

Once the framing sequence has been located, there is no further loading of new data bits into shift register 634 or the deletion of 301 MHz clock pulses by divider 527 in the bit synchronization module (FIG. 13) since frame sync PN generator 606 is producing the framing bit sequence exactly in phase with the framing bit sequence occupying every third overhead bit position of the incoming scrambled data stream. Instead, generator 606 is now clocked in synchronism with the bit positions of the framing sequence in the incoming data. Eventually, as the contents of shift register 634 continue to change in response to the 9.1 MHz clock on line 641, the frame marker pattern occupies the five stages of shift register 634. Thereupon descrambler sync detector 611 thereafter causes a prescribed state code to be loaded into selected stages of shift register 631 in response to an output over line 667, to mark the beginning of a frame. Modulo-two adder 617 is now able to accurately descramble the incoming data stream.

OPERATION

In operation, the receiver decoder module carries out a prescribed sequence of steps to implement data recovery. The first step is the location of the framing bit sequence. Once the framing bit sequence has been identified, the sequence of frame sync bits $S_1$-$S_5$ marking the beginning of a frame, termed the frame marker, is located so that descrambling of the data and attendant demultiplexing of the overhead bits can commence.

As was described above, location of the framing bit sequence is implemented by the controlled operation of frame sync PN generator 606. Let it be initially assumed that the framing bit sequence in the incoming scrambled data sequence is not synchronized with the framing PN sequence clocked out of generator 606. As the scrambled 301 Mb/s data sequence is received over line 212 it is applied to the D input of flip-flop 601. Divide-by-tree divider 603 divides the 27.4 MHz clock from the bit synchronizer module on line 214 into an approximately 9.1 MHz clock signal that clocks every thirty-third bit of the scrambled data sequence through flip-flop 601 to modulo-two adder 602 via line 642. Via line 683 timing signal generator 616 causes gate circuit 604 to load five successive supposed framing bits of the incoming data sequence. Each of the supposed framing bits is separated from adjacent supposed framing bits by thirty-two other bits since flip-flop 601 is clocked at 1/33rd of the 301 MHz data rate. Upon the expiration of the time to load these five bits into shift register 634, timing signal generator 616 supplies a switching signal on line 683 to cause gate circuit 604 to couple line 682 at its input to recirculation output line 668. Now, the clocked output of flip-flop 601 on line 642 is compared with the PN sequence produced by generator 606 as each is clocked by divider 603.

Should the bits from each match, modulo-two adder 602 produces an output on line 644 causing gate circuit 635 to apply a single pulse on line 662 to line 681 which increases the count of counter 605. Should the bits applied to modulo-two adder circuit 602 not match, an output is produced on line 645 causing gate circuit 635 to coupler line 663 to line 681, whereby the contents of counter 605 are decremented by the number of pulses applied to line 681.

The above described incrementing/decrementing of counter 605 continues until the contents of counter 605 reach a maximum or minimum. The former occurrence corresponds to a frame synchronization condition wherein the incoming data sequence is properly phased with the frame bit sequence produced by generator 607 except for occasional bit errors, so that counter 605 will tend to count up to maximum capacity and remain there. Here, it has been assumed that the data sequence is not properly phased with the output of frame sync PN generator 606 so that counter 605 counts down and eventually goes reaches minimum, whereupon an output is produced on line 661N indicating that the contents of counter 605 have reached minimum and that the frame sync PN sequence produced by generator 606 is not properly phased with the framing bit sequence contained in the incoming data stream.

Timing signal generator responds to the output on line 661N by supplying a frame sync control signal on line 216 so that the incoming data sequence is shifted in phase by the period of one 301 MHz clock signal. Timing signal generator 616 further causes the level on line 683 to change state so that gate circuit 604 couples output line 668 to its load input and five new data bits corresponding to five newly assumed bit positions for the location of the frame bit sequence are loaded into shift register 634. Upon the expiration of the time required to load the five new bits into shift register 634, the level on line 683 changes state and gate circuit 604 couples line 682 to line 668. Thereupon, a new comparison of the newly assumed framing bit sequence and the PN sequence produced by generator 606 is conducted. The above described procedure is repeated until eventually counter 605 tends to count up indicating that the scrambled data bits occupying the location of the bits of the assumed framing bit sequence correspond to the bit sequence produced at the output of generator 606, whereupon counter 605 produces an output on line 661P. In response to this output, timing signal generator delivers a signal over line 685 to descramble sync detector 611 indicating that the PN sequence produced by frame sync PN generator 606 is properly phased with the frame bits in the incoming data enabling descrambler sync detector 611 to look for a frame marker output on line 667.

Now that the two sequences occupy the same bit time slots, the receiver decoder module next proceeds to locate the frame marker. Assuming that the frame marker does not correspond to the five bits of the PN sequence contents of register 634 at the time synchronization is detected, so that there is no frame marker identification signal on line 667, then descrambler sync detector 611 does not change the state of output line 684. As scrambled data continues to be received, frame sync PN generator 606 is clocked and the state of the stages of shift register 634 are changed to be different ones of its thirty-one possible states. Eventually, the code in shift register 634 matches the frame marker and the level on line 667 changes state, causing descrambler sync detector 611 to supply an output on line 684; also the level of line 666 changes state. Since line 684 causes prescribed stages of register 631 to be preset to the state which equates the contents of register 631 with the frame marker code now stored in register 634, the output of the descrambler sequence generator is fully synchronized with the incoming data sequence, so that descrambling of the data can begin.

Descrambling of the data is carried out at the 301 MHz clock rate on line 213B which clocks the output flip-flop of modulo-two adder 617, so that a 301 Mb/s descrambled data sequence is produced on line 647. As was explained above, delay unit 613 and multiplexer 614 downconvert the 301 Mb/s data to a 274 Mb/s sequence while dropping the overhead bits, to produce on line 672 a serial data stream corresponding to the original 274 Mb/s data sequence. The overhead bits in the 301 Mb/s descrambled data output of modulo-two adder circuit 617 are demultiplexed by demultiplexer 615 for delivery to their respective output lines 674, 675 and 676, under control of the 9.1 MHz clock supplied over line 641 and demultiplexer steering signal on link 656.

It should be noted that once frame sync has been achieved, the descrambled frame sync bit should always be a logic zero. If the frame sync bit is not zero, the descrambler 612 started in the wrong place and needs to be restarted. Under control of line 646A from overhead bit demultiplexer 615, the timing signal generator 616 is commanded to reinitiate frame search if the descrambled frame sync bit is non-zero. If this happens, a frame sync control pulse is output to the timing recovery circuitry and a new set of five bits is loaded into register 634.

During the describling and demultiplexing of the incoming data and overhead bits, state decoder 607 continues to monitor the contents of shift register 634 for that particular sequence of five bits in the thirty-one bit maximal length sequence that corresponds to bits $S_{27}$-$S_{32}$ indicating that last frame of a major frame of data is being processed. Upon detection of this sequence, state decoder 607 produces a signal over line 671 to demultiplexer 615 to inhibit demultiplexer 615 from supplying an overhead bit over lines 675 or 676. As was described previously, the last overhead bit of a major frame of data (which should correspond to the orderwire bit as it is for an odd numbered frame) is unused. Accordingly the signal on line 671 inhibits the delivery of erroneous data from demultiplexer 615 for this bit, and causes the third overhead bit of the next frame instead (which next frame is the first or an odd numbered frame of the next major frame) to be correctly applied to line 675.

REPEATER (FIBER OPTIC LINK CONFIGURATION) FIG. 15

As was explained in conjunction with the description of the general configuration of the fiber optic communication system of the present invention, illustrated in FIG. 1, in addition to respective terminal stations provided at opposite ends of the network, there may be provided one or more repeaters distributed along the optical fiber communication link to compensate for the attenuation and fiber dispersion characteristics of the fiber optic cable. For this purpose, each repeater contains three basic components that effectively regenerate the optical data.

Figure 15:
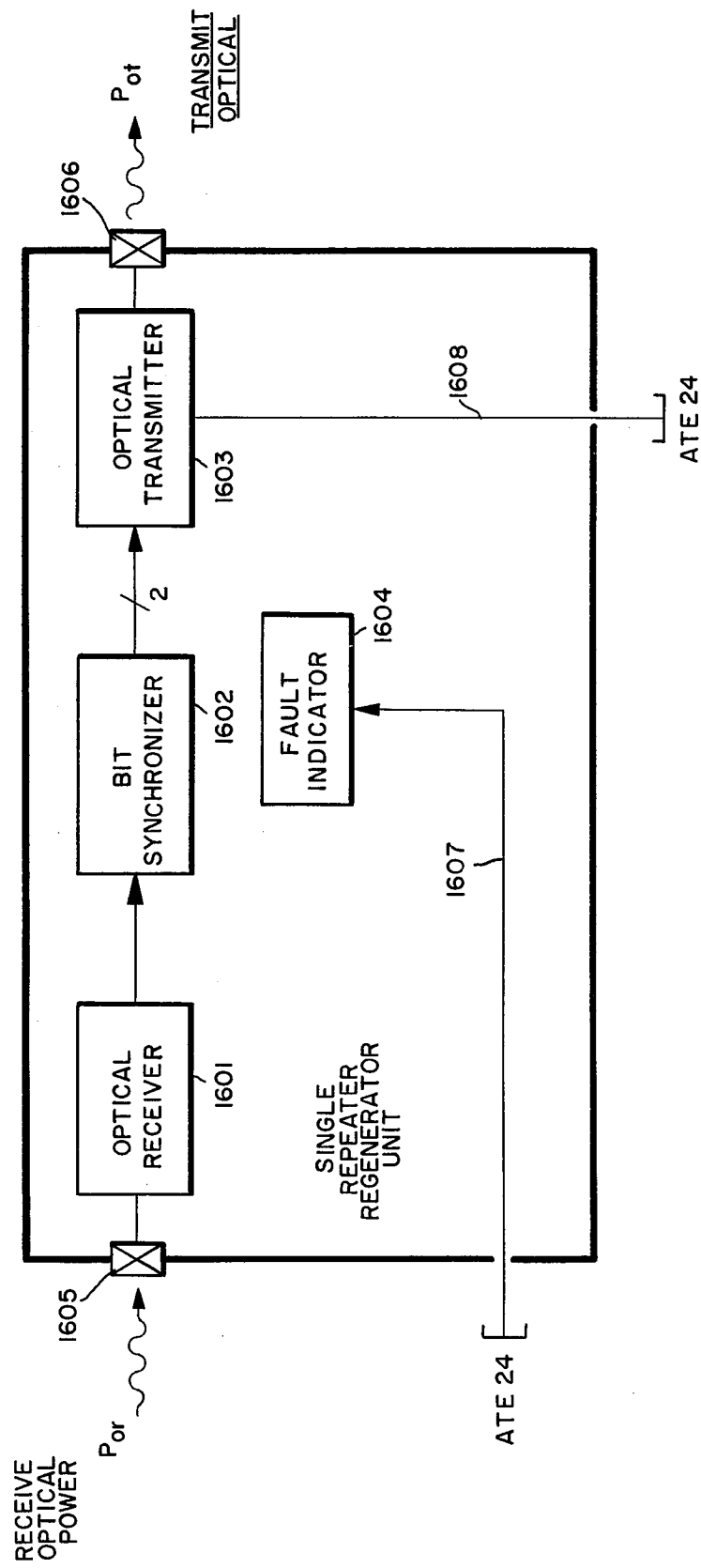
FIG. 15 is a block diagram of an individual repeater unit of FIG. 1.

More particularly, an individual repeater includes either a set of optical signal regenerator unit pairs, termed RBTs (Receiver-Bit synchronizer-Transmitter), or a set of optical signal regenerator pairs, termed RTs (Receiver-Transmitter) corresponding in number to the number of channels that make up the optical fiber communication network. In the present example where five normally working channels and one protection channel are employed, each repeater comprises six up-link regenerator units and six down-link regenerator units. FIG. 15 illustrates the regenerator configuration for a single unit as including an optical receiver unit 1601, a bit synchronizer unit 1602 and an optical transmitter unit 1603. (An RT unit would contain only receiver unit 1601 and an associated transmitter unit 1603.) Optical receiver unit 1601 is coupled to an incoming optical fiber cable strand through a suitable optical fiber coupler 1605 by way of which the fiber is mechanically coupled to the unit. Similarly, optical transmitter unit 1603 is coupled to an outgoing optical fiber cable strand through a suitable optical fiber coupler 1606 by way of which the fiber is mechanically coupled to the unit. Advantageously, the components of the receiver may be configured the same as corresponding components of the terminal stations. Thus, reference may be had to FIG. 12 and its attendant description for an explanation of the make up of the optical receiver unit 1601 and to FIG. 11 and its attendant description for an explanation of the make up of optical transmitter 1603. The bit synchronizer 1602 is the same as that of the bit synchronizer of FIG. 13 except that clock generator 530 which derives the 27.4 MHz and 274 MHz clock deriving components is omitted since the clock signals are not necessary, there being no encoding or decoding of the 301 Mb/s data in the repeater.

In operation, incoming data from another repeater or terminal station over an input optical fiber strand is detected by the avalanche photodiode detector within the optical receiver unit 1601. After being filtered and amplified in the optical receiver unit, a data modulated voltage is coupled to bit synchronizer unit 1602. Bit synchronizer unit 1602 extracts the 301 MHz clock from the scrambled data stream and hard limits the receiver output. The recovered clock is also used to completely restore the pulse waveform and to resynchronize the timing of the outgoing data stream as described in conjunction with the description of FIG. 13A. The restored data stream drives the injection laser diode of the optical transmitter unit 1603, which outputs the regenerated optical data stream at full amplitude to the next section of the fiber optic link.

The output of the current-to-voltage converter of optical transmitter 1603 is further coupler via line 1608 to supervisory local orderwire circuitry with the ATE 24 to be described below. Through line 1608 the bit error rate is monitored and in the event of a failure in the repeater a fault indication signal is coupled from the supervisory circuitry over line 1607 to a fault indicator 1604. Each repeater unit also includes a thermoelectric cooler and temperature monitor (not shown) for maintaining the ambient temperature of the repeater components within a prescribed operating range. Lines from these components (not shown) are also coupled with the supervisory local orderwire circuitry for parameter monitoring as will be described in detail below.

SUPERVISORY SYSTEM

As was described previously in conjunction with the description of the overall communication network generally illustrated in FIG. 1, in addition to the fiber optic data links over which high data rate optically encoded messages are conveyed between stations, there is provided a supervisory system associated with the terminal stations and the repeater stations distributed along the network, which monitors and controls the operation of the network, performs diagnostic testing, etc. This supervisory system is comprised of an orderwire subsystem for providing the capability of parameter monitoring, fault isolating and system maintenance voice communications, together with an intelligent control unit. The orderwire subsystem is comprised of a first portion termed a local orderwire subsystem employing a twisted pair wire link (the orderwire) which is coupled to each terminal station and to the repeaters. It is through this local orderwire subsystem that parameter monitoring and fault isolation tasks, to be described in detail below, are effected. In addition, voice circuits are associated with the local orderwire subsystems for establishing a maintenance voice communication link among the units of the network. A second portion of the orderwire subsystem is comprised of a voice communication subsystem, termed an express orderwire subsystem, that permits voice telephone communications to be conducted between the attendants or operators at the terminal stations. The express orderwire subsystem interfaces with the fiber optic link rather than the orderwire twisted pair link and effectively enables voice telephone communications to be conducted between the terminal stations in substantially the same manner that telephone voice traffic is conveyed over the fiber optic link. As was described briefly above in conjunction with the description of the transmit encoder module and receiver decoder module, one of the shared overhead bits in each frame of data is identified as an orderwire bit. It is through the use of this additional bit that fiber optic voice communications between the attendants at the terminal stations are effected, as will be described subsequently.

In the description to follow, the supervisory system will be subdivided into three major sections: 1—the local orderwire subsystem which communicates exclusively over the orderwire twisted pair link; 2—the express orderwire subsystem which communicates exclusively via the shared orderwire bit of the fiber optic data stream; and 3—the auxiliary terminal unit (ATU), a microprocessor-based control subsystem which constitutes the intelligent control portion of the overall fiber optic communications network. Within each terminal station, those components that perform the functions associated within each of these three sections are interconnected with one another to form the auxiliary terminal equipment (ATE) referenced previously.

The repeater units themselves contain components associated with only the local orderwire section and accordingly do not contain auxiliary terminal equipment as defined above and described in detail below.

LOCAL ORDERWIRE SUBSYSTEM

Figure 16:
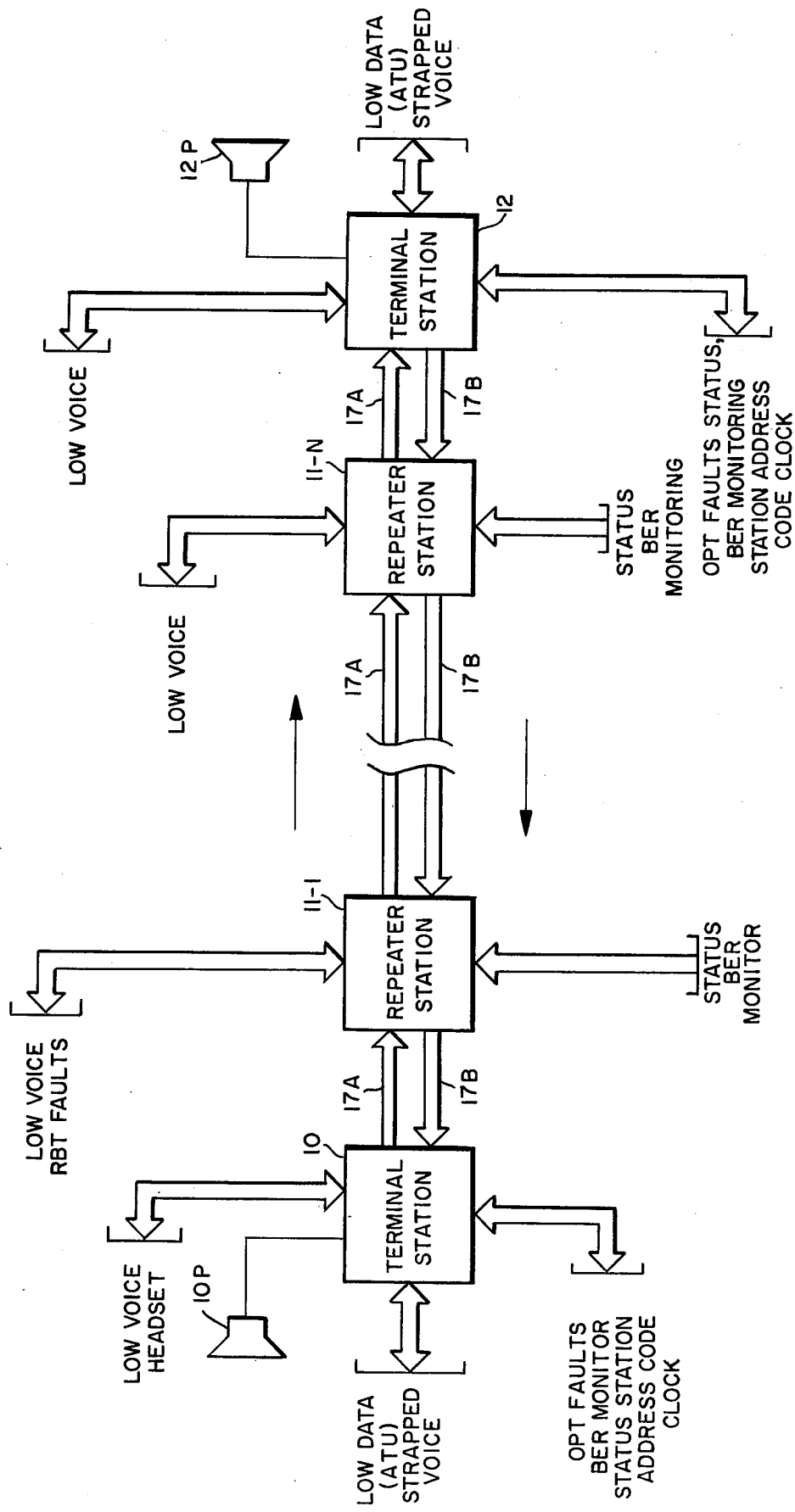
FIG. 16 shows the general network configuration of the local orderwire system.

A general block diagram of the local orderwire (LOW) subsystem of the supervisory system associated with the fiber optical communication network of the present invention is illustrated in FIG. 16. It may be noted here that the local orderwire subsystem to be described below has utility in repeatered communication systems in general. As such, it is described in detail in copending U.S. patent application Ser. No. 146,164, filed May 2, 1980, by Thomas J. Nixon, Geroge A. Waschka, Jr. and Norman Seiler, entitled "Orderwire Communication System", assigned to the assignee of the present application, and attention may be directed to that application for a description of the same. Still, for the purpose of facilitating an understanding of its application to a fiber optic communications network of the present invention it will be explained in detail below.

The terminal stations 10 and 12 at opposite ends of the network are coupled to each other and to a number of repeater units 11-1 to 11-N via a twisted pair link 17 made up of a set of twisted pair local orderwire lines 17A and 17B, one for west to east signalling, the other for east to west signalling. As was explained briefly above, local orderwire signalling involves maintenance voice communications, status parameter monitoring and bit error rate monitoring. For voice communications, each terminal station and repeater unit is associated with attendant voice communication circuits by way of local orderwire voice input and voice output links to an audio transceiver unit such as a conventional headset. Local orderwire voice signalling is used for terminal-to-repeater, repeater-to-repeater, and/or terminal-to-terminal voice communications via the twisted pair link by system maintenance personnel. Voide is transmitted in baseband over local orderwire cable sections 17A and 17B with all stations being configured in a party line format.

Thus, terminal station 10 acts as the source terminal for local orderwire voice input signals from a maintenance attendant's headset to be coupled west to east over twisted pair local orderwire cable 17A, and acts as the terminating terminal for voice signals received via local orderwire cable 17B and supplied as local orderwire voice output signals to the terminal attendant's headset. Terminal station 12 acts in a like manner with respect to its end of the network. The terminal stations are further provided with "paging" speakers 10P and 12P for enabling maintenance personnel to monitor the local orderwire voice communications. Repeater stations 11-1 to 11-N contain circuitry that will condition voice signals received over the local orderwire cable sections 17A and 17B by amplification and equalization and then retransmit the signals out over the local orderwire cable. Local orderwire voice input and output links between each repeater and an associated audio circuit are provided as part of the bi-directional party line access to maintenance personnel at the repeaters. In addition to providing the capability for maintenance voice communications, the local orderwire system performs status parameter monitoring and bit error rate (BER) monitoring on the output of each optical transmitter. Status parameter monitoring, which is performed on a command/response format from a terminal station, permits the auxiliary terminal units in the terminal stations to monitor conditions in the repeater, i.e., check for faults or defects that may occur. In a terrestrial fiber optic communication network, the repeater units are self-contained, isolated pieces of hardware, usually buried or submerged, and are subjected to local environmental conditions. Continual monitoring of prescribed conditions within the repeaters, conditions such as temperature, humidity, pressure, entry, etc., through the local orderwire subsystem provides maintenance personnel with an indication of the condition and integrity of the equipment along the network. Bit error rate monitoring permits an observation of the performance of the communication circuits within the repeaters.

As was explained briefly above, as part of the supervisory system, an auxiliary terminal unit (ATU), which is a processor-based monitor and control subsystem, is associated with the auxiliary terminal equipment of each terminal station. When performing status parameter and BER monitoring functions, the ATU at terminal station 10 inputs digital command data as a local orderwire message into local orderwire communication equipment in he terminal station as LOW data-in. This data is encoded as an amplitude modulated wave using a single tone carrier at a first frequency $f_1$ and is transmitted over a west to east channel, on cable 17A, with each of repeater stations 11-1 to 11-N examining the command word for that repeater station's unique address.

The command message is also received by terminal station 12 wherein it is decoded and coupler to its associated ATU unit as LOW data-out. The addressed repeater station decodes the message from terminal station 10 and formats a response message which is encoded and transmitted at either the first frequency $f_1$ or at a second frequency $f_2$ (depending upon which embodiment of the local orderwire system, to be described below, is used) over west-to-east cable 17A to terminal station 12 and over east to west cable 17B to terminal station 10 on either frequency $f_1$ or frequency $f_2$ (again depending upon which embodiment of the orderwire system is used). At both terminal stations 10 and 12, the response message from the interrogated repeater is decoded and coupled to its associated ATU as LOW data-out for processing. In a similar manner, in response to a command message from its associated ATU over the LOW data input, terminal station 12 encodes and transmits a message at freguency $f_2$ over east to west cable 17B. The subsequent response and decode operations proceed in the same manner as for command messages from terminal 10.

Bit error rate monitoring is also implemented by way of a command/response format. Each terminal station and each repeater station includes BER test lines coupled to the current-to-voltage converter component in the optical transmitters for monitoring the operation of the network. Fault lines and status bit lines are also part of the local orderwire system and are coupled to the stations associated ATU. The manner in which the BER test is performed and the configuration of the local orderwire positions of each station for implementing this test as well as the above-described voice transmission and station parameter monitoring will be described in detail below.

LOCAL ORDERWIRE EQUIPMENT FOR TERMINAL STATION

The local orderwire equipment for each terminal station is comprised of a local orderwire interface module and an associated bit error rate module that interface with the auxiliary terminal unit at the station and the orderwire cable. In the description to follow reference will be made to the equipment for terminal station 10 for purposes of explaining an exemplary configuration. It should be understood however, that the description applies also to terminal station 12 with due consideration given to change in frequencies and direction of communication.

LOCAL ORDERWIRE INTERFACE MODULE (LOI)

The local orderwire interface (LOI) module includes: 1—an orderwire signal interface unit, that is comprised essentially of an analog section, and 2—an associated control unit containing digital encode/decode control logic, data multiplexing circuitry, and fault indication-BER control logic components. The configuration and operation of these units for a first embodiment of the local orderwire system will be described in detail below in conjunction with the description of FIGS. 17 and 18.

The configuration and operation of a second embodiment of the orderwire signal interface units will be described with reference to FIGS. 17A and 23A.

TERMINAL SIGNAL INTERFACE UNIT (FIG. 17)

As was explained briefly above, the signal interface unit operates to detect incoming amplitude modulated tone messages from another station and to forward these on to the associated ATE for processing and response. It also serves to transmit outgoing tone messages for delivery over the interstitial pair to another station. A further function of the signal interface unit is to couple voice messages between local audio communication circuits and the orderwire cable, with both voice and amplitude modulated tone messages being capable of being transmitted and interfaced simultaneously.

Figure 17:
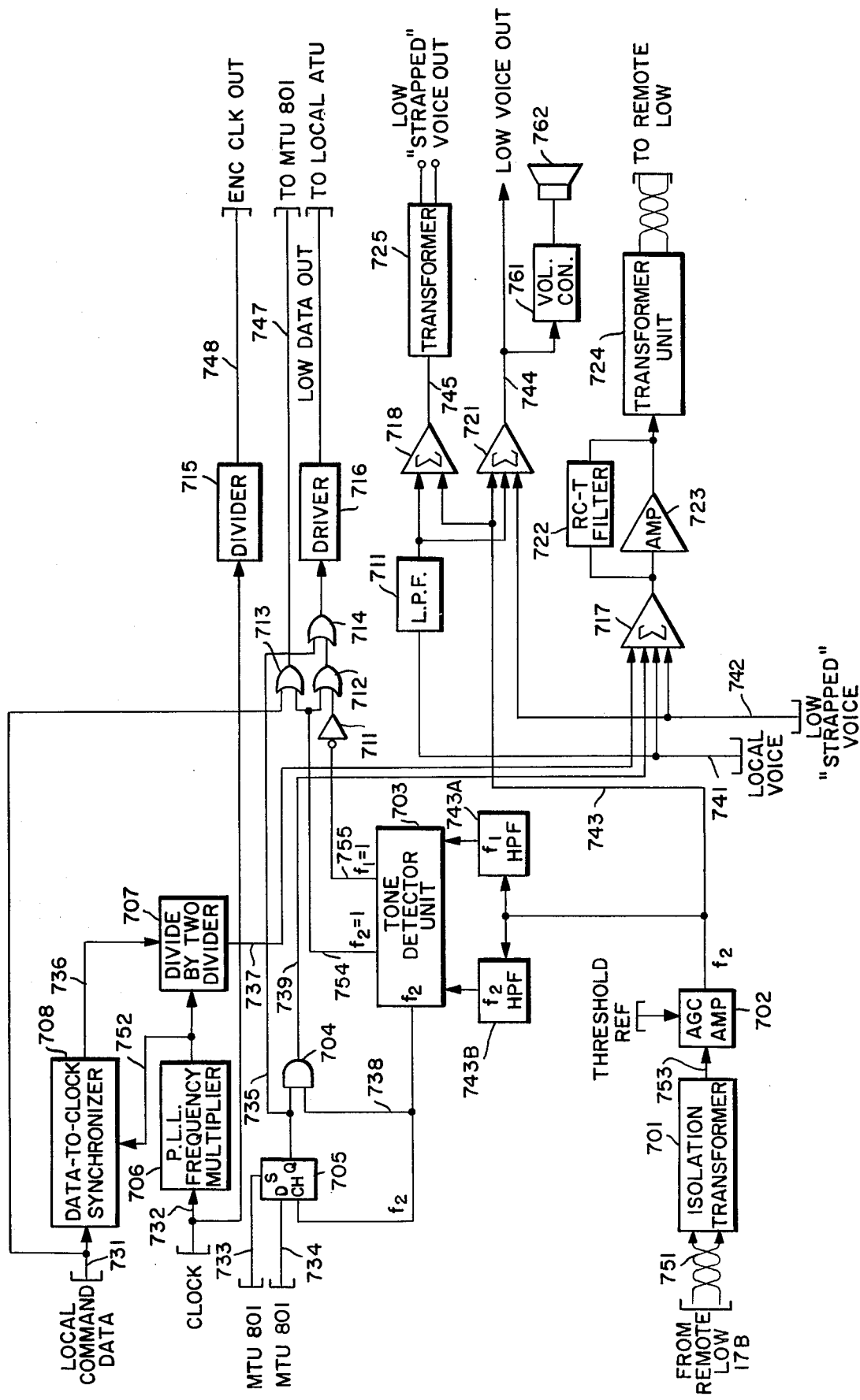
FIGS. 17 and 17A are respective circuit diagrams of embodiments of the signal interface unit of a local orderwire interface module.

As is shown in FIG. 17, at terminal station 10, a twisted pair 751 from the east-to-west local orderwire cable (corresponding to east-to-west cable 17B in FIG. 16) is terminated in an isolation transformer 701 and an associated AGC amplifier 702 coupled to the output 753 of transformer 701. AGC amplifier 702 may contain a voltage controlled resistor (e.g. an FET) coupled in the feedback path of the AGC amplifier with the output being compared to a reference for gain control. AGC amplifier 702 controls the level of the received signal and offsets the attenuation of the LOW cable 751 between terminal 10 and repeater 11-1. The output of AGC amplifier 702 is coupled over line 743 to a pair of high pass filters 743A and 743B respectively tuned to frequencies $f_1$ and $f_2$. The outputs of filters 743A and 743B are coupled to the tone response or detection inputs of a suitable commercially available dual tone detector/generator unit 703. Line 743 is also coupled to summing amplifiers 718 and 721. Tone detector/generator unit 703 responds to the presence of an amplitude modulated tone commands from remote station 12 and to any response from an addressed repeater on cable 17B and outputs a recovered demodulated signal via lines 754 and 755. In addition, dual tone detector/generator unit 703 generates a carrier tone on tone on line 738 to be used in its own generation of a response message in reply to a command message from terminal station 12 or terminal 10. In the present example, considering the environment of terminal station 10, dual tone detector/generator unit 703 generates a carrier tone at frequency $f_2$ on line 738. (In terminal station 12, the tone frequency on its line 138 is frequency $f_1$.) This carrier frequency on line 738 is used to clock flip-flop 705 and enable AND gate 704. The set input of flip-flop 705 is coupled to line 733 from the control unit to be described below with reference to FIG. 18. This line is used to keep the $\overline{Q}$ output of flip-flop 705 low and thereby prevent carrier $f_2$ transmission, except during the encoding and transmission of a response message, as will be explained below in conjunction with the description of FIG. 18.

Tone detector unit 703 has a digital "$f_1$ detected" output coupled to lead 755 which has a one/zero level corresponding to the amplitude modulated tone of a digital response message on frequency $f_1$ from an addressed repeater. Similarly, an "$f_2$ detected" output is coupled to lead 754 and produces a digital output corresponding to the amplitude modulated encoded command message at frequency $f_2$ from terminal 12. Lead 754 is coupled to one input of each of OR gates 712 and 713 while lead 755 is coupled through inverter 712 to another input of OR gate 712. The output of OR gate 712 is coupled to one input of OR gate 714, the output of which is coupled to a driver 716. The output of driver 716 is coupled to the ATU associated with the terminal station. As was mentioned previously, in the present embodiment each repeater station transmits a response message in reply to a command message on both carrier frequencies $f_1$ and $f_2$ over respective orderwire cables 17B and 17A. At terminal station 10, accordingly, any reply message, either from a repeater station (whether the repeater station be addressed by terminal station 10 or terminal station 12) or from terminal station 12, is received at "frequency $f_1$-detected" line 755 and coupled out via inverter 711 and OR gates 712 and 714 to the local ATU.

OR gate 713 has a second input coupled via line 731 to receive command data from the auxiliary terminal unit within terminal station 10. Line 731 is further coupled to data/clock synchronizer 708 the output of which is coupled over line 736 to a divide-by-two divider 707. A suitable clock signal is coupled over line 732 to a phase locked loop/frequency multiplier 706 and to a divider 715. Depending upon the transmission carrier frequency assigned to the terminal station of interest, frequency multiplier 706 will multiply the clock frequency on line 732 by either a value of two or three in order to establish a unique transmission frequency for that particular terminal station. For purpose of providing an illustrative example, frequency $f_1$ may be assigned a value of 20.48 KHz and frequency $f_2$ a value of 30.72 KHz so that the two frequencies have a ratio $f_2:f_1$ of 3:2. The choice of this ratio makes it convenient to implement tone carrier detection and generation within the signal interface unit of each terminal station. Terminal station 10 is assigned a carrier frequency $f_1$ for transmitting command messages on cable 17A and receiving response messages on cable 17B. (Terminal station 12, on the other hand, is assigned a carrier frequency $f_2$ for transmitting command messages on cable 17B and receiving response messages on cable 17A.) For terminal station 10 with carrier frequency $f_1$ being on the order of 20 KHz ($f_1 = 20.48$ KHz) corresponding to the clock frequency on line 732, the output of multiplier on line 752 is on the order of 40 KHz (40.96 KHz). This clock frequency is used for synchronizing phase lock loop 708 and is divided by divider 707 back to frequency $f_1$. The output of divider 737 is coupled to one input of summing amplifier 717. Data/clock synchronizer 708 synchronizes the input command data from the ATU with the tone frequency $f_1$ so that an amplitude modulated tone message is applied over line 737 to summing amplifier 717.

Figure 18:
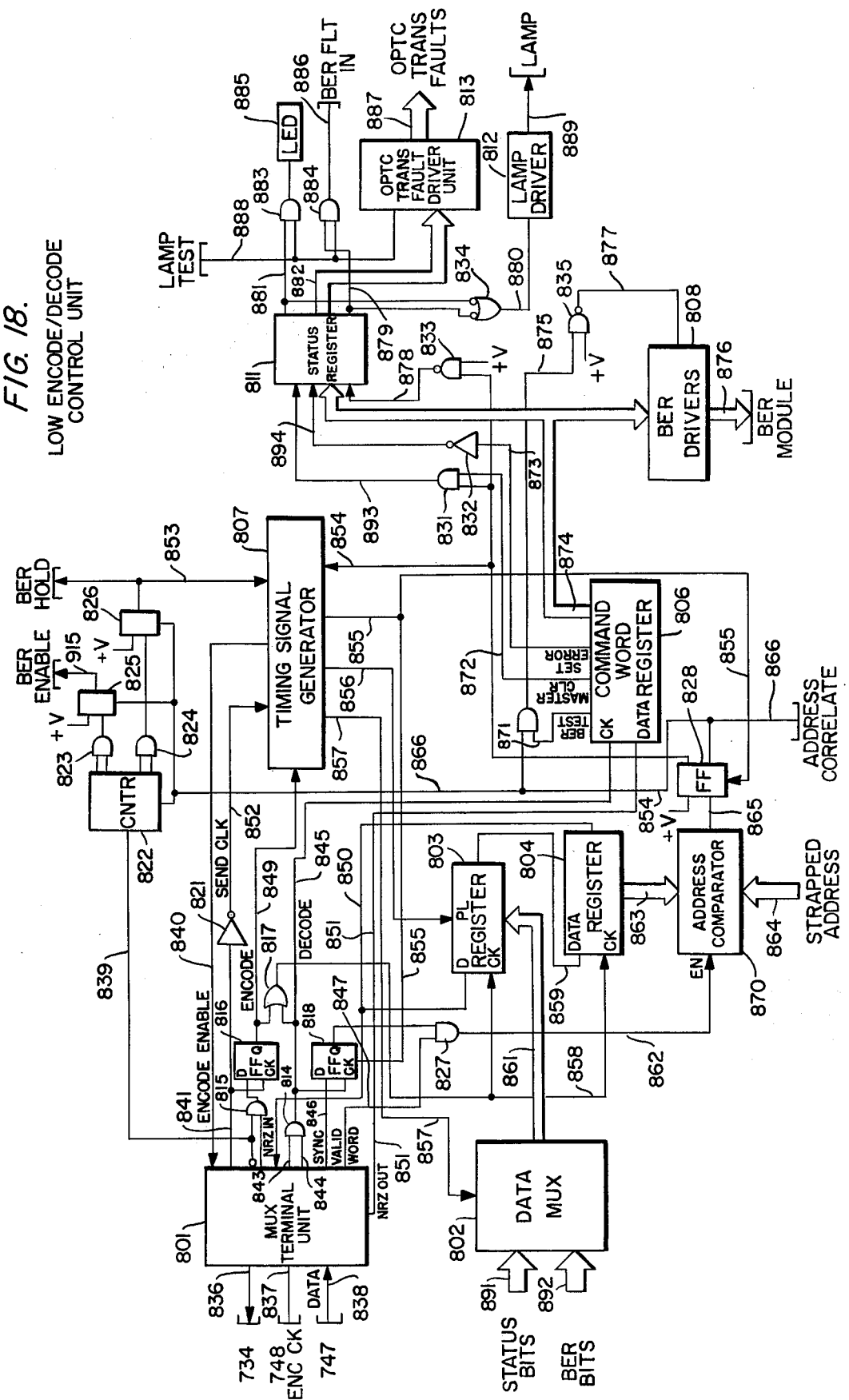
FIG. 18 is a block diagram of the encode/decode control unit of a local orderwire interface module.

Lines 733 and 734 are coupled to the encode/decode control unit (FIG. 18). Line 734 couples the local response message from the multiplex terminal unit 801 on line 836 (FIG. 18) to flip-flop 705 which is clocked by frequency $f_2$ (30.72 KHz) from tone detector unit 703. As a result, this local response message is synchronized with frequency $f_2$ and it enables and clears the $f_2$ carrier creating the local amplitude modulated response words that are clocked out from the $\overline{Q}$ output of flip-flop 705 through AND gate 704 to line 739, to be superimposed with the local command message by summing amplifier 717.

Line 733 supplies an "address correlate" signal on line 836 (FIG. 18) from an address comparator 870 within the encode/decode control unit (FIG. 18) and is used to clear flip-flop 705 in the event that an incoming message is not directed to terminal station 10, there being no response from the station to a message not directed to it. The $\overline{Q}$ output of flip-flop 705 is further coupled to OR gate 714. The output of OR gate 714 is coupled through a deglitch/differential driver 716 (e.g. a flip-flop) and over line 746 to the ATU, whereby the ATU receives the local response from MTU 801 (FIG. 18), the incoming digital command message at frequency $f_2$ from terminal station 12 and any repeater response message at frequency $f_1$. Divider 715 divides the 20 KHz frequency on clock line 732 down to 10 KHz and applies the clock over line 748 as a timing signal for MTU 801 (FIG. 18) to be used by MTU 801 in encoding on/off keying messages.

Voice signals are coupled to the signal interface unit via links 741 and 742. Link 741 is derived from a standard twisted pair and is coupled through low pass filter 711 to one input of a summing amplifier 718. The local voice signals on link 741 are derived from audio input equipment such as a headset used by maintenance personnel. Link 742, which couples "strapped" voice from any auxiliary audio equipment, such as another local orderwire unit, recording equipment, etc., is derived from a transformer isolated twisted pair and is coupled to each of summing amplifiers 718 and 721. Each of summing amplifiers 718 and 721 is further coupled to receive via line 743 the incoming tone signals from the local orderwire cable 751.

The output of summing amplifier 718 is coupled via line 745 and transformer 725 to "strapped" voice out local orderwire terminals which may be coupled to auxiliary audio equipment as mentioned above. The summed voice and tone outputs from amplifier 721 are applied to line 744 as local orderwire voice output which may be coupled over a twisted pair to an attendant's headset, and via volume control unit 761 to a terminal station paging loudspeaker 762.

OPERATION

INCOMING DIGITAL MESSAGES

As was described briefly above, for detecting an incoming amplitude modulated tone message from a remote station, a dual tone detector/generator 703 is provided. If the message is a response message, as from one of the repeater stations, it will be modulated on tone carrier $f_1$. If it is a command or a response message from the other terminal station 12 it will be modulated on tone carrier $f_2$ or tone carrier $f_1$, respectively. In either case, incoming tone signal on east-to-west orderwire cable 17B is coupled through isolation transformer 701, AGC amplifier 702 and one of highpass filters 743A and 743B to dual tone detector/generator 703. Tone detector/generator 703 responds to the amplitude modulation of the passed-through tone and supplies a digital transition signal train corresponding to the ON/OFF keying of the received tone over one of lines 754 and 755. If the message is a response message whether it be from a repeater station or from terminal station 12, it will be modulated on the carrier associated with terminal station 10, i.e. frequency $f_1$, and coupled over line 755, to be delivered to the monitor and control unit from the output of driver 716. On the other hand, if the message is a command message from the remote terminal station 12 it will be carried on tone frequency $f_2$ and decoded on line 754 from tone detector/generator unit 703. This message is coupled to both the monitor and control unit via OR gate 712 and to the ATU via OR gate line 713 and 714 for a response.

INCOMING VOICE SIGNALS

Incoming voice signals coupled from the orderwire cable twisted pair 751 through isolation transformer 701 and AGC amplifier 702 are coupled over line 743 to a pair of summing amplifiers 718 and 721 to be delivered to associated output voice circuits, (e.g. maintenance personnel's headset, a "strapped" recorder, paging speaker, etc.,) as provided, via lines 744 and 745.

OUTGOING DIGITAL MESSAGES

The transmission of outgoing messages from the orderwire interface transceiver module may be governed either by the ATU at the terminal station (for outgoing command messages) or in response to a command message from the remote terminal (for an outgoing response message). In the former instance, the command message to be transmitted (here considering terminal station 10, the message is amplitude modulated via tone carrier $f_1$ on to the west-to-east orderwire cable 17A) is coupled from the ATU over line 731 to data/clock synchronizer 708 and OR gate 713. The connection to OR gate 713 enables the ATU at terminal station 10 to address the operational devices of interest in terminal station 10 proper, since the west-to-east orderwire cable 17A does not connect to receiving equipment in terminal station 10 itself. In this way the ATU in each terminal station is capable of conducting supervisory operations with respect to equipment at all the sites of the network including itself. In the present example it will be assumed that the ATU at terminal station 10 is transmitting a message to another site (i.e. a repeater station or terminal station 12). As will be explained in greater detail below in connection with the description of FIG. 18, each message contains an address segment that identifies the site for whom the message is intended. Thus, although each station is coupled to receive any message on the orderwire, unless it recognizes its own address, it ignores the message. Because of this feature, even though an outgoing message on line 731 is applied via OR gate 713 to line 747, within the control unit (FIG. 18) the message will be ignored since the address portion of the message indicates an address other than its own (i.e. another site).

Considering the transmission of a message from the monitor and control unit at terminal station 10 to a remote site, the digitally encoded command message is coupled over line 731 to data/clock synchronizer 708. Synchronizer 708 is clocked by the output of frequency multiplier 706 which doubles to 20.48 KHz clock on line 732 to 40.96 KHz. The digital signal on line 836, representing the synchronized message, is used to control the divide-by-two divider 707, to output no signal or to divide by two the 40.96 KHz input from P.L.L. frequency multiplier 706. The 20.48 KHz amplitude modulated signal is coupled over line 737 to summing amplifier 717 for application to the west-to-east interstitial pair 17A via amplifier 723 and isolation transformer 724. (It is to be noted here that for terminal station 12, whose carrier frequency $f_2$ is 30.72 khz, frequency multiplier 106 multiplies the 20.48 KHz on line 732 by three so that at the output of divide-by-two divider there is produced a 30.72 KHz tone.)

The second type of outgoing message that may be transmitted from the terminal station is a response message in reply to a command message from the terminal station at the local or remote end of the orderwire cable. In this case, the contents of the response message are generated in the control unit (FIG. 18) and supplied over line 734 to flip-flop 705. Since the response message is to be transmitted to terminal station 12, it is transmitted on the carrier associated with terminal station 12, namely, tone frequency $f_2$ which is generated by tone detector/generator 703 on line 738. This carrier is applied to the clock input of flip-flop 705 and AND gate 704 to provide a clean modulated carrier $f_2$ output from the output of AND gate 704 to be coupled over line 739 to summing amplifier 717 and on to west-to-east orderwire cable link 17A. The output of flip-flop 705 is also coupled via line 735 and OR gate 714 to the ATU associated with terminal station 10 so that its own control facility is advised of the contents of the response message.

OUTGOING VOICE SIGNALS

Outgoing voice signals such as local voice signals from an attendant's headset and "strapped" voice signals are coupled over input lines 741 and 742 to summing amplifier 717 for delivery to the orderwire cable. These signals are also coupled to local audio equipment via summing amplifier 718 and 721 so that, in effect, all voice signals conveyed over the orderwire cable are made available according to a party line format.

CONTROL UNIT (FIG. 18)

As described above in conjunction with the description of FIG. 17, the signal interface unit of the local orderwire interface module is coupled to a control unit containing digital encoding/decoding circuitry. Advantageously, the control unit, a schematic block diagram of which is illustrated in FIG. 18, is of a modular field-programmable configuration so that it may be readily incorporated in different portions of the orderwire system. In particular, as will be described in more detail below, the same modular control unit incorporated in the local orderwire interface module of a terminal station can also be used for the control unit of the local orderwire control module (to be described below) that forms the essential part of the supervisory section of a repeater unit, with the only difference between the two relating to the status and BER input and output data. The decoding and encoding functions are performed by a multiplex terminal unit 801 which decodes incoming Manchester encoded data into NRZ format and encodes NRZ data into Manchester encoder data. Multiplex Terminal Unit (MTU) 801 may be comprised of a commercially available HARRIS HD1-15530 Manchester-to-NRZ encoder/decoder having the data and control part interconnections described below. Line 836 of MTU 801 is the Manchester signal output line which is coupled to line 734 of the signal interface unit shown in FIG. 17. Line 837 couples the divided-down encoding clock over line 748 from divider 715 (FIG. 17), while line 838 is coupled to line 747 to couple the output of OR gate 713 (FIG. 17), and line 838 is coupled to line 747 to couple the output of OR gate 713 (FIG. 17) to the data input of MTU 801. The derived NRz data decoded by MTU 801 is coupled over line 851 to the serial data input of an eight-bit serial/parallel-in, serial-out register 803 and to the serial data input of a serial-in, parallel-out command word register 806. Register 803 operates in conjunction with a serial-parallel, parallel-out register 804 to store a respective portion of a command message received from a remote source or a response message generated at the present station. The manner in which registers 803 and 804 store and output these messages will be explained below in conjunction with the description of the operation of the module with reference to FIGS. 19 and 20. Command word register 806 stores the byte of an incoming command message which governs status and BER monitoring functions as will be described below.

Line 841 couples a transmit clock generated by MTU 801 to the clock input of flip-flop 816 and, via inverter 821, to a timing signal generator 807. Timing signal generator is comprised of combinational logic that may include a suitably programmed PROM to generate the timing and control signals to be described below. Rather than describe the details of an implementation of generator 807, the explanation to follow will treat the input and output signals that are associated with timing signal generator 807 and their functions relative to the other components of the system, in order not to burden the present description with details that will be readily understood and implemented by one skilled in the art.

Line 840 couples an encode enable signal from timing signal generator 807 to the ENCODE ENABLE input of MTU 801, while lines 839 and 842 supply ENCODE SHIFT CLOCK and SEND DATA ENABLE signals from MTU 801 to the clock input of a counter 822 and to AND gate 815. Line 850 couples NRZ data derived from serial-in, serial-out register 804 to the NRZ input of MTU 801. Line 846 supplies an enable signal to flip-flop 818 upon MTU 801 detecting a sync pattern in an incoming message, while line 847 couples an enable signal to one input of AND gate 827 when MTU 801 detects a valid message word applied over line 838 from the signal interface unit.

The output of AND gate 815 is coupled to the D input of flip-flop 816, the Q output of which is coupled to one input of OR gate 817 and to the clock/shift inputs of registers 803 and 804. The output of AND gate 814 is coupled to the other input of OR gate 817, to the clock input of flip-flop 818 and to the clock input of command word register 806. The Q output of flip-flop 818 is coupled to a second input of AND gate 827 the output of which is coupled to the enable input of an address comparator 805. Address comparator 805 is coupled to the various stages of register 804 via link 863 and to a strapped address code identifying terminal station 10 coupled over link 864. When enabled via line 862, address comparator 805 compares the contents of register 804 with an address byte supplied over line 864 (here the address of terminal station 10). Should the two bytes match, the state of output line 865 changes logic levels thereby clocking flip-flop 828.

The Q output of flip-flop 828 is coupled over line 854 to timing signal generator 807 and AND gates 829, 831 and 833. Line 854 is used to initiate a decode/encode timing cycle that governs the operation of the control unit. The $\overline{Q}$ output of flip-flop 828 is coupled over line 866 to the clear inputs of a counter 822 and flip-flops 825 and 826, as well as to the set input of flip-flop 705 of the signal interface unit (FIG. 17). Flip-flop 828 and flip-flop 818 are cleared at the end of the decode/encode sequence by a signal from timing signal generator 807 on line 855.

Status and BER data to be monitored is applied to the module through a data multiplexer 802 over a set of parallel input data links 891 and 892. The size of each link will depend upon the number of bits employed and for a terminal station each link may be one byte in length. Line 857 is coupled to receive a switching signal from timing signal generator 807 for coupling either link 891 or link 892 to output link 861 and the parallel inputs of register 803. The byte on link 861 is loaded into register 803 by a parallel load signal applied over line 856 from timing signal generator 807 during the encode operation. The serial output of register 803 is coupled over line 859 to the data input of register 804. As mentioned briefly above, registers 803 and 804 together form the input/output registers for data decoding and encoding.

Figure 19:
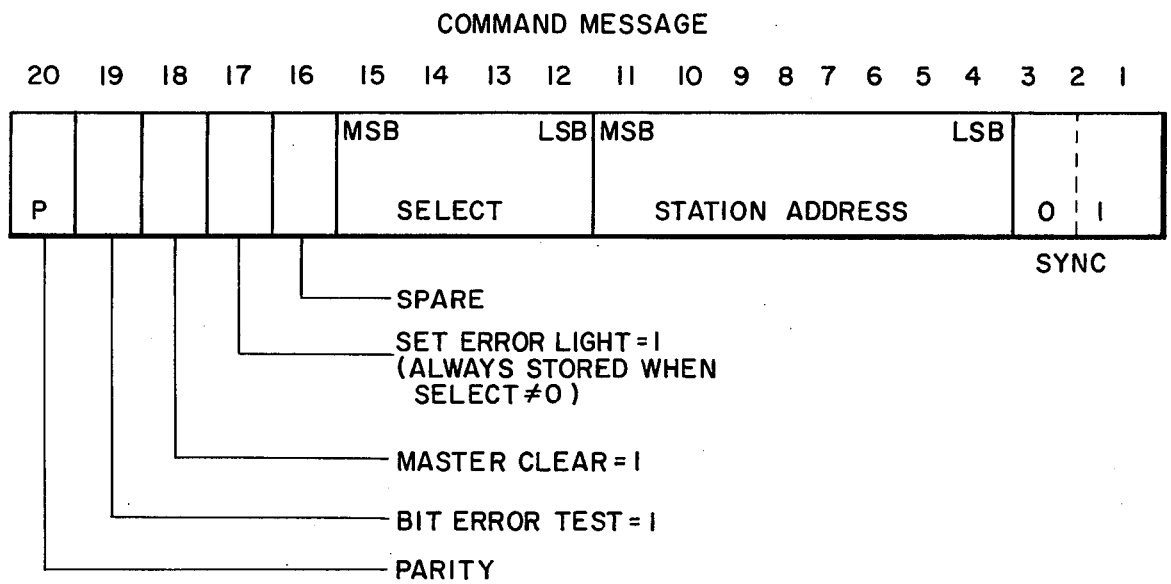
FIGS. 19 and 20 show the data configurations of respective command and response messages transmitted over the local orderwire system.

As was pointed out earlier, the NRZ output of MTU 801 is coupled over line 851 to the data input of serial-in, parallel-out register 806. Register 806 is used as a command word storage register to store the command instruction bits of a decoded command message that has been accepted by the station. As will be explained in more detail below with reference to FIGS. 19 and 20 in conjunction with the description of the operation of the module, the command instruction bits comprise the second byte of the command word and it is these bits that control the operation of the control unit with regard to the module fault indicators and bit error monitoring. For this purpose, the command byte contains a four bit select field (only three of which are used for a terminal station as explained below), three activity bits and one spare bit, as shown in FIG. 19. For the select field a four bit field is provided so that a transmitting station (either a repeater or a terminal station) may identify any one of up to fourteen different message recipients as designated in Table 1 below.

functions that are to be performed via the LOI module. The MSB is unused. The second MSB, a SET ERROR LIGHT bit, is coupled over line 873 and via inverter 832 to the D input of each of the flip-flops of status register 811. The clock inputs of these flip-flops are coupled to repeater bits of select link 874 from command byte register 806. By way of the three bits of select link 874 one of the eight flip-flops of status register will be clocked to either energize or clear a respective one of eight fault lights that are coupled to the output stages of status register 811. To this end link 882 couples six of the stages of register 811 that correspond to the five normally used channels and one protection channel to respective circuits of a fault LED driver circuit 813. The outputs of the driver circuits are coupled to fault indicator (LEDS) in the optical transmitter modules of the transceiver unit of the terminal station through the respective lines of link 887. A further link 888 is coupled to each driver in common to permit the ATU to conduct a lamp test of all the indicators simultaneously. Additional drivers 883 and 884 are coupled via lines 881 and 879 to respective stages of status register 811 used for storing bits identifying the fault indicator 885 in the LOI module itself or a BBR fault indicator in the BER module (to be described below). If a fault is detected and a subsequent fault indication signal produced for either of these latter two modules, a separate lamp in the LOI module is energized. For this purpose each of lines 881 and 879 is coupled through gate 834 and line 880 to lamp driver 812, the output of which is applied to line 889 and the lamp.

TABLE 1

| | SELECT | | FIBER NO. |
|---|---|---|---|
| | 0000 | SPARE | N/A |
| | 0001 | UPLINK CHANNEL 1 | 1 |
| UPLINK | 0010 | UPLINK CHANNEL 2 | 2 |
| SELECT | 0011 | UPLINK CHANNEL 3 | 3 |
| BYTE | 0100 | UPLINK CHANNEL 4 | 4 |
| | 0101 | UPLINK CHANNEL 5 | 5 |
| | 0110 | UPLINK PROTECTION CHANNEL | 6 |
| | 0111 | BER MODULE | N/A |
| | 1000 | LOC MODULE | N/A |
| | 1001 | DOWNLINK CHANNEL 1 | 7 |
| DOWNLINK | 1010 | DOWNLINK CHANNEL 2 | 8 |
| SELECT | 1011 | DOWNLINK CHANNEL 3 | 9 |
| BYTE | 1100 | DOWNLINK CHANNEL 4 | 10 |
| | 1101 | DOWNLINK CHANNEL 5 | 11 |
| | 1110 | DOWNLINK PROTECTION CHANNEL | 12 |
| | 1111 | SPARE | N/A |

UPLINK = WEST TO EAST DATA FLOW
DOWNLINK = EAST TO WEST DATA FLOW

The select field is used to identify a particular channel or module in the system, as shown in Table 1, for conducting either a BER test on the optical transmitter module for a respective one of the fiber optic channels, or for energizing a particular fault indicator in conjunction with a fault monitoring operation, as will be described in detail below. As communications over each orderwire twisted pair to a terminal station (in the present example, considering terminal station 10 in particular) are monodirectional (uplink or downlink) only the three least significant bits of the select byte need be decoded since each of terminal stations 10 and 12 can receive messages in only one direction—terminal station 10 receives downlink messages travelling east-to-west; terminal station 12 receives uplink messages travelling west-to-east. Therefore, the MSB of the select field is not decoded at the terminal stations.

The activity field (bits 16–18, FIG. 19 or the four MSBs of the command byte) identify specific types of The third MSB of the activity field is used to clear all the storage flip-flops of status register 811. To perform this function the MASTER CLEAR bit is coupled over line 872 via AND gate 831 and line 893 to the clear input of register 811. AND gate 831 is enabled via line 854 from the Q output of flip-flop 828.

The first activity bit is used to assert a BIT ERROR TEST via line 871, which is coupled via AND gates 829 and 835 to the enable inputs of BER driver unit 808. When this bit is high that one of the drivers of BER driver unit 808 as defined by the contents of link 824 will cause a signal to be coupled over its corresponding output line of link 876 to the BER module, to be described below.

The control unit of the local orderwire interface module further includes an eight state binary counter 822, the two least significant bits of which are coupled via AND gate 823 to flip-flop 825. The Q output of flip-flop 825 is coupled to the BER enable line of the BER module. The two most significant bits of counter 822 are coupled to AND gate 824 to control the clocking of flip-flop 826. The output of flip-flop 826 is coupled via line 835 to a BER hold terminal and to timing signal generator 807. Counter 822 serves to control the BER testing interval during the fault isolation mode of operation, as will be explained fully below.

OPERATION

COMMAND MESSAGE DECODING

As was described briefly above, the format of a command message is a twenty bit configuration as shown in FIG. 19. For purposes of the present description it will be assumed that a message incoming on the local orderwire has been interfaced by the local orderwire signal interface unit (FIG. 17) with a terminal 10 station address code. The interfaced command message is conveyed over line 747 from the signal interface unit and applied to input line 838 of MTU 801. When MTU 801 detects a command sync pattern in the first three bits of the message (see FIG. 10), it enables AND gate 814 and changes the state of line 846 to flip-flop 818. Decode shift clock pulses on line 844 are now coupled through AND gate 814 to flip-flop 818. As a result the NRZ (decoded Manchester) data (command bytes one and two) is clocked out of MTU 801 and into the serial combinations of registers 803 and 804 and into command word register 806. (Note that only the second byte of the command word is held by register 806 as the first byte is detected during clocking in the second byte). Upon detecting a valid command word (valid sync, data and parity bits) MTU 801 causes line 847 to go high enabling AND gate 827, which thereby applies an enabling signal over line 862 to address comparator 805. Address comparator 805 compares the strapped address code on link 864 to the address byte (station code, see FIG. 19) that has been clocked into register 804. Since it has been assumed that terminal station 10 has been addressed, the two codes match and address comparator produces an output on line 865, thereby setting flip-flop 828. Had there been an error in the command word, MTU 801 would not have enabled AND gate 827 thereby inhibiting the address comparison operation and would have continued to monitor data input line 838 for another command word. Similarly should there be no address code correlation, comparator 805 does not set flip-flop 828.

When address comparator 805 sets flip-flop 828, the contents of command word register 806 are selectively applied to status register 811 and BER drivers 808 as the Q output of flip-flop 828 goes high supplying an enabling signal over line 854 to AND gates 829 and 831 and AND gate 833. The impact of the contents of command word register 806 relative to these logic components is described individually below.

For a particular message, one of the activity bits, i.e., bits 17, 18 and 19 of the command word shown in FIG. 19 will be a "one", thereby instructing some form of action or response by the terminal station. The address bits 12, 13 and 14 of the select portion of the command word identify one of the eight outputs of status register 811 or one of the BER drivers 808 depending upon whether or not a fault indication action or BER test is conducted. In the latter instance line 871 will be high, coupling an output signal from AND gate 829 over line 875 to NAND gate 835, the output of which will cause the addressed one of BER drivers 808 to apply a signal over its respective line of link 876 to the BER module to be described below. Similarly, depending upon the state of the set error light line 873, line 872 couples a signal to inverter 832 and, via line 894, to the common D inputs of the flip-flops of status register 811. As status register 811 is clocked by the output of NAND gate 833, that particular stage designated by the address on link 874 will be loaded with the bit designated by line 894 for the purpose of energizing or clearing its associated fault indicator via one of drivers 883, 884, 813. Namely, the set error light bit enables the ATU to set or clear individual fault lights via the local orderwire interface module, with the set error light bit (bit 17, FIG. 19) set or cleared as required together with the address (in the select code bits 12-14) of that particular light, i.e., one of LED 885, the BER fault indicator, or one of the lights associated with the optical transmitter module of the six fiber optic channels. If the master clear bit (bit 18, FIG. 19) is a "one" each flip-flop of status register 811 is cleared as AND gate 831 is strobed by line 854 as the Q output of flip-flop 828 goes high. This action clears all indicator lights associated with the terminal station.

When a BER test is conducted the contents of select link 874 will address one of the BER drivers 808. The BER test bit in command byte register 806 will enable the designated driver to couple a signal to the BER module. Also, counter 822 and its associated output logic, which relates to the operation of the BER module, operate to perform a time-out operation in conducting the BER test sequence which will be described below in conjunction with the description of FIG. 21.

Figure 20:
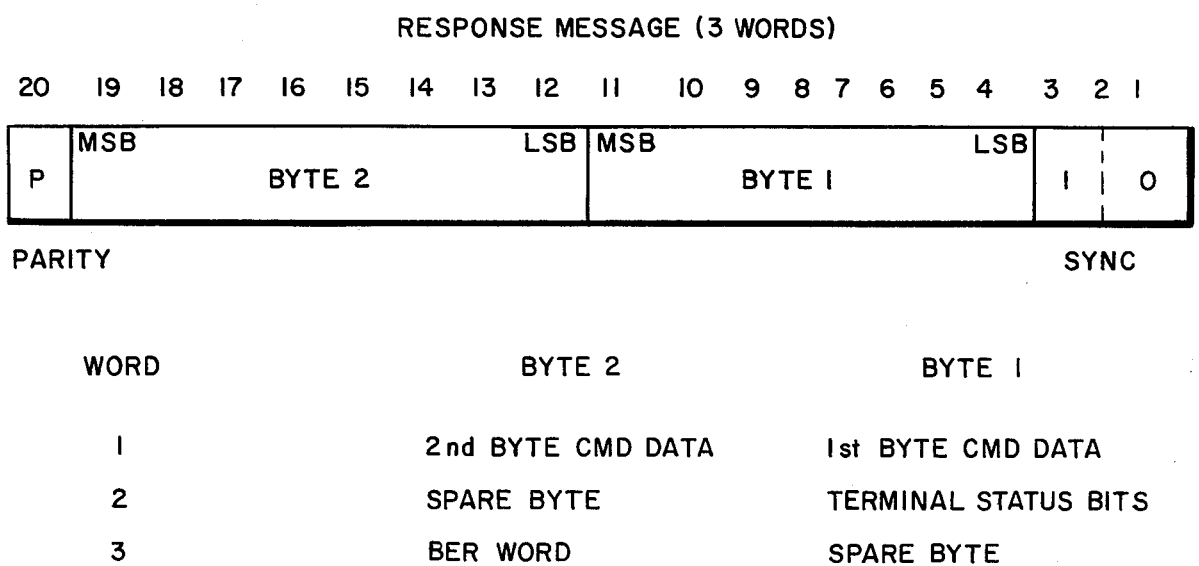

Upon one of the above events (indicator illumination control or BER test) having been initiated by the Q output of flip-flop 828, timing signal generator 807 couples a signal over line 840 to enable the encoding operation of MTU 801. As is shown in FIG. 20, a response message is comprised of three words of twenty bits each formatted of a pair of eight bit bytes bounded by a sync field and a parity bit. The first response word to be encoded by MTU 801 is a replica of the originally received command word presently stored in registers 803 and 804.

RESPONSE MESSAGE ENCODING

When MTU 801 is ready to encode the response message (consisting of three successive response words, as shown in FIG. 20) it enables AND gate 815 via line 842 and begins applying encoding shift clock pulses over line 839 to the other input of NAD gate 815 and to binary counter 822. A transmission clock signal (SEND CLOCK) is applied over line 841 to the clock input of flip-flop 816 and, via inverter 821 and line 852 to timing signal generator 807. The Q output of flip-flop 816 applies an ENCODE action signal over line 849 to timing signal generator 807 and, via OR gate 817, a shift clock signal via line 858 to registers 803 and 804. As a result, the first and second bytes of the first response word (the command echo) are clocked out of registers 803 and 804 over line 850 to the NRZ input of MTU 801, which encodes the NRZ formatted command echo into Manchester signals, adds the sync and parity bits and transmits the first response word over line 836 to line 734 of the signal interface unit (FIG. 17) described previously.

Assembly of the second response word is controlled by a multiplex control signal on line 857 and a parallel data load signal on line 856 from timing signal generator 807. For the second response word the multiplex control signal on line 857 causes the terminal status bits applied via link 891 to be coupled over link 861 to the parallel inputs of the respective stages of register 803. The status bits are loaded into register 803 by a parallel-load control signal on line 856 and then clocked serially through registers 803 and 804 to the NRZ input of MTU 801 for encoding and transmission out over line 836. Subsequently, the third response word is assembled, with the multiplex control signal on line 857 causing the BER bits of link 892 to be coupled to link 861 for parallel loading into register 803. With the BER bits loaded into register 803, the third response word is clocked out of registers 803 and 804 for encoding by MTU 801 and transmission over line 836. During assembly of the response words, counter 822 selectively enables AND gates 823 and 824 in response to clock pulses on line 839 as its contents reach prescribed values. Flip-flops 825 and 826 are thereby selectively set, causing control signals to be supplied to the BER module to be described below, from which the BER bits to be coupled to link 892 are applied to register 803 during assembly of the third response word.

Upon the completion of the encoding of the third response word, timing signal generator 807 removes the ENCODE/ENABLE signal from line 840 and resets flip-flops 818 and 828 via line 855 so as to prepare the local orderwire interface for receipt of and reply to a new command message. In this regard, the clearing of flip-flop 828 causes a master clear bit, if present in the command word stored in register 806, to be applied to status register 811 and thereby clear all indicators coupled to the outputs of register 811. Thereafter, the digital section of the local orderwire interface is ready to receive a new command message.

BIT ERROR RATE (BER) MODULE (FIG. 21)

Figure 21:
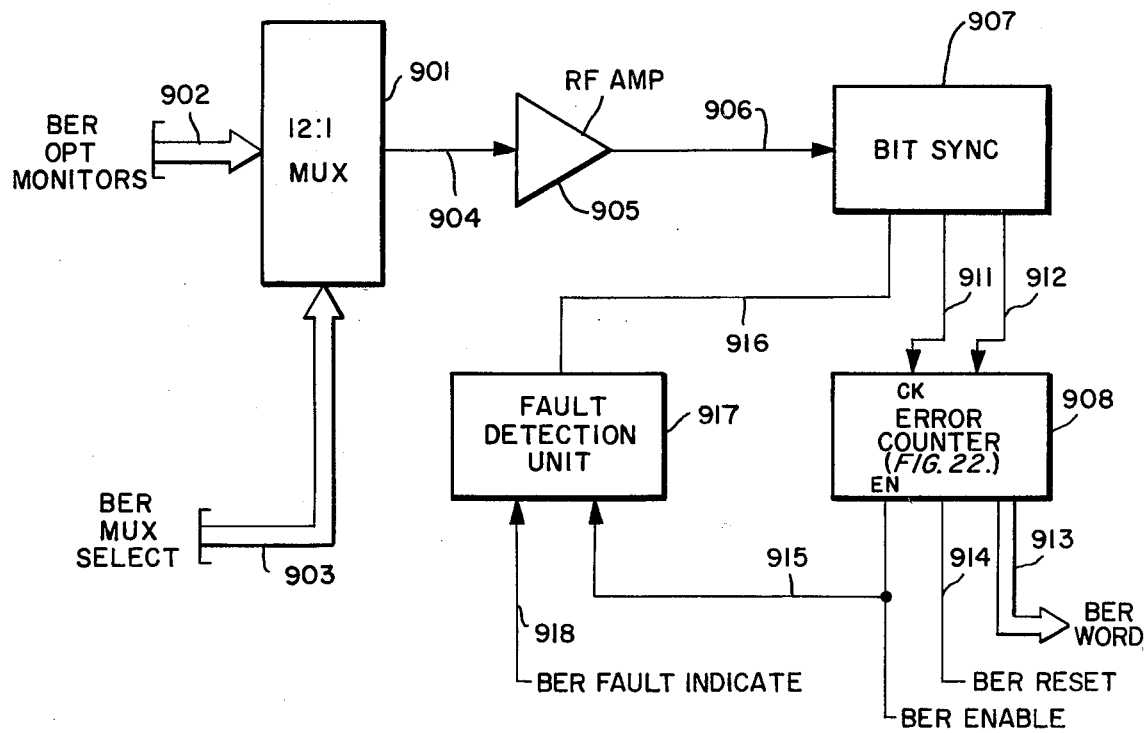
FIG. 21 is a block diagram of a bit error rate module.

A block diagram of a bit error rate (BER) module is depicted in FIG. 21. This module is contained within the local orderwire interface module in a terminal station and within the local orderwire control module in a repeater station. Since the BER module is adaptable for use in both the local orderwire interface module and the local orderwire control module the description to follow is applicable for either unit. The only difference between the two units relates to the number of optical transmitters the outputs of which are monitored. Terminal station 10 contains six such transmitters for the west to east link and terminal station 12 contains six such transmitters for the east-to-west link. On the other hand each repeater station must be capable of transmitting in both directions and therefore contains twelve optical transmitters. Accordingly, the BER module in a terminal station is configured to monitor the outputs of the transmitters associated with that terminal station, while the BER module in a repeater station is configured to monitor the outputs of the twelve transmitters of the twelve RBT units associated with that terminal station. The BER module is selectively enabled by the control unit of the local orderwire module during the encoding of a response message if the command message to the station has designated a BER test via the BER test bit of the activity portion of the second byte of the command word, as explained above in conjunction with the description of the operation of the control unit of the local orderwire interface module.

Referring to FIG. 21, link 902 is coupled to each wideband current-to-voltage converter and coupled to the detector that monitors the back facet of the ILD of a respective optical transmitter. Namely, for a terminal station, such as terminal station 10, link 902 is coupled to line 410 of the wide band current-to-voltage converter 408 of each of the six optical transmitter modules (FIG. 11) used to transmit optical data over a respective fiber optic channel. For a repeater station, link 902 will couple line 410 of twelve OPT modules to a multiplexer 901. Multiplexer 901 may be comprised of twelve relay units (not shown) each of which may include two sets of contacts and an associated driver. Each relay driver is coupled to a respective one of twelve BER section links of link 903. Link 903 is coupled to link 876 of the BER driver unit 808 of the control unit (FIG. 18) of the associated local orderwire module. The normally closed contacts of each set of relay contacts are connected across a terminating impedance, such as a resistor, and a section of coaxial cable that is coupled to line 410 of each OPT module. The normally open contacts of each set of relay contacts are connected across the primary coil of a coupling transformer (not shown) that forms the output of multiplexer 901. The secondary of the transformer forms the input to an RF buffer amplifier 905 that converts the signal levels on lines 410 of each OPT module to logic levels compatible with downstream signal processing circuitry.

The output of buffer amplifier 905 is coupled via line 906 to a bit synchronizer 907. The circuitry of bit synchronizer 907 may correspond to that of the bit synchronizer employed in a repeater station and attention may be directed to the description of such a unit presented above in conjunction with the description of FIGS. 13 and 15. The 301 Mb/s data stream produced by bit synchronizer 907 for the OPT module being monitored is coupled over line 912 to an error counter 908, the details of which will be described below in conjunction with the description of FIG. 22. The synchronous 301 MHz clock derived by bit synchronizer 907 is coupled over line 911 to error counter 908. The activity output of bit synchronizer 907 is coupled over line 916 to a fault detection unit 917.

Error counter 908 has a pair of control input lines 914 and 915 coupled to the Q outputs of flip-flops 825 and 826, respectively, of the control unit of the local orderwire module (FIG. 18). Line 915 couples a BER enable signal from flip-flop 825 (FIG. 18) to the enable input of error counter 908 and to fault detection unit 917. An additional line 918 couples a BER fault indication signal from line 886 (FIG. 18) to a fault indicator light (not shown) in the fault detection unit 917. Link 913 couples an eight bit BER word from the repeater stages of a binary counter contained within error counter 908 to BER input link 892 of data multiplexer 802 (FIG. 18). As will be described in detail below in conjunction with the description of FIG. 22, error counter 908 descrambles the data on line 912 and counts bit errors in the scrambled data sequence transmitted over the monitored optical channel when that channel has been placed in the fault isolation mode. These bit errors are totalled by the binary counter within error counter 908 and coupled over link 913 to data multiplexer 802 (FIG. 18) for transmission as part of the third word of a response message.

Figure 22:
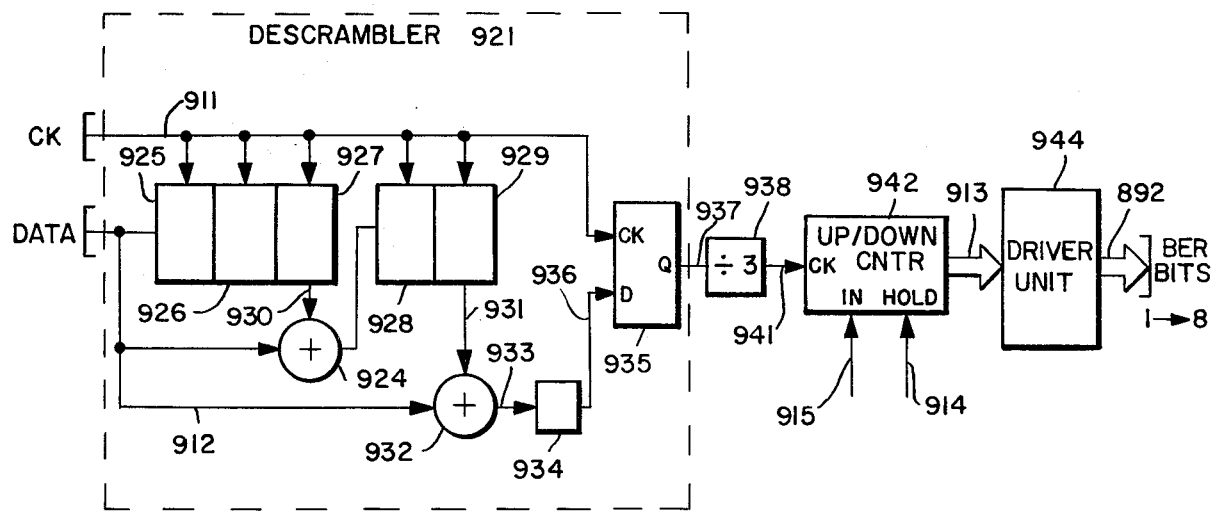
FIG. 22 is a schematic block diagram of the error counter portion of the bit error rate module shown in FIG. 21.

Referring now to FIG. 22, the circuitry of which the error counter 908 of the BER module is configured includes a descrambler 921 that receives the thirty-one bit scrambling PN sequence on line 912 and the 301 MHz clock on line 911 from bit scynchronizer 907.

Descrambler 921 includes a three-stage shift register comprised of stages 925–927 and a two-stage shift register comprised of stages 928 and 929. Each stage is clocked by the 301 MHz clock signal on line 911. The outputs of stages 927 and 929 are respectively coupled to modulo-two adders 924 and 932 which are further coupled to receive the thirty-one bit PN sequence on line 912. Shift register stages 925–929 and modulo-two adders 924 and 932 operate to receive the original fault isolation sequence (namely, all zeroes) applied to modulo-two adder 171 in the transmit encoder module (FIG. 10) during the fault isolation sequence. The output of modulo-two adder 932 is coupled over line 933 through a one bit delay and to the D input of flip-flop 935 via line 936. Flip-flop 935 is clocked by the 301 MHz clock signal on line 911 and provides a synchronized error bit indication signal on line 937 for each bit error in the descrambled PN sequence. Because of a factor of three multiplication error, a divide-by-three divider 938 is coupled to the Q output of flip-flop 935. The output of divider 938 is coupled over line 941 to the clock input of a binary counter 942. Counter 942 is enabled by a BER enable signal on line 915 from flip-flop 825 (FIG. 18). The contents of counter 942 are applied via link 913 to a set of output drivers 944, the outputs of which are coupled over link 892 to data multiplexer 802 (FIG. 18). Typically, counter 942 may comprise an eight stage counter and supply an eight bit byte indicative of the BER count during a fault isolation test interval.

OPERATION

As was explained previously, the BER module is placed into operation during the fault isolation mode of operation of a selected optical data link. During this mode, the ATU at one of the terminal stations assembles a command message for transmission to a designated station to monitor the output of a selected one of its optical transmitters. Thus, the select portion of the command message will identify a selected optical transmitter the output of which is to be monitored, via link 874 (FIG. 18). Through one of the lines of link 903, the selected one of BER drivers 808 will cause the energization of one of the relays in multiplexer 901, so that the output of the identified optical transmitter will be coupled over links 902 and 904, amplifier 905 and line 906 to bit synchronizer 907. For the fault isolation mode, the selected optical data link is isolated from normal communication channels and is supplied with a prescribed thirty-one bit PN sequence produced by the TEN module associated with the selected link.

During the encoding operation of the local orderwire module, as counter 822 (FIG. 18) counts encode shift clock pulses applied from MTU 801 over line 839, AND gate 823 is enabled causing flip-flop 825 to become set and enable counter 908 via line 915. As was pointed out previously in conjunction with the description of FIG. 18, the inputs of AND gate 823 are coupled to the two least significant bit stages of counter 822; this coupling provides a slight delay that permits the contacts of the selected relay of multiplexer 901 to stabilize before counter 942 is enabled. Once enabled, counter 942 proceeds to count every third bit error signal produced by descrambler 921. Upon the contents of counter 822 (FIG. 18) reaching a prescribed count that enables AND gate 824, flip-flop 826 is set causing a disable count signal to be applied over line 914 to counter 942. The count value stored in the stages of counter 942 and applied over link 892 to data multiplexer 802 is now loaded in register 803 (FIG. 18) via link 861, so that it may be used for the BER word of the second byte of the third word of the response message generated by the encode/decode logic, as described above in conjunction with the description of FIGS. 18–20. The BER word of the response message is subsequently evaluated by the site surveillance section of the ATU to be described in detail below.

LOCAL ORDERWIRE EQUIPMENT FOR REPEATER STATION

The local orderwire quipment for each repeater station is similar to that employed in a terminal station, each repeater station including a local orderwire interface, termed a local orderwire control module, and associated bit error rate circuitry. These modules perform the auxiliary functions of fault isolation maintenance voice communications and parameter monitoring. As in a terminal station, the local orderwire module includes an essentially analog signal interface unit and a digital control unit the latter being substantially identical to that employed in the local orderwire module of a terminal station described above with reference to FIG. 18. The difference between the two control units relates only to the contents of the input and output data for the associated fiber optical channels and the fact that a repeater station contains no ATU. Accordingly, the description to follow will relate to the signal interface unit of the local orderwire control module. Since the components of the control unit of the module and the BER module are the same as those employed on a terminal station, a description of the same will not be repeated here. For a detailed explanation of the makeup and operation of the control unit and BER module attention may be directed to FIGS. 18–22 and their attendant description.

SIGNAL INTERFACE UNIT (LOCAL ORDERWIRE CONTROL MODULE (FIG. 23)

Figure 23:
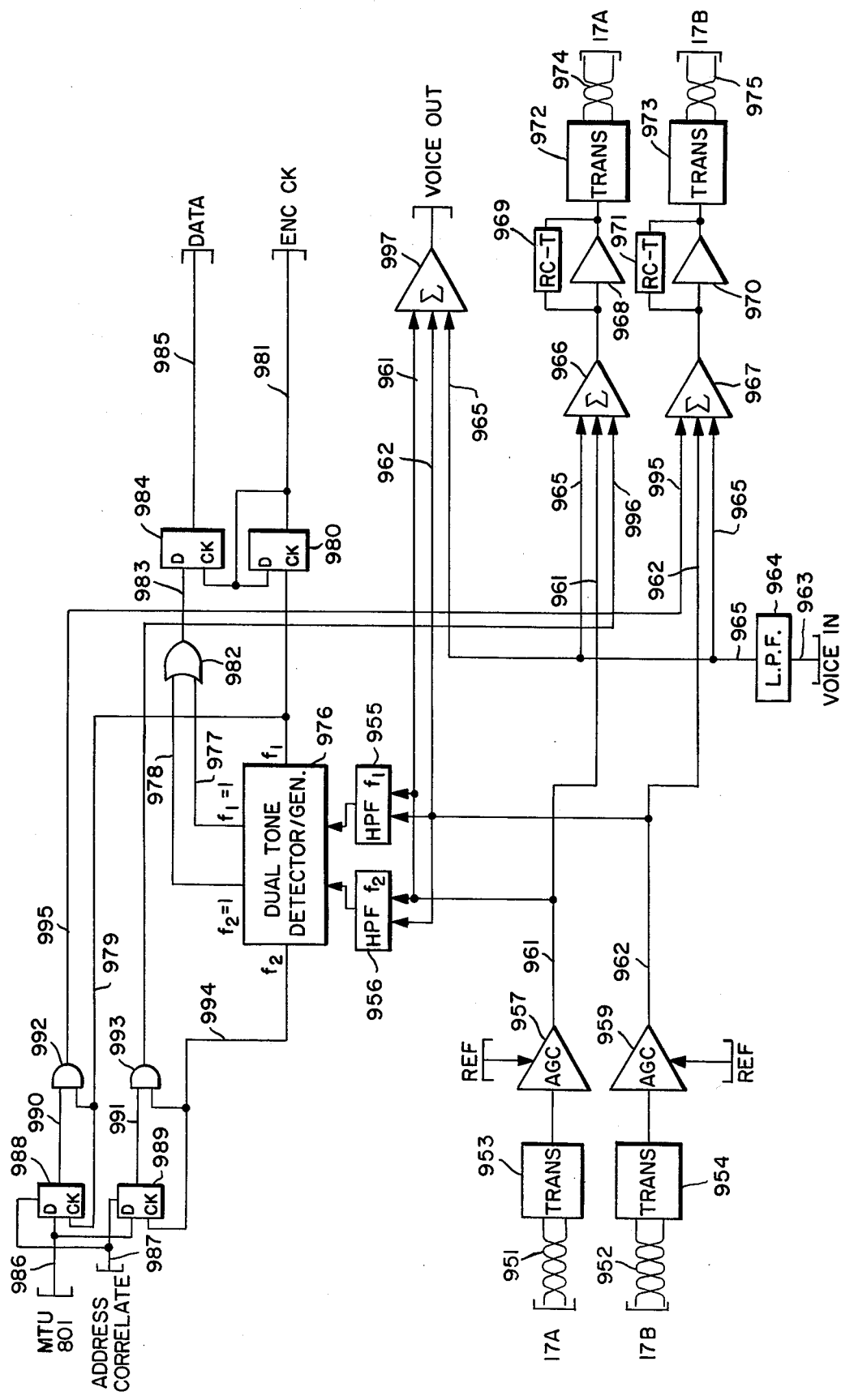
FIGS. 23 and 23A are respective schematic block diagrams of embodiments of the signal interface unit of a local orderwire control module.

Referring now to FIG. 23 the signal interface unit of the first embodiment of the local orderwire system is depicted as comprising a pair of channel input links 951 and 952 and output links 974 and 975, each formed of a twisted pair orderwire cable configuration for orderwire cables sections 17A and 17B, respectively. As was pointed out previously, cable section 17A corresponds to communications directed from west-to-east along the orderwire link, while cable section 17B corresponds to communications directed from east-to-west along the link. Whereas a terminal station is located at one end of the link and therefore sources communications in one direction and receives communications in the other direction, a repeater station is configured to convey communications in both directions so that it must be capable of receiving and transmitting communications in either direction. Each incoming twisted pair 951 and 952 is coupled to a respective isolation transformer 953, 954. The output of each respective transformer is coupled to an associated AGC amplifier 957, 959. Each AGC amplifier may contain a voltage-controlled resistor (e.g. an FET) coupled in the feedback path of the amplifier with the output being compared to a respective reference voltage for adjusting the amplifier's gain. Each AGC amplifier controls the level of the signal on its respective channel and offsets the attenuation of the LOW cable 951, 952 between the repeater and its adjacent station.

The output of AGC amplifier 957 is coupled over line 961 to one input of each of highpass filters 956 and 955. Highpass filters 955 and 956 have their outputs coupled to inputs of a dual tone detector/generator unit 976. Highpass filter 955 is tuned to pass only signals at frequencies equal or above carrier frequency $f_1$, while highpass filter 956 is tuned to pass only signals equal or above carrier frequency $f_2$. Line 961 is further coupled to one input of each summing amplifiers 966 and 997. The output of AGC amplifier 959 is coupled over line 962 to second inputs of highpass filters 955 and 956 and to one input of each of summing amplifiers 967 and 997. Like tone detector/generator unit 703 (FIG. 17) tone detector/generator unit 976 monitors lines 961 and 962 (via highpass filters 955 and 956) for the presence of decode commands (amplitude modulated) digital signals from a remote terminal station over cable sections 17A and 17B. Tone detector/generator 976 responds to the presence of either an $f_1$ or $f_2$ carrier via which the amplitude modulated signals are transmitted by generating a constant amplitude AC signal having the same frequency as the amplitude modulated carrier. For carrier $f_1$ the signal is supplied over line 979 to the clock input of a flip-flop 988, one input of AND gate 992 and to the clock input of a flip-flop 980; for carrier $f_2$ this signal is supplied over line 994 to the clock input of flip-flop 989 and to one input of AND gate 993. Dual tone detector/generator unit 976 further outputs decoded digital data transmitted via carriers $f_1$ and $f_2$ over lines 977 and 978, respectively, to the two inputs of OR gate 982. The output of OR gate 982 is coupled over line 983 to the D input of flip-flop 984, the Q output of which is coupled over line 985 to the data input line of the MTU in the associated control unit of the repeater's local orderwire control module. Flip-flop 984 is clocked by the Q output of flip-flop 980 which functions as an edge refining driver, the output of which is coupled over line 981 the MTU of the control unit of the module.

Data from the associated MTU of the control unit is coupled over line 986 to the D inputs of flip-flops 988 and 989. Address correlation signals from the digital control unit are coupled to the SET inputs of each of flip-flops 988 and 989. The E,ovs/Q/ outputs of flip-flops 988 and 989 are coupled over lines 990 and 991 to AND gates 992 and 993 respectively. Flip-flops 988 and 989, in conjunction with AND gates 992 and 993, serve to synchronously encode the response words from the MTU on frequencies $f_1$ and $f_2$, respectively, for application over lines 995 and 996 to summing amplifiers 967 and 966, for coupling to orderwire cable sections 17A and 17B, respectively.

Voice signals are applied via input line 963 through a low pass filter and line 965 to each of the summing amplifiers 966, 967 and 997. The output of summing amplifier 997 provides the voice output signals to associated repeater voice monitoring equipment such as a local headset. The outputs of summing amplifiers 966 and 967 are coupled through equalization amplifiers 968 and 970 each configured with a feedback RC-T filter 969 and 971, respectively. The outputs of amplifiers 968 and 970 are coupled to the local orderwire twisted pair cables 974 and 975 via transformer units 972 and 973, respectively.

OPERATION

The operation of the signal interface unit of a repeater station is similar to that of a terminal station, except that the repeater station does not source or terminate a message. Voice signals are output directly to the local attendant's headset via summing amplifier 997. Any incoming voice from the local attendant and all incoming signals are further relayed out on cables 17A and 17B via summing amplifiers 966 and 967.

Incoming amplitude modulated tone digital messages on either orderwire cable 17A or orderwire cable 17B are passed by one of highpass filters 955 and 956 and then detected by tone detector/generator unit 976 and the recovered binary digital data modulations are conveyed over one of lines 977 and 978 to OR gate 982 for coupling toe line 988 to the associated MTU for a possible response (depending upon wehther the address byte of the command word identifies that particular repeater station).

For example, a command message from terminal station 10 and thereby keyed onto frequency $f_1$ on orderwire cable 17A will be coupled through highpass filter 955 from isolation transformer 953 and amplifier 957. Similarly, a command message from terminal station 12 and thereby keyed onto frequency $f_2$ on orderwire cable 17B will be coupled through highpass filter 956 from isolation transformer 954 and amplifier 959. As described above, each repeater is synchronized with the $f_1 = 20.48$ KHz tone, so that the encoding clock for the MTU is derived from the divided 20.48 KHz clock (frequency $f_1$) as described above with reference to FIG. 18. Thus, the clock is derived from the $f_1$ tone output in line 979, divider 980 and output line 981 to the MTU of the control unit.

If the repeater has been addressed by an incoming command message from one of terminal stations 10 and 12, the MTU of the associated digital control unit (see FIG. 18) will formulate a response and apply it over line 986 to be synchronously applied to orderwire cables 17A and 17B via the synchronous carrier clocking action of flip-flops 989 and 988 and AND gates 993 and 992, respectively. Since a repeater transmits its response message to each terminal station on separate tone carriers $f_1$ and $f_2$, each of flip-flops 988 and 989 and associated AND gates 992 and 993 are clocked and enabled respectively at the $f_1$ and $f_2$ tone frequencies, so that the incoming response digital signals on line 306 from the MTU of the control unit effectively modulate respective tones $f_1$ and $f_2$ for transmission to terminal stations 10 and 12 over orderwire cables 17B and 17A, respectively. The output of AND gate 992 containing the response message of frequency $f_1$ is coupled over line 995 to summing amplifier 967 for application to orderwire cable 17B. Similarly, the response message from AND gate 993 is coupled over line 986 to summing amplifier 966 for application to orderwire cable 17A.

CONTROL UNIT (LOCAL ORDERWIRE CONTROL MODULE INTERFACE CIRCUITS) AND BER MODULE

The control unit of the local orderwire control module is configured substantially identically to that employed in the local orderwire interface module used by the terminal stations, and reference may be had to FIG. 18 and its attendant description for an explanation of that section. Differences between the two relate to the status and BER bits that make up the response messages and these data bits are, of course, programmable as desired depending upon the size and intended use of the system. For example, as pointed out previously the parameters monitored at a repeater station may include but are not limited to ambient temperature, power supply failure, injection laser diode temperature fault, etc., with the units that monitor such parameters supplying acceptable or unacceptable representative signals (0 or 1) as the corresponding parameter state bit to be incorporated in a response message. Moreover, link 874 includes an extra line coupled to a further gate in addition to gate 835 for selecting one or the other of a pair of driver units 808 which are coupled to twelve (six uplink, six downlink) BER lines of the BER module. As can be seen in Table 1—the MSB of the select word identifies either the uplink direction or the downlink direction. This additional bit is employed in the repeater stations to address the required one of two BER driver units.

The foregoing embodiment of the local orderwire system employs a pair of tones for each of the west-to-east and east-to-west links. In accordance with a second embodiment of the system, to be described below, communication over each link may be conducted using a respective single tone assigned to each link irrespective of whether the message is a command message or a response message. In this second embodiment of the local orderwire system, messages conveyed over link 17A are amplitude modulated onto a first tone (e.g. $f_1 = 20.48$ KHz) while those sent over line 17B are amplitude modulated onto a second tone (e.g. $f_2 = 30.72$ KHz). As in the first embodiment, each terminal and repeater station contains an orderwire signal interface unit and an associated control unit. The control unit for each station (shown in FIG. 18) is identical to that in the first embodiment, so that a description of the same will not be repeated. The signal interface units, however, although quite similar to those shown in FIGS. 17 and 23, contain additional signal switching control components which serve to enable normal signal detection and response functions and to provide a reply carrier source to the auxiliary terminal equipment at one of the terminal stations in the event of a fault or failure. Further, in this embodiment, provision is made for amplitude modulation transmission at indices of modulation other than 100%. These units for a terminal station and a repeater station, respectively will be described with reference to FIGS. 17A and 23A.

TERMINAL SIGNAL INTERFACE UNIT (FIG. 17A)

Like the terminal signal interface unit described with reference to FIG. 17, the unit shown in FIG. 17A operates to detect incoming amplitude modulated tone messages from another station and to forward these on to the associated control unit for processing and response. It also serves to transmit outgoing tone messages for delivery over the interstitial pair to another station. A further function of the signal interface unit is to couple voice messages between local audio communication circuits and the orderwire cable, with both voice and amplitude modulated tone messages being capable of being transmitted and interfaced simultaneously.

Figure 17A:
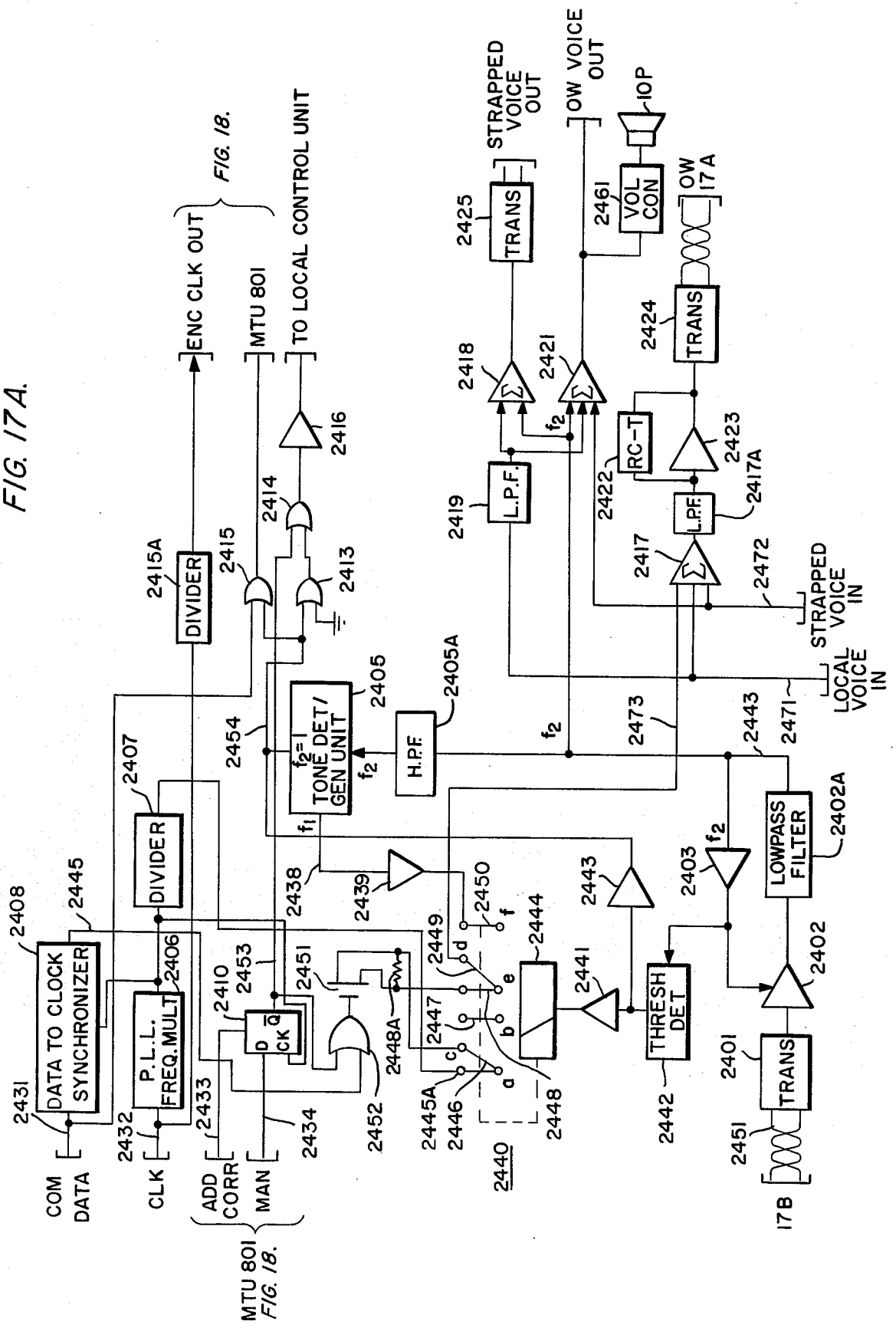

Referring now to FIG. 17A, there is shown a schematic diagram of a terminal signal interface unit for the second embodiment of the local orderwire system wherein each orderwire link conveys messages using only one of carrier frequencies $f_1$ and $f_2$. Again, for purposes of the present description it will be assumed that the terminal signal interface unit of interest is that employed at terminal station 10. East-to-west orderwire cable line 17B over which messages are amplitude modulated onto carrier frequency $f_2$ terminates via twisted pair 2451 at isolation transformer 2401. The output of transformer 2401 is coupled to an associated ACC amplifier 2402, the AGC control input of which, in turn, is coupled to the output of a feedback amplifier 2403. AGC amplifier 2402 may contain a voltage controlled resistor (e.g. an FET) coupled in its feedback control path with the output being compared to a reference for gain control. Amplifiers 2402 and 2403 control the level of the received signal and offset the attenuation of orderwire calbe 2451 between terminal station 10 and its adjacent repeater 11-1.

The output of amplifier 2402 is coupled through a lowpass filter 2402A over line 2443 to a tone detector/generator unit 2405 except that no bandpass filter is used. Line 2443 is also coupled to summing amplifiers 2418 and 2421. Tone detector/generator unit 2405 responds to the presence of an amplitude modulated tone command from remote terminal station 12 and to any response message from an addressed repeater it receives on orderwire cable 17B and outputs the demodulated digital data modulation recovered from received frequency $f_2$ over line 2454 to one input of each of OR gages 2415 and 2413. OR or gate 2415 has a second input coupled to line 2431 to receive command message data from the local auxiliary terminal unit to be transmitted out over west-to-east orderwire cable 17A. The messages themselves are formatted by the encode/decode control unit (FIG. 18) and the output of OR gate 2415 is coupled to MTU 801 (FIG. 18) for this purpose. OR gate 2413 is coupled to one input of OR gate 2414, the output of which is coupled via buffer amplifier 2416 to the local auxiliary terminal unit. A second input of OR gate 2414 is coupled via line 2453 to the $\overline{Q}$ output of flip-flop 2410. Flip-flop 2410 is employed to synchronously clock messages from the encode/decode control unit for delivery to an intended recipient via outgoing switching circuitry (to be described below) and out over west-to-east orderwire cable 17A. As all outgoing messages from terminal station 10 are monitored by the local supervisory equipment, line 2453 couples these messages to the auxiliary terminal equipment via OR gate 2414 and buffer amplifier 2416, just as in the previously described first embodiment.

Command message data on line 2431, in addition to being coupled to one input of OR gate 2415, as explained above, is coupled to a data-to-clock synchronizer 2408 which synchronizes the command message data with the clock output of frequency multiplier 2406. The synchronized output data is coupled over line 2445 to OR gate 2452, where it is combined with response data from MTU 801 (FIG. 18). The output of OR gate 2452 is coupled to the gate of FET switch 2451, the operation of which is to amplitude modulate the carrier tone, 20.48 KHz in the present unit of interest at terminal 10.

The clock source for all communications is derived from a line 2432 which is coupled to receive a system clock of 20.48 KHz. This clock is coupled through a divider 2415 for delivery to the encode/decode control unit (FIG. 18) and to a phase lock loop/frequency multiplier 2406. Again, depending upon the transmission carrier frequency assigned to the terminal station of interest, frequency multiplier 2406 will multiply the clock frequency on line 2432 (20.48 KHz) by either a value of two or three in order to establish a unique transmission frequency for that particular terminal station. For terminal station 10, the clock output of frequency multiple 2406 is 40.96 KHz, while for terminal station 12, the clock output of the multiplier is 61.44 KHz. This clock is then divided by two in divider 2407, to produce the carrier clock for outgoing messages, which is connected by line 445A to terminal a of a double-pole, double-throw relay switch circuit 2440. As will be described in detail below, rely switch circuit 2440 normally steers command messge data to line 2473 so as to be coupled via summing amplifier 2417, lowpass filter 2402A, equalizer 2423 and transformer 2424 to west-to-east orderwire cable line 17A. In the event of a fault or failure, causing loss of carrier on incoming east-to-west link 17B, relay circuit 2440 is switched to supply an outgoing carrier $f_1$ onto the west-to-east link and to inhibit the reception or transmission of data by the terminal station.

For this purpose, the output of AGC feedback amplifier 2403 is coupled to a threshold detector 2442, the output of which is coupled to a relay driver 2441 and buffer amplifier 2443. Threshold detector 2442 has its trigger reference set at a level approximating the output of amplifier 2403 for maximum gain by AGC amplifier 2402, so that for a loss of carrier on east-to-west orderwire cable 17B, which causes the gain imparted by amplifier 2402 to go maximum, the output of threshold detector 2442 will change state. When threshold detector 2442 is triggered in response to loss of carrier, its output is coupled through driver 2441 to energize relay coil 2444 of relay circuit 2440. The output of threshold detector 2444 is also coupled through amplifier 2443 to line 2454 to latch or hold the detection output of unit 2405 and thereby one input of each of gates 2413 at a zero logic level, so that each of gates 2413 and 2415 will see no incoming message from orderwire cable 17B.

Tone detector/generator unit 2405 provides a carrier frequency of $f_1 = 20.48$ KHz output over line 2438 through amplifier 2439 to lead 2450 and terminal f of rely circuit 2450. In the normally non-energized condition of relay circuit 2440, terminal f is open. In response to a loss of carier, however, with relay coil 2444 being energized by the output of driver 2441, movable contact arms 2446 and 2449 are switched between respective terminals a-c and e-d to terminals c-b and d-f. Terminal d is coupled to input line 2473 of summing amplifier 2417, while terminal e is coupled to the source of FET switch 2451. The drain of FET switch 2451 is coupled to terminal c, while terminal b is coupled to open line 2447. The gate of FET switch 2451 is coupled to the output of OR gate 2452 one input of which is coupled over line 2453 to the $\overline{Q}$ output of flip-flop 2410. The other input of OR gate 2452 comes from data synchronizer 2408. Since the $\overline{Q}$ output of flip-flop 2410 represents response data to be transmitted, and the output of data synchronizer 408 on line 445 represents command data, FET switch 2451 is turned on and off in accordance with the response and command data, thereby controllably interrupting the flow of current between its source and drain in correspondence to the encoded data in line 2434 from MTU 801 (FIG. 18) or command data on line 2431. Further, a resistor 2448A sets the index of modulation for transmission by providing a current path around FET switch 2451. In the normally non-energized state of relay circuit 2440 the source-to-drain current path of FET switch 2451 is coupled to receive the carrier output of divider 2407 via line 2445A, terminal a, movable switch contact 2446 and termainal c, so that the carrier ($f_1 = 20.48$ KHz) output of divider 2407 is amplitude modulated in accordance with the output of flip-flop 2410 and/or synchronizer 2408. In response to a loss of carrier, however, with relay circuit 2440 energized, the source-drain current path of FET switch 2451 is disconnected from the output of divider 2407, as movable switch contact 2446 is switched to open terminal b. Since contact 2449 is also switched, to thereby bridge terminals d and f, the carrier output on line 2473 is provided via the $f_1 = 20.48$ KHz output line from tone detector/generator unit 2405 and transmission of command or response data is inhibited.

The terminal interface unit of the second embodiment of the local orderwire system contains the same set of voice interface circuits as employed in the first embodiment. These components include low pass filter 2419 coupling local voice input line 2471 to summing amplifiers 2418 and 2421. The output of summing amplifier 2418 is coupled to output transformer 2425, while summing amplifier 2421 supplies an orderwire voice output to an output line and to speaker 10P via volume control 461. The strapped voice input line 2472 is coupled to each of summing amplifiers 2417 and 2421.

Under normal operating conditions, the operation of the terminal interface unit of FIG. 17A is similar to that of FIG. 17, except that only a single frequency is assigned to each orderwire link. Incoming messages on carrier $f_2$ from orderwire cable 17B are detected by tone detectors 2405, with the zero/one level changes output on line 2454 to MTU 801. Messages assembled for transmission by MTU 801 or by ATE 24 via command data line 2431 modulate the $f_1$ carrier output of divider 2407 by the action of FET switch 2451. In the event of loss of carrier, threshold detector 2442 responds to a maximum gain output of AGC amplifier 2402 to trigger relay switch 2440, thereby connecting line 2473 to the $f_1$ carrier output of unit 2405, so as to supply an unmodulated $f_1$ carrier tone to west-to-east orderwire cable 17A. When carrier returns, relay coil 2444 is de-energized and normal conditions are restored, the carrier output of divider 2407 (subject, of course, to amplitude modulation by FET switch 2451) being coupled through normally closed contacts of relay switch 2440 to output line 2473 and thereby to output circuitry and orderwire 17A.

SIGNAL INTERFACE UNIT FOR REPEATER STATION (FIG. 23A)

Figure 23A:
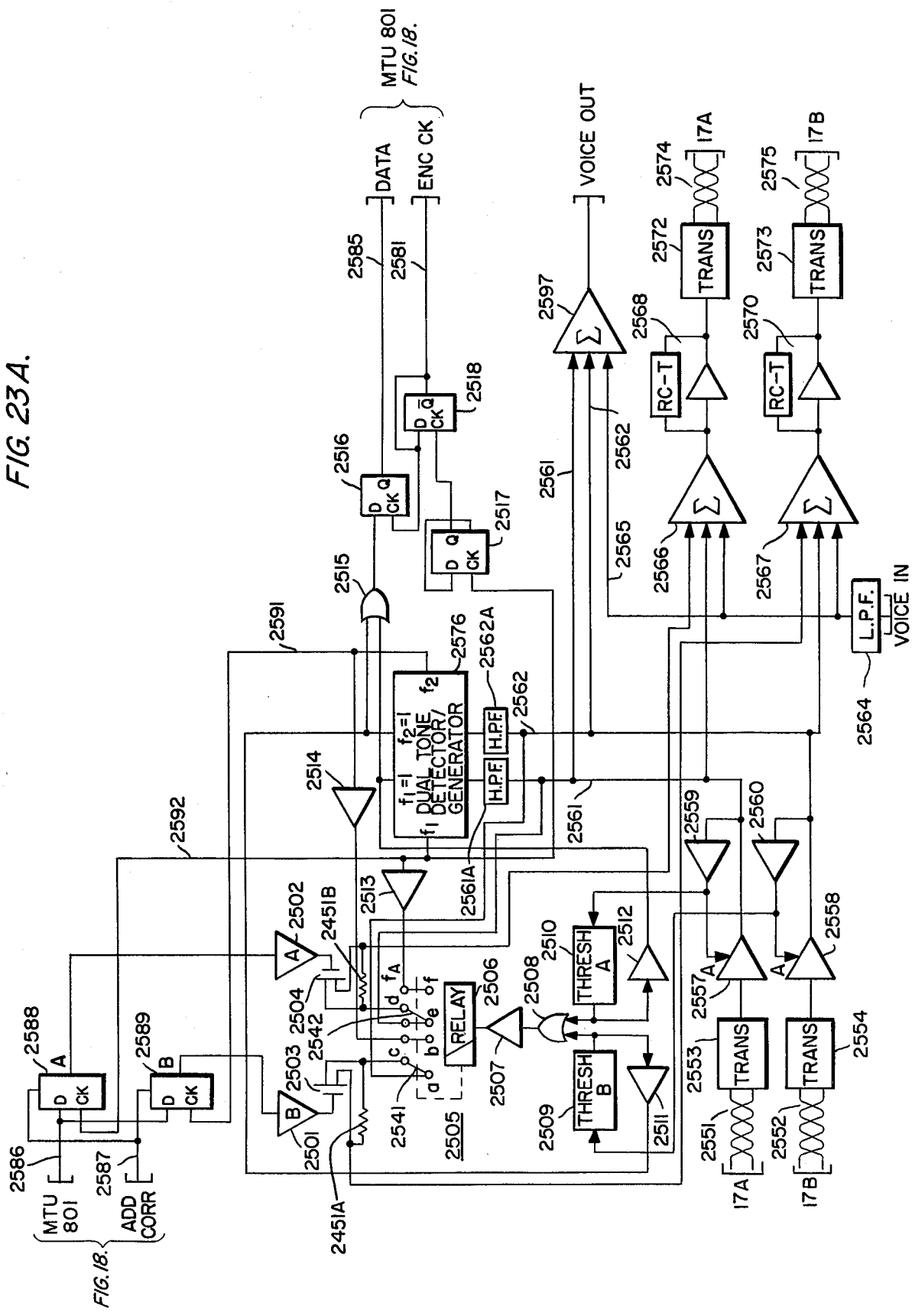

Referring now to FIG. 23A the signal interface unit for a repeater station of the second embodiment of the local orderwire system is depicted as comprising a pair of orderwise cable input links 2551 and 2552 and output links 2514 and 2575, each formed of a twisted pair orderwire calbe for cable links 17A and 17B, respectively. As was pointed out previously, cable link 17A conveys communications at frequency $f_1$ directed from west-to-east along the orderwire, while cable link 17B conveys communications at carrier frequency $f_2$ directed from east-to-west. Whereas a terminal station interface unit shown in FIG. 17A is located at one end (e.g. the west end) of the orderwire cable and therefore sources communications in one direction, a repeater station is configured to convey communications in both directions so that it must be capable of receiving and transmitting communications over each of cables 17A and 17B. Each incoming twisted pair 2551 and 2552 is coupled to a respective isolation transformer 2553, 2554. The output of each respective transformer is coupled through AGC amplifiers 2557 and 2558 to lines 2561 and 2562. Line 2561 is coupled through a highpass filter 2561A to one input of a dual tone detector/generator 2576 and to an AGC feedback amplifier 2559. The output of amplifier 2559 is coupled to the control input of AGC amplifier 2557 and to a threshold detector 2510. Line 2562 is coupled through a highpass filter 2562A to a second input of dual tone detector/generator 2576 and to an AGC feedback amplifier 2560. The output of amplifier 2560 is coupled to the control input of amplifier 2558 and to a threshold detector 2509. As in the signal interface circuit shown in FIG. 17A described above, threshold detectors 2509 and 2510 monitor the presence or absence of carrier on orderwire cables 17A and 17B by comparing the outputs of feedback amplifiers 2559 and 2560 (the gain control signals) with a reference threshold detector (2509 or 2510) and coupling an output through OR gate 2508 to relay driver 2507. The outputs of threshold detectors 2509 and 2512 to the tone detection outputs of unit 2576 and to OR gate 2515. As in the signal interface unit for a terminal station, a loss of carrier causes the threshold circuit associated with that carrier to latch one input of OR gate 2515 at zero so that the encode/decode control unit (FIG. 3) sees no data on that channel and therefore generates no response to be sent out on the opposite channel. Namely, for a loss of carrier on east-to-west orderwire cable 17B, threshold detector 2509 couples a signal through amplifier 2511 to the $f_2$ detection output of unit 2576 and one input of OR gate 2515. OR gate 2515 is now incapable of coupling data to MTU 801 in the encode/decode control unit of the repeater. The output of OR gate 2515 is coupled to the D input of flip-flop 2516, the Q output of which is coupled over line 2585 to MTU 801 (FIG. 18). The clock input of flip-flop 2516 is derived from flip-flop 2518 which is coupled to the $f_1$ generation output of unit 2576 via line 2592. Flip-flops 2517 and 2518 provide a clean divided-down clock in line 2581 for synchronous operation of the encode/decode control unit (FIG. 18). Like the terminal interface units, the repeater unit operates in accordance with the 20.48 KHz clock (frequency $f_1$) to provide for simple substitution of repeater cards and the requisite commonality throughout the system.

Response messages assembled by the encode/decode control unit (FIG. 18) are coupled to a pair of flip-flops 2588 and 2589 from MTU data line 2586 and address correlate line 2587 just as in the first embodiment. Flip-flops 2588 and 2589 are clocked by the $f_1$ and $f_2$ outputs of dual tone detector/generator unit 2576, respectively, the $\bar{Q}$ outputs of the flip-flops being coupled to buffer amplifiers 2502 and 2501, respectively. Buffer amplifier 2502 is coupled to the gate of FET switch 2504, the source and drain of which are coupled between terminal d of relay switch 2505 and one input of summing amplifier 2566. As in the terminal unit, resistors 2541A and 2541B provide for adjustment of the modulation index. Summing amplifier 2566, equalizer circuit 2568 and transformer 2572 form the output circuit for the repeater signal interface unit to orderwire cable 17A. Similarly, summing amplifier, one input of which is coupled to the drain of FET switch 2503, equalizer 2570 and output transformer 2573 form the output circuit to orderwire cable 17B. The drain of FET switch 2503 is coupled to terminal c of relay switch 2505.

Terminal a of the relay switch is coupled to $f_2$ input signal line 2562, while terminal c is coupled to $f_1$ input signal line 2561. Terminals b and f are coupled, via buffer amplifiers 2514 and 2513, respectively, to the $f_2$ and $f_1$ carrier outputs of tone detector/generator unit 2576. During normal operation, with relay coil 2506 being non-energized, the carrier input on lines 2562 and 2561 are coupled through normally bridged terminals a-c and e-d by normally closed contacts 2541 and 2542 to the source-drain in path of FET switches 2503 and 2504. Response messages are applied to the gate of FET switches 2503 and 2504 to modulate the carrier applied to the source-drain circuit paths of the FET switches for transmission out over the corresponding orderwire cable via summing amplifiers 2566 and 2567. (It should also be noted that incoming signals on orderwire cables 17A and 17B are coupled via lines 2561 and 2562 to summing amplifiers 2566 and 2567 for delivery to transformers 2572 and 2573 to cable twisted pairs 2574 and 2575.)

In the event of loss of carrier on either orderwire channel, west-to-east or east-to-west, the associated one of threshold detectors 2509 and 2510 will change state, causing movable contacts 2541 and 2542 to interrupt the normally closed connection between terminals a-c and e-d and make the connection between terminals b-c and d-f. Carrier is now supplied from tone detector/generator 2576 to FET switches 2503 and 2504 via the newly closed terminal connections, so that the repeater may still communicate with an associated auxiliary terminal unit at a terminal station via its own generated carrier.

It should be noted that the switching configuration shown in FIG. 23A operates to sever the uplink connection in the event of a fault but still provides downlink connection in the event of a fault but still provides downlink communication capability. Namely, considering repeater 11-1 as an example, for a loss of carrier on east-to-west orderwire cable 17B, threshold detector 2509 will cause relay circuit 2505 to be energized and, at the same time, will inhibit gate 2515 from receiving zero/one level changes for frequency $f_2$. Therefore, no messages on the $f_2$ carrier will be received by repeater 11-1. However, a new $f_2$ carrier provided by unit 2576 irrespective of the existence of carrier $f_2$ on line 2562 will be supplied to FET switch 2503, so that repeater 11-1 can still send response messages to terminal station 10 over orderwire calbe 17B. Since threshold detector 25 has not been triggered, incoming messages on carrier $f_1$ are still detected and output through OR gate 2515 to the repeater's encode/decode control unit (FIG. 18) whereby a response message can be assembled and coupled to FET switch 2503 which, in turn, modulates the $f_2$ carrier supplied by unit 2576 for delivery downlink to terminal station 10.

Thus, in accordance with the second embodiment of the local orderwire system, single frequencies are employed for message transmission over the respective orderwire cables (east-to-west and west-to-east) of the network, as contrasted to the use of dual frequencies for both highways. In addition, loss of carrier does not defeat the operation of the entire network, as each signal interface unit is equipped to switch in a new carrier in response to loss of signal, so that it may communicate with its associated auxiliary terminal unit in a terminal station.

EXPRESS ORDERWIRE INTERFACE (EOI) (FIGS. 24A–24C)

Figure 24A:
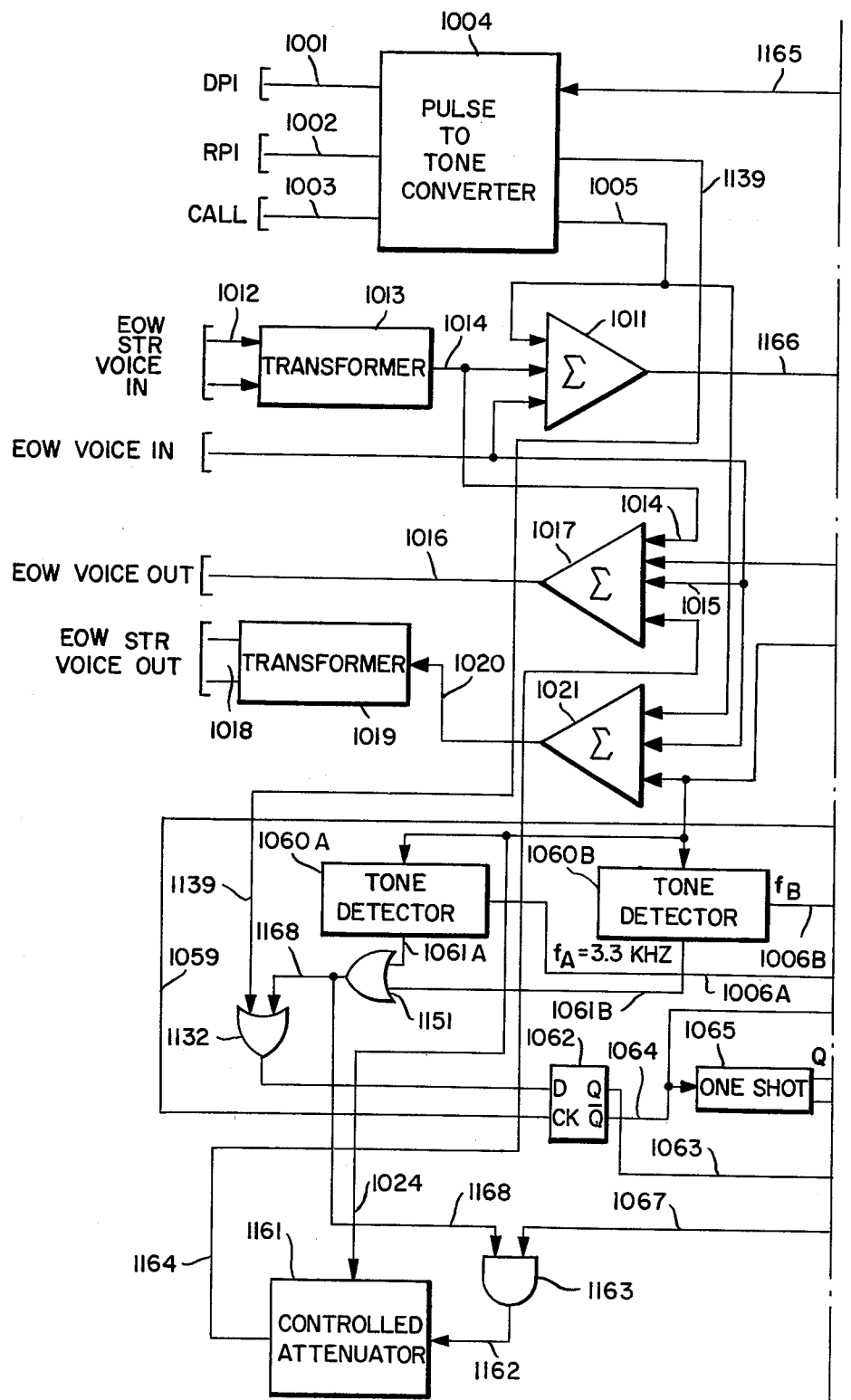
FIGS. 24A and 24B show the components and configuration of an express orderwire interface module.
Figure 24C:
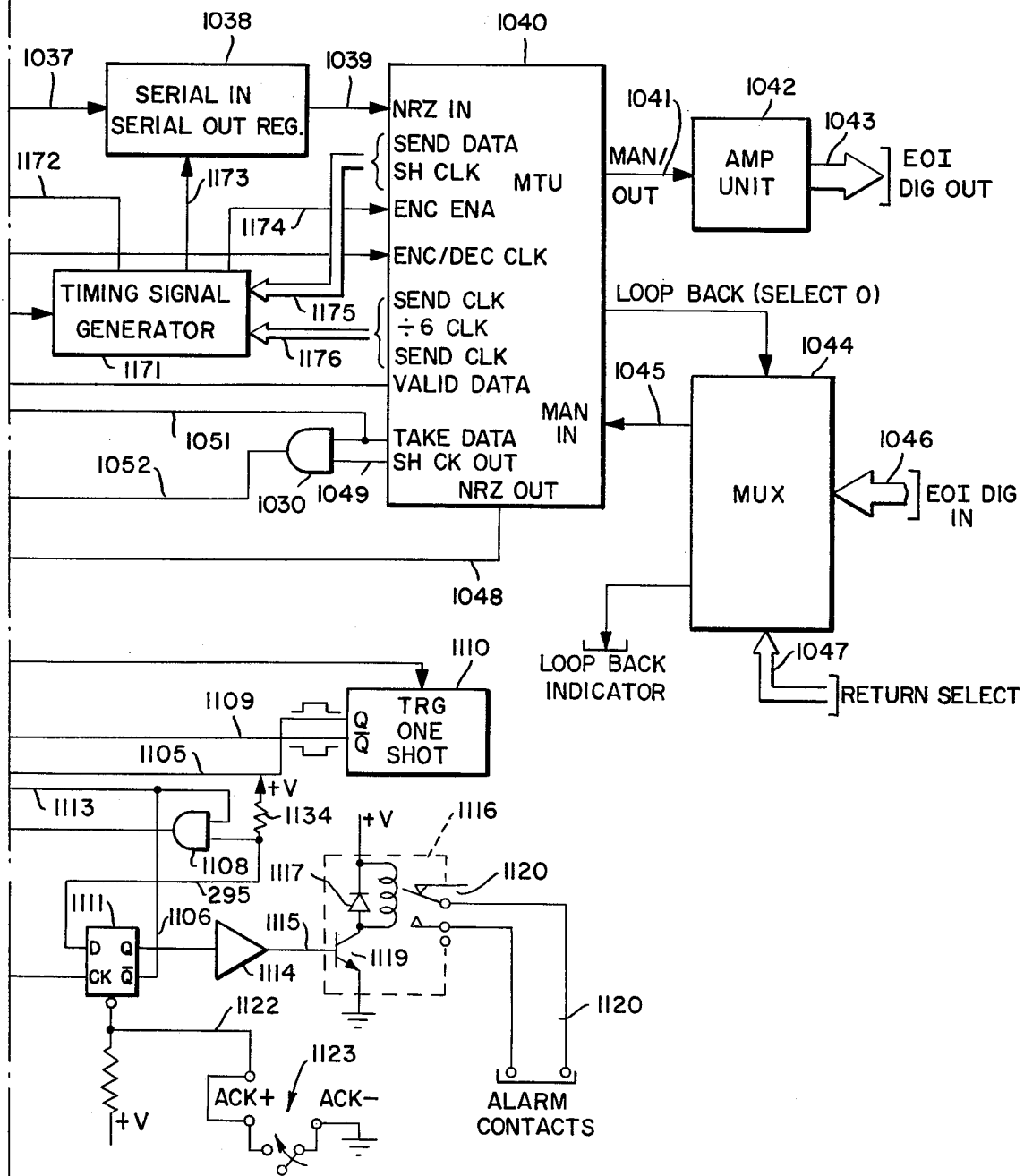

The express orderwire subsystem which is shown in schematic block diagram form in FIGS. 24A–24C is a voice/alarm, encode/decode interface for implementing voice and alarm signal communications between terminal stations via the fiber optic links. Advantageously, this subsystem permits network operators at the terminal stations to signal and talk directly with each other over the optical fiber links without interfering through the telephone equipment from which the customers telephone data traffic is derived. This means that a line of communication between station operator personnel is substantially quaranteed irrespective of the operation of external telephone interface equipment. While such a scheme may be incorporated in various types of communication networks in general, and is embodied in a copending patent application Ser. No. 148,286, filed May 9, 1980, by Thomas J. Nixon and Harold W. Iley, entitled "Voice/Alarm Signalling System" and assigned to the assignee of the present application, it will be described in detail here in order to facilitate an understanding of its capabilities in the environment of the present invention.

At one terminal station encoded alarm or voice signals are inserted into the 301 Mb/s data stream as overhead bits, transmitted over each of the available fiber optic data links, and subsequently decoded at the addressed terminal station to recreate the transmitted alarm or voice. Telephone addressing schemes, such as rotary dial, frequency pulse keying, etc. are employed for identifying the terminal station being called. While only two terminal stations (10 and 12) have been referenced in conjunction with the description of the system, it is again to be understood that a fiber optic communication system embraced by the present invention may include more than two terminals, each of which forms one end of a point-to-point fiber optic link. With this capability, each terminal station will have a telephone number address that may be dialed from an attendant's handset at another terminal station and the description of the express orderwire subsystem to follow will explain the equipment associated with a respective terminal station for implementing the voice/alarm encoding and decoding functions necessary to convert the telephone address, alarm and voice signals into the proper format for a response and completed communication.

In order to facilitate an explanation of the voice/alarm interface module, the module may be considered to be subdivided into three sections: 1—an encoding section which receives incoming dial pulse, voice or alarm audio signals, digitizes and encodes the signals and forwards the encoded digital signals in to the transceiver/multiplexer circuitry of the terminal station for transmission over each channel; 2—a decoding section which receives encoded digital signals transmitted from another terminal station, decodes the signals and outputs analog audio signals to the attendants' audio equipment. In the case of station address signals that identify the terminal station being called, the decoding section carries out address signal detection functions and energizes an alarm to the terminal station operator. Finally, there is an alarm monitoring section that responds to a longer than monmentary signal level input to energize an alarm. each of these sections will be described separately below. For purposes of simplifying an understanding of the invention, the various sections of the voice/alarm interface module under consideration will be assumed to be those associated with the module associated with terminal station 10.

ENCODING SECTION

When the attendant at terminal station 10 wishes to place a call to another terminal station (e.g. terminal station 12), the attendant addresses that station by way of a conventional handset signalling device, such as rotary dial, frequency pulse keys, momentary switch, etc. provided at the station. The type of signalling device used is not critical and merely provides means for addressing the EOI equipment at another terminal station.

Input address signalling lines 1001 for dial pulse signals, lines 1002 for rotary pulse signals and lines 1003 for momentary switch pulses (CALL) are coupled to a conventional pulse-to-tone converter 1004 which produces a dual audio tone output at a selected pair of frequencies of 2.9 KHz and 3.3 KHz on line 1005 in the presence of a closed contact pulse on any one of lines 1001-1003. The set of frequencies of 2.9 KHz and 3.3 KHz was chosen to ensure that the equipment will be capable of distinguishing between voice and tone signals. In some instances a voice frequency signal may have such a frequency content that is recognized as a tone signal. However, with the use of a pari of non-harmonically related frequencies spaced apart by the 400 Hz differential, which will not be duplicated by a voice signal, a clear line of demarcation between true voice signals and a true tone pair can be effected. The tone pair signals themselves are produced by a pair of tone generator/detector circuits 1060A and 1060B, the tone outputs $F_A = 3.3$ KHz and $F_B = 2.9$ KHz of which are coupled over lines 1006A and 1006B to be summed together in summing amplifier 1180 and applied over line 1165 to the tone input of pulse-to-tone converter 1004. The pulse signals that are applied to converter 1004 over one of input lines 1001, 1002 and 1003 effectively gate the dual tone summation signal on line 1165 and apply the resulting tone burst signal to output line 1005. The gaing pulses, per se, are coupled over output line 1139 to one input of gate 1138.

Line 1005 is coupled to one input of each of summing amplifiers 1011 and 1021. The output of summing amplifier 1011 is coupled over line 1166 to a low pass filter 1167. Summing amplifier 1011 is also coupled to receive incoming voice signals from auxiliary voice interface circuitry at terminal station 10. For this purpose a strapped voice input twisted pair 1012 is transformer coupled via isolation transformer 1013 and line 1014 to one input of summing amplifier 1011. Line 1014 is also coupled to one input of another summing amplifier 1017, the output of which is coupled over line 1016 to deliver applied audio signals (voice or tones) to the earphone or speaker of the attendant's audio set, e.g., handset or headset. The summed tone pair signal on line 1005 is further coupled to one input of summing amplifier 1021. The output of amplifier 1021 is coupled over line 1020 to an isolation transformer 1019. The output of isolation transformer 1019 is coupled via twisted pair 1018 to strapped audiooutput equipment. Thus, through summing amplifier 1017 and 1021, the tone signals produced by converter 1004 are applied to local audio equipment.

The tone or voice signals produced at the output of low pass filter 1167 are coupled over line 1035 to a companding A-D converter 1036 which is clocked by a suitable clock 1056 (1.536 MHz) via line 1055. The output of clock generator 1056 is further coupled to a timing signal generator 1171 and to the ENCODE/DECODE CLOCK input of a multiplex terminal unit (MTU) 1040. Timing signal generator 1171 is comprised of suitably configured combinational logic to produce timing signals that control the operation of A-D converter 1036, register 1038 and MTU 1040. The basic clock is derived from the 1.536 MHz clock on line 1055 and generator 1171 responds to outputs of MTU 1040 on links 1175 and 1176 to produce sequential operational timing signals, described below. The sampled and quantized audio signal is digitized into a suitable code resolution, e.g., eight bits, to produce an eight-bit serial output code for each sample, which code is coupled over link 1037 to serial shift register 1038. The serial NRZ output of shift register 1038 is supplied over line 1039 to the NRZ IN terminal of (MTU) 1040. (MTU 1040 is the same type of NRZ-MANCHESTER-NRZ encoding/decoding unit described previously in connection with the description of the local order-wire interface and control modules). MTU 1040 encodes the serial NRZ data on line 1039 into a sixteen-bit Manchester word (3 sync bits, 8 data bits, 4 spare bits and 1 parity bit) at a suitable bit rate (128 Kbs) and outputs the encoded bipolar data over line 1041 to buffer amplifier unit 1042. Buffer amplifier unit 1042 includes six amplifiers (for the six fiber optic channels) through which encoded data signals are converted to ECL logic levels and applied over link 1043 to each of the five normally used and the one additional uplink transmission channel for application to the transmit encoder module associated with each channel. As was pointed out above, the timing of the fetching of the digitized data by MTU 1040 is controlled via timing signal generator 1171 which responds to the 1.536 MHz clock on line 1056 and the outputs of MTU 1040 on links 1175 and 1176 to produce shift clock pulses on line 1176 to read out the contents of register 1938 and line 1172 which delivers control timing signals to A-D converter 1036 as MTU is ready to receive and encode more data samples. As a new audio data sample is to be encoded, timing signal generator 1171 delivers an encode enable control signal over line 1174 to the encode enable input of MTU 1040.

In operation, when the attendant at terminal station 10 places a call to terminal station 12, the address of the terminal station is applied in a dialing device to pulse-to-tone converter 104. Pulse-to-tone converter 104 pulses out an audio signal, corresponding to the summed tone pair signals on line 265 from tone detector/generators 1060A and 1060B in accordance with these pulses, on output lines 1005 and 1139. The tone pair on line 1005 is coupled through summing amplifier 1011 and lowpass filter 1167 to A-D converter 1036, wherein the pulsed tone pair signals are digitized. These digital signals representative of the address of the called station are then encoded by MTU 1040 and applied over each line of output link 1043 to be applied in parallel to the transceiver units associated with each otugoing channel. Through the multiplexing circuitry of the transceiver units, the encoded tone pair address bits are inserted into the outgoing data streams of each channel and transmitted over each data link to the remote terminal station. In a similar manner, voice signals, either from the attendant's handset equipment or from auxiliary audio equipment, are coupled directly to the other inputs of summing amplifier 1011 and subsequently digitized and encoded for transmission over each channel.

DECODING SECTION

The description of the decoding section of the module to follow will proceed from the standpoint of a received call from another terminal, i.e., the data contained in the received EOW bits that have been demultiplexed by the receiver decoder units of the terminal station. It will also be assumed that the address tone pair designates the address of terminal station 10.

Via a suitable thumbwheel switch located externally to the EOI module, the attendant can select one of the six incoming fiber optic channels to be monitored for EOW data. The digital code produced by the setting of the thumbwheel switch will be applied over lines 1047 which designate over which line the communication return from the other station is to be received. Accordingly, one of the lines of link 1046, after appropriate logic level translation, is coupled via multiplexer 1044 over line 1045 to the Manchester data input of MTU 1040. The incoming Manchester words that are comprised of successively received EOW bits are decoded by MTU 1040 into a twelve-bit NRZ data word (8 data bits, 4 spare bits) and supplied over line 1048 to serial-in, parallel-out shift register 1034. Clocking of the decoded NRZ words from MTU 1040 into register 1034 is controlled by TAKE DATA and SHIFT CLOCK OUT signals applied by MTU 1040 over lines 1051 and 1049, respectively, to AND gate 1050, the output of which is coupled via line 1052 to the clock or shift control input of register 1034. Line 1051 is further coupled to a load inhibit input of a storage register 1032 and to a counter 1058. When MTU 1040 detects valid data it supplies a VALID DATA signal on line 1130 to the clock input of storage register 1032, so that the decoded data byte clocked into serial-in, parallel-out register 1034 may be loaded via link 1033 in parallel into the eight stages of register 1032.

The contents of storage register 1032 are coupled over link 1031 to companding D-A converter 19027 which supplies an analog output over line 1026 to lowpass filter 1025. Filter 1025 removes quantization noise from the audio signal and applies the resulting signal over line 1024 to summing amplifier 1021, tone detectors 1060A and 1060B and to a controlled attenuator 1161. One input of AND gate 1163 is coupled via line 1168 to the output of OR gate 1151, while a second input of AND gate 1163 is coupled via line 1067 to the Q output of a retriggerable one-shot 1065. The Q output of one-shot 1065 is normally low except during receipt of incoming address dial pulses, as will be explained below. The output of AND gate 1163 is coupled over line 1162 to the control input of controlled attenuator 1161, which contains a controlled active resistor, such as an FET, that reduces the amplitude of a tone signal output of filter 1025 to a level acceptable for human hearing and applies the attenutated tone signal over line 1164 to one input of summing amplifier 1017 so that the incoming tone signals may be delivered to the attendant's voice output circuit.

In addition to the initial decoding of received tone and voice input signals, the express orderwire interface module contains dial pulse/call and alarm signal monitoring circuitry which is capable of decoding the digits dialed or an alarm signal generated by either the local calling party or received over the fiber optic link from a remote calling party. For incoming dialed address signals from a remote terminal station, such as terminal station 12 to terminal station 10, the EOI compares the dialed digits to its own station code and signals the attendant if it determines that the call is for terminal station 10. Circuitry is also included for generating a misdialing error signal if the dialed digits are not properly dialed by either the local calling party on an outgoing call, or by the remote calling party on an incoming call. If an alarm tone is generated by either party, this signal is also detected and causes a local alarm signal to be generated at each terminal station.

As was explained above, an incoming call will contain dialed digit tone pair pulses to be eventually followed by voice signals from the remote terminal. In the configuration shown in FIGS. 24A and 24B, the dial signal monitoring circuitry is capable of handling up to one thousand addresses, using a three digit dialed decimal number addressing scheme. It should be understood, of course, that the size of the address code is not critical and may be tailored to suit the requirements of the user without departing from the basic implementation of the present invention.

Now, using the three decimal digit addressing scheme referred to above, when a call is placed, the dialed decimal digits are encoded in a dual tone format and delivered over the fiber optic link to another terminal station. In the present example it will be assumed that terminal station 10 has the three digit decimal address 010, so that using rotary dial equipment, for example, at the remote calling station, the calling party will have dialed the sequence: ten pulses–one pulse–ten pulses. Thus, at terminal station 10 there will be received a sequence of ten tone pulses–one tone pulse–ten tone pulses. As the first group of ten tone pulses are decoded and reproduced in analog form at the output of D-A converter 1027 they are filtered by low pass filter 1025 and applied to tone detectors 1060A and 1060B. The outputs of tone detectors 1060A and 1060B are coupled over respective lines 1061A and 1061B to OR gate 1151. The output of OR gate 1151 is coupled via line 1168, OR gate 1138 and line 1152 to the D input of a flip-flop 1062. Flip-flop 1062 is clocked via line 1059 from the output of a divide-by-ten counter 1058 which is coupled via line 1051 to the TAKE DATA output of MTU 1040. The TAKE DATA output from MTU 1040 provides a clock signal at 8 KHz to control the sampling rate of converter 1027, via register 1032, and counter 1958 divides this clock signal down to a value suitably less than half the sampling rate for proper tone signal monitoring. Thus, during the presence of tone pulses detected by either of tone detectors 1060A and 1060B, counter 1958 will clock flip-flop 1962 via line 1059, causing its Q output line 1063 to go low and its $\overline{Q}$ output line 1064 to go high.

Line 1063 is coupled to one input of an AND gate 1968 a second input of which is coupled over line 1066 to the Q output of retriggerable one-shot 1065. Line 1064 from the $\overline{Q}$ output of flip-flop 1962 is coupled to the input of one-shot 1065 and to the reset input of a flip-flop 1094. The $\overline{Q}$ output of one-shot 1065 is coupled via line 1967 to the clock inputs of flip-flops 1094 and 1098. The D input of flip-flop 1094 is strapped to +V, so that if line 1064 is high, flip-flop 1094 is set in response to an output signal from the $\overline{Q}$ output of one-shot 1065 on line 1067. The Q output of one-shot 1065 is further coupled to the clear input of a dialed digit counter 1070, to the clock input of flip-flop 1131 and to the trigger input of a further one-shot 1110.

The output of AND gate 1068 is coupled to the clock input of dialed digits counter 1070. Counter 1079 counts the number of pulses produced for each dialed digit and couples it contents over link 1981 to a comparator 1072. Comparator 1072 is also coupled via links 1073, 1074 and 1075 to gate circuits 1076, 1077 and 1078. Gate circuits 1076–1078 are coupled to PCD digit code links 1079–1081, respectively, the latter being hard-wired to prescribed logic levels that identify the digit address of terminal station 10. Thus, for the example chosen, link 1079 will couple the 4-bit code "1010" to gate circuit 1076, link 1080 will couple the code "0001" to gate circuit 1077 and link 1081 will couple the code "1010" to gate circuit 1078. Gate circuits 1076–1078 are sequentially enabled by AND gates 1087, 1086 and 1085, respectively, as incoming dialed digit pulses are analyzed. For this purpose flip-flops 1098 and 1101 are coupled in cascade to form a stepping circuit that is incremented for each newly-received digit as a new delayed pulse is produced by one-shot 1065. This action causes flip-flops 1098 and 1101 to selectively enable one of AND gates 1087–1085 as each new dialed digit tone pulse sequence is detected by tone detectors 1060A and 1060B. As was pointed out above, one-shot 1065 is retriggerable and produces a pair of complementary delay pulses of a suitable width in response to a trigger signal at its input. This delay pulse width is wide enough to encompass the maximum time span of a dialed digit pulse. When a sequence of pulses that make up a digit is clocked through flip-flop 1062 over line 1064, one-shot 1065 is repeatedly retriggered, thereby extending the width of the delay pulses on lines 1066 and 1067 until it times out after the last pulse of the digit. Therefore, AND gate 1068 remains enabled for the entirety of the duration of the dialed digit.

As AND gates 1087–1085 are selectively enabled, the strapped BCD code input to one of gate circuits 1076–1078 is applied over a respective one of links 1073–1075 to comparator 1072 to be compared with the dialed digit count accumulated in digit counter 1070. If a match occurs, a signal is applied over line 1132 to the D input of flip-flop 1093.

Flip-flop 1093 is clocked via line 1059 by the output of divider 1058. The Q output of flip-flop 1093 is coupled over line 1092 to one input of AND gate 1091, the second input of which is coupled to the $\overline{Q}$ output of one-shot 1065 via line 1067 as described previously. Flip-flop 1093 and AND GATE 1091 function to supply a dialed digit recognition signal for a respective dialed digit over line 1090 to a shift register 1089 when comparator 1072 has detected a digit match, but the output of comparator 1072 is prevented from being loaded into shift register 1089 until the $\overline{Q}$ output of one-shot 1065 changes state indicating that the length of time sufficient to cover the span of the last pulse of the dialed digit has elapsed.

Shift register 1089 accumulates a count corresponding to the number of decimal digits employed for a station address (three in the present embodiment) and supplies an output signal over line 1133 to OR gate 1096 upon the completion of a successful three decimal digit address comparison by address comparator 1072. The output of OR gate 1096 is coupled over line 1097 to the clock input of flip-flop 1111, while the D input of flip-flop 1111 is coupled over line 1135 and resistor 1134 to high potential (+V). The Q output of flip-flop 1111 is coupled over line 1112 to a relay driver 1114, the output of which is coupled over line 1115 to the base of a switching transistor 1119 within a relay circuit 1116. The collector of transistor 1119 is coupled thourgh the parallel connection of diode 1117 and relay winding 1118 to positive potential while the emitter of transistor 1119 is grounded. Relay contacts 1120 of relay circuit 1116 are coupled to a signalling alarm (e.g. bell) through lines 1121. The reset input of flip-flopo 1111 is coupled over line 1122 to a normally open ACKNOWLEDGE SWITCH 1123 that is depreseed by the attendant in answer to the ringing alarm signal. A ringing alarm signal is generated when flip-flop 1111 is set by a signal on line 1097 from OR gate 1096, which causes the Q output of flip-flop 1111 to go high. This signal is coupled through buffer 1114 to turn transistor 1119 on and switch the contacts 1120 of relay 1116.

The $\overline{Q}$ output of flip-flop 1111 is coupled to one input of AND gate 1108 and to AND gate 1104 via line 1106, and is used to reset various components of the dialed digit monitoring circuitry in response to an ACKNOWLEDGEMENT signal, as will be described more fully below. The output of AND gate 1108 is coupled over line 1107 to reset flip-flop 1131. The output of AND gate 1104, which is also coupled to line 1106, is coupled via line 1088 to clear flip-flops 1098 and 1101 and shift register 1089. AND gate 1104 also has an input coupled via line 1105 to the Q output of one-shot 1110. The $\overline{Q}$ output of one-shot 1110 is coupled via line 1109 to the clock input of flip-flop 1135. The D input of flip-flop 1135 is coupled to the Q output of flip-flop 1131, the clock input of which is coupled to the Q output of one-shot 1065, as explained previously. The D input of flip-flop 1131 is coupled over line 1084 to the output of AND gate 1085. When AND gate 1083 is enabled, so that the BCD code for the third digit is coupled via gate circuit 1078 to comparator 1072, the D input of flip-flop 1131 goes high so that at the change in state of the Q output of one-shot 1065, the Q output of flip-flop 1131 goes high, indicating a completion of the loading and comparison of the third digit or complete number of the station address by digit counter 1070 and comparator 1072. After a time out interval governed by one-shot 1110, flip-flop 1135 is clocked via the $\overline{Q}$ output of one-shot 1110 over line 1109. If flip-flop 1131 has been set by a recognition of three complete digits for terminal station 10, the Q output of flip-flop 1131 will have been high causing the Q output of flip-flop 1135 to go high in response to the clock pulse on line 1109. The Q output of flip-flop 1135 is coupled over line 1137 to a timing signal generator 1028. Generator 1028 produces a low frequence (2 Hz) interruption signal for a brief period of time (5–10 sec.) and applies this signal over line 1029 to one input of AND gate 1023 and over line 1029 and via inverter 1030 to clear flip-flop 1135. During the time out interval that timing signal generator 1028 generates the 2 Hz signal, AND gate 1023 interrupts the 800 Hz produced by divider 1058 over line 1059 to supply an audible tone over line 1022 to summing amplifier 1017. The purpose of the interrupted 800 Hz audio signal produced by AND gate 1023 is to provide a misdialing error audio alarm signal to the local attendant.

As was pointed out above, for the purpose of describing a working example, the dialed digit address of terminal station 10 is assumed to be the BCD address "010". This address will be strapped in BCD format with the appropriate logic levels applied over links 1079 through 1081 to gate circuits 1076 through 1078. When the initial dialed digits of an incoming call for terminal station 10 are reconstructed by companding D-A converter 1027, they are coupled through low-pass filter 1025 and the successive tones are decoded into digital pulses by tone detectors 1060A and 1060B. These pulses are coupled through gates 1151 and 1138 and applied to the D input of flip-flop 1062, which is clocked by the output of divider 1058. Flip-flop 1062 effectively removes undesired transients in the output of tone detectors 1060A and 1060B and applies the pulses as they are received to AND gate 1068. As the pulses are clocked through flip-flop 1062, the initial change in state of the $\overline{Q}$ output of flip-flop 1062 on line 1064 triggers retriggerable one-shot 1065. For the first pulse, the Q output of one-shot 1065 goes high for a prescribed period of time, (for example 200 milliseconds to cover the greatest width of any pulse within a digit that may be encountered) while the $\overline{Q}$ output of one-shot 1065 goes low for the same period of time. Incoming pulses are thereby gated through gate 1068 and counted by digit counter 1070. In addition, during receipt of the tone pair pulses, AND gate 1163 is enabled thereby inserting a resistor in the path between output line 1024 from filter 1025 and input line 1164 to summing amplifier 1017 so as to make the audio level of the tone pulses acceptable to the attendant.

The states of flip-flops 1098 and 1101 at this time are such as to initially enable AND gate 1089 and thereby gate circuit 1076 so that comparator 1072 will compare the contents of the digit counter 1070 with the strapped digit code on input link 1079. When one-shot 1065 has timed out through the last pulse of the first digit received, its Q and $\overline{Q}$ outputs change state, thereby enabling AND gate 1091. If the contents of the first digit and the first strapped digit of the terminal station match, comparator 1072 will have caused flip-flop 1093 to be set, thereby enabling both inputs of AND gate 1091 and causing an intiial pulse to be loaded into shift register 1089, as one-shot 1065 changes state.

As the next two digits are received, the above operations are repeated and the contents of shift register 1089 are advanced until three successive digits have been recognized and therefore three pulses have been loaded into shift register 1089. At this time, the contents of the third stage will cause the output on line 1133 to go high, thereby applying a signal to the clock input of flip-flop 1111 over line 1097. This sets flip-flop 1111 and thereby energizes relay circuit 1116 to cause the alarm contacts that are coupled to lines 1121 to be closed, and energize whatever circuit is coupled to the alarm contacts, such as a bell circuit. To answer a call, the attendant momentarily depresses the acknowledge switch 1123 thereby resetting flip-flop 1111 and terminating the alarm. The resetting of flip-flop 1111 further enables AND gate 1108 and AND gate 1104. Time out one-shot 1110 which was triggered by the output of one-shot 1065 eventually has its outputs change state, thereby causing flip-flops 1098, 1101 and 1131 to be reset and shift register 1089 to be cleared, so that, again, for subsequent calls the dialed digits that identify the address of terminal station 10 may be recognized and decoded, with the alarm eventually energized.

Voice signals from the calling station are coupled through low-pass filter 1025, as well as summing amplifiers 1017 and 1021 to the local orderwire output circuits to the attendant. During receipt of voice signals, the attenuating action of controlled attenuator 1161 is not activated as AND gate 1163 is disabled.

If the digits decoded by comparator 1072 have failed to match the strapped digit code for the terminal station, namely, the call was addressed to another terminal station, the output of comparator 1072 would not have caused flip-flop 1093 to be set, so that shift register 1089 would not have been loaded with three consecutive pulses identifying a satisfactory comparison for all three digits. As a result, flip-flip 1111 would not have been set and no alarm would have been generated by relay circuit 1116. Eventually, one-shot 1110 would have produced an output over line 1105 to reset the components of the decoding circuitry, just as at the end of a normal digit detection.

If the calling party does not dial a complete number then, as flip-flops 1098 and 1101 are incremented to count each dialed digit, the output of AND gate 1085 will be of such a level as to change the state of flip-flop 1131. As a result, the input to flip-flop 1135 will be of a state such that when one-shot 1110 times out, the output of flip-flop 1135 supplies a signal over line 1137 to timing signal generator 1028. Timing signal generator 1028 produces an interrupting two Hz signal over line 1029 for a period of 5-10 seconds so that AND gate 1023, which also receives the 800 Hz output of divider 1058, supplies an interrupted 800 Hz tone over line 1022 summing amplifier 1017 advising the local attendant of an incorrectly dialed number. At the end of the interrupting period, the state of line 1029 is such that inverter 1030 clears flip-flop 1135 and removes the dialing error signal tone.

ALARM MONITORING SECTION

In addition to signalling the attendant for the receipt of a sequence of dialed digits, the express orderwire inferface circuitry is also capable of detecting an alarm signal, namely a continuous tone in excess of a prescribed period of time, (for example, considerably greater than the time out period of one-shot 1065 or 200 milliseconds). Typically, the depression of the momentary switch on the attendant's console through which a call tone is provided will be on the order of one-third to one-half a second. This tone will cause a steady output to be provided on line 1064 from flip-flop 1062 so that flip-flop 1094 will be set and supply a signal line 1095 through OR gate 1096 to set flip-flop 1111 and thereby energize the alarm via relay circuit 1116. The attendant then answers the alarm by depressing the ACKNOWLEDGE switch 1123 to reset flip-flop 1111 and thereby disable relay circuit 1116, as discussed above.

The above described digit decoding and alarm monitoring section also operates to monitor the proper dialling of an outgoing call. The pulses that are applied over one of the lines 1001-1003 to pulse-to-tone converter 1004 are applied over line 1139 through gate 1138 to the D input of flip-flop 1062. The remainder of the circuitry operates in the same manner described above for incoming pulse signals applied over line 1168 to gate 1138 in response to incoming tone pulse signals.

AUXILIARY TERMINAL EQUIPMENT

Figure 25:
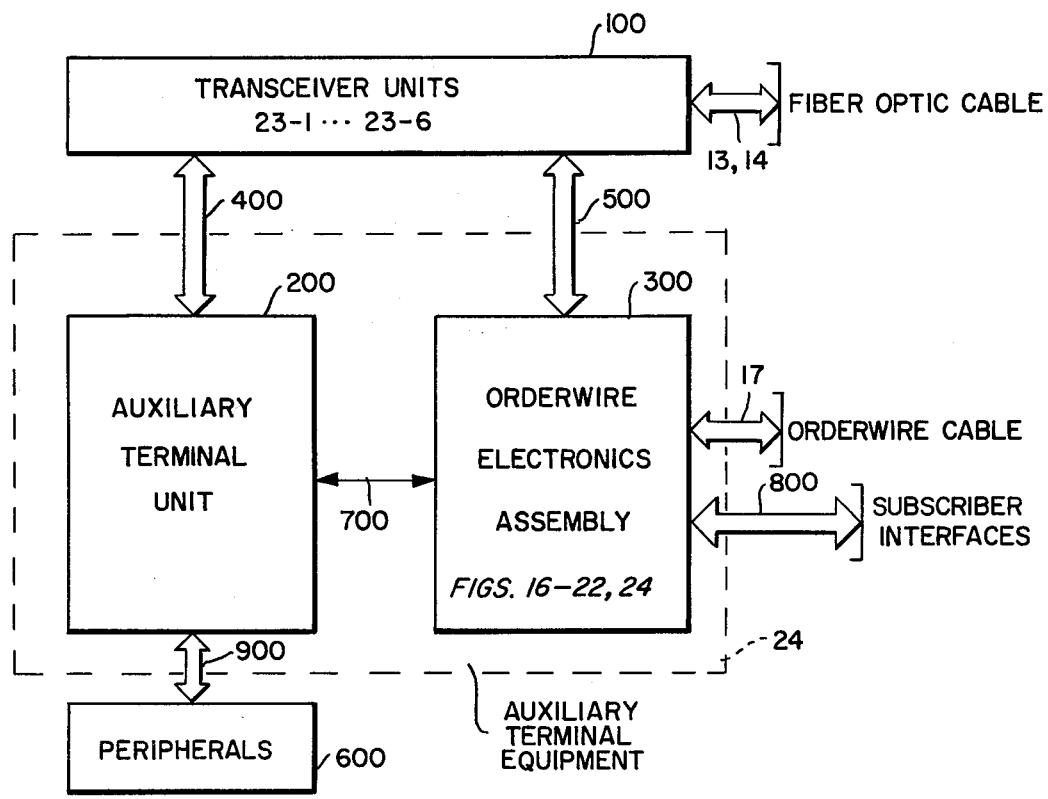
FIG. 25 is a general block diagram showing the auxiliary terminal equipment of a terminal station of FIG. 2.

As was described briefly above in conjunction with the description of the general communication network configuration illustrated in FIG. 1, and referred to with respect to the description of components of the transceiver and repeater equipment of the communication network employed in the present invention, supervisory signals for monitoring system operation and controlling the insertion of the protective channel in place of a faulty normally active channel are coupled to and from a monitoring and control subsystem termed auxiliary terminal equipment (ATE) 24. ATE 24 is a processor-based supervisory subsystem that is located in a terminal station and which is generally configured as illustrated in FIG. 25, wherein ATE 24 is shown as comprising an auxiliary terminal unit (ATU) 200 and an orderwire electronics assembly (OWEA) 300. Auxiliary terminal unit 200 is a computer-based unit containing CPU, memory and communication boards that interface with transceiver units 100 via link 400, OWEA 300 via link 700, and peripherals (such as CRT display, printer, keyboards, etc.) 600 via link 900, generating control signals and responding to parameter indication signals supplied over links 400, 700 and 900. OWEA 300 contains the orderwire subsystems described above in conjunction with FIGS. 16-24 for effecting supervisory action on the part of a terminal station attendant, as well as prescribed bit error rate fault alarm monitoring functions by ATU 200. Link 800 couples audio and status signals between the attendant's console and ATE 24. Link 500 couples express orderwire (EOW) signals between the transmit encoder and receiver decoder modules and the express orderwire interface module of the terminal station. Link 400 conveys control and parameter indication signals (such as control and status signals, protection channel switching control signals, transmit encoder module control signals, etc.) between the transceiver components of the terminal station and ATU 200. Link 700 couples the Manchester encoded messages and clock signals between the local orderwire interface module of OWEA 300 and ATU 200. Finally, link 900 couples display readout and external I/O signals between ATU 200 and selected peripheral equipment such as an associated printer, keyboard, CRT, etc. These peripheral devices and their associated interface signal lines are conventional and an explanation of the same is not necessary for an understanding of the present invention; accordingly, they will not be described in detail here. Instead, the description to follow will focus upon the make-up of the auxiliary terminal unit and its operation in conjunction with the transceiver units 100 and orderwire modules of OWEA 300, described previously.

AUXILIARY TERMINAL UNIT (FIG. 26)

Figure 26:
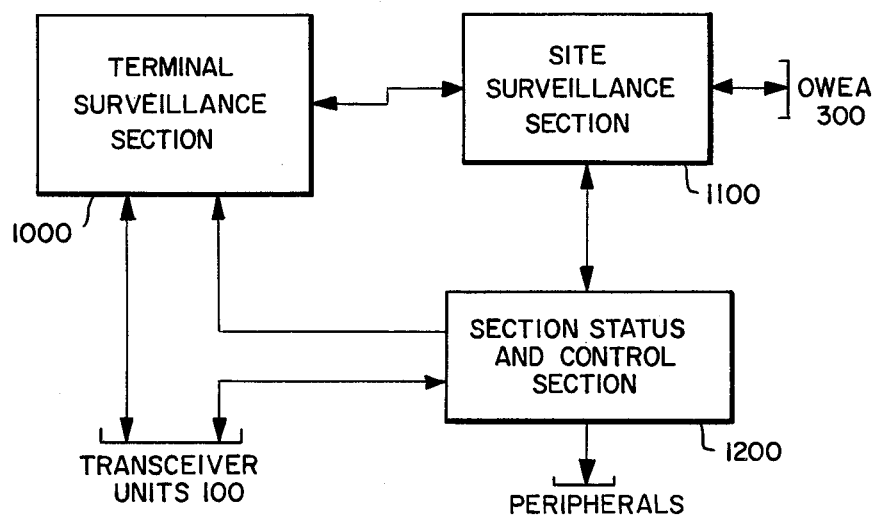
FIG. 26 is a general block diagram of the makeup of an auxiliary terminal unit of FIG. 25.

The auxiliary terminal unit, a functional block diagram of which is shown in FIG. 26, is comprised of three computer-based sections, each of which has the responsibility of performing specific tasks and has minimum interaction with the other two units. These sections are: a terminal surveillance section 1000, a site surveillance section 1100 and a section status and control section 1200. Each of sections 1000, 1100 and 1200 is a complete microprocessor-based system charged with its own autonomous tasks, programs for each processor residing in erasable programmable read only memory (EPROM), with random access memory (RAM) being provided for data storage and processor calculations. The three processors communicate with each other through dedicated eight bit buffers. A general description of each of the sections is presented below.

TERMINAL SURVEILLANCE SECTION (TSS) 1000

The main purpose of this section is to monitor the fiber optic transceiver units. As described above, fault sensors are located at critical points in the transceiver units and can be read by the TSS. A measure of channel quality (BER) is also calculated for the data on each of the channels. If either a fault is sensed or channel quality falls below a prescribed level, the TSS switches the failed channel to the protection channel. Additionally, switch inputs from an alarm panel on the attendant's console, monitored by the TSS, can cause a channel to be switched to protection. Other switch inputs can alternatively cause a channel to be "locked out" so that the selected channel will never be switched to the protection channel.

The two terminal surveillance sections, one at each end of a terminal-to-terminal (e.g. terminal 10 to terminal 12) section, exchange channel status information. When a channel problem occurs, the TSS at the receive end of the link determines if protection switching is necessary. If switching is required the receive end TSS coordinates the switching action by passing commands to its remote counterpart using the C/S overhead bits of the fiber optic channel data.

After completion of the protection switching action, both TSS's fault-isolate their respective ends of the failed link and turn on fault lamps on the defective equipment found. The receive link TSS commands the Site Surveillance Section 1100 to perform a repeater check of the failed link. Information about the protection switching action and defective modules found is passed to the Control/Status Section 1200 for distribution around the network and for display to the attendant.

Periodically or upon operator initialization the TSS may execute a test diagnostic. A principal purpose of this routine is to check the channel quality monitoring circuitry and to exercise the protection switches so as to ensure their correct operation in the event of a channel failure.

SITE SURVEILLANCE SECTION 1100

Two Site Surveillance Sections (SSS) 1100, one a part of the ATU at each end of a terminal-to-terminal section, take turns issuing commands to the various repeater sites via the orderwire cable communication link. The two SSS's determine which one has control of repeater site interrogation by exchanging synchronization data between themselves using the local orderwire. Both sections monitor the repeater site responses to determine if the other section has identified faults.

When directed by the Terminal Surveillance Section 1000, a Site Surveillance Section 1100 performs a search for a faulty repeater module. The search operates by repeatedly testing the bit error rate at the midpoint of the suspected portion until the individual site causing the problem is isolated. Similarly, when directed by the Terminal Surveillance Section 1000, a Site Surveillance Section 1100 performs a test diagnostic to determine if all the bit error rate modules in the local orderwire equipment are performing correctly.

When faults are identified by either Site Surveillance Section, that Section issues a command to the appropriate repeater site to turn on a fault indicator (e.g. an LED). Similarly, when the fault clears, the section will command the repeater site to extinguish the fault LED.

The Site Surveillance Section 1100 reports all changes in the faults and alarms at each individual repeater site to the Status and Control Section 1200 which displays the data for the system operator and distributes the data around the fiber optic communication network.

CONTROL & STATUS SECTION 1200

The Control & Status Section 1200 of the ATU allows a distant operator to monitor all status from any terminal-to-terminal portion of network and to send commands to any ATU in the system.

Whenever an operator enters a status request through associated peripheral equipment, the message is encoded and passed from one ATU to the next. This and all other commands are documented on display peripherals (e.g. line printers) throughout the system.

The Control & Status Section 1200 not only allows for control and status of any ATU, but also provides a running log of outages, failures, and maintenance actions. In addition to automatic logging, maintenance notes may be entered by the operator through his associated peripheral equipment.

ATU MODULAR CONFIGURATION (FIG. 27)

Figure 27:
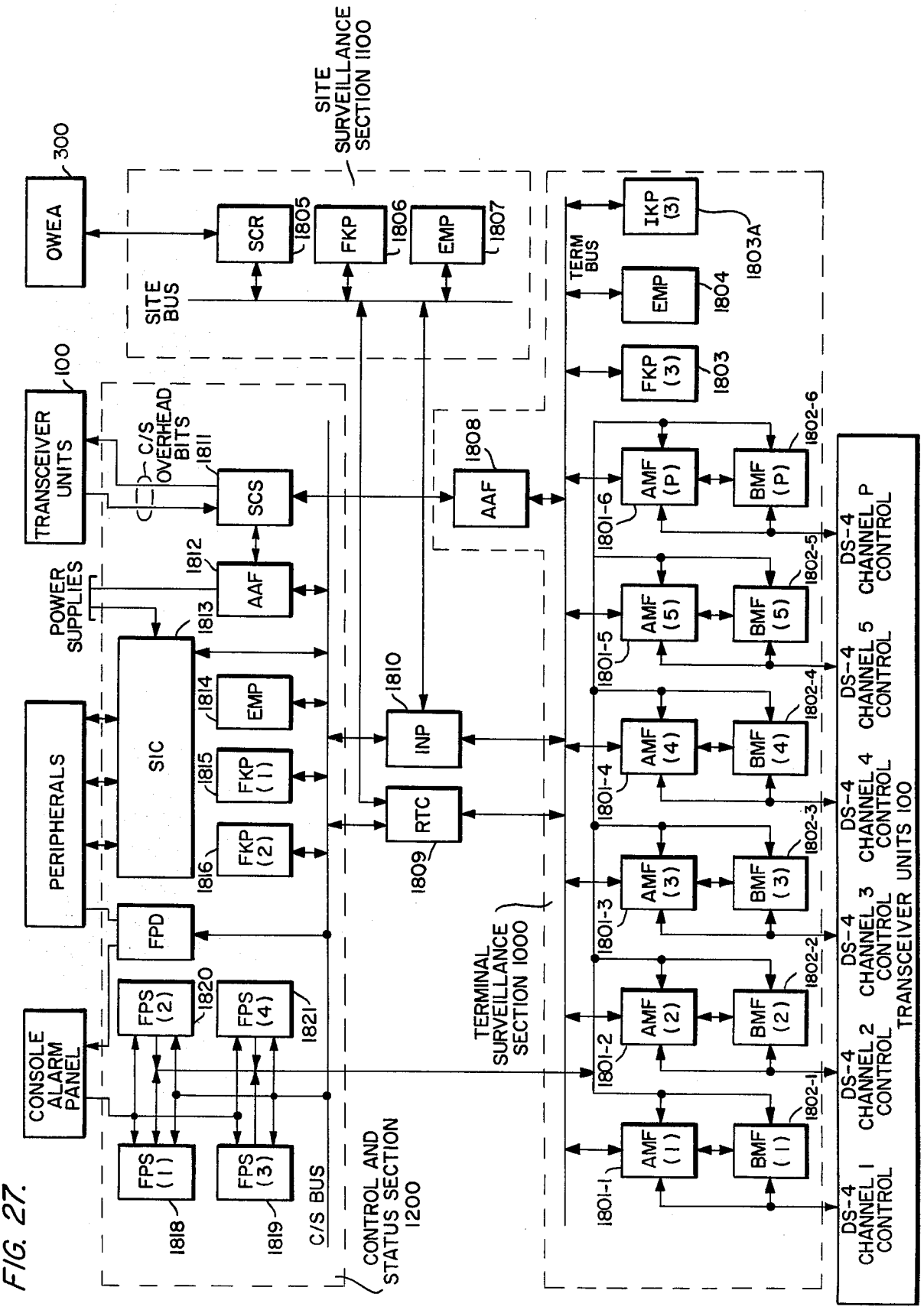
FIG. 27 is a module block diagram of an auxiliary terminal unit of FIG. 25.

In order to facilitate an understanding of the makeup of each of sections 1000, 1100 and 1200 of the ATU, a modular configuration of the ATU is schematically illustrated in FIG. 27, with broken lines surrounding the respective groups of modules of which each section is formed. In the description to follow the modular configuration of each of sections 1000, 1100 and 1200 will be discussed separately with reference to its own associated group of modules shown in FIG. 27.

TERMINAL SURVEILLANCE SECTION 1000

Terminal surveillance section 1000 is shown in FIG. 27 as including a CPU (microprocessor) module 1804, three memory modules 1803, six pairs of associated alarm monitor and fault light (AMF) modules 1801-1 . . . 1801-6 and bit error rate monitor and fault locate (BMF) modules, 1802-1 . . . 1802-6, one pair of AMF-BMF modules being coupled to a respective transceiver unit 23-1 . . . 23-6 of transceiver units 100 and an ATU Address and Fault Module (AAF) 1808.

Figure 28:
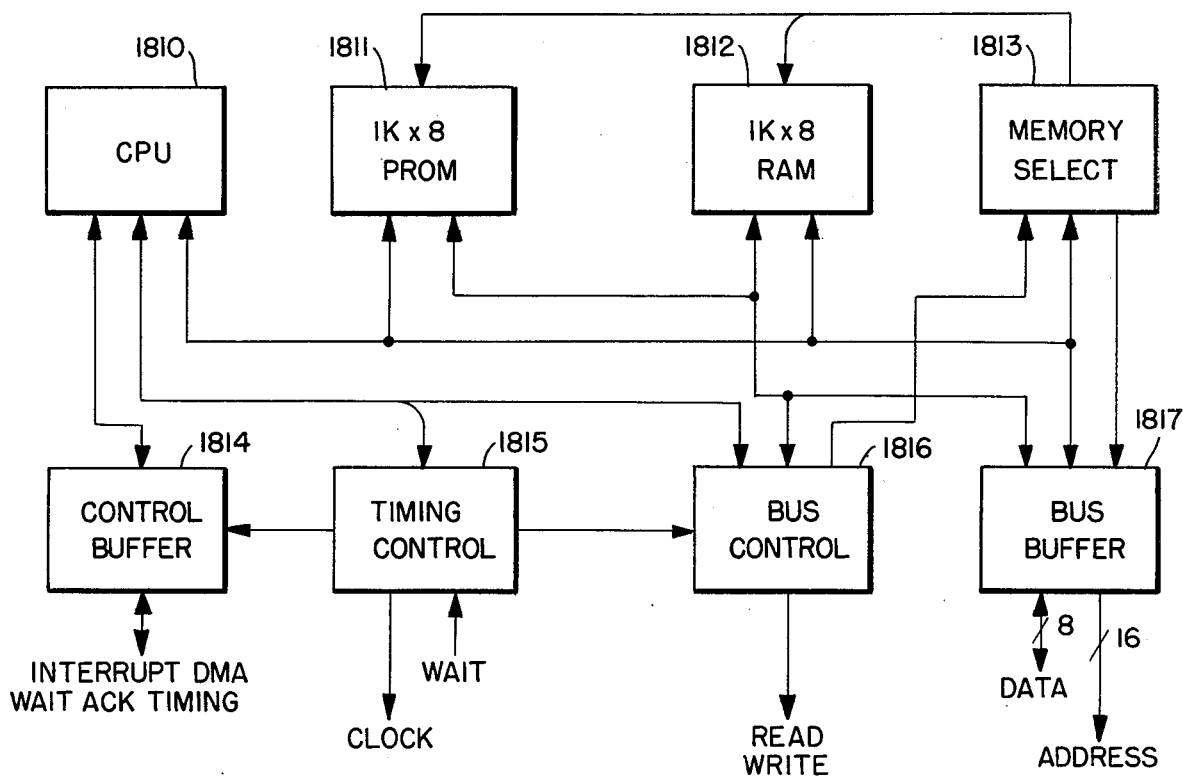
FIG. 28 is a functional block diagram of a microprocessor module of FIG. 27.

Microprocessor module 1804, the internal configuration of which will be described below in connection with FIG. 28, is the controlling CPU for TSS 1000 providing data processing capability and sequence control for the tasks performed by TSS 1000 within the ATU. Memory module 1803 is a suitably sized PROM (described below and shown in FIG. 29) that provides program memory for microprocessor module 1804. Alarm monitor and fault light (AMF) module 1801-i, a detailed description of which will be presented below in conjunction with FIG. 30, provides interrupt signals for microprocessor module 1804 whenever protection switching is to be effected, such as may occur for local alarms or by operator selection. The AMF module 1801-i also provides the ability for the TSS to read channel alarms and operator options, control module fault lights for a channel and control the protection switch select lines. Each of BMF modules 1802-1 . . . 1802-6 performs the function of monitoring the channel bit error rate. In addition, the BMF modules provide TSS 1000 with the ability to read the channel PER status, control the channel's shelf fault lights, read the channel priority (as set by the operator), control protection switch strobes, and control fault location circuitry. The details of an individual BMF module will be described below in conjunction with the description of FIG. 31.

Module pairs 1801, 1802 are further coupled to four front panel switch (FPS) modules 1818-1821 in the section status and control module 1200. Each of the memory, microprocessor and alarm monitor and fault light modules is coupled to a communication bus 1824 by way of which the components of TSS 1000 communicate with each other. As is shown in FIG. 27, the data communication configuration within each section is a distributed one with inter-section communications being directed through an interprocessor module 1810.

MICROPROCESSOR MODULE (FIG. 28)

Microprocessor module 1804 may be a commercially available processor module such as a Intel 8080A microprocessor, a module block diagram configuration of which is shown in FIG. 28.

Since the configuration and operation of this module are conventional, they will not be described in detail. Instead, only a brief explanation of the module components and interface lines that are coupled to TSS bus 1824 will be presented. In addition, rather than offer in the present description a detailed explanation of each program used by the microprocessors associated with the ATU, the supervisory tasks including monitoring and control sequences will be set forth subsequently in order that a more useful understanding of the operation and impact of the ATU may be afforded.

As illustrated in the functional block diagram of FIG. 28, microprocessor module 1804 is comprised of an 8080 CPU 1810, a timing controller 1815, and bus controller 1816 interconnected in the conventional manner. A random access memory 1812 and PROM 1811, are also provided. Memories 1811 and 1812 are selectively addressed by a memory select unit 1813 which utilizes a dual two-line-to-four line decoder and associated combinational logic to control chip enables and buffers. Buffers 1813 and 1817 provide isolation and drive for both address and data connections to other modules. A standard sixteen bit address link and eight bit data link are coupled from bus buffer 1817 to the TSS bus 1824. Bus control unit 1816 couples read/write signals to the bus, while WAIT and clock signals are coupled via timing control 1815 in a customary manner. Control buffer 1813 couples interrupt, direct memory access, wait, acknowledge and timing signals between the bus and the module.

PROM MODULE (FIG. 29)

Figure 29:
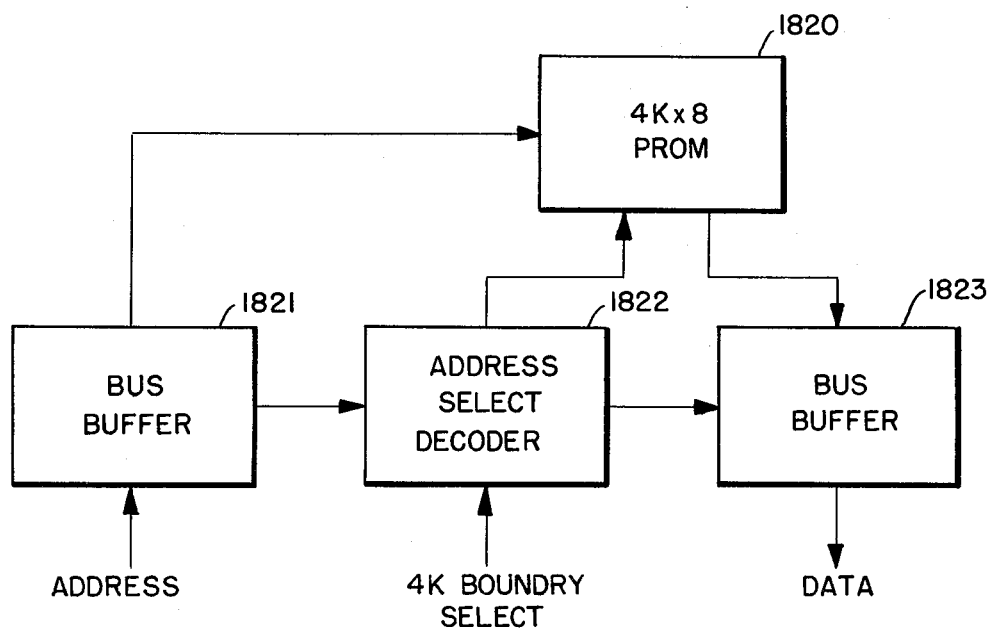
FIG. 29 is a functional block diagram of a PROM module of FIG. 27.
Figure 30:
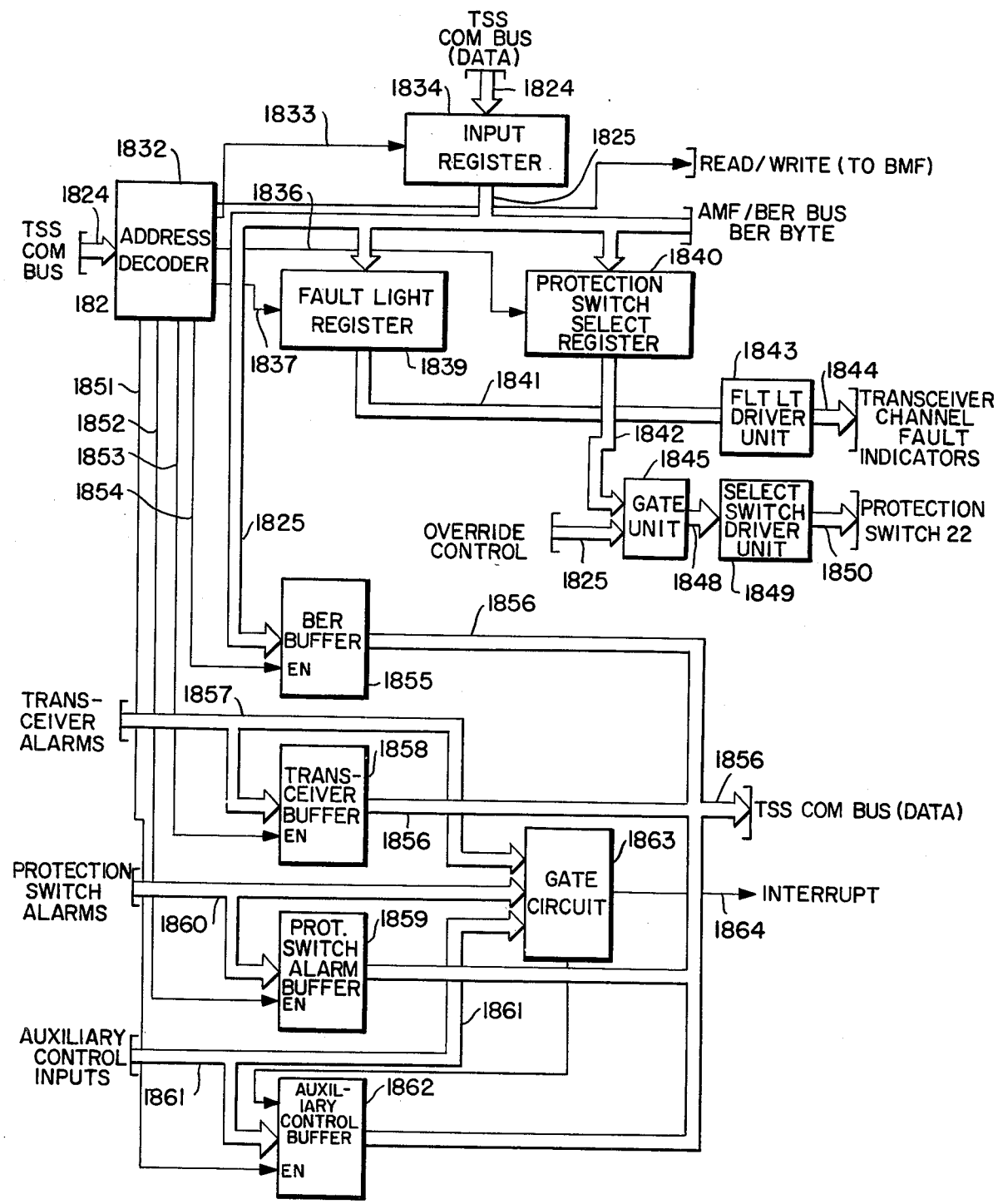
FIG. 30 is a block diagram of an alarm monitor and fault light module of FIG. 27.

The PROM module 1803, like memory module 1804, is also of conventional configuration using commercially available components interconnected as shown in the functional block diagram of FIG. 29. Memory itself may consist of a set of commercially available erasable PROM chips, such as four Intel PROMS creating a 4K×8 bit UV eraseable PROM unit 1820. Address lines from the TSS bus are coupled to PROM 1820 via an address buffer 1821. The addressing scheme is such that the memory may be addressed at any one of sixteen (hexadecimal) memory address locations between $0000_8$ to $F000_8$. The two remaining address lines $A_{10}$ and $A_{11}$ are connected to a two line-to-four line address select decoder 1822 which, when enabled by an address select signal, supplies a chip enable signal to one of the four PROM chips of PROM 1820. Data output buffer 1823 couples each eight bit data byte read out of the location in PROM 1820 addressed via buffer 1821 and address select decode 1822 into the data portion of the TSS communication bus.

ALARM MONITOR AND FAULT LIGHT CONTROL MODULE (FIG. 30)

As explained above in connection with the description of the individual subsystems of the communication network of the present invention, fault detection units (typically configured as activity threshold detectors) are incorporated into the transceiver units in the terminal stations for generating alarm signals upon the occurrence of a fault in the transceiver. The outputs of these fault detection units are coupled to the ATU which monitors the system components and is equipped to take corrective action and to couple a fault indication signal to the module which has produced the alarm. The ATU also functions to operate the protection switch select lines so that the defective channel may be replaced by the protection channel. The alarm monitor and fault light control module (AMF), individual ones 1801-1 . . . 1801-6 of which are associated with each of channels one to five and the protection channel and shown in FIG. 27, serves these functions by reading channel alarms and operator control signals and interrupting the TSS's microprocessor 1804 whenever a protection switch is to be effected, as may occur for local alarms in the transceiver units, or in response to direct operator control. The AMF also controls protection switch select lines and module fault lights for its associated channel.

Referring now to FIG. 30 which shows a schematic block diagram of an individual AMF, incoming alarm signals from the various modules and protection switch control signals from the protection switch circuits of the transceiver unit 100, together with auxiliary inputs produced by operator control switches on the attendant's console are coupled over input data links 1857, 1860 and 1861 to alarm buffers 1858, 1859 and 1862, respectively. Thus, link 1857 is coupled to receive alarm signals from the fault detection circuits in transmitter and receiver portions of its associated transceiver module, e.g., the OPR module (FIG. 12), BSC module (FIG. 13), RDC module (FIG. 14), TTR module (FIG. 9), TEN module (FIG. 10), and TPS module (FIG. 4). Link 1860 is coupled to receive an alarm signal from the output activity detector 1216 of the data delay circuit as well as the switch control leads from receiver protection switches 42A and 42B, in the receive protection unit (see FIG. 5). Auxiliary control inputs corresponding to unconditional switching instruction signals and lock out signals for inhibiting protection switching on a designated channel via control switches on the attendant's console are coupled to additional inputs available over links 1860 and 1861. The lockout switches are used to circumvent protection switching for a selected channel by the attendant. The unconditional switch inputs enable the attendant to directly switch between one of the five normally active channels and the protection channel without the assistance of the processor, as occurs in the automatic switching modes. Data links 1857, 1860 and 1861 are also coupled to a gate circuit 1863 which consists of combinational logic that logically combines selected ones of the alarm signals for the purpose of producing an interrupt over line 1864 to the processor when immediate action is necessary, such as a failure in a portion of the fiber optic channel of interest that requires the substitution of the protective channel. Processor module 1804 monitors the data coupled through buffers 1858, 1859 and 1862 and an additional BER buffer 1855 which is coupled to the data portion of the TSS communication bus. BER buffer 1855 is coupled to receive a BER count indicative of the channel BER via an AMF/BMF link 1825. The BER count is placed on AMF/BMF link 1825 by the BER monitor and fault locate control module (BMF) 1802 as will be explained below in conjunction with the description of FIG. 31.

Thus, considered as a unit, buffers 1855, 1858, 1859 and 1862 couple control data that enables the ATU to take two types of action. On the one hand the data advises the ATU of the occurrence of an alarm condition in a terminal transceiver unit or an indication of poor quality in the fiber optic data being received in the terminal station, so that corrective action such as protection switching can be taken. In this regard, protection switching verification signals are coupled from the receive protection switches to the ATU via the AMF buffers. The data may also represent operator inputs (as opposed to system fault detection alarms) to which a response is made to substitute the protection channel or prevent the substitution of the protection channel for a "locked-out" channel. In association with this control data the ATU produces indicator energization signals that are coupled to fault indicators in the modules themselves for assisting maintenance personnel in locating the defective circuits. These fault indication signals are coupled through a fault light driver unit 1843 referenced below. Control signals for effecting the operation of the transmit and receive protection switches are also coupled through the AMF module, via its select switch driver unit 1849, also referred to below. These protection switch control signals may be coupled to the AMF module via the processor communication bus 1824 or by manual override from the attendant via link 1825.

To read the BER, alarm and control data via buffers 1855, 1858, 1859 and 1862, the processor module 1804 supplies address and read enable signals via TSS communication bus 1824 to address decoder 1832. Address decoder 1832 decodes the control word on bus 1824 and, via lines 1851–1854, selectively enables buffers 1855, 1858, 1859 and 1862 to couple the respective BER, alarm and control data words over link 1856 to the data portion of TSS bus 1824 for action by microprocessor 1804. Address decoder 1832 has further decode control outputs that are coupled over lines 1833, 1836 and 1837 to input buffer 1834, fault light register 1839 and protection switch select register 1840. When enabled, input buffer 1824 couples control data on bus 1824 from processor 1804 into one of registers 1839 and 1840 in response to decoded selection signals produced by address decoder 1832 over lines 1836 and 1837. When the processor reads data via link 1856, it takes subsequent action via registers 1839 and 1840. Energization of the fault indicator in a defective module that has produced an alarm is effected via the data applied to fault light register 1839, the contents of which are coupled over link 1841 through a fault light driver unit 1843 and link 1844 to the various module indicators in the associated transceiver unit. Similarly, the control of the switches in the protection switch unit associated with the channel of interest is effected via the protection switch control data that is loaded into protection switch select register 1840. The contents of register 1840 are coupled over link 1842 to gate circuit 1845.

Gate circuit 1845 is also coupled to receive operator control signals that may be coupled to AMF/BMF bus 1825 from the front panel switches on the attendant's console. Normally, gate circuit 1845 couples switch selection control signals on link 1842 to link 1848 and select switch driver unit 1849. Driver unit 1849 amplifies and level-converts the data on link 1848 for application to the protection switch units of the associated channel in protection switch 22, to control the substitution between a normally active channel and the protection channel, under control of the ATU as described above in connection with FIGS. 5 and 6. Direct operator override is effected via gate 1845 which gives priority to operator controlled switching signals on link 1825 to control protection link substitution via protection switch 22. The AMF module also includes its own fault indicator light, not shown, which is energized under processor control in the event of a fault in the AMF module itself.

As will be appreciated from the foregoing description, the operation of the circuitry of the AMF module is such that for either monitored abnormal indication signals or operator controlled inputs that will require protection switching action, the processor module 1804 reads input data via buffer 1855, 1858, 1859 and 1860. Response instructions, such as protection switch control signals and/or fault light indication signals are selectively coupled via input buffer 1834 to 1839 and 1840, to thereby control protection switching action and fault light energization in the associated transceiver module.

BER MONITOR AND FAULT LOCATE CONTROL MODULE (BMF) (FIG. 31)

As mentioned previously, BMF module 1802 serves TSS 1000 by monitoring the bit error rate of its associated channel. This module also provides processor 1804 with the ability to read the channel BER status, control channel fault indicators, and read a channel priority that has been established via a block on connector on the motherboard.

Figure 31:
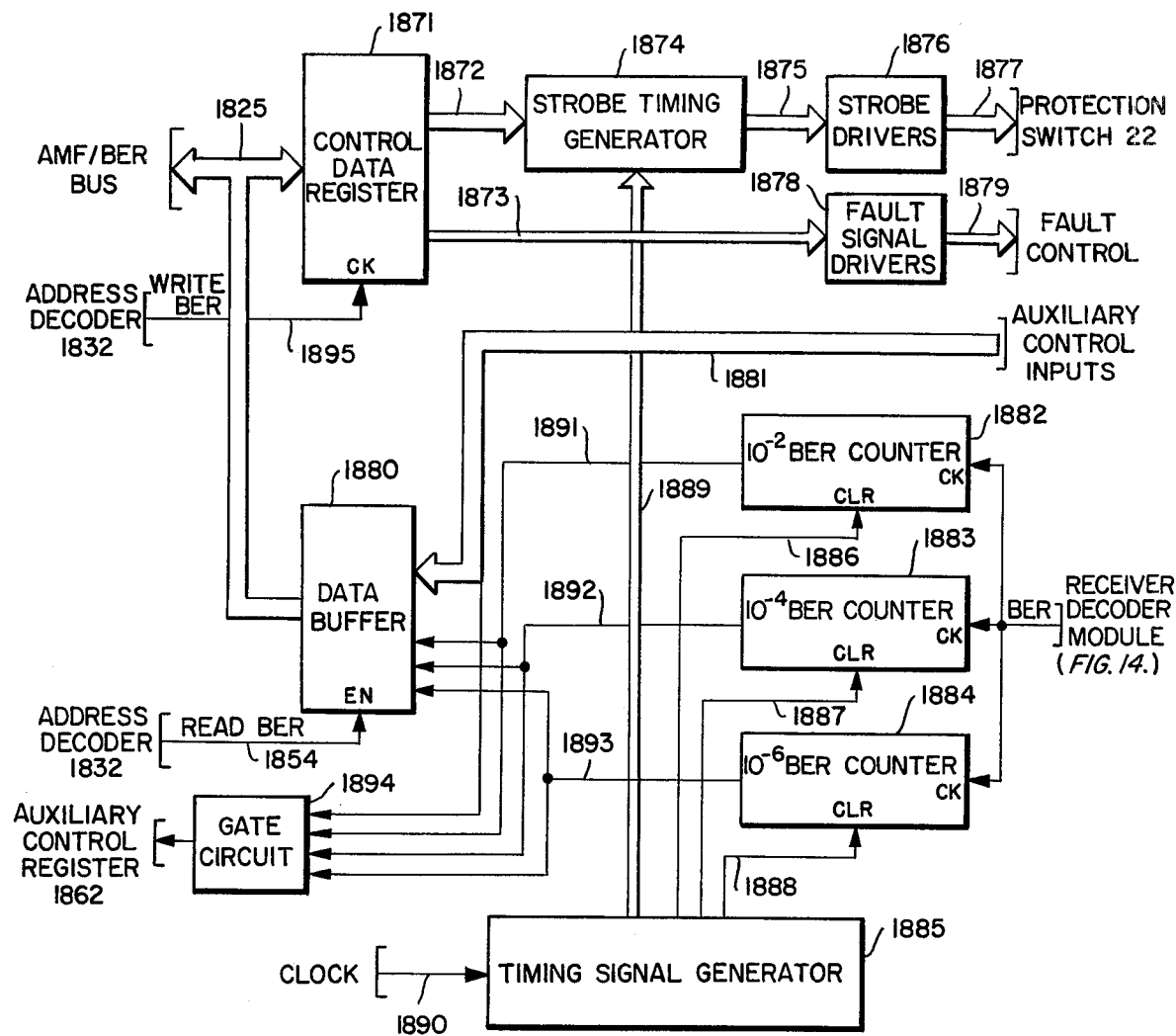
FIG. 31 is a block diagram of a BER and fault locate module of FIG. 27.
Figure 38:
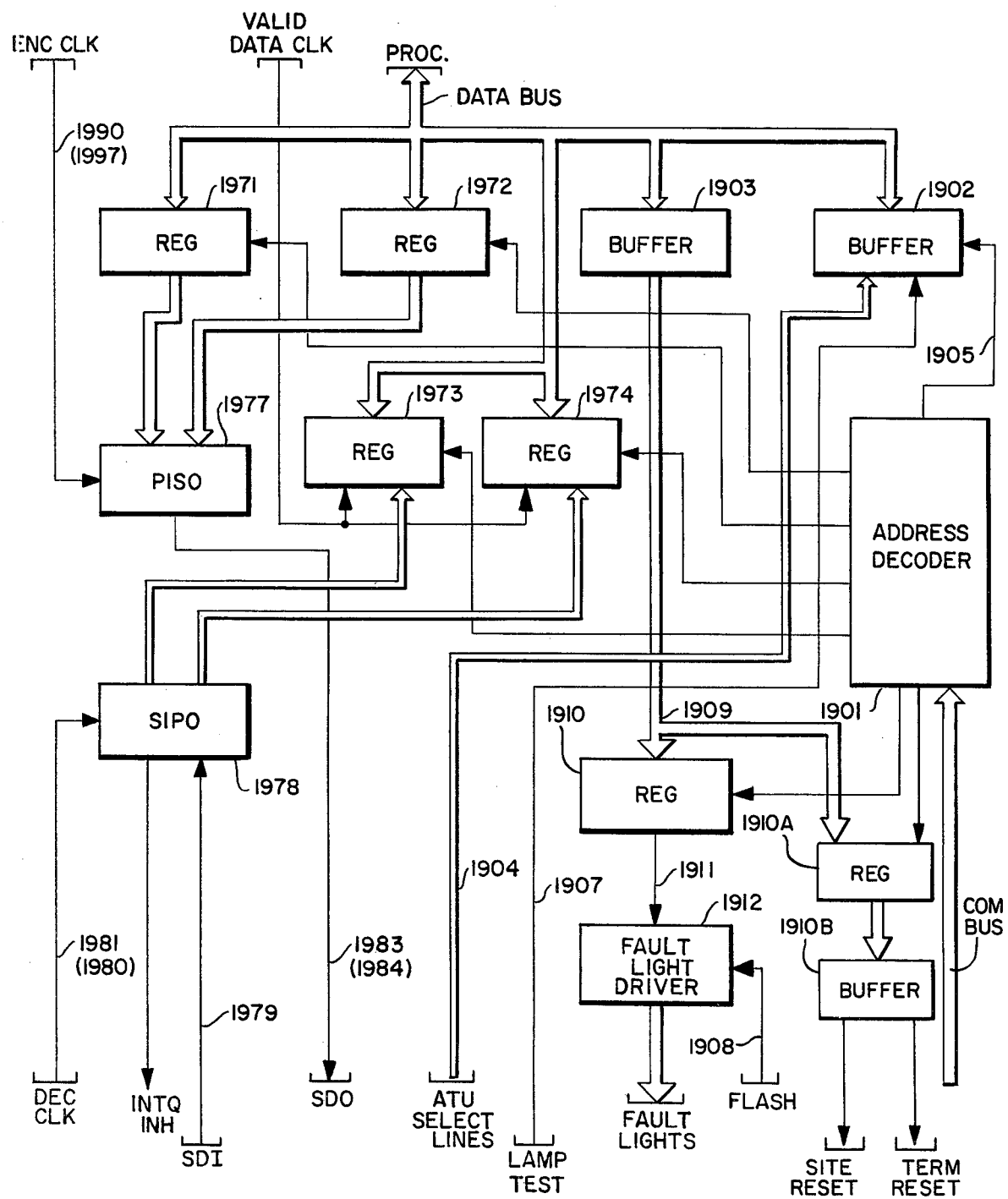
FIG. 38 is a block diagram of an ATU address and fault light module of FIG. 27.

Referring to FIG. 31 which is a schematic block diagram of a BMF module, the AMF/BMF bus 1825 is shown as being coupled to a control data register 1871 and a data buffer 1880, each of which is selectively enabled by the processor via address decoder 1832 of the AMF module (FIG. 30). Processor-generated output data to be used by the BMF module in conjunction with its protection switch and fault light energization control functions is coupled from input buffer 1834 of the AMF module over link 1825 to be loaded onto control data register 1871. Operator controlled instructions are coupled to AMF/BMF bus 1825 via link 1881 and data buffer 1880. Buffer 1880 also receives BER data from a set of BER counters 1882–1884 referenced below and couples this data on link 1825 to be accessed by the processor via BER buffer 1855 (FIG. 30). Data on bus 1825 is written to register 1871 in response to a WRITE BER enable signal on line 1895 from address decoder 1832. Similarly, data is read out onto bus 1825 by a READ BER signal applied on line 1854 from address decoder 1820. Those bits of the control data byte loaded in register 1871 that relate to the strobe and phase adjust signals applied to the transmit protection switch (FIG. 4), receive protection switch (FIG. 5) and data delay unit (FIG. 6) are coupled over link 1872 to a set of combinational logic that makes up a strobe timing generator 1874. Strobe timing generator 1874 receives a set of timing signals via link 1889 from a timing signal generator 1885 and generates strobe and phase adjust signals to control the operation of the protection switch 22 and data delay circuit 47 described previously and applies these signals over link 1875 to a set of strobe drivers 1876. Drivers 1876 amplify and level convert the signals to the proper level for application via link 1877 to the components of protection switch 22. The fault indication and control signals are applied over link 1873 to another set of drivers 1878, the outputs of which couple the signals to link 1879 for application to fault indication circuitry associated with the ATU proper, via the ATU address and fault module (FIG. 38).

Timing signal generator 1885 is comprised of a set of cascaded divider and combinational logic stages that sequentially divide down an input clock signal applied over line 1890 from the clock line of the communication bus 1824 to produce level transition signals at selected times in a straightforward manner conventionally employed in the art. These cascaded stages also produce further timing signals on lines 1886, 1887 and 1888 to determine if the respective BER counters 1882, 1883 and 1884 overflowed during their respective intervals. Each of counters 1882, 1883 and 1884 is clocked by the BER signal produced by the receiver decoder module, described previously, and is reset by a timing signal on one of lines 1886, 1887 and 1888. Since the timing signals on these lines are divided down relative to one another the contents of counters 1882, 1883, and 1884 provide a measure of the BER. More specifically, the timing signals on lines 1886, 1887 and 1888 are such that counters 1882, 1883 and 1884 will produce outputs on lines 1891, 1892 and 1893, respectively, if the BER signal from the receiver decoder module causes the counters to reach capacity before they are cleared by the respective timing signals. The delays between the timing signals on lines 1886, 1887 and 1888 are such that counter 1882 produces an output on line 1891 if the BER is not less than $10^{-2}$, counter 1883 produces an output on line 1892 if the BER is not less than $10^{-4}$ and counter 1884 produces an output on line 1893 if the BER is not less than $10^{-6}$.

Each of the BER lines 1891–1893 is coupled to inputs of data buffer 1880 and a gate circuit 1894. Also coupled to these components is a link 1881 by way of which auxiliary control inputs, such as operator intervention signals that are generated by either external switches on the front-panel or by keyboard entry from the attendant's console, are applied. The auxiliary control inputs include a hardwired set of channel priority bits through which the attendant may program channel priority with respect to access to the protection channel, and a further input coupled to the fault alarm detector in the receiver decoder module. Like gate circuit 1863 in AMF 1801, gate circuit 1894 in BMF 1802 is comprised of a set of combinational logic which selectively logically combines BER and auxiliary inputs to produce, in response to a set of defined bit conditions, a summary alarm signal that is coupled to the auxiliary control register 1862 in AMF 1801.

Thus, in a manner similar to the operation of the AMF module, the TSS processor module 1804 monitors the channel BER and alarm/control data via data buffer 1880. The output byte from data buffer 1880 is coupled over AMF/BMF bus 1825 and is applied through BER buffer 1855 (FIG. 30) and link 1856 to the TSS communication bus 1824. After acting on the received BER data word, processor module 1804 delivers a control byte to AMF/BMF bus 1825, via input register 1834 (FIG. 30) and causes this data byte to be loaded into control data register 1871. The data now loaded in control data register 1871 is coupled over links 1872 and 1873 for the requisite production of strobe, phase adjust and ATU fault indication control signals.

SITE SURVEILLANCE SECTION

Referring again to the ATU modular configuration shown in FIG. 27, site surveillance section 1100 includes a microprocessor module 1807, memory module 1806, and a site command and response module 1805, each being distributed along section communication bus 1823, to which a real time clock module 1809 and an interprocessor module 1810 are also coupled. Since the configurations of memory module 1806 and microprocessor module 1807 are identical to those of memory module 1803 and microprocessor module 1804, respectively, a description of the same will not be repeated here. Instead, the description to follow will concentrate on site command and response module 1805. For a description of modules 1806 and 1807 attention may be directed to FIGS. 28 and 29 and their attendant descriptions set forth previously.

SITE COMMAND AND RESPONSE MODULE (SCR) (FIG. 32)

The SCR module provides the communications interface between the section's communication bus 1823 and the serial data link in the local orderwire equipment, specifically, that contained in the local orderwire interface module (FIGS. 17 and 18 described above) within the orderwire electronics assembly portion of the auxiliary terminal equipment. Through SCR module 1805, the ATU can issue messages to and receive messages from the remote ATU and the repeaters along the fiber optic link.

Within the module itself there is an address decoder 1938, coupled to the address, read/write portions of the communication bus 1828 and a source buffer 1948, input data buffer 1951, output buffer 1950, and output register 1946 that are coupled to the data portion of communication bus 1823. Address decoder 1938 is coupled to the address and read/write control portion of bus 1823 to decode address and write/read instructions from processor 1807 and thereby control the coupling of data to and from the SCR and communication bus 1823. As was pointed out above in connection with the description of the encode/decode control unit of the LOI module, command and response messages sent over the orderwire cable are twenty bits in length, sixteen bits of which are coupled to and from the ATU. These sixteen bits are coupled between the processor bus 1823 and the SCR module as a pair of eight bit bytes. For receiving a pair of bytes from the processor, the SCR contains an input buffer 1951, the data output of which is coupled over link 1952 to a two byte parallel-in, serial-out register 1953. Register 1953 may be comprised of a pair of eight bit register chips connected in series, with control link 1933 coupling a pair of bits from address decoder 1938 to selectively control the loading of the successive bytes from bus 1823, buffer 1951 and link 1952 into the two register chip staged register 1953. Once loaded in register 1953, the parallel data bytes are serially clocked out over line 1955 to the SERIAL DATA INPUT of a multiplex terminal unit (MTU) 1963 by an ENCODE SHIFT clock supplied over line 1954 from the MTU. MTU 1963 is a commercially available encoder/decoder unit of the type referenced previously in the description of FIG. 18, and serves to assemble or encode the pair of data bytes from the processor bus 1823 into the proper format for transmission to the OWEA as LOW data-in and to disassemble or decode LOW data-out from the OWEA into a pair of bytes to be read out onto the processor bus.

Line 1933 from address decoder 1938 is also coupled to a timing signal generator 1922. Timing signal generator 1922 is comprised of combinational logic and cascaded divider circuit components which produce timing signals that are used to enable selected units within the module as will be explained in detail below. The basic clock frequency upon which timing signal generator 1922 operates is coupled over line 1921. Timing signal generator 1922 also produces on line 1823 an interrupt signal that is available to the processor and, on line 1923, clock used by the local orderwire subsystem.

Line 1934 from address decoder 1938 couples a load instruction signal to a fault light register 1956 the data inputs of which are coupled to data link 1952 and the contents of the respective stages of which are coupled over data link 1957 to a fault light driver unit 1958. The outputs of driver unit 1958 are coupled via link 1959 to respective fault indicator lights in the ATU modules themselves.

Link 1925 from address decoder 1938 is used to selectively control the loading of a two byte output register 1946, sixteen bit inputs for which are coupled via double byte link 1945 to the respective stages of a serial-in, parallel-out register 1944. Register 1946 is clocked by a signal on line 1931 from the VALID WORD port of multiplex terminal unit (MTU) 1963. Line 1931 is also coupled to timing signal generator 1922. Like register 1953, register 1946 may be comprised of a pair of eight bit register chips that are selectively addressed by two bits via link 1925, to sequentially read out the two eight bit bytes stored in register 1946 onto the data portion of communication bus 1823.

Address decoder output line 1936 is coupled to the enable input of a message source buffer 1948, the data inputs of which are coupled to link 1947 and the data outputs of which are coupled to the data portion of the communication bus 1823. Link 1947 is used to determine the number of repeaters in the section. Seven bits are made available for this purpose. The eighth bit designates either the uplink ATU or the downlink ATU.

Address decoder output line 1937 couples an enable signal to the output buffer 1950, selected inputs of which are coupled via link 1932 to timing signal generator 1922. Link 1932 carries data indicating a command word, data availability and whether or not MTU 1963 is busy encoding data. Buffer 1950 couples these data bits to bus 1823 for use by the processor module 1807.

As was explained above, output register 1946 couples a pair of data bytes provided over link 1945 to bus 1823. Link 1945 is coupled to the stages of a sixteen bit serial-in, parallel-out register 1944, the serial data input to which is coupled via link 1943 to the serial data output (SDO) of MTU 1963. The operation of register 1944 is controlled by lines 1942 and 1924. Line 1942 couples a signal from AND gate 1941 to clock in the serial data from MTU 1963. The inputs of AND gate 1941 are coupled to the TAKE DATA and DECODE SHIFT CLOCK outputs of MTU 1963. Register 1944 is cleared by a signal supplied over line 1924 from timing generator 1922. Timing generator 1922 also supplies an ENCODE/DECODE clock signal over line 1926 and a MASTER RESET over line 1927 to the multiplex terminal unit 1963.

Unipolar data signals (LOW data-out) from the local orderwire interface (LOI) module are coupled through amplifier 1939 and over line 1940 to the NRZ IN terminal of MTU 1963. Manchester encoded data to be transmitted from MTU 1963 is supplied over line 1960 as LOW data-in to LOI driver unit 1961 which buffers the data with respect to output line 1962. For this purpose LOI driver unit may comprise complementary open collector TTL drivers. The ENCODE ENABLE, SEND DATA and COMMAND SYNC outputs of MTU 1963 are coupled to timing signal generator 1922 over lines 1928, 1929 and 1930, respectively.

As was explained above, the SCR module provides the ATU's communication interface to the local orderwire equipment. In operation, input data to be sent as a command message is coupled to the SCR in the form of a sixteen bit word. As was described previously in conjunction with the description of the local orderwire subsystem, a command message is comprised of twenty bits, sixteen of which are supplied by the ATU. It is these sixteen bits that are coupled to the SCR. The first byte designating the address of the intended receipt and the second byte containing control data are input from the processor bus 1823 directly. As each byte is placed on the communication bus 1823, it is coupled to input data buffer 1951 and therefrom over link 1952 to parallel-in, serial-out register 1953. Address decoder 1938 decodes the address and write/read portion of the communication bus and applies a load signal on line 1933 to cause register 1953 to successively load the pair of bytes applied over link 1952. Timing signal generator responds to a signal on line 1925 and couples an ENCODE/DECODE clock to MTU 1963 over line 1926. When MTU 1963 is ready to encode and transmit a message it couples signals over lines 1928–1930 causing timing signal generator 1922 to remove the clock inhibit level from line 1935 and, in response to an encode shift clock signal on line 1954 the two bytes in register 1953 are clocked out serially bit-by-bit over line 1955 to the serial data input of MTU 1963. An encoded Manchester message is applied over line 1960 to LOI driver 1961 and applied as LOW DATA to the signal interface unit of the LOI module described previously. The status of operation of the SCR during this time is supplied to the processor over link 1932 and buffer 1950.

When the SCR is not transmitting messages to the local orderwire subsystem it remains in the idle state awaiting incoming messages from the OWEA or instructions (either for message transmission to the OWEA or fault indication functions) from the processor. Incoming OWEA messages (LOW DATA OUT) are received via amplifier 1939 and input line 1940 to the NRZ input of MTU 1963. Incoming data is coupled by MTU 1963 over line 1943 to the serial data input of serial-in, parallel-out register 1944 and clocked into the register by the decode shift clock that is coupled through gate 1941. Valid messages cause MTU 1963 to couple an output signal over line 1931, so that the contents of register 1944 are loaded into output register 1946. At the same time, the signal on line 1931 causes timing signal generator 1922 to make available, on bus 1823, a signal that may be coupled to the processor as an interrupt, as for informing the processor that the data within an incoming message is available for reading on the data bus. Once the processor had read the most significant of the two data bytes from register 1946, it couples a new address instruction code to decoder 1938, changing the state of line 1925, thereby clearing register 1946 and causing timing signal generator to remove the interrupt INTR from line 1823.

As was explained briefly above, the SCR module is also equipped with circuitry for energizing fault indicators in selected ATU modules. This secondary function is carried out through fault light register 1956 and fault light drive unit 1958. Input data and address-control commands are coupled to input data buffer 1951 and address decoder 1938, respectively. Address decoder produces a load instruction signal on line 1934 to cause the data on bus 1823 to be loaded into fault light indicator 1956. The designated light or lights are energized thereby through driver unit 1958 and link 1959.

CONTROL AND STATUS SECTION

Control and status section (CSS 1200) is shown in FIG. 27 as including a set of four front panel switch FPS modules 1818–1821 coupled to the control panel on the attendant's console, the section communication bus 1822 and to the AMF/BMF bus 1825 within TSS 1000. The front panel switch modules perform the function of interfacing data bus 1822 and AMF/BMF modules with the alarm panel switches and function select indicators on the attendant's console. Also coupled to the attendant's console panel and bus 1822 is a front panel display (FPD) module 1817. This module interfaces indicators and alarms with the communication bus. The CSS further includes two memory modules 1816 and 1815 and a microprocessor module 1814. Again, reference may be had to the detailed explanation of TSS 1000 for a description of the memory and microprocessor modules. Also included in the CSS is an ATU address and fault (AAF) module 1812. This module provides the interface between the processor bus 1822 and fault light drivers. It also interfaces the bus with ATU select lines and a lamp test input. The AAF module is coupled to system power supplies, bus 1822 and a section control and status module 1811. A serial interface control (SIC) module 1813 provides serial communications between the terminal ATU and the ATU of an adjacent terminal-to-terminal switching section, peripherals and communication bus 1822. Through the SIC module 1813, power supply conditions may also be monitored. Communications to the ATU at the opposite end of a terminal-to-terminal switching section are provided through a section control and status SCS module 1811 which is coupled to each of the transceiver units of the terminal and to AAF module 1812. This module provides the capability of automatically selecting one of the six available fiber optic links for overhead bit communication to the other terminal station. The description to follow will be directed to these modules of CSS 1200 not previously described in connection with either TSS 1000 or SSS 1100.

SECTION CONTROL AND STATUS MODULE (FIG. 33)

Figure 33:
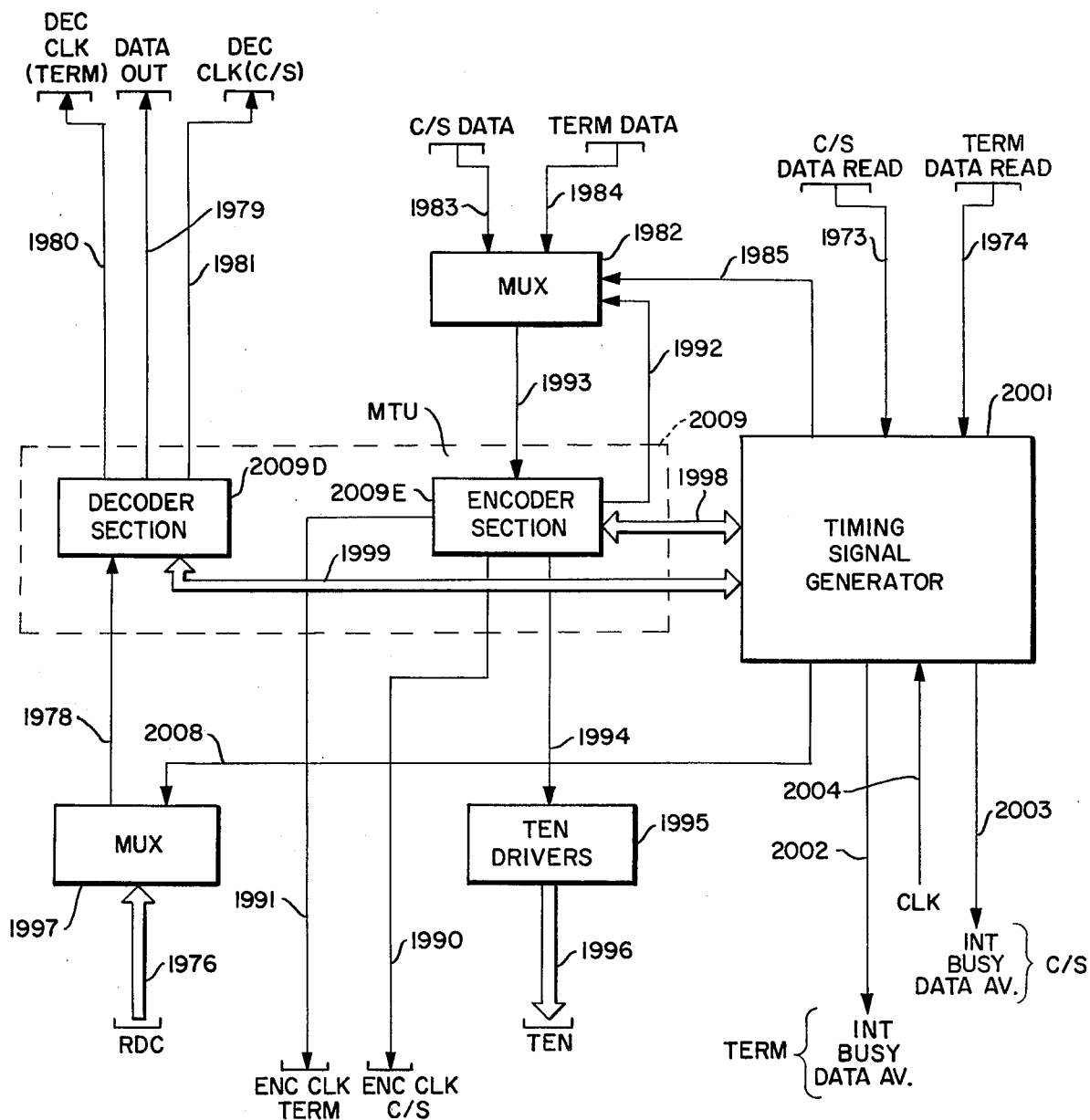
FIG. 33 is a block diagram of the section control and status module of FIG. 27.

Referring now to FIG. 33, the configuration of the section control and status (SCS) module is shown in detail. As pointed out above, it is through this module that the ATU at one terminal station communicates directly with the ATU at another terminal station using the fiber optic data links. The SCS module performs this function by encoding message data from the status and control section processor or from the terminal surveillance section processor as serial C/S bits to be inserted into the 301 Mb/s data stream by each active TEN in the terminal station's transceiver units. Messages from the control and status processor are coupled to the SCS module from AAF 1812 as command data; messages from the terminal surveillance processor are coupled to the SCS module from AAF 1808 as data words, with the most significant bit being zero. The SCS module also decodes C/S bits demultiplexed from the RDC modules of the transceiver units and assembles these into incoming message data to be coupled to the destination processor module (via AAF module 1812 or AAF module 1808).

OUTGOING MESSAGES

For encoding message data from the control and status processor or from the terminal surveillance processor, data is temporarily buffered in holding registers on AAF modules 1812 and 1808, (to be described below with reference to FIG. 38). Data is coupled to the SCS module from AAF module 1812 on line 1983 and from AAF module 1808 on line 1984 to respective inputs of multiplexer 1982. Multiplexer 1982 selects the serialized data to be encoded in accordance with a control signal on line 1994 from timing signal generator 2001 and a send enabling signal on line 1992 from the encoder section of MTU 2009. MTU 2009 contains the same multiplex terminal unit the data and control inputs and outputs of which have been described in detail previously in conjunction with other components of the system and in order to simplify the block diagram configuration of FIG. 33, the detailed connections and function labels have been omitted. In their place the MTU has been shown as an encoder section 2009 E and a decoder section 2009D.

The MTU encoder section 2009 E has a serial data input line 1993 coupled to the output of multiplexer 1982, thereby encoding data from either the control and status processor or the terminal surveillance processor. Timing signal generator 2001 is configured of suitable combinational logic and counting circuitry to control the sequences of encoding and decoding of messages by the module, following the format to be described below. The logic of timing signal generator 2001 is configured to cause multiplexer 1982, via line 1985, to give priority to messages from the terminal surveillance processor. Control and timing signals for the encoding of incoming data by MTU decoder section 2009 E are coupled over link 1998. As data is encoded into bipolar format it is coupled over line 1994 to a set of transceiver TEN driver 1995. Drivers 1995 connect the data to a level compatible with the TEN modules in the transceiver units described above in conjunction with the description of FIG. 10 and apply this data over link 1996 in parallel to each TEN module as overhead bits to be inserted into the 301 Mb/s data stream, as explained previously. For the five normally active and one protection channel embodiments presently under consideration, link 1996 contains six data lines, one for each TEN modules 102. Lines 1990 and 1991 supply encoding clock signals for the control and status processor command words and the terminal data words, respectively.

During the process of accepting and encoding of serial message data from either the control and status processor or the terminal processor MTU encoder section 2009 couples a signal over line 1998 causing timing signal generator 2001 to couple a busy signal on lines 2002 and 2003 until the encoder is ready to take new data.

INCOMING MESSAGES

Incoming C/S bits from a remote ATU are coupled from the six (corresponding to the six fiber optic channels) RDC modules 203 of the transceiver unit via link 1976, to a multiplexer 1997. Multiplexer 1997 may be comprised of a six-to-one data multiplexer addressed by a count-to-six counter that is selectively incremented by a signal on line 2008. The output of multiplexer 1997 is coupled as NRZ input data over line 1978 to MTU decoder section 2009D. As long as the quality of the incoming C/S data from the RDC of the selected channel is satisfactory, timing signal generator 2001 will respond to a VALID word signal on line 1999 from MTU decoder section 2009D and cause multiplexer 1997 to continue to monitor the same channel. A loss of quality, however, changing the state of the VALID word bit on link 1999, causes a signal to be coupled from timing signal generator 2001 over line 2008 to the control input of multiplexer 1997. This signal increments the count-to-six counter in multiplexer 1997, so that the next channel (in ascending numerical order) is then monitored. In addition link 1999 couples a signal to MTU decoder section 2009D to clear the poor quality data from the MTU and prepare it to receiver new C/S overhead bits on line 1978.

As messages are decoded, MTU decoder section 2009D couples a signal over link 1999 causing timing signal generator 2001 to couple a data available to the respective processor (via lines 2002, 2003) when a pair of overhead bytes are ready for reading by the processor. These bytes are serialized out over line 1979 to AAF module 1812 and AAF module 1808. Respective decoding clocks for terminal data and control and status data are coupled from MTU decoder section on lines 1980 and 1981.

As will be appreciated from the foregoing description, the operation of the SCS is straightforward. Overhead bits from a selected one of control and status and terminal processors are coupled via their AAF modules through multiplexer 1982 to MTU 2009. When the encoder section of MTU 2009 is ready to accept and send data, it advises the processor, via link 1998, and assembles the bytes stored in the AAF module into Manchester format and couples the data over line 1994 to drivers 1995 and thereby the TEN modules of the transceiver unit.

Incoming overhead bits from the ATU at the opposite end of the terminal-to-terminal section of the communication network are coupled via the RDC module 203 of the selected fiber optic channel, multiplexer 1997, and applied over line 1978 to MTU decoder section 2009D. MTU decodes section 2009D serially clocks the overhead bits from the remote ATU out over line 1979 to the respective AAF module. An interrupt (data available) is applied over line 2002 to the terminal processor as the two bytes are coupled to its associated AAF module 1808. Once both bytes have been read, the interrupt is removed so that new data may be read.

SERIAL INTERFACE CONTROL MODULE (FIG. 34)

As described earlier, serial interface control module (SIC) 1813 provides serial communications between the terminal station ATU and the ATU of an adjacent terminal-to-terminal fiber optic communication network. It also communicates with peripherals and a surveillance computer, as well as providing the capability of monitoring equipment power alarms. For this purpose the SIC contains a set of universal asynchronous receiver transmitter modules (commonly designated in the art as UARTs) 2033, 2034 and 2035, each dedicated to a separate external section of equipment as shown. From these UARTS respective transmit and receive line sets 2036/2039, 2037/2040 and 2038/2041 are coupled to buffers 2042 and 2044. Output buffer 2042 couples messages transmitted from the UARTs over line 2043 to the various external units to whom the messages are asynchronously transmitted, at a prescribed baud rate, while input buffer 2044 receives incoming messages over link 2044 and couples the messages to the receiver terminals of the UARTs. Each serial data message byte may be assembled to contain one eight bit intelligence byte flanked by single start and stop bits. An interrupt (or data available) bit is raised by a UART in response to an incoming message from external equipment (e.g. CRT Keyboard) via buffer 2044 to inform the processor that data is available to be read out. A transmit busy (TRBSY) bit is raised during transmission of a message by a UART to external equipment.

For interfacing data between the communication bus and UARTs 2033–2035, a data buffer 2023 is coupled to a sixteen bit parallel data link 2032 and eight bit data link 2021. The sixteen bits of link 2032 provide one byte for data to be transmitted and one byte for received data. A status buffer 2022 is coupled to a power supply status data link 2030 and to interrupt signal and transmit busy outputs of the UARTs over link 2031. The output of status buffer 2022 is coupled over data link 2021 to the data portion of the communication bus 1822.

The transmission clock for UARTs 2033–2035 is derived by a clock generator 2024 which divides a clock signal supplied over clock line portion 2025 of the communication bus to that corresponding to the baud rate of operation of the UARTs and couples the transmission clock over line 2029. For selectively coupling data between the data bus and the UARTs, an address decoder 2026 is coupled over link 2027 to the address portion of the communication bus, the decoded outputs of address decoder 2026 being coupled over link 2028 to the UARTs and buffers 2022 and 2023.

In operation, when data is to be transmitted from the serial interface control module to an external piece of equipment, such as a CRT display, printer, etc., address signals on link 2027 from the processor cause data buffer 2023 to couple the data over link 2032 to the selected UART. The message is serialized out to the external equipment via output buffer 2042. When a UART has data from external equipment (CRT Keyboard) available for the processor, it asserts an interrupt until the processor reads the UART's data. Status buffer 2022 permits the processor to read any data ready and transmit busy signals from the UARTs in one byte.

FRONT PANEL DISPLAY MODULE (FIG. 35)

Figure 35:
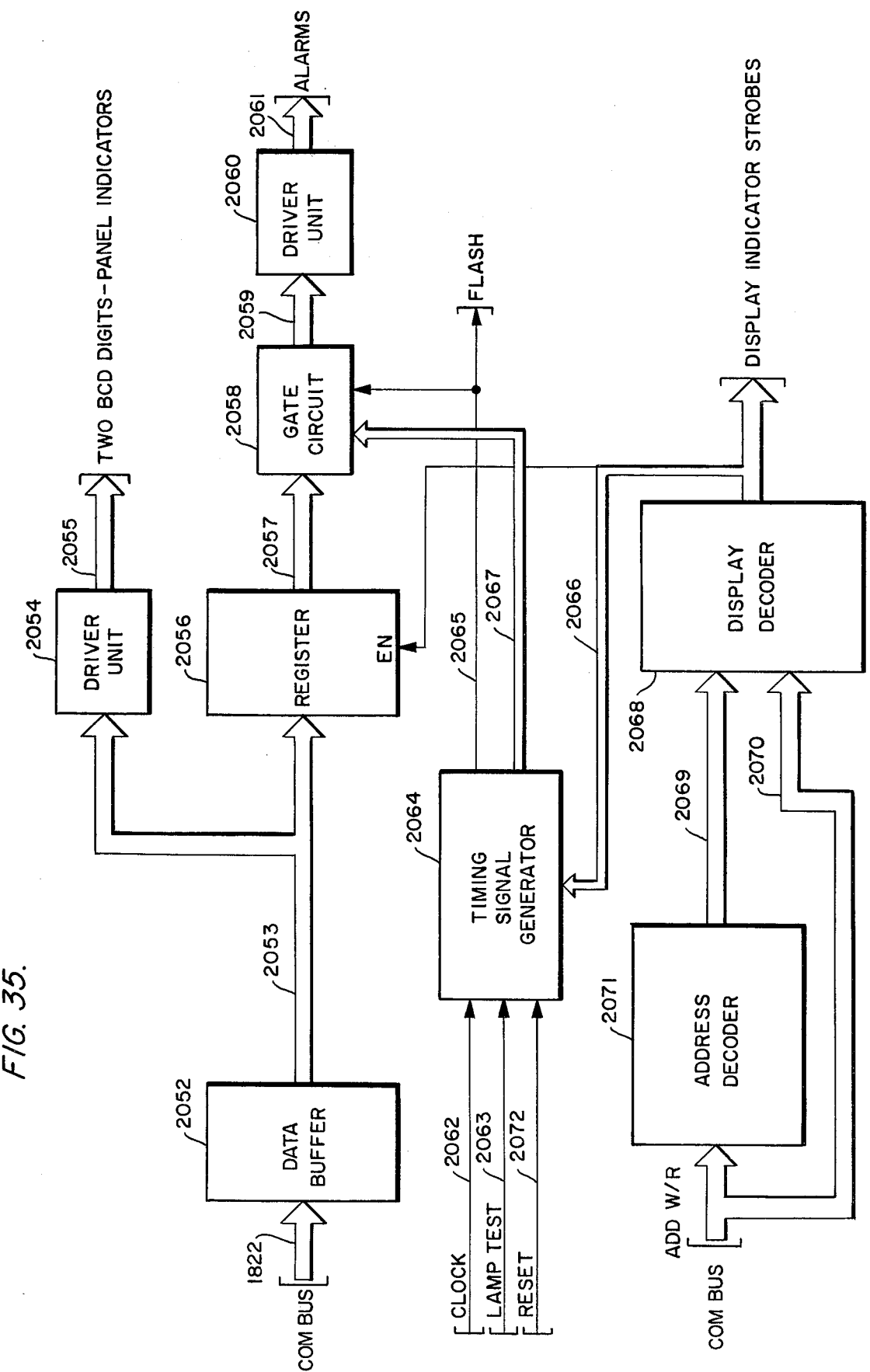
FIG. 35 is a block diagram of the front panel display module of FIG. 27.

The front panel display (FPD) module 1817, shown in FIG. 35, interfaces various indicators on the ATU alarm panel and office alarm signals with the microprocessor data bus. A detected fault is indicated by energizing a respective alarm panel indicator and activating office alarms. To facilitate an understanding of the function of the front panel display module (FIG. 35) and the front panel switch module (described below with reference to FIG. 36), reference may be had, as the situation arises, to FIG. 37 which shows an exemplary layout of the various indicator lamp and switch hardware that forms a part of the control panel at the attendant's console.

Referring now to FIG. 35, data for activating the front panel alarm indicators is delivered from the processor over the communication bus 1822 to input data link 2053 through a data buffer 2052 and onto data link 2053. Eight bit data link 2053 is coupled to a driver unit 2054 and to a storage register 2056. The output of driver unit 2054 is coupled over a pair of BCD numerical indicator conductor sets making up link 2055, to the various indicators on the alarm panel of the attendant's console.

The contents of storage register 2056 are coupled over link 2057 to a gate circuit 2058 which, under control of enabling signals on link 2067, selectively gates the data bits on link 2057 onto link 2059 to alarm indicator driver unit 2060. The output of driver unit 2060 is coupled over link 2061 to various alarm indicators on the alarm panel. Timing signal generator 2064 is comprised of combinational logic that responds to clock, lamp test, and reset on links 2062, 2063 and 2072 and decoded fault and register clock signals on link 2066 and controls the selective gating of the display data signals on line 2057 to the appropriate alarms.

Address decoder 2071 and a display decoder 2068 are coupled to the address portion of the communication bus 2070. The outputs of address decoder 2071 are coupled over link 2069 to strobe inputs of decoder 2068 which decodes the three LSBs of the address bus and selects one of the outputs of decoder 2971 to strobe the displays. Timing signal generator uses a slow (1 Hz) clock on line 2062 to produce an indication flash signal on line 2065.

In operation, whenever an alarm signal is asserted in response to the output of a fault detection circuit, as explained previously, the processor outputs data in link 2051 to control the energization of an alarm. The contents of the address bus define the indicator to be activated. Each display unit is of the type having an internal storage capability, (e.g. input latch) so that data may be stored in a pair of display units for a given strobe from address decoder 2071. The lamp test input line 2062 is ORed via timing signal generator 2064 and gate circuit 2058 with selected outputs of register 2056, to test prescribed alarm indicators. Line 2072 is coupled to a reset switch on the attendant console to manually terminate indicator flashing controlled by line 2065 at the 1 Hz repetition rate.

FRONT PANEL SWITCH MODULE (FIG. 36)

Figure 36:
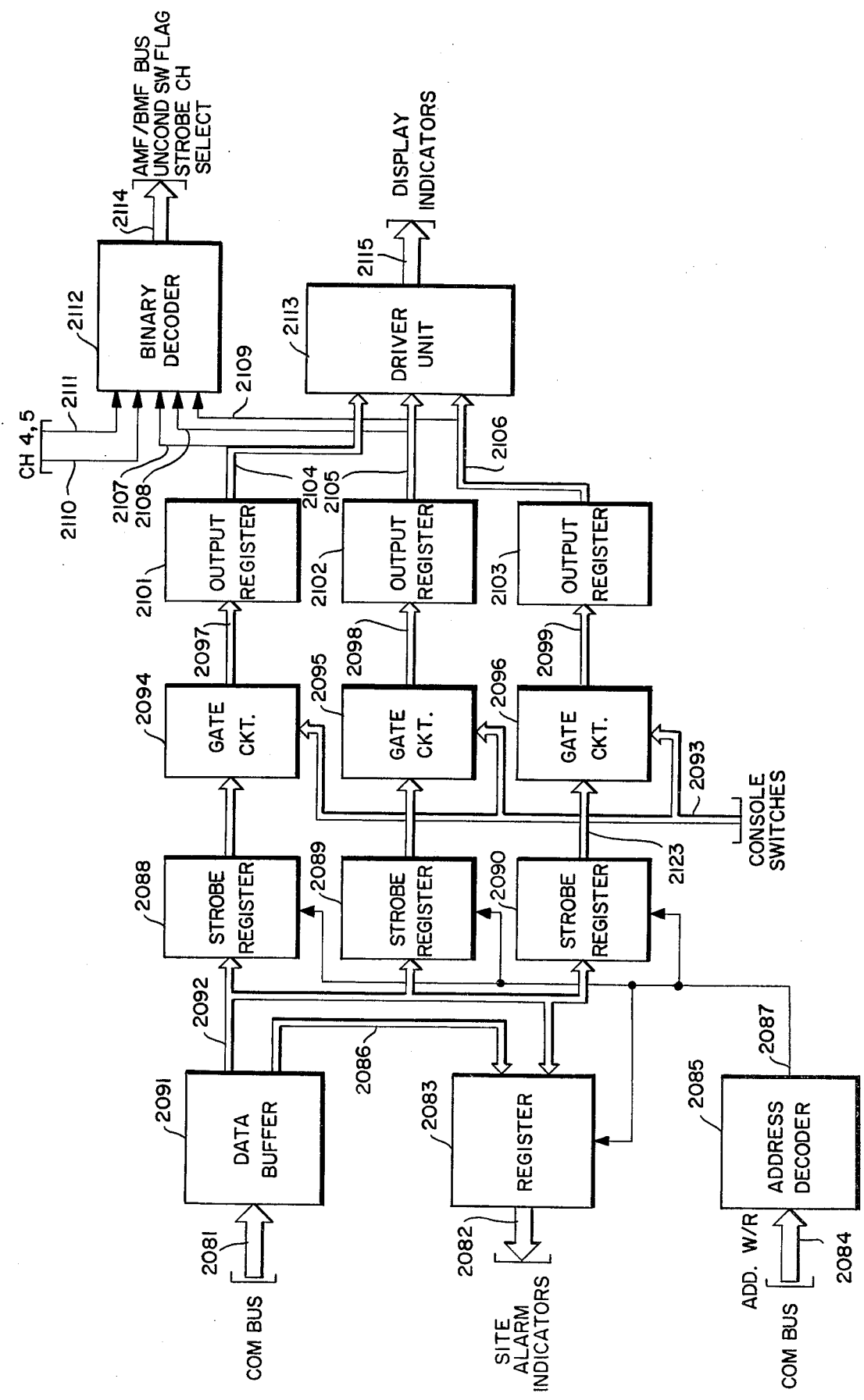
FIG. 36 is a block diagram of a front panel switch module of FIG. 27.

As shown in FIG. 27, the section status and control section 1200 of the ATU contains four front panel switch (FPS) modules 1818-1821, coupled between the processor bus 1822 and the alarm panel switches (FIG. 40) on the attendant's console. These modules are also coupled to the function select indicators on the console and the AMF/BMF bus of TSS 1000. A detailed schematic block diagram of an individual FPS module is shown in FIG. 36. As is the case with the various modules of the sections of the ATU, each FPS module contains a data buffer and an address decoder coupled to the communication bus. The data portion of the bus is coupled over eight bit data link 2081 to input data buffer 2091, while the address and write/read portions of the bus are coupled over a link 2084 to address decoder 2085. The decoded outputs of address decoder 2085 are coupled over link 2087 to the control terminals of a set of strobe registers 2088, 2089 and 2090 and to an output storage register 2083. The inputs to these registers are coupled to the four LSB's of the data word via link 2092. Link 2092 is also coupled to the four LSB stages of output register 2083. The outputs of register 2083 are coupled over data link 2082 to the site surveillance parameter indicators on the alarm panel of the attendant's console. The four MSBs of the data word are coupled over link 2086 to output register 2083.

Each four bit half word stored in strobe generators 2088-2090 is coupled over a respective data link 2121-2123 to gate circuits 2094-2096. Gate circuits 2094-2096 selectively steer the data in registers 2088-2090 to the stages of a set of output registers 2101-2103 via links 2097-2099 in response to control signals supplied from the switches on the attendant's console. The control switches (shown in FIG. 37), which designate various manual operation conditions that the attendant may supervise and implement, such as unconditional switching between a normally active channel and the protection channel, hitless switching, channel lockout, etc. are coupled to line 2093.

Depending upon which switches have been operated by the attendant, gate circuits 2094-2096 will selectively couple the contents of strobe registers 2088-2090 to output registers 2101-2103. These registers contain control data words for fiber optic channels one to three and channels four and five, and the protection channel. The channel data outputs are coupled through driver unit 2113 and over link 2115 to display indicators on the alarm panel to indicate manual mode selection, as designated by switching signals on switch input link 2093 in response to operation of control switches by the attendant.

An additional unit, binary encoder 2112, is coupled to receive the outputs of register 2101-2103 for channels one to three and those of another one of modules 1818-1821 for channels four and five and the protection channel to be used in protective switching via data link 2114. Data link 2114 is coupled to the AMF/BMF bus, discussed previously, to supply the attendant manual override signals to the AMF and BMF modules (see FIGS. 30, 31) and thereby control the operation of the protective switching units of the transceiver, in the manual mode.

ATU ADDRESS AND FAULT MODULE (FIG. 38)

The ATU Address and Fault Module (AAF), a schematic block diagram of which is shown in FIG. 38, provides the interface between the processor communication bus and fault light drivers for the ATU fault lights in the various modules of control and status section 1200; it also interfaces the bus with field programmable ATU select lines and a lamp test line. Through the AAF, the processor module can indicate fault conditions in the CSS, determine the ATU address and test the lamp test line. In addition, the AAF buffers data between the section control and status module (SCS) 1811 and the processor buses for sections 1000 and 1200.

Referring now to FIG. 38, AAF 1808 is shown as containing an address decoder 1901, buffers 1902 and 1903, storage register 1910 and fault light driver circuit 1912. Address decoder 1901 is coupled to the read, write and address portions of the communication bus while buffers 1903 and 1902 are coupled to the data portions of the bus. Buffer 1903 couples input data on the data bus to storage register 1910 via eight bit data link 1909, while buffer 1902, when enabled by address decoder 1901 via line 1905, couples seven ATU select data bits on link 1904 and a lamp test bit on link 1907 to the data portion of communication bus. The data stored in register 1910 in response to a write signal on line 1906 from decoder 1901 represents fault indication data to be supplied to designated CSS fault indicators. The contents of storage register 1910 are coupled over link 1911 to a fault light driver circuit 1912 which comprises a set of eight OR-gate driver circuits the respective outputs of which are coupled over link 1912 to fault indicators (not shown) in CSS modules in the ATU cabinet. These fault indicators are used by the ATU to indicate faults within the CSS 1200 of the ATU proper. Lamp test line 1907 is logically OR-ed with each fault data bit on link 1911. A further line 1908 couples a pulsing signal that may be selectively logically AND-ed with the outputs of the OR gates of driver circuit 1912 to provide a flashing indication with respect to prescribed portions of the system. For example, a basic equipment failure in the ATU, such as in the power supply for the unit, may advantageously be coupled with line 1908 to bring a power failure to the immediate attention of the terminal operator.

Figure 34:
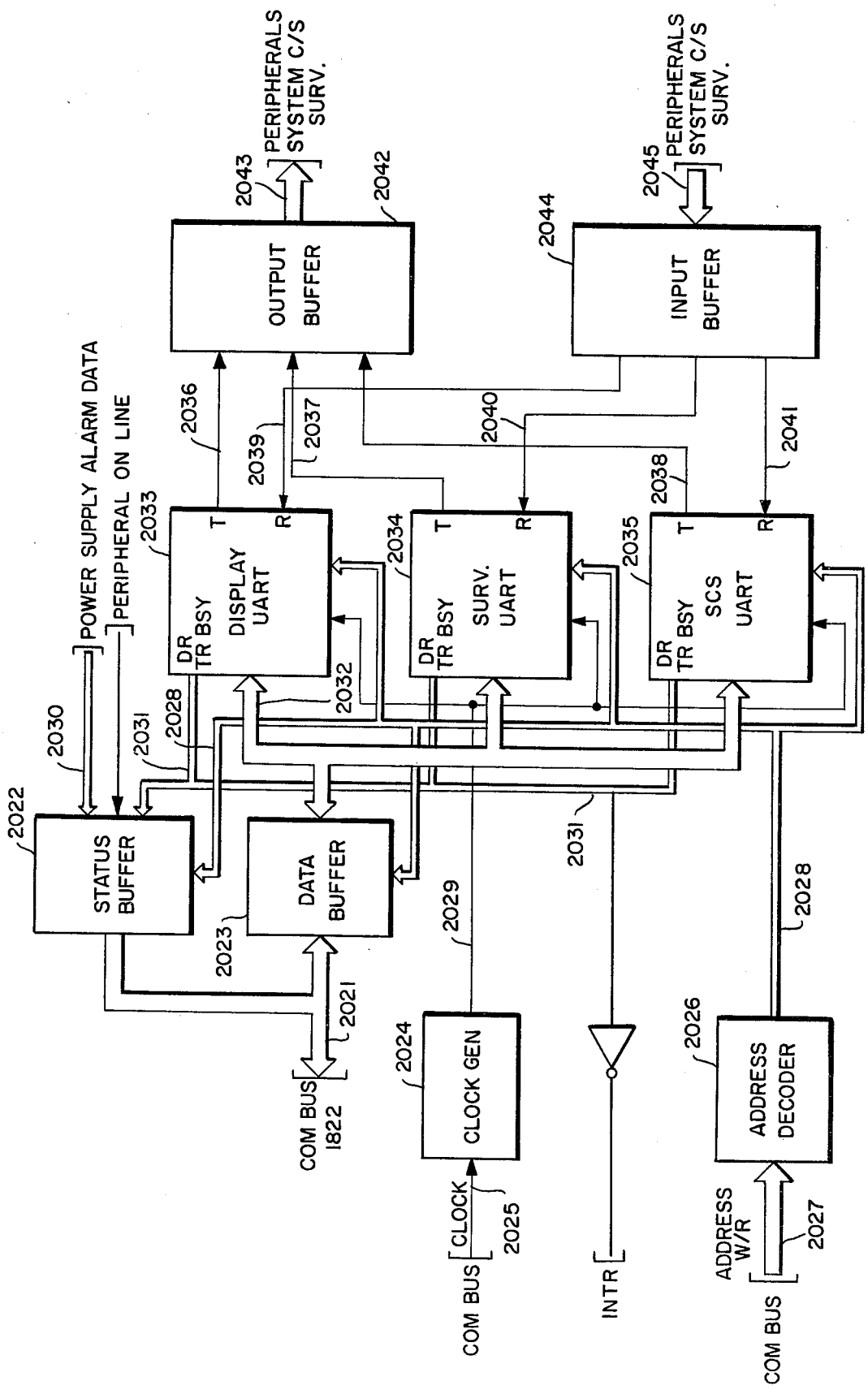
FIG. 34 is a block diagram of the serial interface control module of FIG. 27.

The AAF module further includes sets of holding registers for buffering data between the SCS module (FIG. 34) and the processor bus in a respective one of sections 1000 and 1200. For this purpose data from the processor to be coupled to the SCS module for transmission of overhead bits in the fiber optic data stream is coupled over the data bus to a pair of eight bit registers 1971 and 1972. These registers are loaded under control of address decoder 1901 and the two bytes are serialized by sixteen bit parallel-in, serial-out register 1977 in response to an encode clock on line 1990 (1991) for delivery to multiplexer 1982 via line 1983(1984). The most significant bit is forced to be a one when dummy data is serialized for channel evaluation only.

Incoming messages in the form of serial data from the SCS module are coupled over line 1979 to a sixteen bit serial-in, parallel-out register 1978. The data is clocked into register 1978 by the decoding clock from MTU decoder section 2009D on line 1981 (1980). The two bytes of received data are loaded into a pair of eight bit tri-state registers 1973 and 1974. These two bytes of data are successively read by the processor over the data bus in response to read enable signals delivered by address decoder 1901 upon its decoding read instruction signals on the address portion of the communication bus. The control and status processor resets the terminal processor and the site processor via reset register 1910A and associated buffer 1910B if these processors are found inactive.

INTERPROCESSOR MODULE (FIG. 39)

Coupled to each of the processor communication buses 1822, 1823 and 1824 of the respective sections of the ATU is an Interporcessor Module (INP) which provides single byte assynchronous data communications between the three ATU processor sections. In addition, the INP module monitors microprocessor activity.

Figure 39:
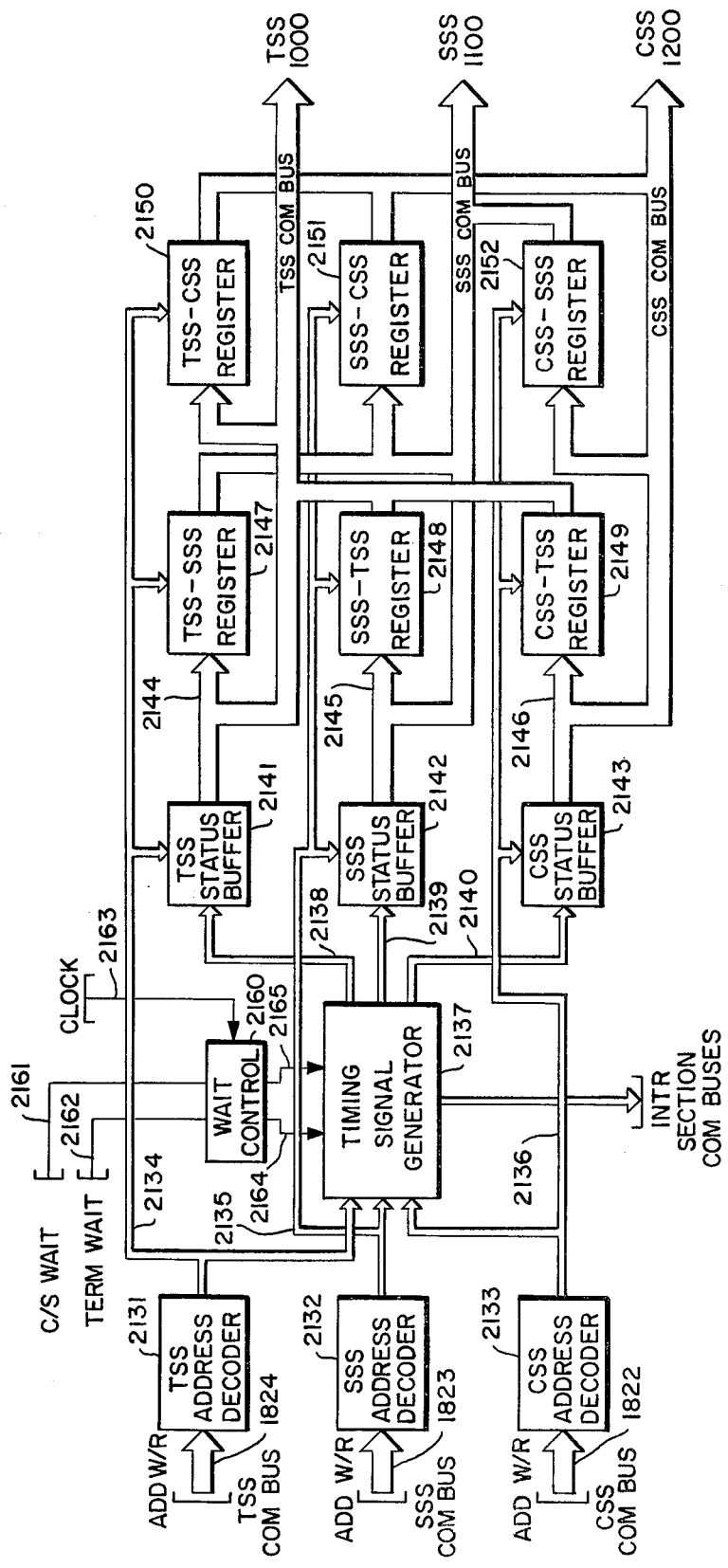
FIG. 39 is a block diagram of the interprocessor module of FIG. 27.

Referring now to FIG. 39, the communication bus of each section of the ATU has its address portion coupled to a set of address decoders 2131, 2132 and 2133, respectively decoding address information from the terminal surveillance section 1000, site surveillance section 1100 and status and control section 1200. The data bytes on the communication bus are coupled to register pairs for each section, the outputs of the registers being coupled to the respective data buses of the other two sections for whom a data communication is intended. Thus, connected to communication bus 1824 of the terminal surveillance section 1000 is a data link 2144 for coupling data from the TSS processor bus 1824 into registers 2147 or 2150 under control of the decoded outputs of address decoder 2231 by way of link 2134. Similarly, a site surveillance section register pair 2148 and 2151 is coupled to the site surveillance communication bus 1823 by way of data link 2145. When data from the site surveillance section 1100 or the control and status section 1200, address decoder 2132 decodes the designated address information and applies control signals over control link 2135. Finally, register pair 2149, 2151 is associated with the control and status section 2100, with data link 2146 being coupled to communication bus 1822. CSS address decoder 2133 supplies control signals over link 2136 to select either register 2149 or register 2152 depending upon for whom a communication from the control and status section 1200 is intended.

The Interprocessor Module further includes a set of status buffers 2141, 2142 and 2143 controlled by the outputs of the address decoders 2131–2133 and receiving activity indication signals from a timing generator 2137 by way of links 2138, 2139 and 2140, respectively. Timing signal generator 2137 is coupled to the outputs of the address decoders by way of links 2134, 2135 and 2136. Generator 2137 is comprised of combinational logic and a set of pulse generators that produce enabling and inhibiting representative signals for the respective sections, which signals effectively govern the selective addressing of the buses and coupling of the contents of the buses between the respective sections. Since the particular implementation of the timing signal generator may take various forms, a detailed circuit description of the generator will not be set forth; instead, the operation of the system and the contribution of the timing signal generator will be explained. Timing signal generator also includes three program timers dedicated to each respective section 1000, 1100, and 1200 to monitor its executive program for activity. A wait control circuit 2160, which may contain suitable combinational logic such as clocked flip-flop and gate circuitry, is coupled to receive respective C/S wait and terminal wait signals from sections 1200 and 1000, respectively. The outputs of wait control circuit 2160 are coupled over lines 2164 and 2165 to the program timers dedicated to the C/S processor and the terminal processor, respectively. In response to signals on lines 2161 or 2162, wait control circuit triggers the dedicated program timer when the processor (either C/S or terminal) is halted, thus making the corresponding processor active and preventing it from being reset by the other processor. From this description one skilled in the art can proceed to effect a straightforward implementation of the timing signal generator to conduct the operation described.

Data and address signals from the processors to be directed to other processors are made available on the communication bus and applied to the set of three address decoders 2131–2133 and registers 2147–2152. Let it be assumed that the terminal surveillance section 1000 wishes to communicate with the site surveillance section 1100. Address decoder 2131 will decode the contents of the address portion of the communication bus 1824 and supply decoded information over link 2134 to enable the loading of register 2147 and inhibit the loading of register 2150. Timing signal generator 2137 then asserts a busy signal which is applied to the TSS buffer 2141 to be read by the TSS section 1000. Similarly, site surveillance section status buffer 2131 receives a data available signal and a signal identifying the source of the message, so that site surveillance section 1100 can proceed to read data link 2145 which is coupled to register 2147. When the microprocessor module 1807 in the site surveillance section 1100 reads status buffer 2131, it is advised of the busy and data available status of its own two interfaces and the activity of the other two processor sections. Once the site surveillance section 1100 has read out the data byte in register 2147 transmitted from the terminal surveillance section's processor 1804, it couples a signal through its associated address decoder 2132 to advise the timing signal generator 2137 that the information from the terminal surveillance section 1000 has been read, whereby the busy and data available line status signals can be reset.

In a similar manner, for data transfer between the other modules, selective enabling and inhibiting of the data registers is effected through the timing signal generator 2137. Generator 2137 further includes a timeout circuit associated with the respective sections to monitor the activity of the respective sections. This information is passed on the status buffers 2141 through 2143 and is readout as part of the status bytes by the respective sections. An additional link 2161 couples a data available or interrupt signal directly to each section processor when a communication is directed to it.

REAL TIME CLOCK MODULE (FIG. 40)

Like interprocessor module 1800, Real Time Clock Module (RTC) 1809 is coupled to the communication bus of each respective section of the ATU, the RTC providing a common real time clock for these sections. For this purpose the RTC module includes a clock section and an interface section. The clock section is comprised of a series of cascaded divider sections that divide the basic system clock frequency 2.048 MHz down to timing increments for producing respective real time signals representative of elapsed time in seconds, minutes, hours and days. The interface section contains adders, decoders and buffer units for coupling address, read/write and real time data signals between the respective processor sections and the RTC module. Through this interface section the minutes and hours counters of clock section 2250 can be preset by control and status section 1200 of the ATU.

Figure 40:
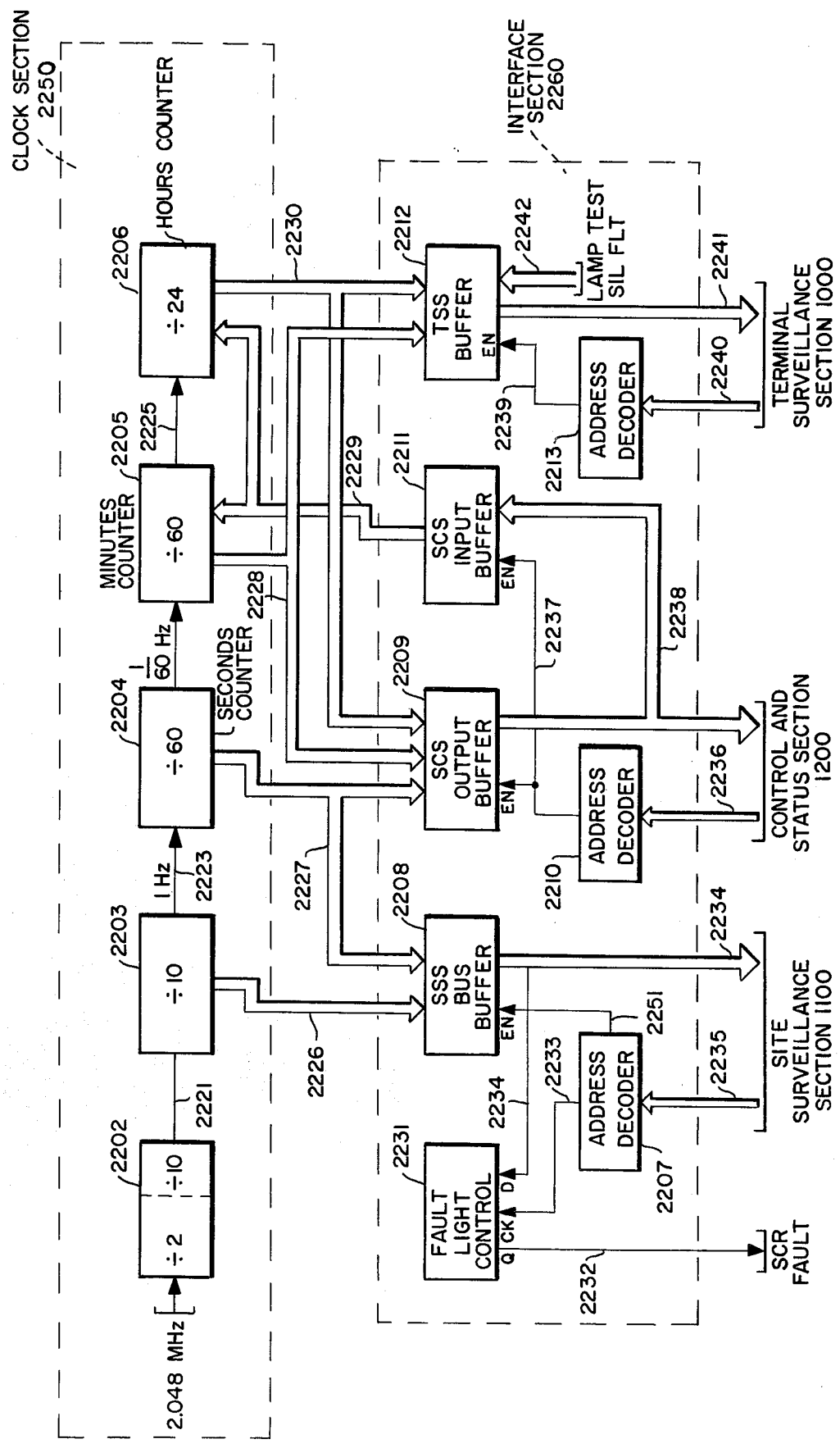
FIG. 40 is a block diagram of the real time clock module of FIG. 27.

Referring now to FIG. 40, the clock section of the RTC is shown as comprising a set of cascaded dividers 2201–2206. Divider 2201 is coupled to receive the basic system clock frequency of 2.048 MHz and divides this clock frequency down to a 100 Hz clock signal. A first divide-by-ten divider 2202 divides the 100 Hz clock down to 10 Hz and supplies this clock over line 2221 to a second divide-by-ten divider 2203 which couples a 1 Hz signal on lines 2223 to a first divide-by-sixty or seconds counter 2204. The stages of divide-by-ten divider 2203 are also coupled over data link 2226 to inputs of bus buffer 2208. Similarly, the contents of counter 2204 are coupled over link 2227 to buffers 2208 and 2209.

The output of seconds counter 2204 is a minutes clock signal that is coupled over line 2224 to another divide-by-sixty counter 2205. The contents of minutes counter 2205 are coupled over link 2228 to buffers 2209 and 2212 within interface section 2209. Each of buffers 2209 and 2212 contains a pair of eight-bit buffers that are strobed individually to couple eight-bit data bytes out over data bus links 2238 and 2241 to control and status section 1200 and terminal surveillance section 1000, respectively. The output of minutes counter 2205, which represents elapsed hours is coupled over line 2225 to a divide by twenty-four hours counter 2206. The stages of counter 2205 and 2206 are selectively presettable by control and status section 1200 via communication bus data link 2238 input buffer 2211 and input data link 2229. The contents of hours counter 2206 are coupled over link 2230 to output buffers 2209 and 2212 to permit the number of elapsed hours to be read by CSS 1200 and TSS 1000 via data links 2238 and 2241.

Interface section 2260 contains address decoder and buffer units associated with each of the processor sections for coupling clock information between the clock dividers and the processor sections. Address decoder 2207 is coupled over address and read/write link 2235 to communication bus 1823 of site surveillance section 1100. Output line 2251 supplies a strobe signal to buffer 2208 to read out the contents of clock counter 2203 and 2204 in links 2226 and 2227 over data link 2234. Line 2233 is coupled to the clock input of a fault light control flip-flop 2231, the D input of which is coupled over line 2234 to the LSB of buffer 2208 and the Q output of which is coupled over line 2232 to the fault indicator in SCR module 1805. Through this circuitry the site surveillance section controls the fault indicator in its own SCR module.

Address decoder 2210 is coupled to the address read/write portion of communication bus 1822 via link 2236. The decoded output of address decoder 2210 is coupled over link 2237 to selectively enable buffers 2209 and 2211 so as to couple data between the control and status section 1200 and counters 2204, 2205 and 2206, via link 2238.

Associated with terminal surveillance section 1000 are address decoder 2213 and buffer 2212. The address, read/write portion of communication bus 1824 is coupled to address decode 2213 via data link 2240 while the data portion of the bus is coupled to buffer 2212 via data link 2241. Decoder 2213 divides the address, read/write data in link 2240 and strobes buffer 2212 via control link 2239. In addition to coupling the contens of divider 2205 and 2206 to output data link 2241, buffer 2212 couples a lamp test bit and a silent fault diagnostic bit coupled over link 2242 from the attendant's control panel as part of a second byte of the low byte buffer unit 2212 for use by TSS 1000. (The remaining six bits for the byte are spares.)

As will be appreciated from the schematic block diagram shown in FIG. 40 the basic operation of the real time clock module is straightforward. The cascaded dividers of clock section 2250 divide the 2.048 MHz clock input to the initial divider 2201 down to timing increments of tens of seconds, seconds, minutes, hours and days that are directly readable by each of ATU section 1000, 1100 and 1200 through interface section 2260. Through buffers 2209 and 2211 control and status section 1200 can preset the hours and minutes counters 2205 and 2206. Section 1200 uses the hours and minutes counters 2206 and 2205 to mark its I/O messages with the time of day while it uses the contens of seconds counter 2204 for program timeouts. Terminal surveillance section 1000 uses the contents of minutes counter 2205 for program timeouts and the contents of hours counter 2206 to determine when to implement a silent fault diagnostic check on system operation, to be described below. Site surveillance section 2200 reads the tenths of seconds counter 2203 and seconds counter 2204 for carrying out its program timeouts.

SYSTEM OPERATION

In the preceding description, explanations have been given of the circuitry and operation of the individual components of which the fiber optic communication network is configured. The description to follow will coordinate the interrelationships of these components and the manner in which they contribute to the overall functional capabilities of the network. Since a major feature of the network is its ability to continuously monitor and control the operation of its subsystems and take corrective action to maintain the integrity of communications over the fiber optic channels at all times the description of the operation of the network will evolve around its fault monitoring and channel replacement capabilities.

As was explained above in conjunction with the description of the configuration of the auxiliary terminal equipment, the overall operation of the system is effectively governed by a pair of processor-based subsystems (the ATUs) located in the terminal stations at the opposite ends of the network. (It is again to be noted that the network is considered to be reduced to an individual section containing terminal stations at opposite ends with one or more repeater stations therebetween.) The ATUs convey command and status information to each other through the use of the cammand/status overhead bit portions of each frame of data that is transmitted over each of the channels of the fiber optic data links, while they interface directly with the transceiver units at their respective stations and are coupled over the local orderwire cable to fiber optic communication components of each of the stations of the network. It is through this multiple interfacing capability that the ATU responds to network fault or error conditions and takes whatever action is necessary to ensure the intended operation of the network and enable maintenance personnel to rapidly replace or repair defective equipment. Thus, since the ATU is the major control component of the network, in order to facilitate an understanding of the overall operation of the network, the present description will focus on the ATU, the actions it takes and how the other components of the network respond to such actions.

As was explained above in conjunction with the description of the configuration of the auxiliary terminal equipment, the ATU monitors network performance, controls protection channel substitution, effects link status and alarm reporting and assists in maintenance of the network. The manner in which the ATU implements these functions will be outlined briefly below, followed by a detailed explanation of system operation in conjunction with the performance of each function.

CHANNEL QUALITY MONITORING AND PROTECTION CHANNEL SUBSTITUTION

The ATU in each terminal station monitors the quality of the data transmitted to it along the fiber optic channels from the other end of the link by determining the bit error rate (PER) of each incoming channel. When the BER of a channel exceeds allowable limits, a control message is transmitted by the ATU that has detected the excessive BER to its action counterpart ATU by way of the section control and status module (FIG. 33) which delivers an encoded message in the form of command/status (C/S) bits to be inserted into the data stream of each of the fiber optic channels. The counterpart ATU responds to this message by feeding the data on the faulty channel to the protection channel as well and acknowledging the message from the ATU that has detected the unacceptable BER. At this point, the data from the source terminal station on the faulty channel is being conveyed over both the faulty channel and the protection channel to the destination terminal. The destination ATU monitors the quality of data transmission over the protection channel and causes a switch or transfer of the data at the destination receive protection switch, so that acceptable quality data is successfully conveyed from the source terminal station to the destination terminal station as intended. The ATU can command either an unconditional or hitless switch depending on the BER of the faulty channel. The status of the faulty link and the identity of the channel for which the protection channel has been substituted are indicated to network operation personnel via the attendant's consoles in the terminal stations. In addition, status is made available for a terminal station alarm and use by additional monitoring equipment such as a surveillance computer that may be coupled to the serial interface control module as desired.

REPEATER FAULT LOCATION

Upon completion of the protection channel substitution and after preliminary fault isolation indicates that neither terminal is at fault, the ATU takes further action to locate the source of the problem along the fiber optic link. For this purpose, a binary search along the link is initiated through command messages via the site command and response module (FIG. 32) over the local orderwire link. The ATU selects repeaters to be interrogated for the BER at their location on the detected faulty channel, through the use of a prescribed BN sequence which is transmitted over the faulty channel in lieu of the previously transmitted data that has been rerouted over the protection channel. The ATU selects the repeater located half way between the last known good repeater (low BER) and the first known bad repeater (high BER). This process continues until a repeater is found where the BER on the faulty channel changes significantly in response to this prescribed sequence; upon this occurrence a determination is made that that particular station is at fault. The data from the faulty station is also made available for status and alarm reporting. This sequencing technique is capable of isolating a 125 repeater section by polling only 8 repeaters.

CHANNEL EQUIPMENT ALARM

In addition to conducting protection channel substitution for a fiber optic link that has been determined to have an excessive BER, the ATU will also initiate protecting channel switching in the event of an equipment failure alarm, either in a transceiver unit at a terminal station or in the repeater equipment at a repeater station. If a fault alarm condition has been detected in the transceiver equipment in a terminal station, the ATU proceeds to initiate protection switching for the channel equipment where the alarm condition occurred and provides a fault indication in the defective equipment itself for assistance to maintenance personnel. The repeater equipment is scanned periodically via the local orderwire link to determine the status of repeater fault detectors and site condition alarms. A fault alarm condition in a repeater station which causes an excessive BER will be detected by the ATU as described above. This, in turn, causes the ATU to initiate protection channel substitution and fault location indication operations.

NETWORK MAINTENANCE

Through I/O devices such as CRT displayer, alarms, operator controlled panel switches, fault indicators, line printer, etc., the ATU has the capability of providing network condition signalling and a hard copy of various status data for the use of the network attendants. Advantageously, through the use of the fault indicator devices in the modules and equipment shelves that house the system components, maintenance personnel are provided with the capability of rapidly locating and replacing defective components. ATU-controlled console alarm and displays permit station attendants to take immediate action so as to maximize the date thruput of the network. In conjunction with the service data read-out and indication facilities, each terminal includes the above described express orderwise equipment through which terminal operators communicate with each other via the ECW bits of the fiber optic data.

Having given a general explanation of the various aspects of the operation of the ATU-controlled network of the present invention, the description to follow will provide a detailed explanation of each of the above features of system operation. In each section of description of network operation it will be initially assumed that the system is operating in its normal mode, with each of the normally available channels one to five carrying data between terminal stations 10 and 12, with the protection channel remaining idle but carrying channel-one data for fault monitoring purposes only.

BER MONITORING

BER DEGRADATION DETECTION

As was explained above in conjunction with the description of the receiver decoder (RDC) module (FIG. 14), an indication of the bit error rate for a particular channel is provided by monitoring the output of modulo-two adder 602 within the RDC, via gate 630 and BEP output line 640. Bit errors in the frame sync bit pattern are produced on line 640 in the transceiver units each of terminal stations 10 and 12 and these error bits are coupled to the clock inputs of each of the BER counters 1882, 1883 and 1884 in the BMF module (FIG. 31). In accordance with the present invention the BER is classified into three degrees of degradation or modes as follows: Mode I—an extremely high BER, similar to that caused by a condition where the peak signal level at the input to a repeater falls by several dB greater than the link margin, for a prescribed continuous period of time (e.g. 0.1 ms) yielding an excessive BER condition ($10^{-2}$); Mode II—a very high BER, where the BER degrades to $10^{-4}$ or greater and persists for a minimum prescribed period of time (e.g. 10 ms); and Mode III—a moderate BER, where the BER degrades to $10^{-6}$ or greater persisting for a considerably longer time (e.g. 2 sec.).

Now, as was pointed out above in conjunction with the description of the BMF module (see FIG. 31), counters 1882–1884 count bit errors from their associated RDC module and are strobed/cleared to supply respective BER indicating signals over lines 1891–1893 to data buffer 1880, in response to respective timing signals over lines 1886–1888. For the purpose of providing a working example let it be assumed that the BER on the east-to-west fiber optic link of channel-two, as monitored by the RDC of the channel-two transceiver unit of terminal station 10, is moderate, namely it is $10^{-6}$ or greater for a selected time interval as governed by the timing signal on line 1888 from timing signal generator 1885 (FIG. 31). Through the data buffer circuitry of the AMF and BMF modules (FIGS. 30 and 31) the ATU of terminal station 10 is informed that an unacceptable BER condition exists. Since the ATU is monitoring the channel-two BDC of its own associated transceiver unit at terminal station 10, it cannot immediately identify the source of the problem along the link that has created the unacceptable BER degradation since the cause of the unacceptable BER may have originated anywhere along the east-to-west, channel-two link. This function will be accomplished during the fault isolation sequence to be described below. CL PROTECTION SWITCHING Assuming the degraded Mode III BEP condition persists for an undesirable length of time (e.g. two seconds), the ATU proceeds to replace the faulty channel with the protection channel. In order to implement this substitution, the ATU initially checks the protection link for availability. As was described above in conjunction with the description of the front panel switch modules that are associated with the attendant's console, any channel on either the source or destination can be locked out of the system by a manual override switch. Assuming that the protection switch is not so locked out and all other channels (one and three to five) are operating normally, then the protection channel is available for use in place of the east-to-west link of channel-two. The terminal processor in the ATU at terminal station 10 next assembles a switch command message to be transmitted via SCS module 1811 (FIG. 33) to the uplink ATU at terminal station 12 which is the source of the data being coupled over the east-to-west link of channel-two. As was explained above in connection with the description of FIG. 33, as data from the communication bus 1824 of the terminal section 1000 is coupled to the SCS module it is assembled into Manschester format via MTU 2009 and coupled to each of the transmit encoder modules of the transceiver unit. Within the transmit encoder modules (FIG. 12) command and status message bits from the ATU in one terminal station are inserted into the C/S overhead bits of each frame of data and transmitted over every active fiber optic link between the terminal stations. In the BDC module (FIG. 14) for each channel, the C/S bits are demultiplexed and applied over link 1976 to multiplexer 1977 of the SCS module in the ATU of the receiving terminal station. Whatever channel has been chosen via select line 2008 (FIG. 33) will apply the incoming C/S bit defined message to MTU 2009 for decoding and output through registers 1973 and 1974 on the AAF module for the terminal section to bus 1824 in the receiving ATU.

For protection switching action in the present example, the message from terminal station 10 to terminal station 12 will direct the ATU in terminal station 12 to switch the transmit protection switch in its transceive unit associated with channel two to the protection channel. Therefore, within the terminal surveillance section 1000 of terminal station 12 an instruction is coupled over communication bus 1824 to the AMF module (FIG. 30) 1801-2 and loaded into its protection switch select register 1840, directing a transmit protection switch operation for channel-two. From protection switch register 1840 a three bit transmit protection switch code is coupled through gate unit 1845 and select switch driver unit 1847 over line 1850 to register 72 of the transmit protection switch module (FIG. 4) causing the east-to-west link of channel-two (line 45-2) to be coupled through multiplexer 71 to east-to-west protection channel line 32-6 of terminal station 12. Data on the faulty east-to-west link of channel-two is now transmitted on both channel two and the protection channel.

At the downlink or receiving terminal station 10 two types of control of the receive protection switch are available—unconditional switching and hitless switching. For unconditional switching a switch instruction is coupled from the processor module 1804 via communication bus 1824 to the AMF module to cause a switch control signal to be coupled directly to the receive protection switch (FIG. 5) without the use of the data alignment circuit (FIG. 6). This type of switching may be effected either manually through the switches in the attendant's console at the receiving terminal station or by the ATU for a high BER condition. In either case, processor module 1804 responds to the data it receives over communication bus 1824 and supplies an unconditional switch instruction to the AMF module (FIG. 30). For an unconditional switch instruction, the data byte loaded into protection switch select register 1840 will cause the appropriate receive protection switch "channel select" and receive protection switch "switch select" bits to be set to control the switching operation of protection switch circuits 42A and 42B in receive protection unit 61-2 (see FIGS. 3, 5) and thereby cause the east-to-west link of fiber optic channel-two on input line 26-2 to be coupled over line 34-2 to the patch panel of terminal station 10's equipment.

In the present example it is assumed that an unconditional switch is neither required nor desired so that hitless switching is to be implemented. For this purpose within the ATU of terminal station 10 instructions are coupled to both AMF module 1801-2 and BMF module 1802-2 to be loaded into respective registers 1840 and 1871 (see FIGS. 30 and 31). The data is register 1840 to AMF module 1801-2 is again used to control the states of the switch select and channel select inputs to receive protection unit 61-2 while the contents of control data register 1871 are used to control strobe timing generator 1874 to produce the phase adjust signals for the data alignment circuit. The state of the output switch status lines (92A, 95A, 96A, 92B, 95B, 96B) (see FIG. 5) from the receive protection switch circuit are coupled to link 1860 of the AMF module (FIG. 30) to enable the ATU to monitor the operation of the protection switch circuit during hitless switching. As was described above in conjunction with FIGS. 5 and 6, the data on the active channel (here channel-two) and the protection channel are phase compared with each other and phase adjust signals, as necessary, are coupled from link 1877 of the BMF module (FIG. 31) to fine counter 1217 of the data delay circuit (FIG. 6) until the phase detect signal from the active protection switch circuit (42A or 42B) being monitored indicates that the data stream on both channel-two and the protection channel are synchronized with each other. Once the two channels are mutually synchronized, a switch control instruction is coupled to the AMF module to cause the substitution of the protection channel for channel-two via the mutual change of states of switches 84A and 84B—FIG. 5 to thereby ensure continuity of the east-to-west link of channel-two. In the event that the alignment circuit has insufficient adjustment to achieve synchronization, the ATU will command an unconditional switch, as described above. The ATU also causes the appropriate indicators on the attendant's console to be activated to advise network operator personnel of the channel substitution.

RESTORATION SWITCHING

The ATU automatically restores operation to the normal channel when the BER monitor indicates that the current BER is less than $10^{-7}$. The ATU accomplishes this by again synchronizing the normally working channel with the protection channel and then directing the protection switch to switch back to the working channel. Communications between the two ATU's is similar to that described above. Following restoration, the operator interfaces are updated to reflect the change.

ALARM INDICATION

At present, the terminal surveillance section 1000 reads the BER data and forwards a message through the interprocessor module 1810 to control and status section 1200 for the purpose of generating an alarm indication in the attendants console, via front panel display module 1817. The detection of a moderate bit error rate may be considered to be a minor alarm condition as compared to a major alarm condition. A major alarm condition is defined as a failure which interrupts service, while a minor alarm is one which does not cause a service outage. (A failure on protected equipment is a minor alarm provided the protection equipment functions. An additional minor alarm on the protection equipment results in a loss/or degradation-of-service and, accordingly is termed as a major alarm.) Thus, the moderate BER on channel-two raises a minor alarm and a mode of failure (MODE III) indicator display on the control panel is energized. Through serial interface control SIC module 1813 (FIG. 34) an error message is coupled to attendant peripheral equipment (e.g. CRT, printer, surveillance computer).

FAULT ISOLATION

Having replaced the faulty (moderate BER) east-to-west link of channel-two with the east-to-west link of the protection channel, the ATU next proceeds to carry out a fault isolation sequence to locate the source of the unacceptable BER degradation along the link. For this purpose the ATU at terminal station 10 communicates with the ATU at uplink terminal station 12 (again, as always, using the C/S bits via the SCS module, FIG. 33) and instructs the uplink ATU to interrupt the coupling of input 274 Mb/s data stream through the TEN module associated with channel-two and replace it instead with only the PN sequence.

Using BMF module 1802-2 (FIG. 31), the ATU at terminal station 12 causes a DATA INHIBIT signal to be coupled over the data inhibit line of link 1877 to line 121 of the TEN module (see FIG. 10). As explained previously in conjunction with the description of FIG. 10, this action causes the output of multiplexer 131 to remain low or zero, so that only the PN sequence produced by PN sequence generator 142 is coupled through module-two adder 171 and output register 172 to its associated optical transmitter module for transmission over the east-to-west link of channel-two.

LOCAL ORDERWIRE INTERROGATION

With the east-to-west link of channel-two now conveying a prescribed PN sequence, transmitted from terminal station 12, the ATU at terminal station 10 proceeds to interrogate the communication equipment along the link to determine the location of the cause of the unacceptable BER for channel-two. For this purpose, the site surveillance section 1100 which is coupled to the orderwire equipment is used. Within the site surveillance section, the site command and response module is loaded with a message instruction from processor module 1807 designating the address of a station along channel two to be interrogated. The procedure to be carried out is such that the station midway between the last known good station and the first known bad station is interrogated so that a switching section with 125 repeaters can be fault-isolated by polling only 8 repeaters.

For this purpose, a BER search routine is conducted. This routine bills a command to determine the BER at a repeater site. The site interrogated is determined by finding the midpoint between the upper limit and the lower limit (the upper and lower limits are preset by the terminal input routine). The LOW output routine is called to interrogate a repeater site and the LOW input routine is called to receive the response from the repeater site.

The response from a repeater site is tested for a three word response and a valid command echo. If the response fails either of these tests, the processor sets a routine retry flag and interrogates the same site again. If the site response fails either of the two tests described above again, the routine retry flag is reset, the polling sequence is reset and the routine is terminated.

The routine retry flag is reset when a site response passes both the tests. If the site's BER count is greater than 90, the upper limit is set to the site's address plus one. (For the downlink ATU, the lower limit is set to the site's address minus one.) If the site's BER count is less than 90, the lower limit is set equal to the site's address. (For the downlink ATU, the upper limit is set to the site's address plus one.) The search technique will result in the true faulty site being bounded by the lower limit and upper limit=lower limit +2 (For the downlink ATU, the lower limit and the upper limit=lower limit +3). To be certain that the true faulty site has been located, the processor must end up with the same boundary conditions twice.

When the faulty repeater is located, the fault log is updated and the status update message is transmitted to the control/status processor. Meanwhile, if the terminal processor has not cancelled the BER check, a complete-GO message is transmitted to the terminal processor.

If this routine determines that all repeater sites are OK, then a complete NO-GO message is transmitted to the terminal processor.

Thus, considering a fault test communication for an individual repeater site, the MTU 1963 in SCR module 1805 of the ATU of terminal station 10 couples a command message out to the local orderwire interface (LOI) module of terminal station 10, as LOW data-in. Within the LOI module, a message is assembled and transmitted out over the orderwire cable 17 to instruct the addressed local orderwire module to conduct a BER test. In the present example let it be assumed that downlink repeater number three (as counted in an east-to-west direction from terminal station 12 toward terminal station 10 and assuming an eight repeater link between stations) is defective. At the initially addressed repeater station (number 5), the command message from the ATU of terminal station 10 is loaded into the command word register 806 of the LOC encode/decode control unit (see FIG. 18). Since a BER test is being carried out for downlink channel-two, the BER test bit will be "one" and the select byte will be "1010" identifying the east-to-west link of channel-two. The "0010" bits of the select type are coupled over link 874 to BER driver unit 808. Since the BER bit is "one", BER driver unit 808 couples a select signal over line 903 to multiplexer 901 in the BER module (see FIGS. 21 and 22). In accordance with the operation of the LOC and BER modules of the local orderwire equipment described previously, the BER module proceeds to conduct a BER test of the PN signal sequence coupled over the east-to-west link of channel-two. Errors are accumulated in counter 942 and a measured BER response word is coupled over link 892 to be applied to the LOC encode/decode control unit and assembled as the second byte of the third word of the response message from repeater station number 5 to terminal 10.

Figure 32:
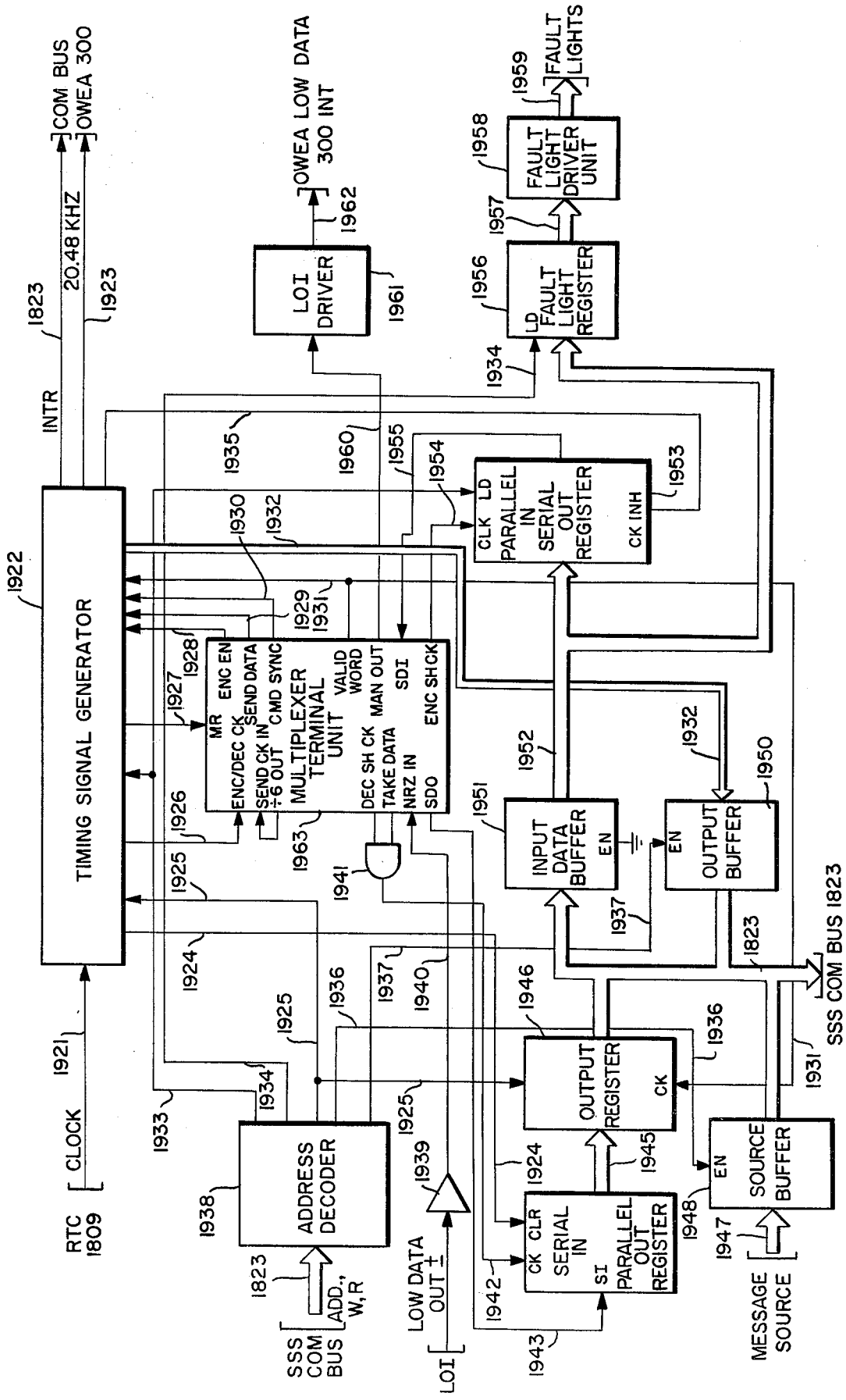
FIG. 32 is a block diagram of the site command and response module of FIG. 27.

As was described previously in connection with the description of the orderwire subsystem, the response message is transmitted via the orderwire cable back downlink to terminal station 10. Here, the response message is decoded and interfaced with the ATU via its SCR module (FIG. 32). Since the present example assumes that repeater number three is the cause of the unacceptable BER problem on channel-two, the ATU finds the BER of repeater station number 5 unacceptable, so that the ATU next interrogates repeater station number halfway between the terminal and repeater station number 5 or repeater station number 2.

At repeater station number two the command message from the ATU of terminal station 10 is loaded into the command word register of the LOC encode/decode control unit (corresponding to the command word register 806 of the LOI encode/decode control unit of the LOI module shown in FIG. 18). Again, as in repeater station number 5, a BER test is conducted with respect to the PN signal sequence injected into the downlink fiber of channel-two and the results of the test are coupled as a BER word to the LOC encode/decode control unit and assembled part of the third word of the response message from the repeater unit. As described previously, a repeater station transmits a response message in two directions over separate frequencies to terminal stations 10 and 12, via the LOC signal interface unit. Namely, with reference to FIG. 23, the response message produced by the MTU in the LOC encode/decode control unit is coupled over line 986 to each of flip-flops 988 and 989. Via gates 992 and 993 and the separate on/off enabling of these gates at the separate frequency outputs $f_1$ and $f_2$ of tone detector/generator unit 976, the response message is coupled through summing amplifiers 966 and 967 and out over twisted pair orderwire cable links 974 and 975 to terminal stations 10 and 12 respectively, where the response message is interfaced with the ATUs of each station through their respective SCR modules, as explained previously. Since the interrogating ATU at terminal station 10 finds the BER to be acceptable, it sends the next command message to the repeater station midway between repeater stations number 2 and number 5; here, repeater station number 3, where the sequence of events described above is repeated. This procedure is repeated, a repeater-at-a time, until the source of the problem is located. In the present example, where repeater number three has been assumed to be defective, the value of the BER word of the response message from repeater number three will be unacceptably high indicating that the problem lies between the output of repeater station number two and the output of repeater station number three. Having located the sudden change in BER to have occurred at repeater station number three, the ATU conducts an alarm indication procedure to designate the location of the fault.

A BER fault indication signal is coupled as part of a command message to repeater station number three, causing the energization of the BER fault light on the module, via status register 811 and driver 884, as explained previously in conjunction with the description of the local orderwire encode/decode control unit shown in FIG. 18. Similarly, on the display panels of the attendant's consoles at terminal stations 10 and 12 the location of the fault is indicated via front panel display module 1817, and a hard copy of the fault is recorded via a suitable recorder (e.g. line printer) coupled to serial interface control module 1813 (see FIG. 34). With the location of the cause of the unacceptable BER having been isolated and visually marked at the repeater site, maintenance personnel can rapidly proceed to make the necessary replacement of the defective equipment.

ALARM MONITORING

As was described previously in conjunction with the description of each of the modules of the terminal and repeater stations of the network, fault detection circuits are associated with each of the pieces of equipment to monitor activity and abnormal condition in the modules.

TRANSCEIVER ALARM MONITORING

In the transceiver units of the terminal stations, the output of each of the fault detection circuits of the transmitter/receiver circuits for a particular channel is coupled to a respective line of either protection switch alarm link 1860 or transceiver alarm link 1857 of the AMF module (see FIG. 30) associated with that channel. As was explained previously in conjunction with the description of the AMF module, the data that is coupled through the alarm buffers 1858 and 1859 is monitored via link 1856 and terminal surveillance section processor module 1804. In response to reading a fault detection circuit 506 in the optical receiver module (FIG. 12), the ATU takes action to replace the channel link associated with the module, just as it does in response to the detection of an unacceptable BER, described above. As explained previously in conjunction with the description of the OPR module (FIG. 12), the OPR alarm triggers fault isolation of the repeaters. The location of the fault is determined by the ATU by virtue of the alarms present and a look up table which identifies those terminal modules whose failures could cause a given set of alarms to be triggered. Accordingly, the appropriate fault indication signals are coupled to the alarm panel at the attendant's console and the protection switching procedure described above is implemented. Fault indicators in the transceiver equipment are also energized by the ATU in accordance with the lookup table, again by way of the associated AMF module described above in conjunction with the description of FIG. 30, to assist maintenance personnel in repairing or replacing the defective module. Thus (referring to FIG. 30), for a fault alarm in the OPR module of one of the channels, fault light location data will be coupled through input buffer 1834 and loaded into fault light register 1839. Via the line associated with the fault indicator in the OPR module of the channel of interest of link 1841, fault light driver 1843 couples a fault illumination signal to the OPR the fault detection circuit of which produced the original alarm data on link 1857.

REPEATER SITE ALARM MONITORING

While transceiver alarm monitoring is effected by a direct link from fault detection circuits in each module to their associated AMF modules in the ATU, wherein the occurrence of a fault in a transceiver unit causes a signal to be delivered immediately to the associated AMF module, repeater site alarm monitoring is conducted in a command response format over the orderwire cable. Through a prescribed routine, each of the repeater stations of each channel is scanned or interrogated in sequence as to the status of their site alarm data inputs. Command messages are sent from either of the ATUs in terminal stations 10 and 12 over the orderwire cable to the repeater stations to sequentially scan the repeaters for the presence of site alarm data. One ATU will control the orderwire to scan all repeaters and then the other ATU will take control of the orderwire to scan all repeaters. As was explained previously in conjunction with the description of the orderwire system, a number of repeater site sensors or detectors are associated with each repeater station. These detectors may be used to monitor localized repeater environmental and operational conditions such as temperature, moisture, pressure, integrity of repeater housing seals, power supplies, etc. and provide a respective output upon the occurrence of a condition considered to be abnormal. The various condition parameters that are monitored are assembled together to make up the status words, that describe the conditions within the repeaters, and form the first byte of the second response word from a repeater station as shown in FIG. 20.

Thus, alarm/status monitoring is carried out in a command/response format like that carried out in the BER fault isolation sequence described above. The contents of the alarm/status words of the response messages from the repeater are coupled over the orderwire cable to the SCR modules of each ATU whereby they are interfaced with parameter monitoring and recording equipment in the terminal stations. Depending upon conditions observed through the repeater site alarm process, site maintenance may be conducted.

DIAGNOSTIC TESTING

In addition to responding to network signalling and operational fault conditions, the ATU is also used to test the equipment on a regular basis in an effort to intercept faults before they occur on an active channel. This procedure, referred to as diagnostic testing, permits the ATU to monitor the performance of all the equipment and to verify that the protection switching components are functional. During the normal operating conditions where the protection channel is idle, the ATU may conduct a procedure whereby the protection switching operation, described above in response to an unacceptable BER, is carried out for each channel in the network to verify that both the hitless switching and protection switching equipment in general are working properly. Of course during this test sequence, if a BER or fault alarm condition is detected, the diagnostic test is discontinued and service to the defective condition is immediately rendered.

A further feature of the present invention permits the ATU to check the operating accuracy of the BER modules. For this purpose, during the diagnostic test, error bits are deliberately inserted into the PN sequence that is transmitted over the substituted channel. Referring again to FIGS. 10 and 31, a TRANSMIT ERRORS signal is coupled via the BMF module to line 125 of the TEN module of the replaced channel of interest. These deliberately inserted error bits are combined in modulo two adder 171 with the PN sequence from scrambler 142 and transmitted over the replaced channel link. The ATU observes the BER word from the BER module of the addressed station along the local orderwire cable and compares the response message from the addressed station with a known error rate. If the BER module is malfunctioning, there will be an unacceptable difference between the two BER codes which results in the ATU taking corrective action.

As will be appreciated from the foregoing detailed description, the fiber optic communications network according to the present invention offers a number of advantageous features that are especially useful in a high data rate repeatered signalling environment such as a T-4 data transmission system. Through the use of the particular signal scrambling and frame synchronization scheme, not only data, but control, status and operator voice communication signals can be exchanged between relatively geographically remote terminal stations. In providing protection channel security, the network according to the invention incorporates a separate communication link, exclusive of the fiber optic channels and employs at each terminal station, an integrated processor-based control facility which performs general supervisory and control tasks to maintain intended network operation and performance. Moreover, each control facility is configured of a set of separate and substantially independent units each assigned its own specific tasks for controlling the various system components and carrying out monitoring and control functions in such a manner that interaction of these units with each other is minimized. This leads to improved modularity, reliability, and operational integrity of the overall network.

While we have shown and described several embodiments in accordance with the present invention, it is understood that the same is not limited thereto but is susceptible to numerous changes and modifications as known to those skilled in the art and we therefore do not wish to be limited to the details shown and described herein but intend to cover all such changes and modifications as are encompassed by the scope of the appended claims.

What is claimed is:

1. In a communication network wherein signals are conveyed between first and second stations over a first communication link having at least one repeater station disposed between said first and second stations, a method for isolating a fault occurring on said link comprising the steps of:
   (a) transmitting a first prescribed encoded signal sequence over said communication link;
   (b) selectively monitoring, at respective stations along said link, a prescribed signal transmission characteristic of the respectively monitored stations along said link; and
   (c) in response to a prescribed change in the signal transmission characteristic of said link at one of said monitored stations, representative of the existence of a fault in said link at said one of said monitored stations, transmitting from said one of said monitored stations a signal representative of said change in signal transmission characteristic, so as to identify said fault as being associated with that monitored station along said link that introduces said prescribed change in said signal transmission characteristic.

2. A method according to claim 1, wherein step (a) comprises transmitting a pseudorandom code signal over said communication link.

3. A method according to claim 1, wherein step (b) comprises generating a second prescribed encoded signal sequence at a monitored station, comparing said first prescribed encoded signal sequence with said second prescribed encoded signal sequence, and generating an output signal indicative of the degree of comparison of said first and second prescribed encoded signal sequences.

4. A method according to claim 3, wherein each of said first and second prescribed encoded signal sequences is the same.

5. A method according to claim 3, wherein each of said first and second prescribed encoded signal sequences comprises a pseudorandom code signal.

6. A method according to claim 1, wherein said first prescribed encoded signal sequence is a digital signal and said prescribed signal transmission characteristic is the bit error rate of the throughput of said station.

7. In a communication network wherein signals are conveyed between first and second stations over a plurality of communication links having at least one repeater station disposed between said first and second stations, a method for isolating a fault occurring on one of said communication links comprising the steps of:
   (a) replacing that one of said communication links on which a fault has been detected to have occurred with another of said communication links;
   (b) transmitting a first prescribed encoded signal sequence over said one of said communication links;
   (c) selectively monitoring, at respective stations along said one link, a prescribed signal transmission characteristic of said respective stations along said one link; and
   (d) in response to a prescribed change in the signal transmission characteristic of said link at one of said monitored stations, representative of the existence of a fault in said link at said one of said monitored stations, transmitting from said one of said monitored stations a signal representative of said change in signal transmission characteristic, so as to identify said fault or being associated with that monitored station along said link that introduces said prescribed change in said signal transmission characteristic.

8. A method according to claim 7, wherein step (b) comprises generating a second prescribed encoded signal sequence at a monitored station, comparing said first prescribed encoded signal sequence with said second prescribed encoded signal sequence, and generating an output signal indicative of the degree of comparison of said first and second prescribed encoded signal sequences.

9. A method according to claim 7, wherein said communication links are fiber optic communication links.

10. A method according to claim 7, wherein step (a) comprises the steps of:
   (a) causing the signals that are conveyed over said one of said communication links to be conveyed over said another of said communication links,
   (b) synchronizing, at that one of said first and second stations to which said signals on said one link are conveyed, the signals that are conveyed on said one and another of said communication links with each other, and (c) upon the signals on said one and other links becoming synchronized with each other, substituting said another of said communication links for said one communication link and inhibiting said communication link from transmitting said signals that would have otherwise been conveyed on said one communication link.

11. In a communication network having first and second terminal stations coupled to each other a plurality of communication links having at least one repeater station coupled in said links for regenerating information signals conveyed thereover between said first and second terminal stations, a system for controlling the operation of said network comprising:

first means, coupled to each of said communication links, for monitoring a prescribed characteristic of signals transmitted over said links, and producing a first output signal in response to a prescribed change in said characteristic on one of said links;

second means, coupled to said first means and coupled to each of said stations over a communication path exclusive of said communication links, for testing the operation of selected ones of said stations with respect to said one of said links;

third means, coupled to said second means and each of said communication links, for controllably modifying said prescribed characteristics of signals transmitted over a selected one of said links.

12. A system according to claim 11, further comprising fourth means, coupled to said first means and to said communication links, for replacing said one of said links with another of said links in response to said first output signal from said first means.

13. A system according to claim 11, wherein each of said communication links comprises an optical communication link.

14. A system according to claim 13, wherein said communication path comprises an electrical communication path.

15. A system according to claim 11, wherein said third means further includes means for monitoring the accuracy of the testing carried out by said second means with respect to said selected link at said selected ones of said stations.

16. In a communication network having first and second terminal stations coupled to each other over a plurality of communication links having at least one repeater station coupled in said links for regenerating information signals conveyed thereover between said first and second terminal stations, a system for controlling the operation of said network comprising:

first means, coupled to each of said communication links, for monitoring a prescribed characteristic of signals transmitted over said links and producing a first output signal in response to a prescribed change in said characteristic on one of said links;

second means, responsive to said first output signal produced by said first means, for replacing said one of said links with another of said links;

third means, responsive to the replacement of said one of said links with another of said links by said second means, for causing a prescribed encoded signal sequence to be transmitted over said one of said communication links;

fourth means, coupled to the stations along said one communication link, for monitoring a prescribed signal transmission characteristic of selected ones of said stations in response to the transmission of said prescribed encoded signal sequence over said one communication link; and fifth means, coupled to said fourth means, for identifying that station, for which there occurs a prescribed change in the monitored prescribed signal transmission characteristic in response to the transmission of said prescribed encoded signal sequence, as being associated with the prescribed change in the signal characteristic monitored by said first means that has caused said first means to produce said first output signal.

17. A system according to claim 16, wherein said second means comprises:

means for causing the signals that are conveyed over said one of said communication links to be conveyed over said another of said communication links, means for synchronizing the signals conveyed on said one and said another communication links with each other, and means, responsive to the synchronization of said signals on said one and another communication links, for interrupting the flow of signals over said one link and enabling the flow of signals over said another link.

18. A system according to claim 16, wherein said prescribed encoded signal sequence comprises a PN signal sequence.

19. A system according to claim 16, wherein said fourth means is coupled to said fourth and fifth means stations over a communication path exclusive of said communication links.

20. A system according to claim 19, wherein said fourth means includes means for selectively communicating with each of the stations along said one communication link over said communication path and causing the selected station to monitor said prescribed signal transmission characteristic.

21. A system according to claim 16, wherein said communication links are fiber optic communication links.

22. A system according to claim 19, wherein said communication links are fiber optic communication links.

23. In a communication network having first and second terminal stations coupled to each other over a plurality of first communication links for conveying signals from said first terminal station to said second terminal station and a plurality of second communication links for conveying signals from said second terminal station to said first terminal station, and at least one repeater station coupled to said links for regenerating information signals conveyed over said links, a system for controlling the operation of said network comprising:

first means, located at said first terminal station, for monitoring a prescribed characteristic of signals transmitted from said second terminal station over said second communication links to said first terminal station and producing a first output signal in response to a prescribed change in said characteristic on one of said links;

second means, located at said first terminal station and responsive to said first output signal produced by said first means, for transmitting a first message to said second terminal station over each of said first communication links representative of the replacement of said one of of said first links by another of said first links;

third means, located at said second terminal station and responsive to said first message from said first means, for causing signals conveyed over said one of said second links to be conveyed over another of said second links;

fourth means, located at said first terminal station, for interrupting at said first terminal station the flow of signals conveyed over said one of said second links while enabling, at said first terminal station, the flow of said signals conveyed over said another of said second links;

fifth means, located at said second terminal station, for inhibiting the flow of signals, which would have otherwise been conveyed over said one of said second links, at said second terminal station and causing a prescribed encoded signal sequence to be transmitted in their place.

24. A system according to claim 23, wherein said prescribed encoded signal sequence is a PN signal sequence.

25. A system according to claim 23, further comprising sixth means, located at said first terminal station, for selectively communicating with each of the stations along said one of said first communication links over a communication path exclusive of said first and second communication links and causing a selected station to monitor a prescribed transmission characteristic of said one of said second links in response to said prescribed encoded signal sequence.

26. A system according to claim 25, wherein each of said stations includes means for comparing said prescribed encoded signal sequence with a prescribed code and producing an output signal indicative of the degree of mismatch between said prescribed encoded signal sequence and said prescribed code.

27. A system according to claim 26, further comprising seventh means, located at said first terminal station, for identifying that station, for which the degree of mismatch between said prescribed encoded signal sequence and said prescribed code exceeds a preselected value, as being associated with the prescribed change in said characteristic on said one of said second links.

28. In a communication network having first and second terminal stations coupled to each other over a plurality of communication links having at least one repeater station disposed between said first and second terminal stations, a system for controlling the operation of said network comprising:

first means, coupled to each of said communication links, for monitoring a prescribed characteristic of signals transmitted over said links and producing a first output signal in response to a prescribed change in said characteristic on one of said links;

second means, coupled to each of said stations, for monitoring at least one preselected operational or enviromental condition at said each station, and producing a second output signal in response to a prescribed change in said at least one preselected operational or environmental condition;

third means, coupled to said first and second means, for replacing said one of said links with another of said links in response to said first output signal or in response to said second output signal indicating a malfunction in a condition associated with said one of said links;

fourth means for causing a prescribed encoded signal sequence to be transmitted over said replaced one of said communication links; and fifth means, coupled to each of said stations over a communication path exclusive of said communication links, for testing the operation of selected ones of said stations in response to said prescribed encoded signal sequence.

29. A system according to claim 28, wherein said encoded signal sequence includes a PN signal sequence.

30. A system according to claim 28, wherein said fifth means includes means for identifying that one of said selected stations that introduces a prescribed change in the signal transmission characteristic of said one link in response to said prescribed encoded signal sequence.

31. A system according to claim 30, wherein said second means includes means, coupled to each of said stations over said exclusive communication path, for interrogating said stations with respect to the production of said second output signals.

32. In a communication network having a first and second terminal stations coupled to each other over a plurality of communication links having at least one repeater station coupled in said links for regenerating information signals conveyed thereover between said first and second terminal stations, a system for controlling the operation of said network comprising:

first means, coupled to said communication links, for monitoring a prescribed content of said information signals transmitted over said links and producing a first output signal in response to errors in said prescribed content of said information signals; and second means, responsive to said first output signal produced by said first means, for replacing said one of said links with another of said links, and wherein said second means includes means for replacing said one of said links with said another of said links irrespective of the degree of synchronization of information signals on said one and other links in response to said output signal being representative of at least a first preselected rate of errors in said prescribed content of said information signals.

33. In a communication network having a first and second terminal stations coupled to each other over a plurality of communication links having at least one repeater station coupled in said links for regenerating information signals conveyed thereover between said first and second terminal stations, a system for controlling the operation of said network comprising:

first means, coupled to said communication links, for monitoring a prescribed content of said information signals transmitted over said links and producing a first output signal in response to errors in said prescribed content of said information signals; and second means, responsive to said first output signal produced by said first means, for replacing said one of said links with another of said links, and wherein said second means includes means for initially synchronizing the information signals on said one and another links and then causing the replacement of said one of said links with said another of said links in response to said first output signal being representative of no more than a first preselected rate of error in said prescribed content of said information signals.

34. A system according to claim 32, wherein said second means includes means for initially synchronizing the information signals on said one and another links and then causing the replacement of said one of said links with said another of said links in response to said first output signal being representative of no more than a second preselected rate of errors in said prescribed content of said information signals.

35. In a communication network having a first and second terminal stations coupled to each other over a plurality of communication links having at least one repeater station coupled in said links for regenerating information signals conveyed thereover between said first and second terminal stations, a system for controlling the operation of said network comprising:

first means, coupled to said communication links, for monitoring a prescribed content of said information signals transmitted over said links and producing a first output signal in response to errors in said prescribed content of said information signals; and second means, responsive to said first output signal produced by said first means, for replacing said one of said links with another of said links, and wherein said information signals comprise encoded digital data containing periodically located synchronization data signals, said synchronization data signals corresponding to said prescribed content of said information signals and being employed by the terminal station receiving the information signals that have been transmitted over a communication link for decoding said encoded digital data.

36. A communication network comprising:
a first terminal station;
a second terminal station;
at least one repeater station disposed between said first and second terminal stations;
a plurality of first communication links, coupled to each of said stations, for conveying data from said first terminal station to said second terminal station;
a plurality of second communication links, coupled to each of said stations, for conveying data from said second terminal station to said first terminal station;
a plurality of first means, located at said first terminal station and coupled to receive data to be transmitted over respective ones of said first communications links, each of said first means including means for encoding data to be transmitted, and
means for transmitting said encoded data over a respective one of said first communication links;

a plurality of second means, located at said second terminal station and coupled to respective ones of said first communication links, for decoding encoded data that has been transmitted from said first terminal station to said second terminal station, each of said second means including means for receiving encoded data transmitted over a respective one of said first communication links, and
means for decoding the received encoded data and outputting the original data;

a plurality of third means, located at said second terminal station and coupled to receive data to be transmitted over respective ones of said second communications links, each of said third means including means for encoding data to be transmitted
means for transmitting said encoded data over a respective one of said second communication links;
a plurality of fourth means, located at said first terminal station and coupled to respective ones of said second communication links, for decoding encoded data that has been transmitted from said second terminal station to said first terminal station, each of said fourth means including means for receiving encoded data transmitted over a respective one of said second communication links, and
means for decoding the received encoded data and outputting the original data;

fifth means, located at said first terminal station, for controlling the operation of each of said first and fourth means, and coupled to each of said first and fourth means for supplying information signals to be contained in the encoded data transmitted by each of said first means and for receiving information signals contained in the encoded data decoded by each of said fourth means; and sixth means, located at said second terminal station, for controlling the operation of each of said second and third means, and coupled to each of said second and third means for supplying information signals to be contained in the encoded data transmitted by each of said third means, and for receiving information signals contained in the encoded data decoded by each of said second means; and wherein each of said encoding means includes means for encoding data to be transferred to the form of a sequence of a selected number of data bits periodically separated by a prescribed control bit, information signals from said fifth and sixth means being encoded as first preselected ones of said control bits.

37. A communication network according to claim 36, wherein each of said transmitting means includes means for scrambling data to be transmitted.

38. A communication network according to claim 37, wherein each of said first and third means includes means for generating a prescribed synchronization data sequence individual signal portions of which are contained in the encoded data as second preselected ones of said control bits.

39. A communication network according to claim 37, wherein each of said first and second terminal stations further includes means for coupling further data signals, exclusive of said data to be transmitted, to said first and third means and encoding said further data signals as second preselected ones of said control bits.

40. A communication network according to claim 39, wherein each of said first and third means includes means for alternately inserting said information signals from said fifth and sixth means and said further data signals into said encoded data as said first preselected control bit.

41. A communication network according to claim 40, wherein each of said first and third means includes means for generating a prescribed synchronization data sequence individual signal portions of which are contained in the encoded data as third preselected ones of said control bits.

42. A communication network according to claim 38, wherein said prescribed synchronization data sequence comprises an N-bit maximal length pseudorandom digital sequence, where N is an integer.

43. A communication network according to claim 38, wherein each of said second and fourth means includes means for removing from said encoded data said prescribed synchronization data sequence.

44. A communication network according to claim 38, wherein each of said fifth and sixth means includes means for monitoring said prescribed synchronization data sequence contained in the encoded data received by said fourth and second means, respectively, and supplying information signals representative of the replacement of one communication link by another communication link to said first and third means respectively, upon the bit error rate in said monitored prescribed synchronization data sequence exceeding a prescribed value.

45. A communication network according to claim 44, further including a third communication link, exclusive of said first and second pluralities of communication links, coupled to said first and second repeater stations, and wherein each of said stations includes means, coupled to said first and second terminal stations and to said at least one pluralities of communication links, for monitoring the bit error rate of the throughput for that repeater station for a specified one of said first and second communication links in response to the transmission of said prescribed synchronization data sequence over said specified one of said first and second communication links and transmitting a message indicative of said bit error rate over said third communication link.

46. In a communication network having first and second terminal stations between which information signals are conveyed over a plurality of normally active communication channels, said network further including an auxiliary communication channel to be substituted in place of a normally active channel in the event of a signal transmission fault on the normally active channel, and including at least one repeater station for regenerating information signals along said communication channels, each of said terminal stations including a control apparatus for controlling the operation of said network, the improvement wherein each control apparatus is coupled to each of said communication channels for exchanging messages therebetween for controlling the substitution of said auxiliary channel in place of one of said normally active channels, and wherein said network further includes an additional communication channel, exclusive of said normally active and auxiliary channels coupled to each control apparatus and repeater station, over which interrogation messages for monitoring the operation of said normally active and protection channels are conveyed, the frequency of transmission of said interrogation messages being established in accordance with a prescribed relationship between the stations between which the messages are conveyed.

47. An improved communication network according to claim 46, wherein each control apparatus includes a first audio interface circuit for interfacing audio and voice signals generated at said terminal stations with the data signals that are transmitted over each of the active ones of said normally active and protection channels.

48. An improved communication network according to claim 47, wherein each control apparatus includes a second audio interface circuit, for interfacing audio and voice signals with the interrogation messages that are transmitted over said additional communication channel.

49. In a communication network having first and second terminal stations, a plurality of information carrying normally active channels and at least one auxiliary channel linking said first and second terminal stations through at least one repeater station, the improvement comprising:

first means for monitoring a prescribed characteristic of information signals received at the terminal station over each active one of said channels and producing a first output signal indicative of said prescribed characteristic;

second means, coupled to said ffirst means, for causing a substitution of an auxiliary channel for that one of said normally active channels for which said first output signal from said first means indicates an unacceptable prescribed characteristic of said information signals transmitted over said one of said normally active channels;

third means, for causing a prescribed portion of the information signals carried over said normally active channels to be conveyed through said substituted channel; and fourth means, coupled to each of said stations, for monitoring a prescribed characteristic of the prescribed portion of the information signals carried over said substituted channel, at selected ones of said stations.

50. The improvement according to claim 49, further including fifth means, coupled to said fourth means, for identifying the location of a fault in said substituted channel as corresponding to that station the throughput of which causes an unacceptable change in said prescribed characteristic of the prescribed portion of the information signals carried over said substituted channel.

51. The improvement according to claim 50, wherein said information signals are comprised of digital data signals scrambled in accordance with a preselected scrambling code.

52. The improvement according to claim 51, wherein said digital data signals include a synchronization signal sequence periodically distributed among said data signals.

53. The improvement according to claim 52, wherein said synchronization signal sequence corresponds to said preselected scrambling code.

54. The improvement according to claim 53, wherein said preselected scrambling code is a maximal length N-bit PN sequence.

55. The improvement according to claim 49, wherein, for a respective information carrying channel, each terminal station includes means, coupled to receive digital data information signals to be carried over said respective information carrying channel;

means, coupled to receive prescribed additional digital signals to be carried over said respective information carrying channel; and means for combining said digital data information signals with said additional digital signals and causing said signals to be transmitted over said respective information carrying channel.

56. The improvement according to claim 55, wherein said combining means includes means for multiplexing a preselected plurality of said digital data information signals with a prescribed number of said additional digital signals.

57. The improvement according to claim 56, wherein prescribed ones of said additional digital signals correspond to said prescribed portion of said information signals.

58. The improvement according to claim 57, wherein said information signals are comprised of digital data signals scrambled in accordance with a preselected scrambling code.

59. The improvement according to claim 58, wherein said preselected scrambling code corresponds to said prescribed portion of said information signals.

60. The improvement according to claim 59, wherein said preselected scrambling code is a maximal length N-bit PN sequence.

61. The improvement according to claim 49, wherein said second means includes control means, associated with each of said terminal stations, for controlling the substitution of said auxiliary channel for said that one of said normally active channels in accordance with control signals transmitted between said terminal stations over at least one of said channels.

62. The improvement according to claim 61, wherein said control signals are transmitted between said terminal stations over each of the channels that is carrying information signals between the terminal stations.

63. The improvement according to claim 49, further including fifth means, associated with each of said stations, for monitoring prescribed operational or environmental conditions in said stations and generating a second output signal indicative thereof.

64. The improvement according to claim 63, wherein each of said fourth and fifth means includes local monitoring means, coupled in each said stations, for monitoring said prescribed characteristic and prescribed operational or environmental conditions, respectively.

65. The improvement according to claim 64, wherein said second means includes control means, associated with each of said terminal stations, for controlling the substitution of said auxiliary channel for said that one of said normally active channels in accordance with control signals transmitted between said terminal stations over at least one of said channels.

66. The improvement according to claim 65, wherein said control signals are transmitted between said terminal stations over each of the channels that is carrying information signals between the terminal stations.

67. The improvement according to claim 65, wherein said control means further includes means for controlling the substitution of said auxiliary channel for one of said normally active channels in accordance with said second output signal.

68. The improvement according to claim 64, further including an additional communication channel, exclusive of said normally active and auxiliary channels and over which said information signals are not carried, coupling the local monitoring means of each station to each terminal station.

69. The improvement according to claim 49, wherein said fourth means includes local monitoring means, coupled in each of said stations, for monitoring said prescribed characteristic of the prescribed portion of said information signals carried over said substituted channel.

70. The improvement according to claim 69, further including an additional communication channel, exclusive of said normally active and auxiliary channels and over which said information signals are not carried, coupling the local monitoring means of each station to each terminal station.

71. The improvement according to claim 70, wherein said second means is associated with each of said terminal stations and is coupled to said additional communication channel.

72. The improvement according to claim 70, wherein said local monitoring means includes means for responding to encoded interrogation signals transmitted from a terminal station over said additional communication channel and transmitting encoded reply signals to said terminal station representative of said monitored characteristics.

73. The improvement according to claim 72, wherein each of said terminal stations includes means for coupling voice signals onto and from said additional communication channel.

74. The improvement according to claim 73, wherein said encoded interrogation signals and said encoded reply signals are comprised of digitally encoded signals.

75. The improvement according to claim 74, wherein said digitally encoded signals are formed of digitally-on/off keyed tone signals.

76. The improvement according to claim 74, wherein at least one of said repeater stations includes means for coupling voice signals with respect to said additional communication channel.

77. The improvement according to claim 61, wherein, for a respective information carrying channel, each terminal station includes
means coupled to receive digital data information signals to be carried over said respective information carrying channel;
means coupled to receive prescribed additional digital signals to be carried over said respective information carrying channel; and
means for combining said digital data information signals with said additional digital signals and causing said signals to be transmitted over said respective information carrying channel.

78. The improvement according to claim 77, wherein said control signals are transmitted between said terminal stations over each of the channels that is carrying information signals between the terminal stations.

79. The improvement according to claim 77, wherein first preselected ones of said additional digital signals comprise said control signals.

80. The improvement according to claim 79, wherein a terminal station further includes means for digitally encoding audio signals to be coupled to said combining means as second preselected ones of said additional digital signals.

81. The improvement according to claim 80, wherein third preselected ones of said additional digital signals correspond to said preselected portion of said information signals.

82. The improvement according to claim 81, wherein said preselected portion of said information signals corresponds to a prescribed scrambling signal sequence.

83. The improvement according to claim 81, wherein said combining means includes means for multiplexing a preselected plurality of said digital data information signals with a prescribed number of said additional digital signals.

84. The improvement according to claim 83, wherein said preselected portion of said information signals corresponds to a prescribed synchronization signal sequence in accordance with which the multiplexed signals carried over a normally active or auxiliary communication channel are demultiplexed.

85. The improvement according to claim 70, wherein each of said normally active and auxiliary communication channels is comprised of duplex fiber optic channel and said additional communication channel has a frequency spectrum characteristic different from that of a fiber optic communication channel.

86. A communication network comprising:
first and second terminal stations;
a plurality of information carrying normally active channels and an auxiliary channel linking said first and second terminal stations through at least one repeater station;
an additional communication channel, exclusive of said normally active and auxiliary channels and over which said information signals are not carried, coupled to each of said repeater and terminal stations;
first means for monitoring a prescribed characteristic of information signals received at a terminal station over an active one of said plurality of information carrying normally active channels and selectively causing, via one of said plurality of normally active and auxiliary channels, a substitution of said auxiliary channel for one of said normally active channels depending upon said monitored prescribed characteristic; and
second means, coupled to said first means, for causing a preselected portion of said information signals to be carried over said substituted channel and for monitoring, via said additional channel, a prescribed characteristic of said preselected portion of said information signals at at least one of said stations.

87. The improvement according to claim 86, wherein each of said terminal stations includes means for coupling voice signals onto and from said additional communication channel.

88. The improvement according to claim 87, wherein at least one of said repeater stations includes means for coupling voice signals with respect to said additional communication channel.

89. The improvement according to claim 87, wherein each of said terminal stations further includes means for coupling audio signals, exclusive of said information signals, with respect to each of the active ones of said plurality of normally active and auxiliary channels.

90. In a communication network having first and second terminal stations coupled to each other over a plurality of first communication links for conveying signals from said first terminal station to said second terminal station and a plurality of second communication links for conveying signals from said second terminal station to said first terminal station, and at least one repeater station coupled in said links for regenerating information signals conveyed over said links, a system for controlling the operation of said network comprising
first and second control apparatus, respectively located at said first and second terminal stations, each control apparatus comprising:
first means of monitoring a prescribed characteristic of signals transmitted over the communication links from the other terminal station and producing a first output signal in response to a prescribed change in said characteristic on one of said links;
second means, responsive to said first output signal produced by said first means, for transmitting messages to the control apparatus of the other terminal station over each of said communication links representative of the replacement of said one link which has caused the production of said first output signal by said first means; and
third means, for selectively communicating with each of the stations along said links over a communication path exclusive of said communication links for selectively testing the operation of the stations along said one link.

91. A system according to claim 90, wherein said first means includes means for controlling the replacement of said one link by another of said links in accordance with messages transmitted between the second means of each control apparatus.

92. A system according to claim 90, wherein said third means includes means for selectively testing the signal transmission capabilities of the stations along each link and producing a second output signal in response to the detection of an anomaly in the signal transmission capability of a tested station.

93. A system according to claim 90, wherein said third means includes means for selectively monitoring operational or environmental conditions of the stations along each link over said exclusive communication path.

94. A system according to claim 93 wherein said second means for transmitting messages to the control apparatus of the other station over each of said links representative of the replacement of that link for which said third means has monitored a prescribed defective operational or environmental condition.

95. In a communication network having first and second terminal stations coupled to each other over a plurality of first communication links for conveying signals from said first terminal station to said second terminal station and a plurality of second communication links for conveying signals from said second terminal station to said first terminal station, and at least one repeater station coupled in said links for regenerating information signals conveyed over said links, a system for controlling the operation of said network comprising:
first and second control apparatus, respectively located at said first and second terminal stations, each control apparatus comprising:
first means for monitoring a prescribed characteristic of signals transmitted over the communication links from the other terminal station;
second means for selectively testing the condition and operation of each station over a communication path exclusive of said communication links; and
third means, responsive to one of the detection of a prescribed change in the characteristic of monitored signals by said first means and the detection of a prescribed anomaly in the condition or operation of a selectively tested station by said second means, for communicating with the control apparatus of the other terminal station over each of said communication links and thereby causing the replacement of one of said communication links with an auxiliary communication link.

96. A system according to claim 95, wherein said second means includes means for transmitting and receiving prescribed encoded messages over said exclusive communication path with respect to each station along said communication links.

97. A system according to claim 96, wherein said second means further includes means for coupling voice signals with respect to said exclusive communication path.

98. A system according to claim 95, wherein said third means includes means for injecting and recovering prescribed control signals as part of the signals conveyed between said first and second terminal stations over said communication links, and wherein said first means includes means for controlling the replacement of said one of said communication links with said auxiliary communication link in accordance with said prescribed control signals.

99. A system according to claim 98, wherein said second means includes means for transmitting and receiving prescribed encoded messages over said exclusive communication path with respect to each station along said communication links.

100. A system according to claim 99, wherein said second means further includes means for coupling voice signals with respect to said exclusive communication path.

101. A system according to claim 95, wherein said first means includes means for controlling the replacement of said one of said communication links with said auxiliary communication link in accordance with predetermined control signals externally coupled to said control apparatus.

102. A system according to claim 101, wherein said third means includes means for injecting and recovering prescribed control signals as part of the signals conveyed between said first and second terminal stations over said communication links, and wherein said first means includes means for controlling the replacement of said one of said communication links with said auxiliary communication link in accordance with said prescribed control signals.

103. A system according to claim 101, wherein said first means includes
 means for inhibiting the transmission of signals which would have otherwise been conveyed over said one of said communication links and causing a first prescribed sequence of signals to be transmitted in their place and wherein
 said second means includes means, located at each of said stations for comparing said first prescribed sequence of signals with a prescribed code and producing an output signal indicative of the degree of mismatch between said first prescribed sequence of signals and said prescribed code.

104. A system according to claim 95, wherein each of said communication links is a fiber optic communication link and said exclusive communication path is a non-optical communication path.

* * * * *